(12) United States Patent
Pederson et al.

(10) Patent No.: US 7,046,160 B2
(45) Date of Patent: *May 16, 2006

(54) LED WARNING LIGHT AND COMMUNICATION SYSTEM

(76) Inventors: John C. Pederson, 621 Roosevelt Rd., St. Cloud, MN (US) 56301; Dan Severson, 1025 Water St. South, Sauk Rapids, MN (US) 56379; Cathy Jo Severson, 1025 Water St. South, Sauk Rapids, MN (US) 56379

( * ) Notice: Subject to any disclaimer, the term of this patent is extended or adjusted under 35 U.S.C. 154(b) by 0 days.

This patent is subject to a terminal disclaimer.

(21) Appl. No.: 11/102,989

(22) Filed: Apr. 11, 2005

(65) Prior Publication Data

US 2005/0231381 A1 Oct. 20, 2005

Related U.S. Application Data

(62) Division of application No. 09/993,040, filed on Nov. 14, 2001, now Pat. No. 6,879,263.

(60) Provisional application No. 60/248,894, filed on Nov. 15, 2000.

(51) Int. Cl.
*G08B 5/22* (2006.01)

(52) U.S. Cl. .................... 340/815.45; 345/82; 398/118

(58) Field of Classification Search .......... 340/815.45, 340/691.1, 691.4, 691.8, 901, 902, 907, 908, 340/945, 961, 981, 983–985; 398/118, 128, 398/130, 135, 140, 172; 362/800; 345/55, 345/82

See application file for complete search history.

(56) References Cited

U.S. PATENT DOCUMENTS

| | | | |
|---|---|---|---|
| 2,082,279 A | 6/1937 | Fore | |
| 3,469,686 A | 9/1969 | Gutsche et al. | 206/65 |
| 3,701,043 A | 10/1972 | Zuleeg et al. | 331/94.5 |
| 3,705,316 A | 12/1972 | Burrous et al. | 307/311 |
| 3,863,075 A | 1/1975 | Ironmonger et al. | 250/552 |
| 3,867,718 A | 2/1975 | Moe | 340/31 |
| 3,889,147 A | 6/1975 | Groves | 313/500 |
| 4,149,111 A | 4/1979 | Coates, Jr. | 315/169.4 |
| 4,243,985 A | 1/1981 | Quayle | 340/753 |
| 4,254,453 A | 3/1981 | Mouyard et al. | 362/240 |
| 4,271,408 A | 6/1981 | Teshima et al. | 340/702 |
| 4,298,806 A | 11/1981 | Herold | 250/504 |
| 4,301,461 A | 11/1981 | Asano | 357/17 |
| 4,319,306 A | 3/1982 | Stanuch | 362/35 |
| 4,336,580 A | 6/1982 | Mouyard et al. | 362/347 |
| 4,342,944 A | 8/1982 | SpringThorpe | 313/499 |
| 4,390,931 A | 6/1983 | Gorick et al. | 362/267 |
| 4,434,510 A | 2/1984 | Lemelson | 455/603 |
| 4,445,132 A | 4/1984 | Ichikawa et al. | 357/32 |
| 4,556,862 A | 12/1985 | Meinershagen | 340/67 |
| 4,598,198 A | 7/1986 | Fayfield | 250/205 |

(Continued)

FOREIGN PATENT DOCUMENTS

DE 4304216 A1 8/1994

(Continued)

*Primary Examiner*—Thomas Mullen
(74) *Attorney, Agent, or Firm*—Vidas, Arrett & Steinkraus, PA

(57) ABSTRACT

A light emitting diode (LED) warning signal light and communication device comprising a controller for generating a first observable light signal and a second non-observable light signal within said first light signal. The second light signal is formed of packets of individual pulsed light which may be processed for comparison to data stored in memory integral to a controller for communication of information to an individual through the use of pulsed light signals.

23 Claims, 46 Drawing Sheets

U.S. PATENT DOCUMENTS

| | | | |
|---|---|---|---|
| 4,614,866 A | 9/1986 | Liss et al. ................... 250/214 |
| 4,615,131 A | 10/1986 | Wakatake ................... 40/473 |
| 4,616,225 A | 10/1986 | Woudenberg ............... 340/908 |
| 4,630,180 A | 12/1986 | Muraki et al. .............. 362/223 |
| 4,630,183 A | 12/1986 | Fujita ......................... 362/311 |
| 4,633,280 A | 12/1986 | Takasu ........................ 357/17 |
| 4,654,629 A | 3/1987 | Bezos et al. ................. 340/87 |
| 4,703,219 A | 10/1987 | Mesquida ................... 313/111 |
| 4,710,977 A | 12/1987 | Lemelson .................... 455/603 |
| 4,716,296 A | 12/1987 | Bussiere et al. ............ 250/504 |
| 4,720,835 A | 1/1988 | Akiba et al. ................. 372/50 |
| 4,724,312 A | 2/1988 | Snaper ........................ 250/203 |
| 4,742,432 A | 5/1988 | Thillays et al. ............. 361/400 |
| 4,799,135 A | 1/1989 | Inukai et al. ................ 362/296 |
| 4,821,338 A | 4/1989 | Naruse et al. ............... 455/617 |
| 4,868,719 A | 9/1989 | Kouchi et al. ............... 362/61 |
| 4,918,497 A | 4/1990 | Edmond ....................... 357/17 |
| 4,928,084 A | 5/1990 | Reiser ......................... 340/479 |
| 4,929,866 A | 5/1990 | Murata et al. ............... 313/500 |
| 4,935,665 A | 6/1990 | Murata ........................ 313/500 |
| 4,954,822 A | 9/1990 | Borenstein .................. 340/925 |
| 4,965,644 A | 10/1990 | Kawabata et al. ............ 357/17 |
| 4,966,862 A | 10/1990 | Edmond ....................... 437/100 |
| 4,975,814 A | 12/1990 | Schairer ...................... 362/240 |
| 4,990,970 A | 2/1991 | Fuller .......................... 357/17 |
| 5,000,569 A | 3/1991 | Nylund ........................ 356/237 |
| 5,027,168 A | 6/1991 | Edmond ....................... 357/17 |
| 5,038,406 A | 8/1991 | Titterton et al. ............. 359/113 |
| 5,041,947 A | 8/1991 | Yuen et al. ................... 362/35 |
| 5,045,767 A | 9/1991 | Wakatake .................... 318/696 |
| 5,050,055 A | 9/1991 | Lindsay et al. .............. 362/293 |
| 5,060,303 A | 10/1991 | Wilmoth ...................... 359/152 |
| 5,067,788 A | 11/1991 | Jannson et al. ............... 385/2 |
| 5,091,828 A | 2/1992 | Jincks et al. ................. 362/35 |
| D324,921 S | 3/1992 | Stanuch et al. ............... D26/35 |
| 5,093,768 A | 3/1992 | Ohe ............................. 362/241 |
| 5,097,397 A | 3/1992 | Stanuch et al. ............... 362/74 |
| 5,097,612 A | 3/1992 | Williams ...................... 40/591 |
| 5,101,326 A | 3/1992 | Roney .......................... 362/61 |
| 5,122,943 A | 6/1992 | Pugh ............................ 362/256 |
| 5,136,287 A | 8/1992 | Borenstein .................. 340/925 |
| 5,159,486 A | 10/1992 | Webb ........................... 359/229 |
| 5,187,547 A | 2/1993 | Niina et al. ................... 257/77 |
| 5,193,201 A * | 3/1993 | Tymes ......................... 708/191 |
| 5,198,746 A | 3/1993 | Gyugyi et al. ............... 323/207 |
| 5,198,756 A | 3/1993 | Jenkins et al. ............... 324/158 |
| 5,220,235 A | 6/1993 | Wakimizu et al. ............ 313/25 |
| 5,224,773 A | 7/1993 | Arimura ...................... 362/227 |
| 5,233,204 A | 8/1993 | Fletcher et al. .............. 257/13 |
| 5,235,498 A | 8/1993 | Van Dulmen et al. ....... 362/296 |
| 5,283,425 A | 2/1994 | Imamura ..................... 250/208 |
| 5,291,196 A | 3/1994 | Defour ........................ 340/961 |
| 5,296,840 A | 3/1994 | Gieffers ....................... 340/474 |
| 5,298,738 A | 3/1994 | Gebert et al. ................ 250/222 |
| 5,302,965 A | 4/1994 | Belcher et al. ............... 345/31 |
| 5,313,187 A | 5/1994 | Choi et al. ................... 340/331 |
| 5,321,593 A | 6/1994 | Moates ........................ 362/251 |
| 5,357,123 A | 10/1994 | Sugawara .................... 257/88 |
| 5,357,409 A | 10/1994 | Glatt ............................ 362/105 |
| 5,359,255 A | 10/1994 | Kawai et al. ................. 313/17 |
| 5,361,190 A | 11/1994 | Roberts et al. ............... 362/61 |
| 5,362,971 A | 11/1994 | McMahon et al. ........... 250/577 |
| 5,400,140 A | 3/1995 | Johnston ...................... 356/345 |
| 5,403,916 A | 4/1995 | Watanabe et al. ............ 437/127 |
| 5,406,095 A | 4/1995 | Koyama et al. .............. 257/88 |
| 5,410,328 A | 4/1995 | Yoksza et al. ................ 345/82 |
| 5,410,453 A | 4/1995 | Ruskouski ................... 362/20 |
| 5,416,627 A | 5/1995 | Wilmoth ...................... 359/159 |
| 5,419,065 A | 5/1995 | Lin .............................. 40/550 |
| 5,420,444 A | 5/1995 | Sawase et al. ................ 257/99 |
| 5,422,623 A | 6/1995 | Bader et al. .................. 340/331 |
| 5,426,417 A | 6/1995 | Stanuch ....................... 340/473 |
| 5,434,693 A | 7/1995 | Tanaka et al. ............... 359/180 |
| 5,436,809 A | 7/1995 | Brassier et al. .............. 362/61 |
| 5,450,301 A | 9/1995 | Waltz et al. .................. 362/231 |
| 5,453,729 A | 9/1995 | Chu ............................. 362/183 |
| 5,465,142 A | 11/1995 | Krumes et al. .............. 356/5.01 |
| 5,471,371 A | 11/1995 | Koppolu et al. ............. 362/32 |
| 5,475,241 A | 12/1995 | Harrah et al. ................. 257/99 |
| 5,482,896 A | 1/1996 | Tang ............................ 437/209 |
| 5,490,048 A | 2/1996 | Brassier et al. .............. 362/238 |
| 5,490,049 A | 2/1996 | Montalan et al. ............ 362/240 |
| 5,491,350 A | 2/1996 | Unno et al. ................... 257/99 |
| 5,498,883 A | 3/1996 | Lebby et al. ................. 257/95 |
| 5,514,627 A | 5/1996 | Lowery et al. ............... 437/209 |
| 5,516,727 A | 5/1996 | Broom ......................... 437/211 |
| 5,519,720 A | 5/1996 | Hirano et al. ................ 372/36 |
| 5,526,237 A | 6/1996 | Davenport et al. ........... 362/32 |
| 5,528,474 A | 6/1996 | Roney et al. ................. 362/249 |
| 5,532,472 A | 7/1996 | Furuta ......................... 250/214 |
| 5,546,496 A * | 8/1996 | Kimoto et al. ............... 385/146 |
| 5,552,780 A * | 9/1996 | Knockeart ................... 340/991 |
| 5,567,036 A | 10/1996 | Theobald et al. ............. 362/80 |
| 5,569,939 A | 10/1996 | Choi ............................ 257/94 |
| 5,575,459 A | 11/1996 | Anderson .................... 362/240 |
| 5,580,156 A | 12/1996 | Suzuki et al. ................ 362/184 |
| 5,585,783 A | 12/1996 | Hall ............................. 340/473 |
| 5,593,223 A | 1/1997 | Koizumi ...................... 362/255 |
| 5,593,459 A | 1/1997 | Gamblin ...................... 8/539 |
| 5,594,415 A | 1/1997 | Ishikawa et al. ............. 340/467 |
| 5,598,290 A | 1/1997 | Tanaka et al. ............... 359/180 |
| 5,604,480 A | 2/1997 | Lamparter .................... 340/433 |
| 5,606,444 A | 2/1997 | Johnson et al. .............. 359/152 |
| 5,612,201 A | 3/1997 | De Plaen et al. ............. 435/91.2 |
| 5,612,231 A | 3/1997 | Holm et al. .................. 437/23 |
| 5,625,201 A | 4/1997 | Holm et al. .................. 257/88 |
| 5,627,851 A | 5/1997 | Takahashi .................... 372/44 |
| 5,631,474 A | 5/1997 | Saitoh ......................... 257/88 |
| 5,632,551 A | 5/1997 | Roney et al. ................. 362/249 |
| 5,634,287 A | 6/1997 | Lamparter .................... 40/572 |
| 5,634,357 A | 6/1997 | Nutter et al. ................. 106/31.25 |
| 5,634,711 A | 6/1997 | Kennedy et al. ............. 362/119 |
| 5,635,902 A | 6/1997 | Hochstein ................... 340/433 |
| 5,636,916 A | 6/1997 | Sokolowski ................. 362/61 |
| 5,644,291 A | 7/1997 | Jozwik ........................ 340/472 |
| 5,656,829 A | 8/1997 | Sakaguchi et al. ........... 257/94 |
| 5,660,461 A | 8/1997 | Ignatius et al. .............. 362/241 |
| 5,661,645 A | 8/1997 | Hochstein ................... 363/89 |
| 5,661,742 A | 8/1997 | Huang et al. ................. 372/46 |
| 5,664,448 A | 9/1997 | Swan et al. .................. 70/224 |
| 5,674,000 A | 10/1997 | Kalley ......................... 362/293 |
| 5,694,112 A | 12/1997 | VannRox et al. ............ 340/472 |
| 5,696,500 A | 12/1997 | Diem ........................... 340/825.44 |
| 5,697,175 A | 12/1997 | Schwartz .................... 40/552 |
| 5,705,047 A | 1/1998 | Lee ............................. 205/123 |
| 5,707,891 A | 1/1998 | Izumi et al. ................. 437/120 |
| 5,722,760 A | 3/1998 | Chien .......................... 362/84 |
| 5,726,535 A | 3/1998 | Yan ............................. 315/185 |
| 5,726,786 A | 3/1998 | Heflinger .................... 359/152 |
| 5,734,343 A | 3/1998 | Urbish et al. ................ 340/942 |
| 5,736,925 A | 4/1998 | Knauff et al. ................ 340/468 |
| 5,739,552 A | 4/1998 | Kimura et al. ............... 257/89 |
| 5,739,592 A | 4/1998 | Rigsby et al. ................ 307/9.1 |
| 5,758,947 A | 6/1998 | Glatt ........................... 362/105 |
| 5,760,531 A | 6/1998 | Pederson .................... 313/25 |
| 5,781,105 A | 7/1998 | Bitar et al. ................... 362/84 |
| 5,785,418 A | 7/1998 | Hochstein ................... 362/373 |
| 5,786,918 A | 7/1998 | Suzuki et al. ................ 359/135 |
| 5,789,768 A | 8/1998 | Lee et al. ..................... 257/96 |
| 5,793,062 A | 8/1998 | Kish, Jr. et al. ............. 257/98 |
| 5,796,376 A | 8/1998 | Banks ......................... 345/82 |
| 5,804,822 A | 9/1998 | Brass et al. .................. 250/302 |
| 5,805,081 A | 9/1998 | Fikacek ...................... 340/908 |
| 5,806,965 A | 9/1998 | Deese ......................... 362/249 |

| Patent No. | Date | Inventor | Class |
|---|---|---|---|
| 5,808,592 A | 9/1998 | Mizutani et al. | 345/83 |
| 5,809,681 A | 9/1998 | Miyamoto et al. | 40/582 |
| 5,826,965 A | 10/1998 | Lyons | 362/74 |
| 5,828,055 A | 10/1998 | Jebens | 250/214 |
| 5,838,024 A | 11/1998 | Masuda et al. | 257/98 |
| 5,838,247 A | 11/1998 | Bladowski | 340/15.45 |
| 5,838,259 A | 11/1998 | Tonkin | 340/903 |
| 5,848,837 A | 12/1998 | Gustafson | 362/235 |
| 5,872,646 A | 2/1999 | Alderman et al. | 359/169 |
| 5,884,997 A | 3/1999 | Stanuch et al. | |
| 5,898,381 A | 4/1999 | Gartner et al. | 340/815.65 |
| 5,900,850 A | 5/1999 | Bailery et al. | 345/55 |
| 5,917,637 A | 6/1999 | Ishikawa et al. | 359/181 |
| 5,929,788 A | 7/1999 | Vukosic | 340/908.1 |
| 5,931,562 A | 8/1999 | Arato | 362/184 |
| 5,931,570 A | 8/1999 | Yamuro | 362/355 |
| 5,932,860 A | 8/1999 | Plesko | 235/454 |
| 5,934,694 A | 8/1999 | Schugt et al. | 280/33.991 |
| 5,939,996 A | 8/1999 | Kniveton et al. | 340/815.4 |
| 5,959,752 A | 9/1999 | Ota | 359/152 |
| 5,960,135 A | 9/1999 | Ozawa | 385/24 |
| 5,965,879 A | 10/1999 | Leviton | 250/231.13 |
| 5,966,073 A | 10/1999 | Walton | 340/479 |
| 5,975,714 A | 11/1999 | Vetorino et al. | 362/192 |
| 5,990,802 A | 11/1999 | Maskeny | 340/815.45 |
| 6,009,650 A | 1/2000 | Lamparter | 40/572 |
| 6,014,237 A | 1/2000 | Abeles et al. | 359/124 |
| 6,018,899 A | 2/2000 | Hanitz | 40/473 |
| 6,028,694 A | 2/2000 | Schmidt | 359/264 |
| 6,067,003 A | 5/2000 | Wang | 340/463 |
| 6,067,011 A | 5/2000 | Leslie | 340/468 |
| 6,067,018 A | 5/2000 | Skelton et al. | 340/573.3 |
| 6,086,229 A | 7/2000 | Pastrick | 362/494 |
| 6,091,025 A | 7/2000 | Cotter et al. | 174/110 |
| 6,095,661 A | 8/2000 | Lebens et al. | 362/184 |
| 6,095,663 A | 8/2000 | Pond et al. | 362/247 |
| 6,102,696 A | 8/2000 | Osterwalder et al. | 433/29 |
| 6,106,137 A | 8/2000 | Adams et al. | 362/237 |
| 6,118,388 A | 9/2000 | Morrison | 340/908 |
| 6,159,005 A | 12/2000 | Herold et al. | 433/29 |
| 6,166,496 A | 12/2000 | Lys et al. | 315/316 |
| 6,177,678 B1 | 1/2001 | Brass et al. | 250/461.1 |
| 6,183,100 B1 | 2/2001 | Suckow et al. | 362/35 |
| 6,243,492 B1 | 6/2001 | Kamei | 382/181 |
| 6,249,340 B1 | 6/2001 | Jung et al. | 356/73 |
| 6,268,788 B1 | 7/2001 | Gray | 340/5.2 |
| 6,271,913 B1 | 8/2001 | Jung et al. | 356/73 |
| 6,292,575 B1 | 9/2001 | Bortolussi et al. | 382/118 |
| 6,293,904 B1 | 9/2001 | Blazey et al. | 600/26 |
| 6,318,886 B1 | 11/2001 | Stopa et al. | 362/555 |
| 6,352,358 B1 | 3/2002 | Lieberman et al. | 362/294 |
| 6,367,949 B1 | 4/2002 | Pederson | 362/240 |
| 6,380,865 B1 | 4/2002 | Pederson | 340/815.45 |
| 6,424,269 B1 | 7/2002 | Pederson | 340/815.45 |
| 6,461,008 B1 | 10/2002 | Pederson | 362/542 |
| 6,462,669 B1 | 10/2002 | Pederson | 340/815.45 |
| 6,469,631 B1 | 10/2002 | Pederson | 340/815.45 |
| 6,472,996 B1 | 10/2002 | Pederson | 362/35 |
| 6,476,726 B1 | 11/2002 | Pederson | 340/815.45 |
| 6,504,487 B1 | 1/2003 | Pederson | 340/815.45 |
| 6,547,410 B1 | 4/2003 | Pederson | 345/815.45 |
| 6,590,343 B1 | 7/2003 | Pederson | 315/76 |
| 6,590,502 B1 | 7/2003 | Pederson | 340/815.4 |
| 6,600,274 B1 | 7/2003 | Hughes | 315/291 |
| 6,614,359 B1 | 9/2003 | Pederson | 340/815.45 |
| 6,623,151 B1 | 9/2003 | Pederson | 362/35 |
| 6,693,551 B1 | 2/2004 | Pederson | 340/815.45 |
| 6,705,745 B1 | 3/2004 | Pederson | 362/284 |
| 6,707,389 B1 | 3/2004 | Pederson | 340/815.45 |
| 6,788,217 B1 | 9/2004 | Pederson | 340/815.45 |
| 6,814,459 B1 | 11/2004 | Pederson | 362/35 |
| 6,822,578 B1 | 11/2004 | Pederson | 340/815.45 |
| 2003/0156037 A1 | 8/2003 | Pederson | 340/815.45 |

FOREIGN PATENT DOCUMENTS

| | | |
|---|---|---|
| DE | 19502735 A1 | 8/1996 |
| DE | 29712281 U1 | 1/1998 |
| EP | 0326668 A2 | 8/1989 |
| EP | 0468822 A2 | 1/1992 |
| EP | 0531184 A1 | 3/1993 |
| EP | 0531185 A1 | 3/1993 |
| EP | 0596782 A1 | 5/1994 |
| EP | 0633163 A1 | 1/1995 |
| EP | 0688696 A2 | 12/1995 |
| EP | 0709818 A1 | 5/1996 |
| EP | 0793403 B1 | 9/1997 |
| EP | 0896898 A2 | 7/1998 |
| EP | 0887783 A2 | 12/1998 |
| EP | 0890894 A1 | 1/1999 |
| EP | 0967590 | 12/1999 |
| EP | 1043189 A2 | 10/2000 |
| FR | 2658024 | 8/1991 |
| FR | 2680861 | 3/1993 |
| FR | 2707222 | 1/1995 |
| FR | 2800500 | 5/2001 |
| GB | 1241369 A | 8/1971 |
| GB | 2069257 A | 8/1981 |
| GB | 2111270 A * | 6/1983 |
| GB | 2139340 | 11/1984 |
| GB | 2175428 A | 11/1986 |
| GB | 2240650 A | 2/1990 |
| GB | 2272791 A | 5/1994 |
| GB | 2292450 A | 2/1996 |
| GB | 2311401 A | 9/1997 |
| GB | 2323618 A | 9/1998 |
| GB | 2330679 A | 4/1999 |
| GB | 2359179 A | 8/2001 |
| GB | 2359180 A | 8/2001 |
| JP | 60143150 | 7/1985 |
| JP | 06333403 | 12/1994 |
| JP | 08002341 | 1/1996 |
| WO | WO97/50070 A | 12/1997 |
| WO | WO99/35634 | 7/1999 |
| WO | WO99/42985 | 8/1999 |
| WO | WO9949435 A * | 9/1999 |
| WO | WO9949446 A * | 9/1999 |
| WO | WO00/74975 A1 | 12/2000 |
| WO | WO01/10674 A1 | 2/2001 |

* cited by examiner

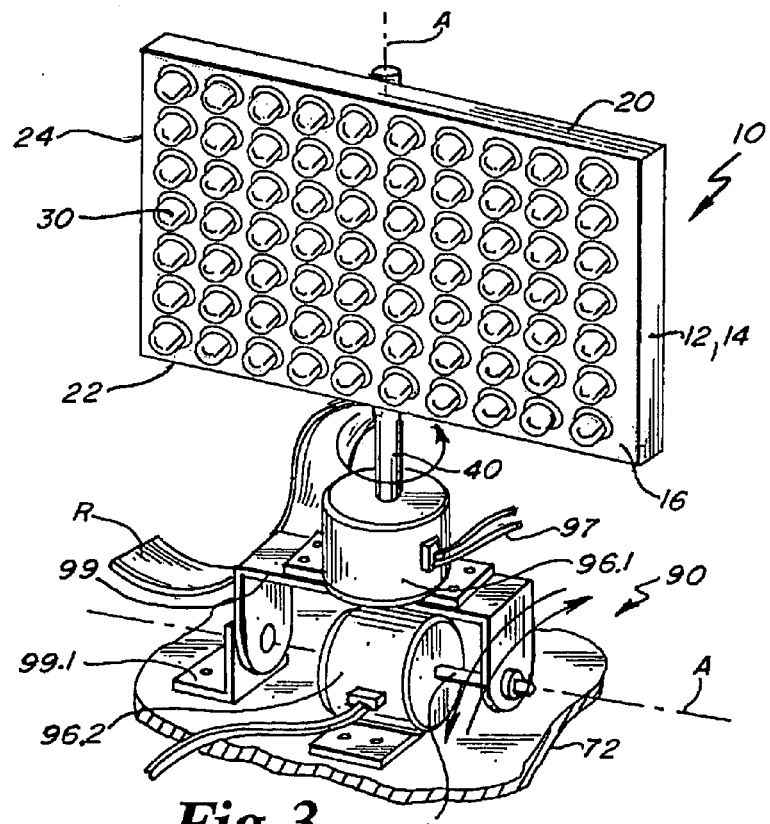
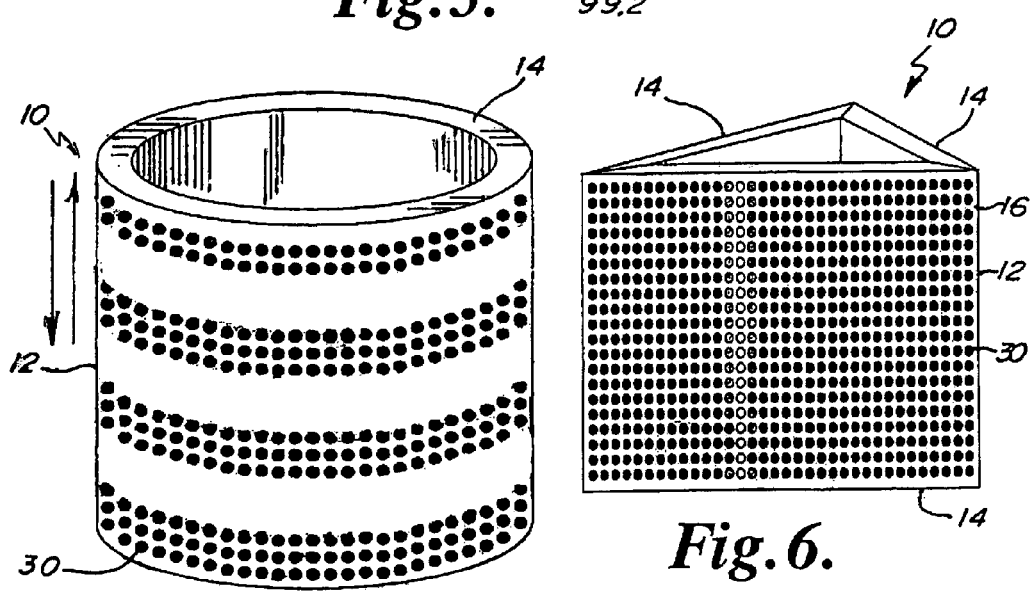
Fig. 3.
Fig. 5.
Fig. 6.

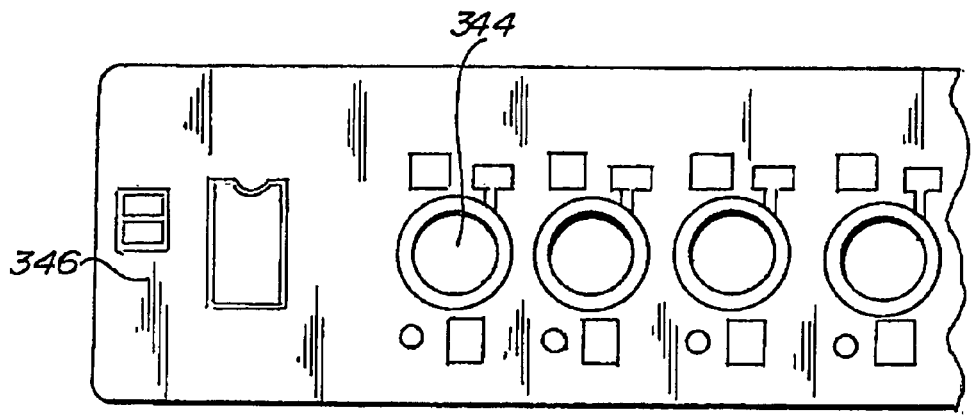
Fig. 36.
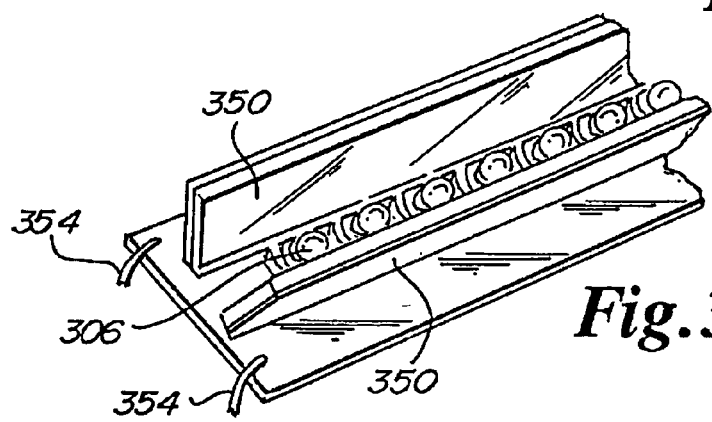
Fig. 37.
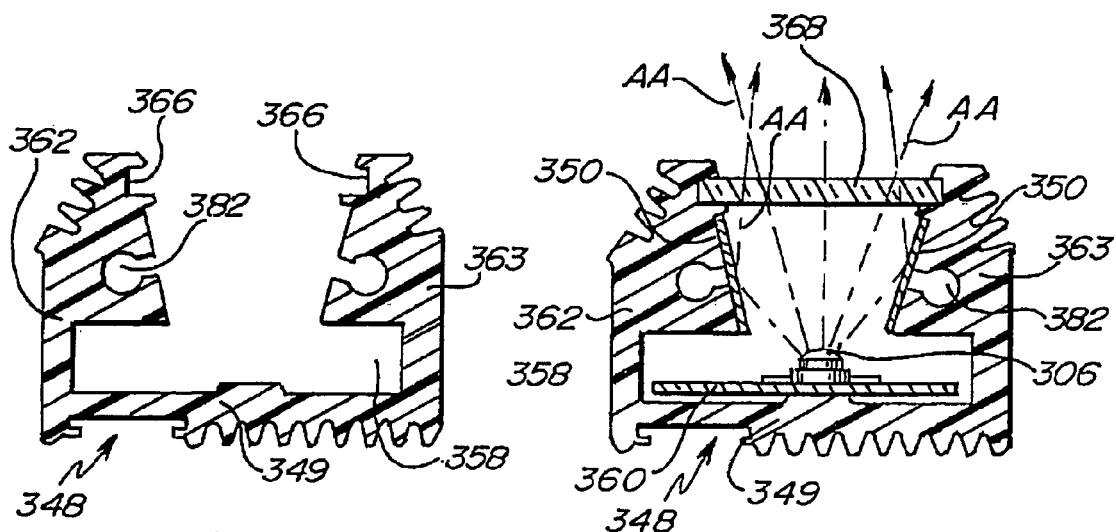
Fig. 38.  Fig. 39.

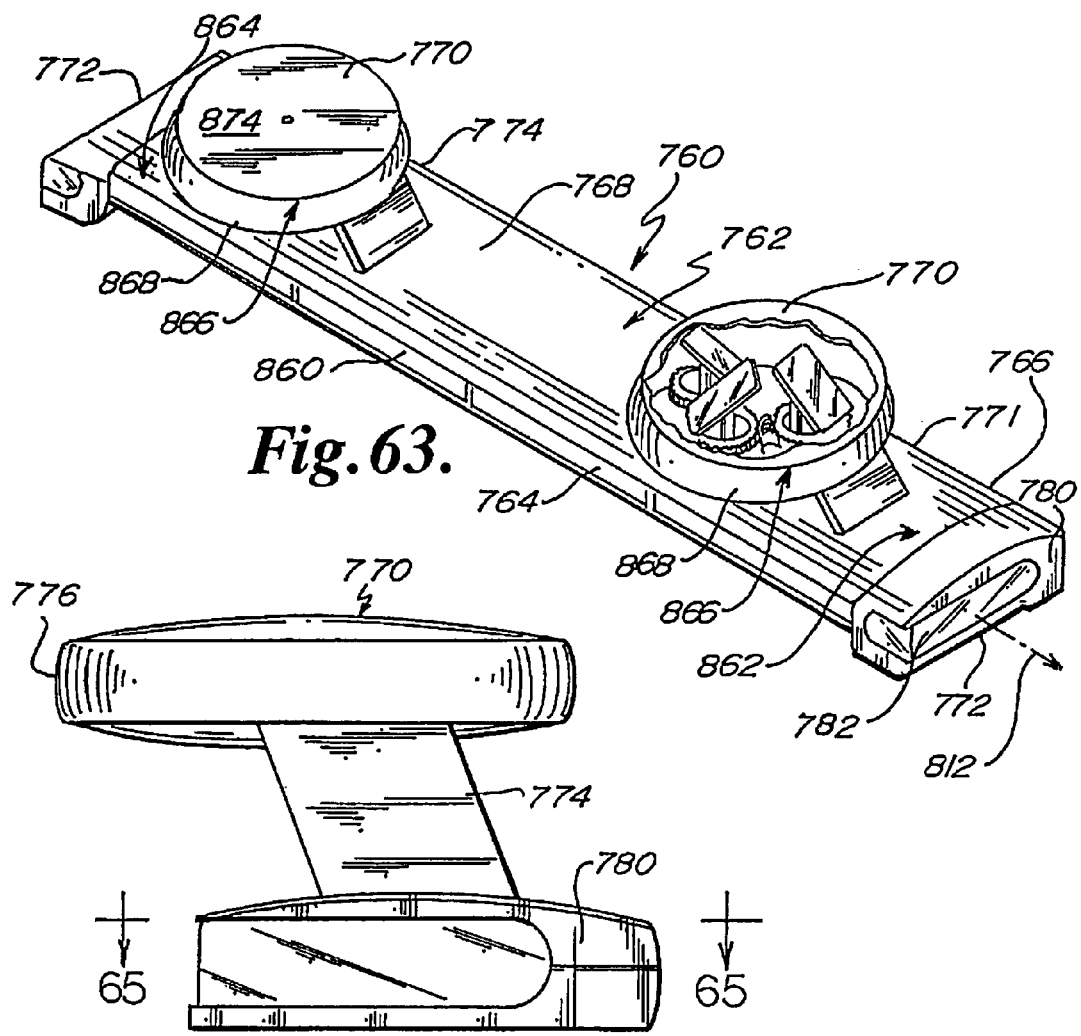
Fig.63.
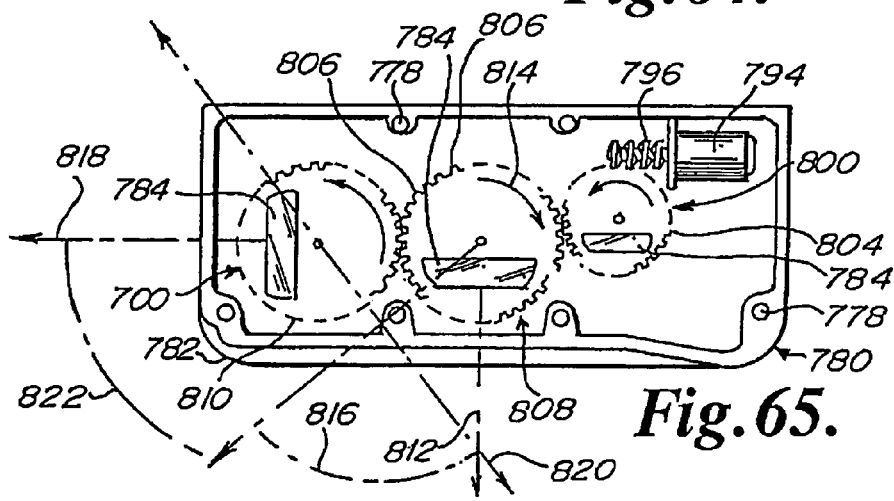
Fig.64.
Fig.65.

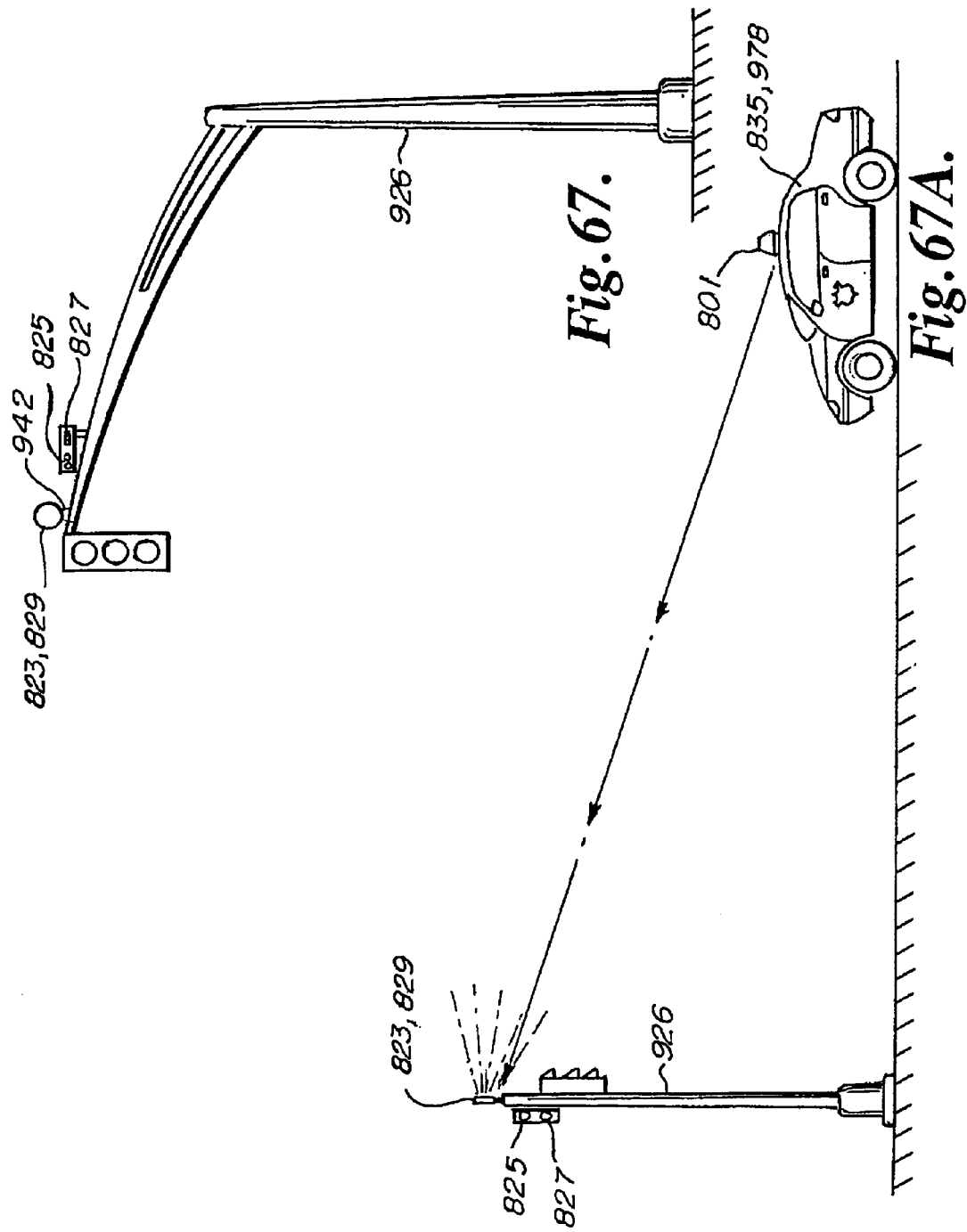

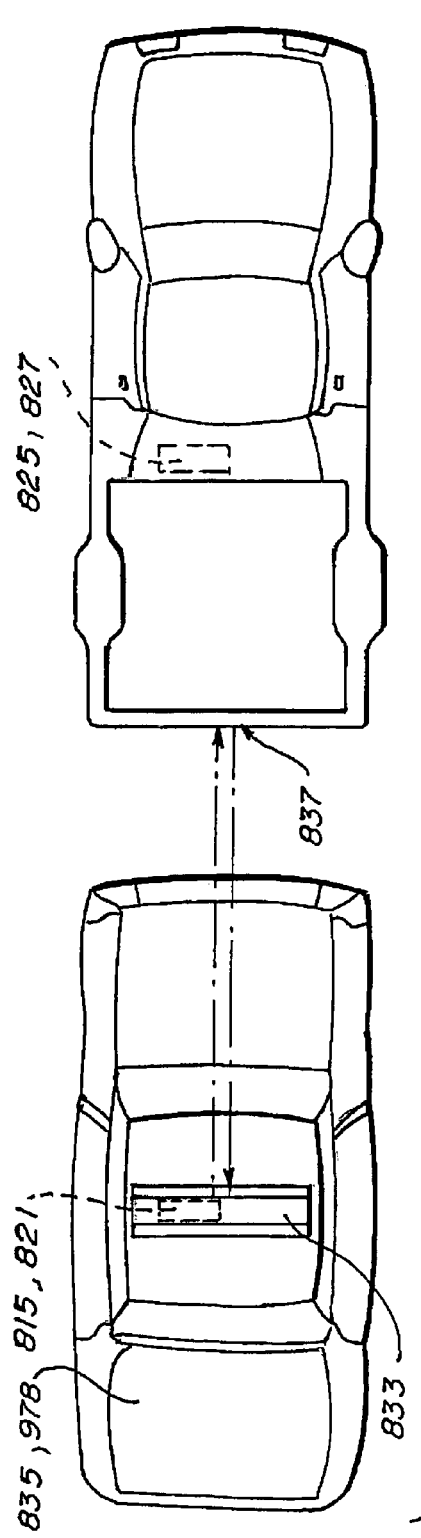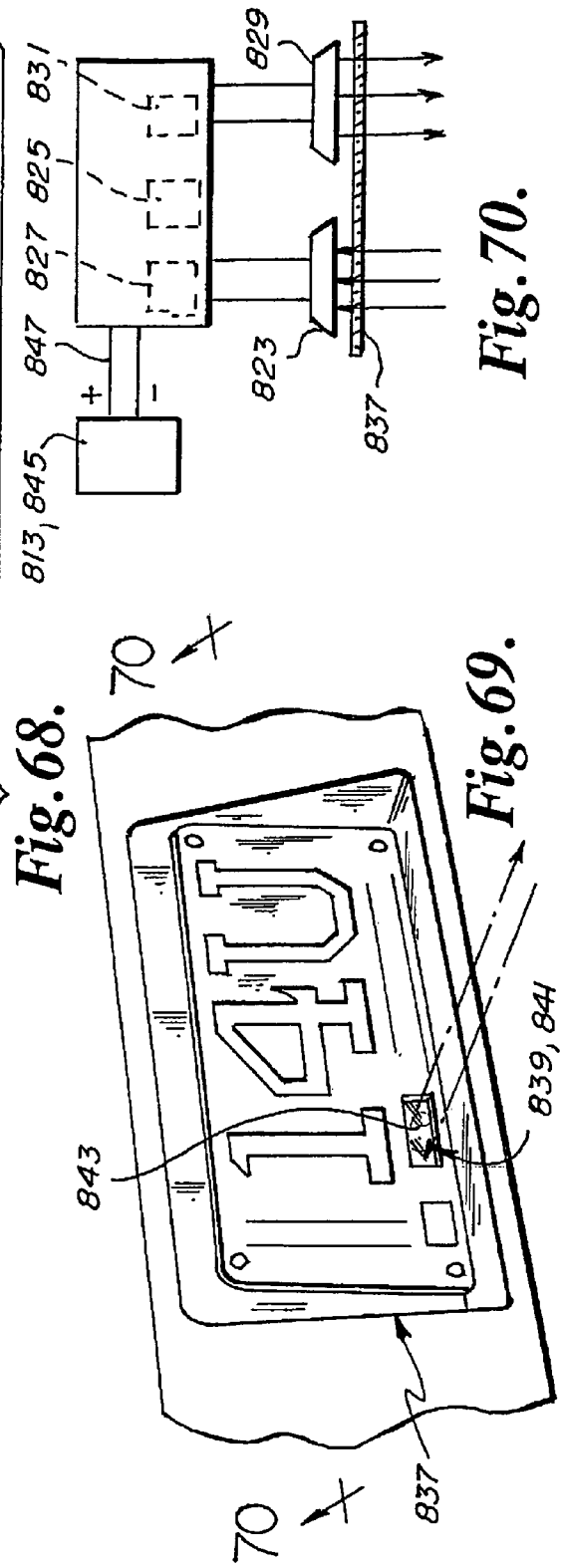

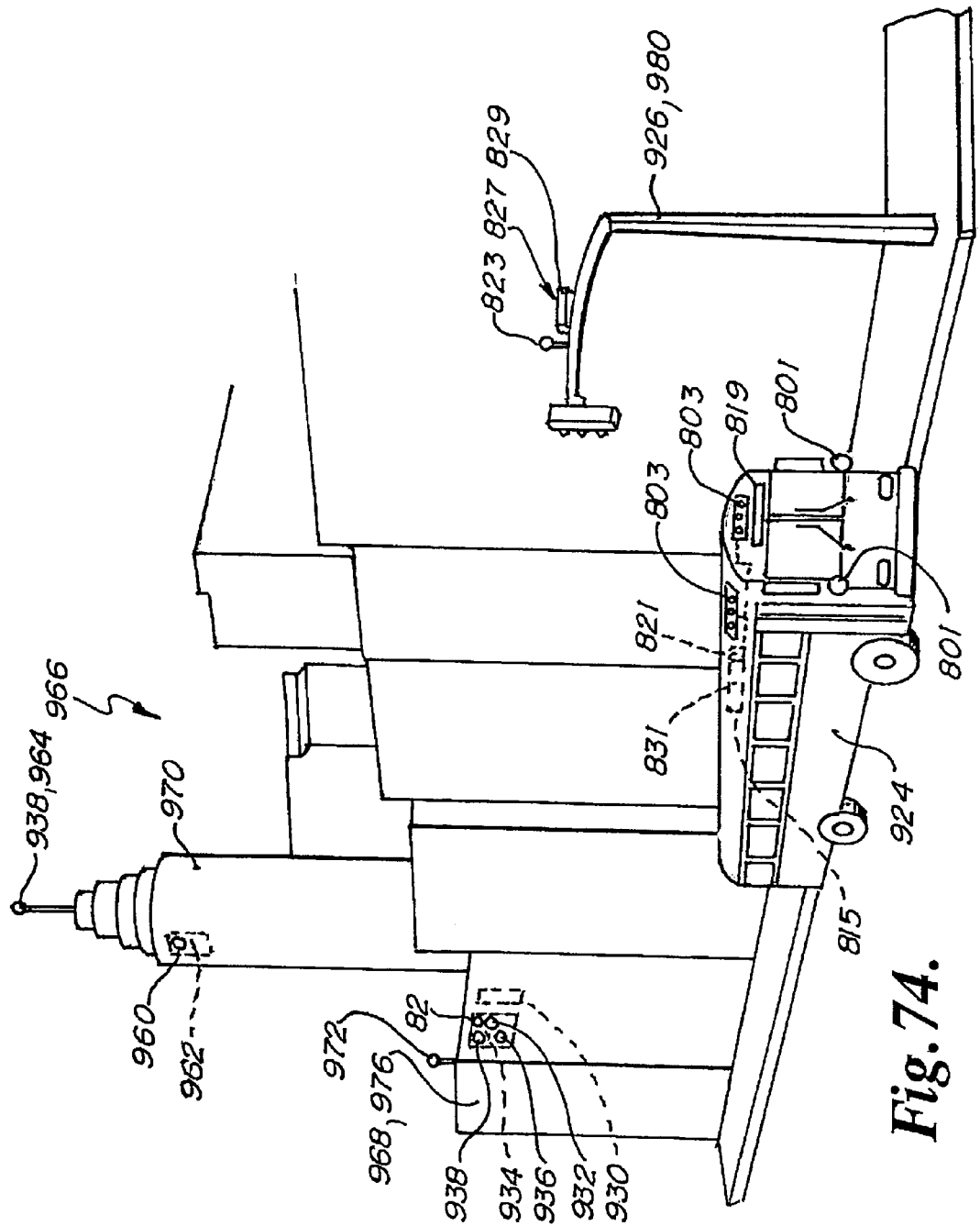

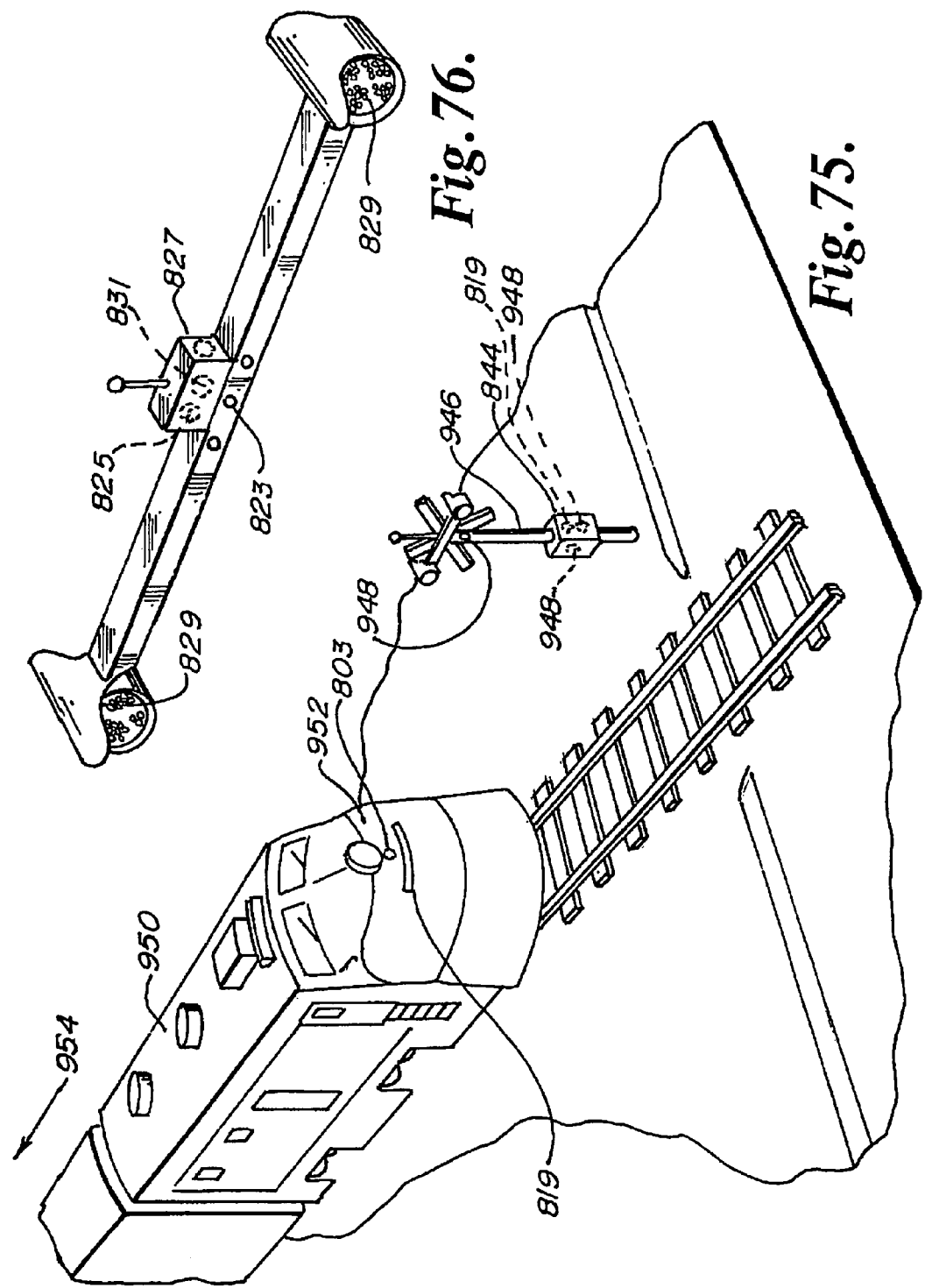

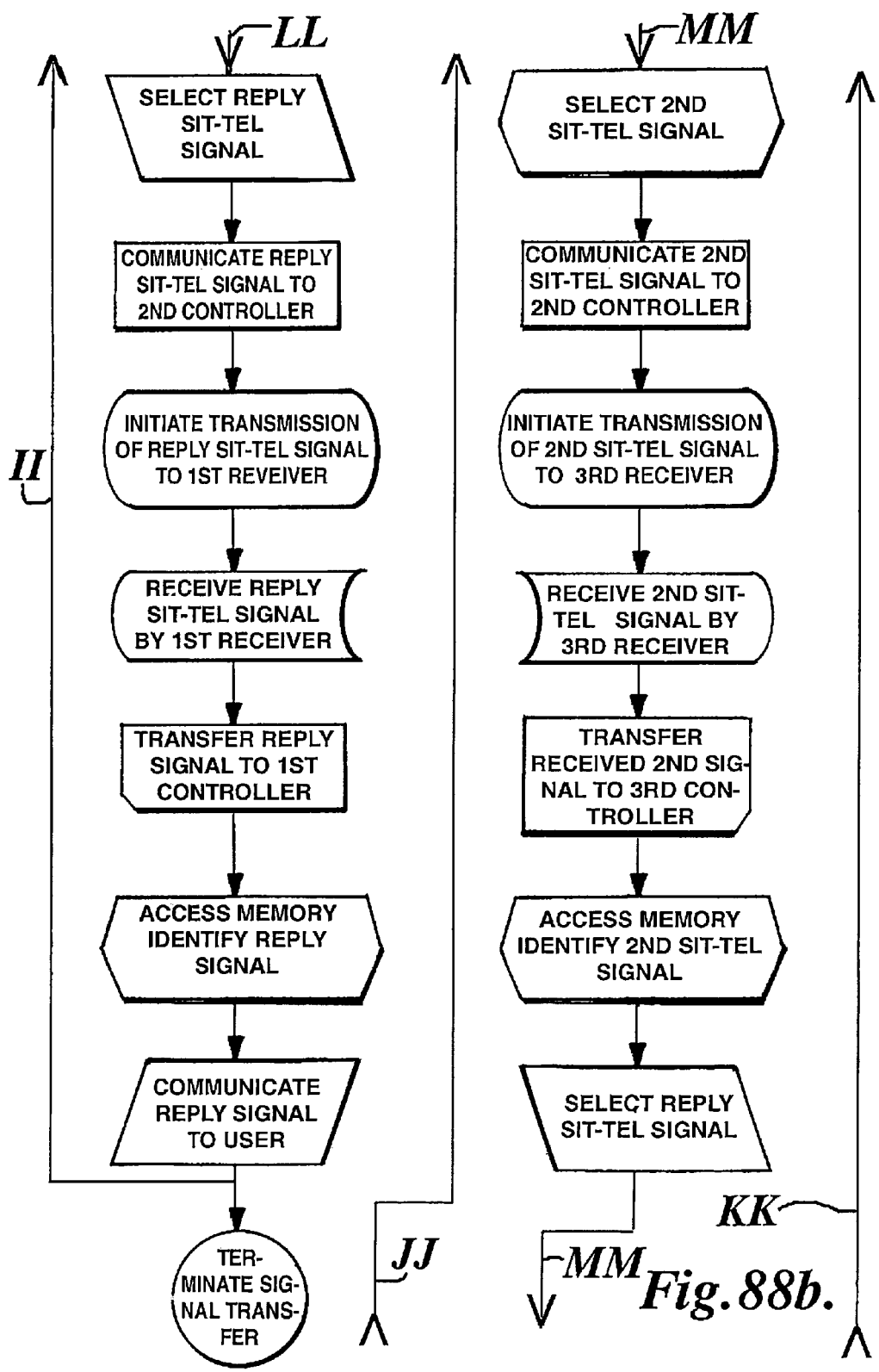

LED WARNING LIGHT AND COMMUNICATION SYSTEM

CROSS REFERENCE TO RELATED APPLICATIONS

This application is a Divisional application from U.S. Ser. No. 09/993,040, filed Nov. 14, 2001, which issued as U.S. Pat. No. 6,879,263, on Apr. 12, 2005 which claims priority to U.S. provisional patent application Ser. No. 60/248,894 filed Nov. 15, 2000, the contents all of which are hereby incorporated herein by reference in their entireties.

BACKGROUND OF THE INVENTION

Light bars or emergency lights of the type used on emergency vehicles such as fire trucks, police cars, and ambulances, utilize warning signal lights to produce a variety of light signals. These light signals involve the use of various colors and patterns. Generally, these warning signal lights consist of incandescent and halogen light sources having reflective back support members and colored filters.

Many problems exist with the known methods for producing warning light signals. One particular problem with known light sources is their reliance on mechanical components to revolve or oscillate the lamps to produce the desired light signal. Additionally, these components increase the size of the light bar or emergency lights which may adversely affect the vehicle's aerodynamic characteristics. Moreover, because of the relatively poor reliability of conventional lighting and the complexity of the present strobe rotational systems there is an increased likelihood that a breakdown of the light bar or light source will occur requiring the repair or replacement of the defective component. Finally, conventional light bars and light sources require a relatively large amount of electrical current during operation. The demands upon the electrical power system for a vehicle may therefore exceed available electrical resources reducing optimization of performance or worse, generating a potential hazard from shorted or over-heated systems.

Halogen lamps or gaseous discharge xenon lamps generally emanate large amounts of heat which is difficult to dissipate from a sealed light enclosure or emergency light and which may damage the electronic circuitry contained therein. In addition, these lamps consume large amounts of current requiring a large power supply, battery, or electrical source which may be especially problematic for use with a vehicle. These lamps also generate substantial electromagnetic emissions which may interfere with radio communications for a vehicle. Finally, these lamps, which are not rugged, have relatively short life cycles necessitating frequent replacement.

Another problem with the known warning signal lights is the use of filters to produce a desired color. Filtering techniques produce more heat that must be dissipated. Moreover, changing the color of a light source requires the physical removal of the filter from the light source or emergency light and the replacement with a new filter. Furthermore, filters fade or flake over time rendering the filters unable to consistently produce a desired color for observation in an emergency situation.

These problems associated with traditional signaling lamps are exacerbated by the fact that creating multiple light signals requires multiple signaling lamps. Further, there is little flexibility in modifying the light signal created by a lamp. For example, changing a stationary lamp into one that rotates or oscillates would require a substantial modification to the light bar or light source which may not be physically or economically possible.

The present invention generally relates to electrical lamps and to high brightness light-emitting diode or "LED" technology which operates to replace gaseous discharge or incandescent lamps as used with vehicle warning signal light sources.

In the past, the xenon gaseous discharge lamps have utilized a sealed compartment, usually a gas tube, which may have been filled with a particular gas known to have good illuminating characteristics. One such gas used for this purpose was xenon gas, which provides illumination when it becomes ionized by the appropriate voltage application. Xenon gas discharge lamps are used in the automotive industry to provide high intensity lighting and are used on emergency vehicles to provide a visible emergency signal light.

A xenon gas discharge lamp usually comprises a gas-filled tube which has an anode element at one end and a cathode element at the other end, with both ends of the tube being sealed. The anode and cathode elements each have an electrical conductor attached, which passes through the sealed gas end of the lamp exterior. An ionizing trigger wire is typically wound in a helical manner about the exterior of the glass tube, and this wire is connected to a high voltage power source typically on the order of 10–12 kilowatts (kw). The anode and cathode connections are connected to a lower level voltage source which is sufficient to maintain illumination of the lamp once the interior gas has been ionized by the high voltage source. The gas remains ignited until the anode/cathode voltage is removed; and once the gas ionization is stopped, the lamp may be ignited again by reapplying the anode/cathode voltage and reapplying the high voltage to the trigger wire via a voltage pulse.

Xenon gas lamps are frequently made from glass tubes which are formed into semicircular loops to increase the relative light intensity from the lamp while maintaining a relatively small form factor. These lamps generate extremely high heat intensity, and therefore, require positioning of the lamps so as to not cause heat buildup in nearby components. The glass tube of a xenon lamp is usually mounted on a light-based pedestal which is sized to fit into an opening in the light fixture and to hold the heat generating tube surface in a light fixture compartment which is separated from other interior compartment surfaces or components. In a vehicle application, the light and base pedestal are typically sized to fit through an opening in the light fixture which is about 1 inch in diameter. The light fixture component may have a glass or plastic cover made from colored material so as to produce a colored lighting effect when the lamp is ignited. Xenon gas discharge lamps naturally produce white light, which may be modified to produce a colored light, of lesser intensity, by placing the xenon lamp in a fixture having a colored lens. The glass tube of the xenon lamp may also be painted or otherwise colored to produce a similar result, although the light illumination from the tube tends to dominate the coloring; and the light may actually have a colored tint appearance rather than a solid colored light. The color blue is particularly hard to produce in this manner.

Because a preferred use of xenon lamps is in connection with emergency vehicles, it is particularly important that the lamp be capable of producing intense coloring associated with emergency vehicles, i.e., red, blue, amber, green, and clear.

When xenon lamps are mounted in vehicles, some care must be taken to reduce the corroding effects of water and various chemicals, including road salt, which might contaminate the light fixture. Corrosive effects may destroy the trigger wire and the wire contacts leading to the anode and cathode. Corrosion is enhanced because of the high heat generating characteristics of the lamp which may heat the air inside the lamp fixture when the lamp is in use, and this heated air may condense when the lamp is off resulting in moisture buildup inside the fixture. The buildup of moisture may result in the shorting out of the electrical wires and degrade the performance of the emission wire, sometimes preventing proper ionization of the gas within the xenon gas discharge lamp.

Another problem with the known warning signal lights is the use of rotational and/or oscillating mechanisms which are utilized to impart a rotational or oscillating movement to a light source for observation during emergency situations. These mechanical devices are frequently cumbersome and difficult to incorporate and couple onto various locations about a vehicle due to the size of the device. These mechanical devices also frequently require a relatively large power source to impart rotational and/or oscillating movement for a light source.

Another problem with the known warning signal lights is the absence of flexibility for the provision of variable intensity for the light sources to increase the number of available distinct and independent visual light effects. In certain situations it may be desirable to provide variable intensity for a light signal, or a modulated intensity for a light signal, to provide a unique light effect to facilitate observation by an individual. In addition, the provision of a variable or modulated light intensity for a light signal may further enhance the ability to provide a unique desired light effect for observation by an individual.

No known warning light systems utilize a variable or modulated light intensity to modify a standard lighting effect nor do they have the design flexibility to easily make those changes. The warning lights as known are generally limited to a flashing light signal. Alternatively, other warning signal lights may provide a sequential illumination of light sources. No warning or utility light signals are known which simultaneously provide for modulated and/or variable light intensity for a known type of light signal to create a unique and desirable type of lighting effect.

No warning signal lights are known which provide irregular or random light intensity to a warning signal light to provide a desired lighting effect. Also, no warning light signals are known which provide a regular pattern of variable or modulated light intensity for a warning signal light to provide a desired type of lighting effect. It has also not been known to provide a warning light signal which combines either irregular variable light intensity or regular modulated light intensity to provide a unique and desired combination lighting effect.

It has also not been known to provide alternative colored LED light sources which may be electrically controlled for the provision of any desired pattern of light signal such as flashing, pulsating, oscillating, modulating, variable, rotational, alternating, strobe, sequential, and/or combination light effects. In this regard, a need exists to provide a spatially and electrically efficient LED light source for use on an emergency or utility vehicle which provides the appearance of rotation, or other types of light signals.

In view of the above, there is a need for a warning signal light that:
(1) Is capable of producing multiple light signals;
(2) Produces the appearance of a revolving or oscillating light signal without reliance upon mechanical components;
(3) Generates little heat;
(4) Uses substantially less electrical current;
(5) Produces significantly reduced amounts of electromagnetic emissions;
(6) Is rugged and has a long life cycle;
(7) Produces a truer light output color without the use of filters;
(8) Is positionable at a variety of locations about an emergency vehicle; and
(9) Provides variable light intensity to the light source.

Other problems associated with the known warning signal lights relate to the restricted positioning of the signal light on a vehicle due to the size and shape of the light source. In the past, light sources due to the relatively large size of light bars or light sources, were required to be placed on the roof of a vehicle or at a location which did not interfere with, or obstruct, an operator's ability to visualize objects while seated in the interior of the vehicle. Light bars or light sources generally extended perpendicular to the longitudinal axis of a vehicle and were therefore more difficult to observe from the sides by an individual.

The ease of visualization of an emergency vehicle is a primary concern to emergency personnel regardless of the location of the observer. In the past, optimal observation of emergency lights has occurred when an individual was either directly in front of, or behind, an emergency vehicle. Observation from the sides, or at an acute angle relative to the sides, frequently resulted in reduced observation of emergency lights during an emergency situation. A need therefore exists to improve the observation of emergency lights for a vehicle regardless of the location of the observer. A need also exists to improve the flexibility of placement of emergency lights upon a vehicle for observation by individuals during emergency situations.

A need exists to reduce the size of light sources on an emergency vehicle and to improve the efficiency of the light sources particularly with respect to current draw and reduced aerodynamic drag. In addition, the flexibility for the positioning of the light sources about a vehicle is required to be enhanced in order to optimize utility for a warning signal light. In order to satisfy these and other needs, more spatially efficient light sources such as LED's are required.

In the past, illumination of an area to the front or to the sides of an emergency vehicle during low light conditions has been problematic. Take-down lights have been utilized by law enforcement personnel for a number of purposes including, but not necessarily limited to, enhancing observation of an individual in a vehicle on a roadway subject to investigation and to hide the location of an officer, or to block or deter observation of an officer by individuals during law enforcement activities.

A need exists for an LED take-down light which has significant illumination characteristics, is spatially efficient, has a long useful life, and has reduced current draw requirements for use on a law enforcement or utility vehicle.

The alley lights as known also suffer from the deficiencies as identified for the take-down lights during dark illumination conditions. Alley lights are used to illuminate areas adjacent to the sides of a vehicle.

In the past, the intersection clearing lights have been predominately formed of halogen, incandescent, and/or gaseous discharge xenon illumination sources. A need exists for an intersection clearing light which solves these and other identified problems.

A problem has also existed with respect to the use of emergency lights on unmarked law enforcement vehicles. In the past, emergency lights for unmarked law enforcement vehicles have consisted of dome devices which are formed of revolving mechanisms. These lights are usually withdrawn from a storage position under a motor vehicle seat for placement upon dashboard of a law enforcement vehicle. In undercover situations it has been relatively easy to identify dashboard affixation mechanisms used to secure these types of dome illumination devices to a dashboard. The known dome devices are also clumsy, have large current draw requirements, and are difficult to store in a convenient location for retrieval in an emergency situation by an individual. A need therefore exists for an emergency vehicle or utility warning light which is spatially efficient, easily hidden from view, and is transportable by an individual for retrieval during an emergency situation.

A need also exists for a new emergency vehicle light bar which is aerodynamic and which provides for both a longitudinal illumination element and an elevated pod illumination device.

In the past, emergency personnel, law enforcement officers, air traffic controllers, and/or pilots have utilized radio frequencies as a primary means of communication. One draw back associated with the use of radio frequency communication is the limited number of radio frequencies available for use within high density traffic areas where radio saturation may cause an unsafe condition through delayed communication and response during transmission of routine information. In addition, a number of available radio frequencies have been assigned for digital transmission further limiting the accessability and/or availability of transmission of routine information. Further, radio frequencies have generally not been available for certain applications including communication between motor vehicles and ground sources related to avionics such as approach lighting and/or taxi location identification.

Another problem associated the use of radio frequencies for communication of routine information is the material intensive nature of the transmitters and/or receivers. The radio frequency transmitters and receivers are generally expensive and further require a large power supply which is a concern for motor vehicle and/or aircraft applications. A need exists for additional avenues of relatively short range communication which do not utilize radio frequency transmissions. In general, cell phones and/or microwave communication are not viable communication alternatives and/or options due to the need for instantaneous communication and receipt of information without the necessity to identify, dial, connect, and couple to a receiver. A need therefore exists for use of an alternative communication source and/or carrier of information which is instantaneous and has high reliability with economical power consumption and material requirements.

In the past, attempts have been made to use light as a communication source normally associated with laser optics. In general, the use of laser optics as a communication source has raised a number of considerations related to performance, durability, and expense. Further, laser optic communication may be difficult to achieve due to the inflexibility of the lasers for transmission of both a directional and/or non-directional signal. The use of laser optics as a communication source has therefore not proven to be reliable, economical and/or viable for use in motor vehicle and avionics applications.

A need exists for a pulsed light signal for communication of information which is durable, reliable, and economical to an end user.

Federal Aviation Administration regulations require an anti-collision light system for placement on the fuselage of all aircraft. The rotating features of a dome light and/or flashing beacon include many of the same problems as earlier described related to size, durability, performance, current draw parameters, and ease of maintenance. In general, the light sources utilized within a rotating dome light or flashing beacon are not durable or efficient.

A need exists to replace the known illumination sources for a rotating dome light and/or flashing beacon as utilized within aircraft with modern LED light sources.

Radio frequency transmissions are regulated within the vicinity of an air field to eliminate and/or minimize risk of interference with air traffic communications. A need exists for alternative communication carriers for reduction of radio frequency communications within the vicinity of an airport. Due to human factors, in the past it has generally been quite difficult to instantaneously identify the exact location of aircraft adjacent to runways during taxiing.

As known, taxi ways of airports have generally utilized stationary lights, runway lights, and/or approach lights, which are not formed of LED technology. Therefore, the brightness, durability, and economics related to current draw have not been maximized to provide optimal performance for the known stationary lights, runway lights, and/or approach lights for an airport.

In the past it has not been known to use the stationary lights, runway lights, and/or approach lights as a communication source for the control of air traffic at an airport. Further, in the past an aircraft rotating exterior dome illumination source has not been used to simultaneously function as a communication device for the transmission and receipt of variable and/or pulsated light signals as generated from an LED light source. The variable and/or pulsed light signals may be alternatively described as the systematic information transfer through encrypted/pulsed light or acronym SIT-TEL. Further, it has not been know to use a variable and/or pulsating light signal or SIT-TEL communication, as generated from an anti-collision light, as an information courier through the use of LED technology.

The Federal Aviation Administration requires identification and collision avoidance systems to be operational at all times at all airports for regulation of ground and air traffic. No communication device is know which transmits an encrypted code within a light carrier for communication of information such as the proximity to a specific location, and/or for aircraft identification.

In the past, air traffic controllers have relied upon VFR or radar signals in order to identify the position of aircraft relative to a control tower. Air traffic controllers also utilize redundant VFR and/or radar systems as backup systems in the event of an initial systems failure. No economical and/or low power backup system to the VFR location indicators is generally available. The high power requirements and equipment expense of VFR radar systems, and the necessity for redundant backup systems, is quite costly for an airport. A further backup utilizing a communication system operating through recognition of pulsed light signals incorporating low power requirements may be extremely useful.

Radio frequency communications are frequently limited, in that there are a finite number of available radio frequencies for commercial and/or private use. The available radio frequency signals are also heavily regulated by the Federal Communications Commission. In a number of instances, the use of radio frequency transmissions may cause interference with a localized environment which in turn may adversely affect adjacent radio frequency transmitters. A benefit obtained from use of a light source as a communication carrier is that there are a virtually infinite number of available wavelengths for a light source. No device has been previously known which utilize LED technology to generate light signals used as a carrier of information for the replacement of radio transmissions, and as particularly used in association with vehicles and/or aircraft. In addition, no device is known which utilizes a light signal for transmission to a receiver which may then trigger audio and/or pre-stored information or convert information transmitted through the use of pulsed light into an audio signal.

A further problem with aircraft rotating illumination domes and/or flashing beacons is the failure of the illumination domes and/or flashing beacons to continue operations during emergency landing situations where the power for the aircraft is terminated. Due to the large power requirements for the rotating domes and/or flashing beacons, any power outage within the aircraft normally terminates the illumination of the rotating dome and/or flashing beacon. The power requirements for the rotating domes and/or flashing beacon illumination sources is generally sufficiently large to prohibit the transportation and use of additional battery sources for an aircraft during emergency landing situations. A need therefore exists for an emergency beacon light source which may continue to operate for an extended period of time, having low power consumption, which may be operated by a transported battery within an aircraft. An LED light source associated with the rotating light and/or exterior beacon therefore significantly improves the operation of the rotating beacon as an emergency beacon during emergency landing situations. Further, the low power requirements of the LED light source enable an exterior rotating light source and/or flashing beacon to operate for an extended period of time following a crash landing to signal the identification of a downed aircraft.

Needs continue to exist for the use of an LED illumination source and communication device for use on aircraft support vehicles, to enhance visual identification and location relative to an airport; to augment the proximity warning systems for aircraft and the regulation of air and ground traffic adjacent to an airport; to enhance the proximity and anti-collision warning light systems of towers for identification by aircraft; for the provision of economical and high brightness LED technology light sources for use in airport runway lighting, airport obstruction lighting, tower lighting, obstacle lighting, taxi lighting, and for use on aircraft as rotating domes and/or flashing beacons and/or landing lights.

Law enforcement officers in the past have generally been limited to visualization of a license plate for identification purposes. Upon visualization of a license plate, an officer may enter the observed license plate into a data base for identification of vehicle registration information. In the past, law enforcement personnel have also utilized optical aids such as focused optics and/or scopes to assist in the visualization and identification of license plates on moving vehicles. The optical and/or focused optic devices are generally expensive and may be extremely difficult to operate during moving conditions. Vehicles having the targeted license plates frequently change lanes and/or bounce upon uneven roadways rendering observation difficult.

No device is presently known which is inexpensive and which utilizes LED technology in association with a license plate, which includes the use of an LED transmitter and light receiver as coupled to a controller, to receive and transmit a pulsed LED light signal or SIT-TEL communication as a carrier of information to a law enforcement vehicle. No device is also known which minimizes environmental interference and accurately confirms the correct tagging, observation, and/or interrogation of a license plate by a law enforcement officer. Further, no backup device is known which supplements the confirmation system for verification of identification of a vehicle subject to consideration.

Another problem with the known law enforcement identification systems for vehicles is that law enforcement personnel are frequently required to place themselves within a certain proximity of a vehicle under observation. Proximity to a suspect vehicle significantly increases the likelihood of recognition of the location of the law enforcement personnel. Law enforcement personnel do not wish to place themselves in close proximity to a vehicle under consideration. Law enforcement personnel desire to be unobserved by suspects during law enforcement investigations and/or activities.

No communication device is known which may transmit license plate information such as the plate number, registered owner, make, model, and/or status of the license plate, to insure that a correct vehicle has been interrogated during police investigations. A need also exists to assists law enforcement officers in speed trap activities to confirm and verify the correct tagging of a target vehicle with radar and/or laser speed detection devices. No communication device is currently known which provides flexibility to select between a focused interrogation specific function versus a non-directional interrogation function for investigation of vehicles relative to a law enforcement officer through the use of LED technology. Further, no communication device is known which may simultaneously check and compare all license plates within the proximity of a law enforcement vehicle for a specific status such as a stolen vehicle identification through a continuous non-directional sweep of a transmitted LED light signal.

In the past, buoys have been used in marine applications to identify channels and hazards such as reefs, bars, rocks, and/or shallow water conditions. The warning buoys as known have frequently not included visual warning light signals. Alternatively, the known warning buoys have included visual warning light signals which have not been bright or rugged. These warning buoy light sources have suffered a relatively short life and have required a relatively large battery source. As such, the warning light signals used with marine buoys have not been efficient for signaling marine traffic. No marine buoy is known which utilizes LED technology to conserve power and to provide a durable and long useful life light source which may be operated on a relatively small battery and/or solar power source.

In addition, no marine buoy is known which incorporates an LED light source which contains a modulated and/or variable light controller which may simultaneously transmit a pulsed light signal or SIT-TEL communication to transmit information obviating the necessity for radio transmissions.

Currently each year a significant number of automobiles and other motor vehicles are involved in accidents with trains at railroad crossings. Frequently these accidents occur at railroad crossings in rural areas which are not marked with railroad crossing gates, warning bells, and/or flashing light signals. The absence of warning devices is frequently the result of economic considerations at remote and/or low traffic areas. A need exists for a warning light signal at remote railroad crossings which may be easily attached to an existing railroad crossing sign. Further, a need exists for a low power, battery powered, and/or solar powered light signal for use at remote railroad crossings which may be easily activated by an approaching train to warn traffic to reduce the likelihood of a vehicle/train collision.

In the past, emergency vehicles have used radio frequency transmissions to trigger intersection semaphores to switch to a green light signal to permit uninhibited passage of the emergency vehicle through the intersection. A problem with the radio frequency transmissions is the lack of available radio wavelengths, and the localized radio frequency interference, adjacent to intersections. In addition, the devices as known frequently have a large current consumption and are relatively expensive. The positioning and wiring of OPTICOM receiving and switching devices upon semaphores is generally elevated above an intersection increasing initial construction expenses. The positioning of the OPTICOM receiving and switching devices, therefore renders maintenance and/or replacement problematic.

It has not been known to use light emitting diodes to provide a light signal to trigger an OPTICOM intersection clearing light. In addition, it has not been known to improve the useful life of an OPTICOM device through the use of long life rugged LED technology which may be operated by a low voltage power source such as a battery and/or solar power unit.

No device is known which provides simultaneous communication to a plurality of independently operated units of soldiers within a theater of operation which coordinates movement, actions, location of friendly troops, and/or identifies the location of hostile soldiers through the use of a pulsed light communication system. In this regard, no device is known which may have the dual functionality of a light source such as a flare in combination with a pulsed SIT-TEL communication system. As is known, radio communications within a theater of operation are frequently interrupted or terminated leaving units of troops without direction as to modified objectives. A need therefore exists for alternative sources of communication which do not rely upon radio transmissions for communication of orders and/or other types of critical information to soldiers engaged in hostilities. In addition, silence and the secretion of the location of troops within a theater of operations is frequently critical. Within situations necessitating silence, the use of radio transmissions is prohibited leaving soldiers without effective communications. A need therefore exists for an alternative source of communication for soldiers which is silent and which does not rely upon radio transmissions.

GENERAL DESCRIPTION OF THE INVENTION

According to the invention, there is provided a light emitting diode (LED) warning signal light and systematic information transfer through encrypted pulsed light SIT-TEL communication system which may be depicted in several embodiments. In general, the warning signal light and SIT-TEL pulsed light communication system may be formed of a single row, single source, or an array of light emitting diode light sources configured on a light support and in electrical communication with a controller and a power supply, battery, or other electrical source. The warning signal light and SIT-TEL pulsed light communication system may provide various light signals, colored light signals, or combination or patterns of light signals for use in association with a vehicle or by an individual. These light signals may include a strobe light, a pulsating light, a revolving light, a flashing light, a modulated or variable intensity light, an oscillating light, an alternating light, a pulsating light signal, an encoded signal, and/or any combination thereof. Additionally, the warning signal light and SIT-TEL pulsed light communication system may be capable of displaying symbols, characters, or arrows. Rotating and oscillating light signals may be produced by sequentially illuminating columns of LED□s on a stationary light support in combination with the provision of variable light intensity from the controller. However, the warning signal light and SIT-TEL pulsed light communication system may also be rotated or oscillated via mechanical means. The warning signal light and SIT-TEL pulsed light communication system may also be easily transportable and may be conveniently connected to a stand such as a tripod for electrical coupling to a power supply, battery, or other electrical source as a remote stand-alone signaling or communication device.

The warning signal light and/or replacement warning signal light and SIT-TEL pulsed light communication system may be electrically coupled to a controller used to modulate, pulse, or encode, the light intensity for the light sources to provide for various patterns of illumination to create an illusion of rotation or other type of illusion for the warning signal light without the use of mechanical devices and/or to transmit and/or receive messages as desired by an individual.

A reflective light assembly may also be provided. The reflective light assembly may rotate about a stationary light source or the light source may rotate about a stationary reflector. The reflective assembly may also be positioned at an acute angle of approximately 45° above a stationary LED panel or solitary light source, where the reflector may be rotated about a pivot point and axis to create the appearance of rotation for the light source.

The controller is preferably in electrical communication with the power supply and the LED□s to modulate the light intensity for the LED light sources for provision of a desired type of warning light effect or encoded SIT-TEL pulsed light communication signal as desired by an individual. Each individual light support may be positioned adjacent to, and be in electrical communication with, another light support through the use of suitable electrical connections. A plurality of light supports or solitary light sources may be electrically coupled in either a parallel or series manner to the controller. The controller is also preferably in electrical communication with the power supply and the LED's, to regulate or modulate the light intensity for the LED light sources for variable illumination of the LED light sources as observed by an individual. The warning signal lights may encircle an emergency vehicle. In addition, the light support may be encased within a waterproof enclosure to prevent moisture or other contamination of the LED light sources.

The individual LED□s and/or arrays of LED□s may be used as take-down and/or alley lights by law enforcement vehicles to illuminate dark areas relative to the emergency vehicle. The take-down light source may be stationary or may be coupled to one or more rotational mechanisms as desired. The intersection clearing light may be a particular application of the alley light as mounted to a motor for oscillation of the light source forwardly and rearwardly relative to an emergency vehicle. The intersection clearing mode preferably rotates or oscillates the alley lights forwardly and rearwardly on each side of a light bar as the emergency vehicle enters an intersection. The intersection clearing light mode preferably warns all traffic perpendicular to the direction of travel of the emergency vehicle as to the presence of an emergency vehicle within an intersection. When the intersection clearing light mode is not in operation the alley light or take-down light may be used to provide illumination at any desired angle relative to the passenger or drivers areas of an emergency vehicle.

A portable pocket LED warning signal light may be provided having a base and a power adaptor for use in unmarked law enforcement vehicles. The portable pocket LED warning signal light may also be connected to, or have, an integral controller for the provision of a variety of unique light signals as earlier described. The portable pocket LED may also include one or more reflective culminators to enhance the performance of the warning or utility signal light.

A light bar may also be provided having one or more elevated pod illumination elements. Each pod illumination element may be raised with respect to a light bar by one or more supports which extend upwardly from the base. The pod illumination elements may be oval or circular in shape. The light bar may also include one or more longitudinal light elements integral to the base which extend transversely to the roof of an emergency vehicle.

The light bar may also include a systematic information transfer through encrypted/pulsed light (SIT-TEL) system including a source of LED pulsed light, a receiver of LED pulsed light, and a controller to reflect and interpret received signals and generate LED pulsed light signals used in the communication of information.

An LED SIT-TEL light signal is provided for replacement of the exterior rotating dome or flashing beacon of an aircraft. The LED light support may be rotated and/or stationary as desired. In addition, the LED light support includes a controller for the provision of a variety of different types of light signals including but not necessarily limited to sequential illumination and/or modulated and/or variable light intensity to simulate the appearance of a rotating or flashing light beacon. The LED light signal may include a battery source which may be coupled to a solar powered energy cell to provide operation and/or functionality when the main power supply for an aircraft is unavailable. The controller for the LED light support may generate and/or recognize SIT-TEL pulsed light signals used to communicate information to a pilot such as location, clearance, collision warning, obstacle warning, and/or other aviation information. The SIT-TEL LED light system may also include a receptor coupled to the controller where the receptor is constructed and arranged for receipt of pulsed SIT-TEL LED light signals for conversion to digital information for transfer to the controller for analysis and interpretation. The controller may then issue a warning light signal or other communication signal to the pilot to reflect received information transmitted via a SIT-TEL pulsed LED light carrier.

The SIT-TEL LED light system may also be modified for simultaneous use as an illumination source, receiver, and transmitter device for use as aviation taxi lights, positioning lights, runway lights, approach lights, and/or other aviation light sources. The taxi, runway, approach, anti-collision, positioning LED lights and/or other aviation lights may simultaneously be electrically coupled by wire or optically coupled to a control tower processing center, to provide instantaneous information to air traffic controllers, representative of the relative position of an aircraft within an airport. The transmission, receipt and/or interpretation of a SIT-TEL pulsed LED light signals may significantly reduce the volume of radio frequency transmissions proximate to an airport. An air traffic controller within a tower may easily view a screen which will identify the location and other information of an aircraft without the necessity for audio communication via radio frequency transmissions.

A SIT-TEL LED light system and license plate communication system may include a license plate having an LED light transmitter and an LED light receiver/receptor. The LED transmitter and the LED receptor are each coupled/connected to a controller. The controller is constructed and arranged for regulating a modulated, variable, and/or pulsed SIT-TEL light signal to be received and recognized by a second receptor located within a law enforcement vehicle. A response SIT-TEL LED pulsed light signal may be generated by the law enforcement vehicle and received by the first receptor integral to the license plate. The responsive pulsed SIT-TEL LED light signal as transmitted from the license plate LED transmitter may include a series of unique signal packets representative of information such as the license plate number, vehicle registration information, and vehicle license plate status. The controller on the law enforcement vehicle may then process the signal received by the license plate for comparison to a data base to display transmitted information on a visible screen for observation by an officer. The SIT-TEL LED light signal system and license plate facilitates interrogation of a license plate without necessitating a police vehicle to close to an observable distance during investigation activities. The existence of a law enforcement vehicle may continue to be undetected facilitating law enforcement activities. The SIT-TEL LED light system and license plate invention may also function to verify the accuracy of a tagged vehicle by law enforcement officers during law enforcement activities.

An LED light source may be incorporated into a marine buoy as a replacement for a conventional light source. The LED light source has improved durability and life expectancy as compared to conventional light sources. The reduced current draw requirements permit an LED light source to be used within a marine buoy as powered by a battery and supplemented by recharging through coupling to a solar energy cell. In addition, the LED light source and marine buoy may include a controller and receptor where the receptor is constructed and arranged to receive a SIT-TEL pulsed LED signal at a preselected SIT-TEL wavelength. The received SIT-TEL pulsed light signal may then be translated by the controller to initiate the transmission of a responsive SIT-TEL pulsed LED light signal which may include information such as longitudinal and/or latitude coordinates and/or other information as may be useful to a ship captain for navigation, and/or a harbor master for marine traffic control and/or channel marking.

A SIT-TEL LED light communication system may be incorporated into a railroad crossing sign for the provision of a warning signal light indicating the presence of a train. The SIT-TEL LED light communication system preferably includes a controller and a receptor adapted to receive a pulsed light signal. A passing train preferably includes a SIT-TEL LED transmitter and controller to generate a SIT-TEL pulsed light signal for receipt by the receptor located on the railroad crossing sign. The generated pulsed light signal from the train is received by the receptor which in turn is passed to the controller for translation and activation of a visual warning light signal and/or audible warning signal at the railroad crossing. The caboose and/or end of the train may include a second LED transmitter which generates a second pulsed SIT-TEL LED light signal. The receipt of the second pulsed SIT-TEL LED light signal by the receptor is then translated and processed by the controller to terminate illumination of the LED warning light signal and/or audible alarm at the railroad crossing. The LED light source receptor and controller may be powered by a low current power source such as a battery which may be recharged by coupling to a solar power cell. A SIT-TEL LED warning light signal may then be economically provided at remote rural railroad crossings where traffic volume does not justify inclusion of crossing bars, warning bells, and/or traditional light sources. The necessity for power lines coupling a power source to remote railroad crossing warning signals is thereby eliminated.

A SIT-TEL LED light source controller and receptor is preferably coupled adjacent to an intersection semaphore for activation by law enforcement and/or emergency vehicles during emergency situations to alter a light signal to permit unobstructed passage of a law enforcement and/or emergency vehicle during emergency situations. A law enforcement and/or emergency vehicle includes a SIT-TEL LED light system and a controller constructed and arranged to transmit a unique pulsed or encoded SIT-TEL LED light signal. The OPTICOM receptor upon receipt of the pulsed or encoded LED light signal, transfers the received signal to the controller for processing for immediate activation and/or alteration of the traffic semaphore to permit passage of the law enforcement and/or emergency vehicle through the intersection. The LED light source receptor, transmitter, and controller function to receive and generate a pulsed SIT-TEL LED light signal significantly enhancing the utility of an intersection clearing OPTICOM device through the elimination of the necessity for use of nondurable short life conventional illumination sources while simultaneously facilitating ease of maintenance and/or replacement. In addition, the use of an LED light source within the OPTICOM intersection clearing light reduces electronic current requirements by the provision of power through the use of a battery which may be coupled to solar energy power cell.

The SIT-TEL systematic information through encrypted/pulsed light system may be incorporated into a flare used within a theater of operations as a back-up or replacement communication system. The flare including the SIT-TEL communication system may include a cylindrical housing having a parachute; a plurality of LED light sources; a pulsed light photosensitive receiver for detection of pulsed light signals for reprogramming of communications to be transmitted as regulated by a controller; and a controller for regulating pulsed LED light signals which may be used for encrypted communications. The flare further may include a cavity holding solid fuel or other types of propellant and one or more stabilizers. The flare is launched into operation through the use of a mortar or other device. The controller within the flare may be reprogrammed prior to launch or following deployment of the parachute for recognition and generation of pulsed light signals from the plurality of LED light sources in order to transmit non-radio communication signals to troops within a theater of operation. A programming transmitter including a controller and a pulsed LED light generator may be used to program the controller within the flare. Alternatively, the controller within the flare may be coupled to a programming device such as a central processing unit through the use of a cable. Troops and/or soldiers may each carry a photosensitive receiver which is constructed and arranged to recognize pulsed encrypted LED light signals for translation into a communication which may be observed on a transported display. The display may be sized for transportation within the pocket of a soldier. Alternatively, the display may be of sufficient size for transportation by a designated communication soldier.

A principal advantage of the present invention is to provide a warning signal light capable of simulating revolving or oscillating light signals without the use of mechanical components.

Another principal advantage of the present invention is that the warning signal light is capable of producing several different types of light signals or combinations or patterns of light signals.

Still another principal advantage of the present invention is to be rugged and to have a relatively longer life cycle than traditional warning signal lights.

Still another principal advantage of the present invention is to produce a truer or pure light output color without the use of filters.

Still another principal advantage of the present invention is to allow the user to adjust the color of the light signal without having to make a physical adjustment to the light source from a multi-colored panel.

Still another principal advantage of the present invention is the provision of an LED light source which is formed of a relatively simple and inexpensive design, construction, and operation and which fulfills the intended purpose without fear of failure or risk of injury to persons and/or damage to property.

Still another principal advantage of the present invention is the provision of an LED light source for creation of bright bursts of intense white or colored light to enhance the visibility and safety of a vehicle in an emergency signaling situation.

Still another principal advantage of the present invention is the provision of an LED light source which produces brilliant lighting in any of the colors associated with an emergency vehicle light signal such as red, blue, amber, green, and/or white.

Still another principal advantage of the present invention is the provision of an LED light source which is highly resistant to corrosive effects and which is impervious to moisture build-up.

Still another principal advantage of the present invention is the provision of an LED light source which is simple and may facilitate the ease of installation and replacement of a xenon, halogen, and/or incandescent light source upon an aircraft, vehicle, within an aviation application, on a marine buoy, at a railroad crossing, as an OPTICOM traffic signal changer, on a license plate or upon a motor vehicle.

Still another principal advantage of the present invention is the provision of an LED light source which reduces RF emissions which may interfere with other radio and electronic equipment.

Still another principal advantage of the present invention is the provision of a warning signal light which may be easily visualized during emergency situations thereby enhancing the safety of emergency personnel.

Still another principal advantage of the present invention is the provision of a warning signal light which includes LED technology and which is operated by a controller to provide any desired type or color of light signal including but not limited to rotational, pulsating, oscillating, strobe, flashing, encoded, alternating, variable, and/or modulated light signals without the necessity for mechanical devices.

Still another principal advantage of the present invention is the provision of a warning signal light which is capable of simultaneously producing several different types of light signals.

Still another principal advantage of the present invention is the provision of an LED light source which is flexible and which may be connected to a modulated illumination source to provide variable light intensity for the light source which in turn is used to create the appearance of rotation and/or oscillation without the use of mechanical rotation or oscillating devices.

Still another principal advantage of the present invention is the provision of an LED take-down light which has significant illumination characteristics which prohibits an individual located in a temporarily stopped vehicle from observing the location or actions or law enforcement personnel within or adjacent to a law enforcement vehicle.

Still another principal advantage of the present invention is the provision of an LED warning signal light which may be easily positioned upon the dash board of an aircraft or a law enforcement vehicle.

Still another principal advantage of the present invention is the provision of an LED alley light which may easily adapted for use within existing light bar for an emergency vehicle.

Still another principal advantage of the present invention is the provision of a warning signal light and/or SIT-TEL pulsed light LED communication system which may be easily customized by the user via the use of a microprocessor/controller.

Still another principal advantage of the present invention is that the warning signal light is capable of transmitting a SIT-TEL pulsed light signal.

Still another principal advantage of the present invention is that the warning light signal includes a controller which is constructed and arranged to generate a series of SIT-TEL pulsed light signal packets where each packet includes a recognizable set of information.

Still another principal advantage of the present invention is that the warning signal light includes a receptor which is capable of receipt and recognition of pulsed SIT-TEL LED light signal packets for translation and/or transfer to a controller for processing.

Still another principal advantage of the present invention is that the controller is constructed and arranged to interpret and process received SIT-TEL LED pulsed light signal packets for generation of a responsive series of pulsed SIT-TEL LED light signals and/or packets to transmit information to a receptor.

Still another principal advantage of the present invention is the provision of a pulsed LED source functioning as a carrier of information as a replacement for radio frequency transmissions.

Still another principal advantage of the present invention is the provision of an aviation rotating or flashing beacon which may operate for an extended period of time with a battery power source and/or solar cell power source without the receipt of power from an aircraft.

Still another principal advantage of the present invention is the provision of an OPTICOM intersection clearing device which may operate for an extended period of time with a battery power source and/or solar cell power source without the receipt of power via an electric wire or cable.

Still another principal advantage of the present invention is the provision of an LED railroad crossing warning light which may operate for an extended period of time with a battery power source and/or solar cell power source without the necessity for receipt of power from a power line.

Still another principal advantage of the present invention is the provision of a SIT-TEL LED communication system for a license plate which may operate for an extended period of time with a battery power source and/or solar cell power source without the receipt of power from a vehicle electric system.

Yet another advantage of the invention is the provision of an LED support member having an array of colored LED□s and a controller capable of selectively illuminating the LED□s of the same color to produce a single or mixed colored light signal.

Still another advantage of the invention is the provision of a light emitting diode support member having LED□s disposed about at least two sides and a controller capable of producing light signals on each side which are independent and/or different from each other.

Still another advantage of the invention is the provision of an LED support member which may be easily connectable to an aircraft, vessel, marine buoy, a railroad crossing sign, a street semaphore, emergency vehicle, including but not limited to automobiles, ambulances, trucks, motorcycles, snowmobiles, and/or any other type of vehicle in which warning signal or emergency lights are utilized.

Still another advantage of the present invention is the provision a microprocessor/controller which is in electrical communication with the LED light sources to selectively activate individual LED□s to produce a flashing, strobe, alternating, rotating, oscillating, variable, encoded, modulated and/or pulsating warning light signals or combination warning light signals.

Still another advantage of the present invention is the provision of a warning signal light having LED technology which includes an array, a single row or a solitary LED light source mounted to a light support.

Still another advantage of the present invention is the provision of a strip warning signal light having LED technology where a plurality of strip LED light supports may be affixed in surrounding engagement to the exterior of an aircraft, vessel, sign, or emergency vehicle.

Still another advantage of the present invention is the provision of a warning signal light having a controller in electrical communication with each individual light source for the provision of a modulated light intensity to the light source to provide various desired patterns or combinations of patterns of illumination.

Still another advantage of the present invention is the provision of an LED light source where a single LED light source or an array of LED light sources may be rotated, and simultaneously a reflective device may be rotated, to provide a warning signal light.

Still another advantage of the present invention is the provision of a rotatable or stationary reflector or culminator which may include transparent and/or reflective sections.

Still another advantage of the present invention is the provision of a conical reflector which may include concave and/or convex reflective surfaces to assist in the reflection of light emitted from an LED light source.

Still another advantage of the present invention is the provision of an LED light support having a longitudinal dimension and a single row of LED□s which provide a desired type of warning light signal.

Still another advantage of the present invention is the provision of an LED light support having a lens cover attached to the frame to minimize water penetration or contamination exposure into the interior of the frame.

Still another advantage of the present invention is the provision of an LED warning signal light having plug-in connectors for coupling to an electrical power source for an emergency vehicle such as a cigarette lighter receptacle.

Still another advantage of the present invention is the provision of an LED warning signal light having at least one illumination face including a plurality of colored LED light sources.

Still another advantage of the present invention is the provision of an oscillating LED intersection clearing light for communication to traffic adjacent to an intersection as to the presence of an emergency vehicle and/or emergency situation.

Still another advantage of the present invention is the provision of a SIT-TEL LED light system where the light intensity may be modulated by the controller to produce a pulsating light source used to transmit information.

Still another advantage of the present invention is the provision of a SIT-TEL LED light system which is coupled to a controller and a low voltage power supply such as a battery.

Still another advantage of the present invention is the provision of a SIT-TEL LED light system which may be powered through the use of a rechargeable solar cell.

Still another advantage of the present invention is the provision of a SIT-TEL LED light system having a controller for regulating a pulsating SIT-TEL LED light signal and an LED pulsating light receiver which is connected to a marine vessel.

Still another advantage of the present invention is the provision of a SIT-TEL LED light source having a controller for regulating a pulsating SIT-TEL LED light signal and an LED pulsating light receiver which is connected to a motor vehicle license plate.

Still another advantage of the present invention is the provision of a SIT-TEL LED light source having a controller for regulating a pulsating SIT-TEL LED light signal and an LED pulsating light receiver which is connected to an aircraft.

Still another advantage of the present invention is the provision of a SIT-TEL LED light source having a controller for regulating a pulsating SIT-TEL LED light signal and an LED pulsating light receiver which replaces the rotating beacon and/or anti-collision light for an aircraft.

Still another advantage of the present invention is the provision of a SIT-TEL pulsed light system having a controller for regulating a pulsating LED light signal and an LED pulsating SIT-TEL light receiver which is connected to an airport taxi light.

Still another advantage of the present invention is the provision of a SIT-TEL LED light system having a controller for regulating a pulsating SIT-TEL LED light signal and an LED pulsating light receiver which is connected to an airport approach light.

Still another advantage of the present invention is the provision of a SIT-TEL LED light system having a controller for regulating a pulsating SIT-TEL LED light signal and an LED pulsating light receiver which is connected to an airport runway light.

Still another advantage of the present invention is the provision of a SIT-TEL LED light source having a controller for regulating a pulsating SIT-TEL LED light signal and an LED pulsating light receiver which is connected to a structure or tower as an anti-collision light.

Still another advantage of the present invention is the provision of a SIT-TEL LED light source having a controller for regulating a pulsating SIT-TEL LED light signal and an LED pulsating light receiver which is connected to a railroad crossing sign.

Still another advantage of the present invention is the provision of a SIT-TEL LED light source having a controller for regulating a pulsating SIT-TEL LED light signal and an LED pulsating light receiver which is connected to the engine and caboose of a train.

Still another advantage of the present invention is the provision of a SIT-TEL LED light source having a controller for regulating a pulsating SIT-TEL LED light signal and an LED pulsating light receiver which is connected to airport baggage and/or fueling vehicles.

Still another advantage of the present invention is the provision of a SIT-TEL LED pulsating light system which includes an LED light source, and controller for regulating pulsed light signals, an LED pulsed light receiver, a signal converter, and a signal processor.

Still another advantage of the present invention is the provision of a SIT-TEL LED pulsating light system having a controller having a processor programmed for the performance of a handshake protocol during the transmission and/or receipt of a pulsed light signal used to communicate information.

Still another advantage of the present invention is the provision of a SIT-TEL LED pulsating light system which may generate a pulsed light signal over a wide variety of light wavelengths.

Still another advantage of the present invention is the provision of a SIT-TEL LED pulsating light system having a selection mechanism permitting convenient alteration of frequencies or wavelengths of transmitted and/or received pulsated light signals.

Still another advantage of the present invention is the provision of a SIT-TEL LED pulsating light system having a scanner for automatic searches for identification of transmissions of pulsated light signals generated at varying wavelengths and/or frequencies.

Still another advantage of the present invention is the provision of a SIT-TEL LED pulsating light system having a controller coupled to a visual warning light and/or audible alarm.

Still another advantage of the present invention is the provision of a SIT-TEL LED pulsating light system having a selection switch to regulate the provision of a focused directional pulsed light signal or a nondirectional pulsed light signal.

Still another advantage of the present invention is the provision of a SIT-TEL LED pulsating light system having a controller which regulates the transmission of thousands of pulsed light signals over a time interval of one second.

Still another advantage of the present invention is the provision of a SIT-TEL LED pulsating light system which has a controller which in turn includes prestored information for transmission as a pulsed light signal for detection, processing, and interpretation by a remote LED pulsating light receiver.

Still another advantage of the present invention is the provision of a SIT-TEL LED pulsating light system which may be coupled to an LED warning light system for transmission of messages.

Still another advantage of the present invention is the provision of a SIT-TEL LED pulsating light system including a modulating light source which emits 20 to 60 cycles of light signals per minute.

Still another advantage of the present invention is the provision of a SIT-TEL LED pulsating light system providing modulated pulsating light at a frequency of 80 Hz or higher.

Still another advantage of the present invention is the provision of a SIT-TEL LED pulsating light system which may transmit an encrypted pulsated LED light signal.

Still another advantage of the present invention is the provision of a SIT-TEL pulsating LED light system which may transmit a pulsed LED light signal in the visible and non-visible spectrum.

Still another advantage of the present invention is the simultaneous communication of SIT-TEL LED pulsed light communication signals to a plurality of units of soldiers without the use of radio transmissions.

Still another advantage of the present invention is the simultaneous provision of SIT-TEL LED pulsed light communication signals and illumination to enhance visibility within a theater of operations.

Still another advantage of the present invention is the provision of a back-up communication system for soldiers in the event of voluntary or non-voluntary radio transmission interruption.

Still another advantage of the present invention is provision of a flare having a SIT-TEL LED pulsed light communication system which may transmit and receive information to be passed on to troops within an operational theater.

Still another advantage of the present invention is the provision of an easily transportable and concealable receiver/transmitter of SIT-TEL LED pulsed light signals for use by troops.

BRIEF DESCRIPTION OF THE DRAWINGS

FIG. 3 is a perspective view of a warning signal light attached to a gyrator according to an embodiment of the invention;

FIG. 5 is a perspective view of a warning signal light according to an embodiment of the invention depicting sequential activation of rows of LED's;

FIG. 6 is a perspective view of a warning light signal according to an embodiment of the invention;

FIG. 36 is an alternative detailed view of a circuit board or LED mounting surface having heat sink wells;

FIG. 37 is an alternative detailed isometric view of a reflector assembly;

FIG. 38 is an alternative cross-sectional side view of the frame of a reflector assembly of FIG. 37;

FIG. 39 is an alternative cross-sectional side view of a frame of a reflector assembly of FIG. 37;

FIG. 63 is an isometric view of an LED light bar for an emergency vehicle;

FIG. 64 is a side view of an LED light bar for an emergency vehicle;

FIG. 65 is a cross-sectional top view of the take-down and alley light;

FIG. 67 is a front view of a traffic semaphore and pulsed light OPTICOM system;

FIG. 67A is an environmental view of an emergency vehicle and pulsed light OPTICOM system;

FIG. 68 is an environmental view of an LED OPTICOM SIT-TEL pulsating light signal between two vehicles;

FIG. 69 is an environmental detail view of a license plate SIT-TEL LED pulsating light signal system;

FIG. 70 is a partial cross-sectional top view of a license plate SIT-TEL LED pulsating light signal system;

FIG. 74 is an environmental view of an LED SIT-TEL pulsating light signal and urban environment;

FIG. 75 is an environmental view of an LED SIT-TEL pulsating light signal and railroad crossing;

FIG. 76 is an detail view of an LED SIT-TEL pulsating light signal and railroad crossing indicator;

FIGS. 88A–C constitute a block diagram of the operation of the first, second, and third controllers within the SIT-TEL pulsed light communication system.

DETAILED DESCRIPTION OF THE PREFERRED EMBODIMENTS

Figure 1:
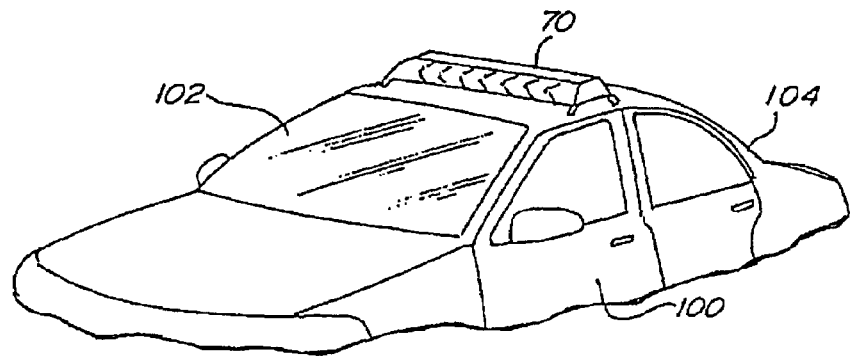
FIG. 1 is a partial perspective view of an emergency vehicle equipped with a light bar containing warning signal lights according to an embodiment of the invention.
Figure 2:
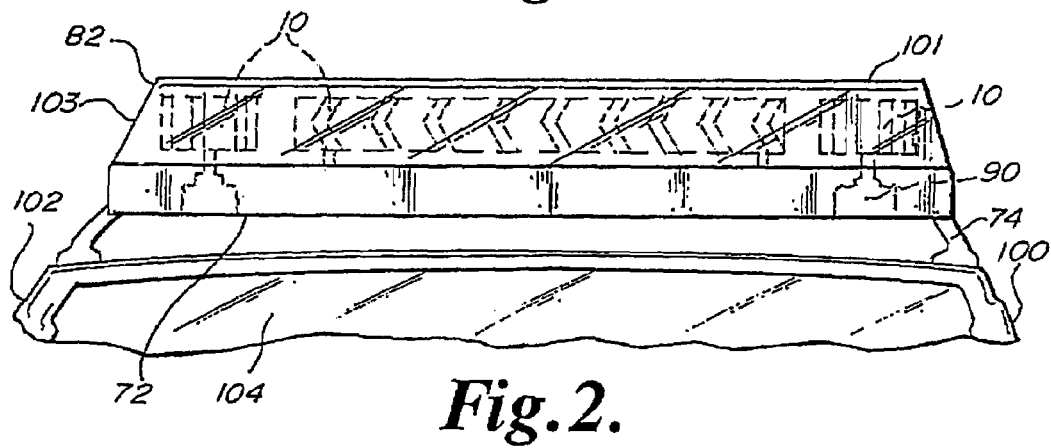
FIG. 2 is a partial front elevation view of an emergency vehicle equipped with a light bar containing warning signal lights according to an embodiment of the invention.

A warning signal light according to the principles of the invention is indicated generally herein as numeral 10. FIGS. 1 and 2 depict light bar 70 mounted to an emergency vehicle 104. Light bar 70, includes base 72, mounting means 74, cover 82, and warning signal lights 10. Also included in light bar 70, may be gyrators 90, which may be used to impart motion to warning signal lights 10.

Figure 9:
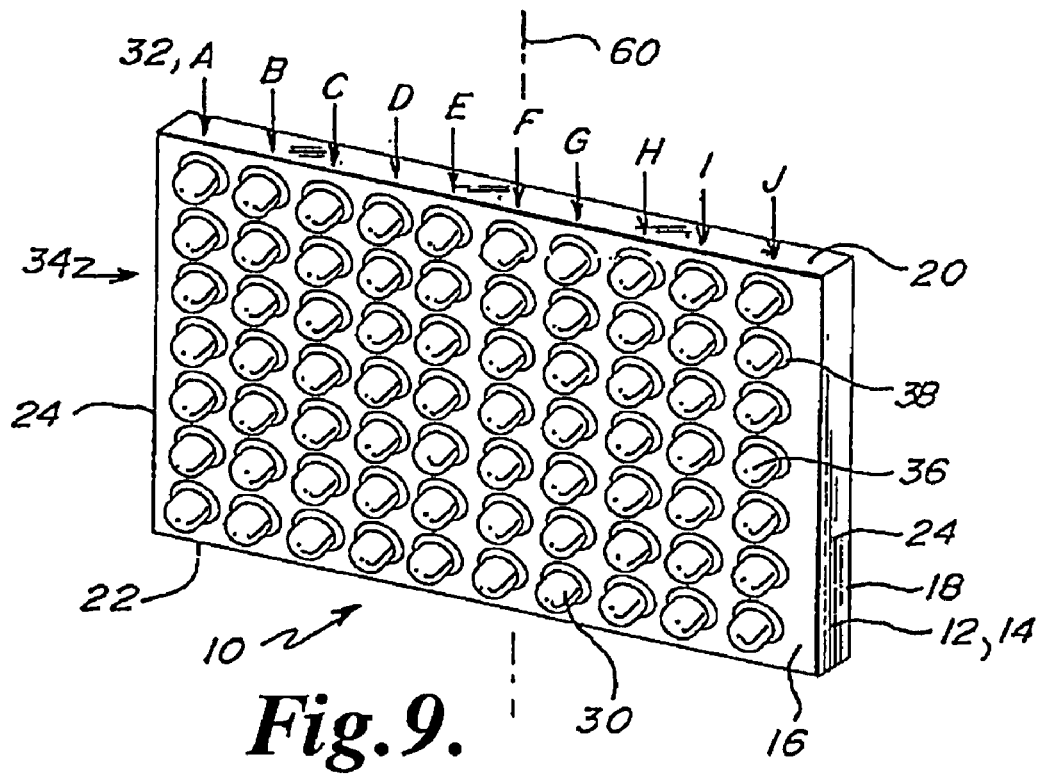
FIG. 9 is a perspective view of a warning light signal according to an embodiment of the invention.

Referring to FIGS. 3 and 9, warning signal light 10, comprises light support 12, LED light sources 30, controller 50 (shown in FIG. 11), and connecting portion 40, for attaching the warning signal light 10, to light bar 70, or gyrator 90. The warning signal light 10, operates to create a warning signal for use by an emergency vehicle 104, by selectively activating light sources 30 or by selectively activating combinations and/or patterns of light sources 30 by using controller 50. Alternatively, warning signal light 10, may be formed of one or more solitary LED light sources 30.

Figure 7:
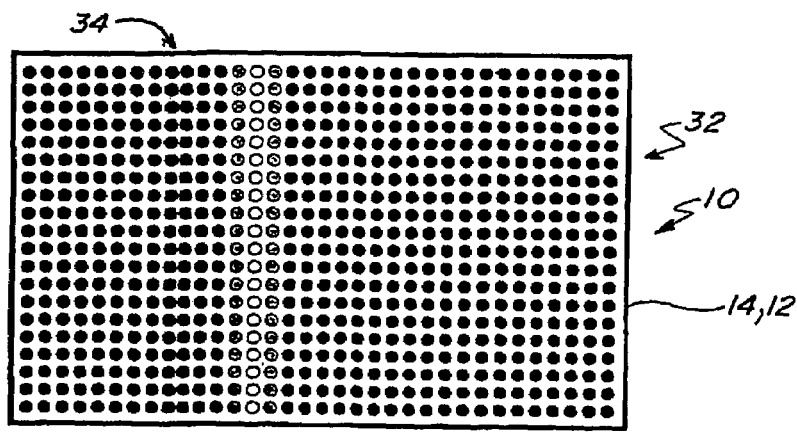
FIG. 7 is a perspective view of a warning light signal according to an embodiment of the invention.

Light sources 30, are preferably light emitting diodes (LED□s) and are generally arranged in aligned columns 32, and/or rows 34, as shown in FIG. 7 and 9. Each of the light emitting diodes (LED□s) may have shoulder portion 38, adjacent LED support 12, and dome 36. LED□s 30, are situated to be in electric communication with controller 50, and a power supply, a battery, or power source. The use of light emitting diodes (LED□s) to replace traditional halogen, incandescent, or gaseous discharge xenon lamps reduces heat generation, current draw, and electromagnetic emissions, while increasing lamp life and producing a more true output light color.

The controller 50 is used to selectively activate portions or entire columns 32, rows 34, or individual LED□s 30, to illuminate any number of a plurality of visually distinct types of warning light signals at any moment; to illuminate more than one of a plurality of visually distinct types of warning light signals simultaneously at any moment; to illuminate one of a plurality of combinations or patterns of visually distinct warning light signals at any moment, or over any desired period of time, or to illuminate more than one of a plurality of combinations or patterns of visually distinct warning light signals over any desired period of time. The plurality of visually distinct warning light signals may include, but are not necessarily limited to, a strobe light signal, a pulsating light signal, an alternating light, a modulated light signal, a variable light signal, a flashing light signal, the illusion of a rotating or an oscillating light signal, a reverse character message, a sequential light signal, a random light signal, or images such as arrows. The controller 50 may also incorporate into any selected warning light signal variable or modulated light intensity to facilitate the provision of a desired unique lighting effect. For example, the controller 50 may illuminate one or more LED light sources 30 to establish a single warning light signal at a given moment. Alternatively, the controller 50 may illuminate one or more light emitting diode light sources 30 to provide two or more warning light signals at any given moment. Further, the controller 50 may simultaneously, consecutively, or alternatively, illuminate one or more LED light sources 30 to establish any desired combination or pattern of illuminated visually distinct warning light signals at any given moment or over a desired period of time. The combination and/or pattern of visually distinct warning light signals may be random, intermittent, or may be regularly cycled. The illumination of one or more patterns or combinations of warning light signals facilitates the continued observation by an individual. Occasionally, the concentration or attention of an individual is diminished when exposed to a repetitive or to a monotonous light signal. The desired purpose for illumination of a warning light signal is thereby reduced. The provision of a pattern, combination, and/or random illumination of visually distinct warning light signals maximizes the concentration or attention to be received from an individual observing a warning light signal. The purpose of the warning light signal is thereby promoted.

Figure 11A:
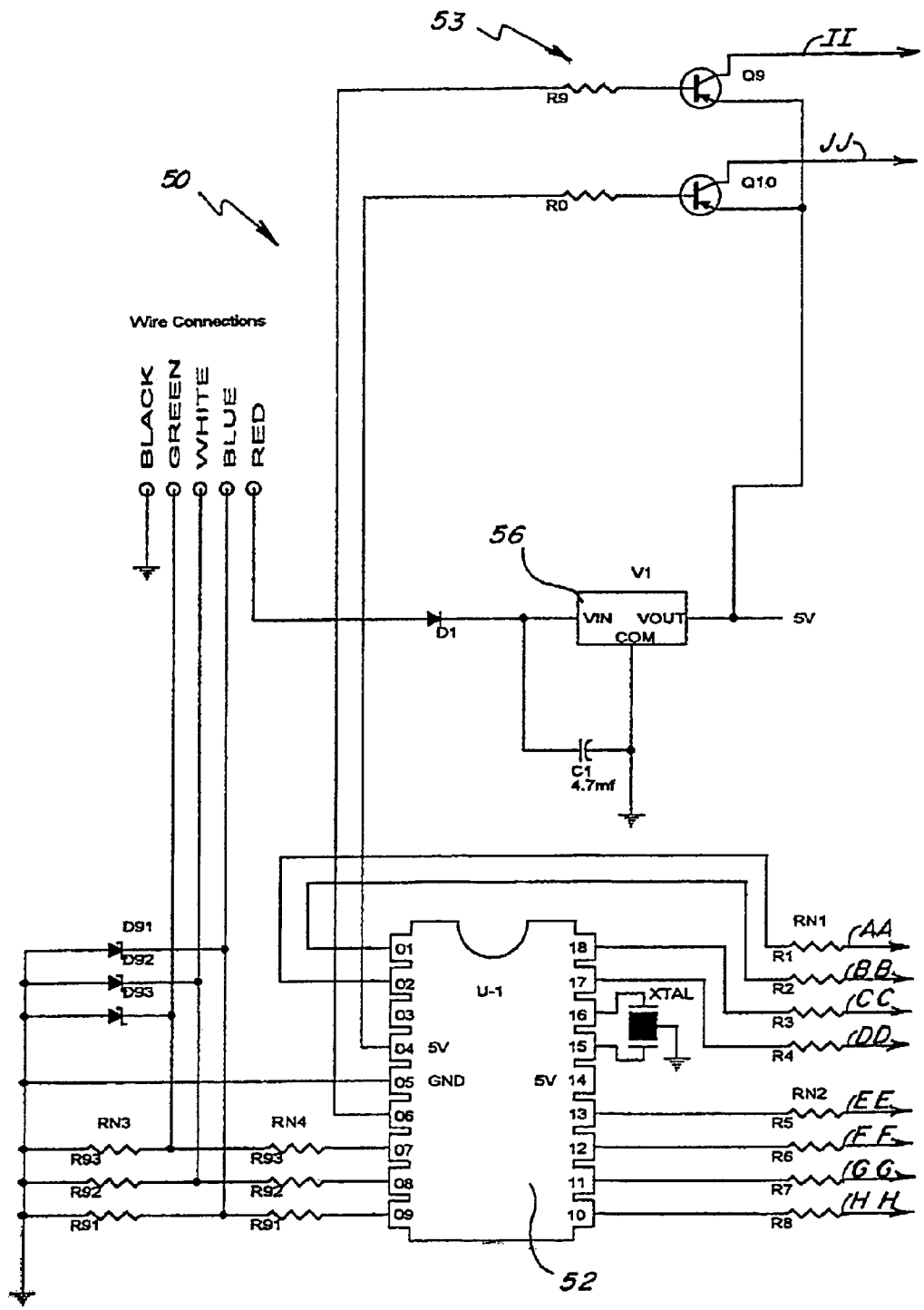
FIGS. 11A, 11B, and 11C are schematic diagrams of one embodiment of the controller circuitry in accordance with an embodiment of the invention.
Figure 11B:
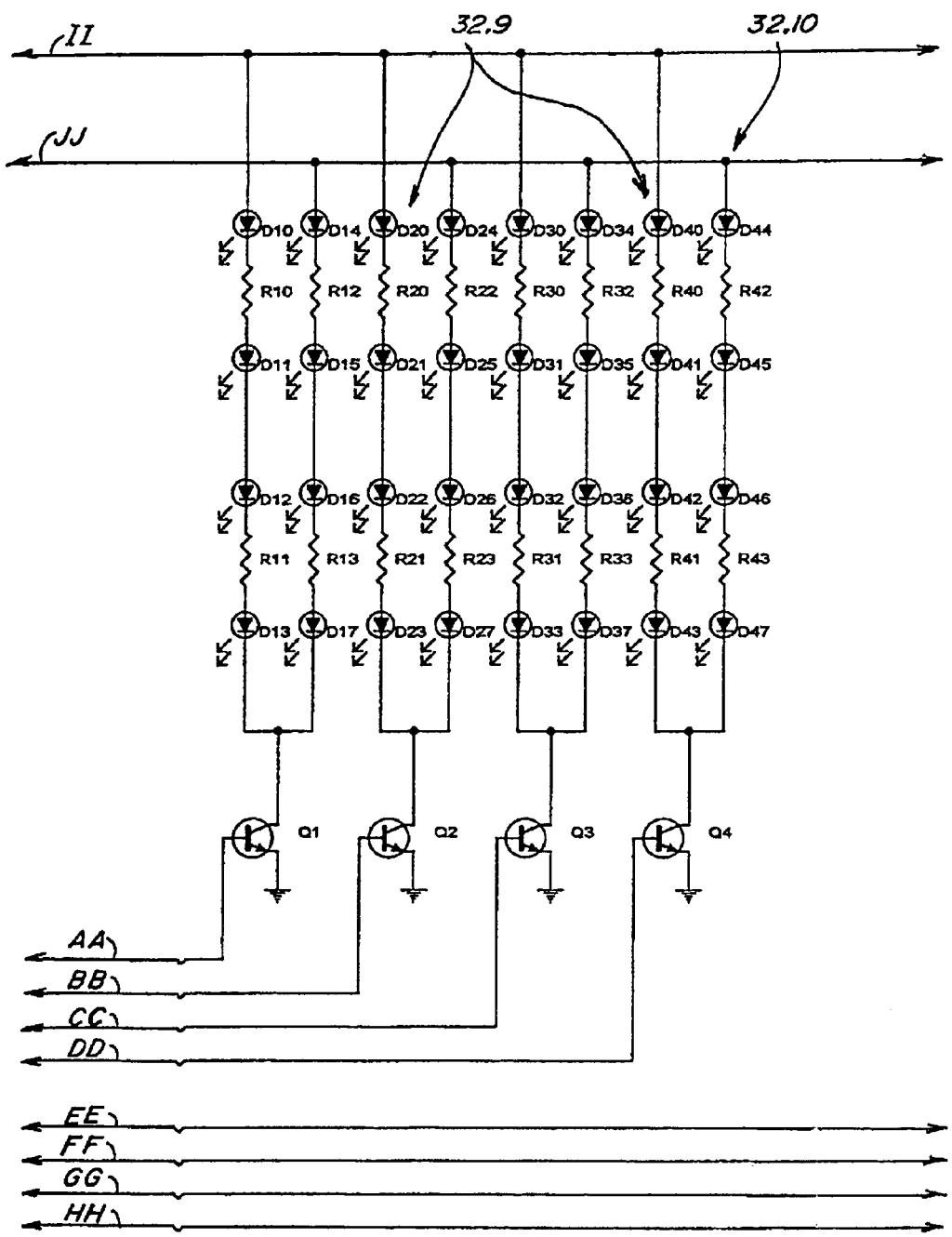
Figure 11C:
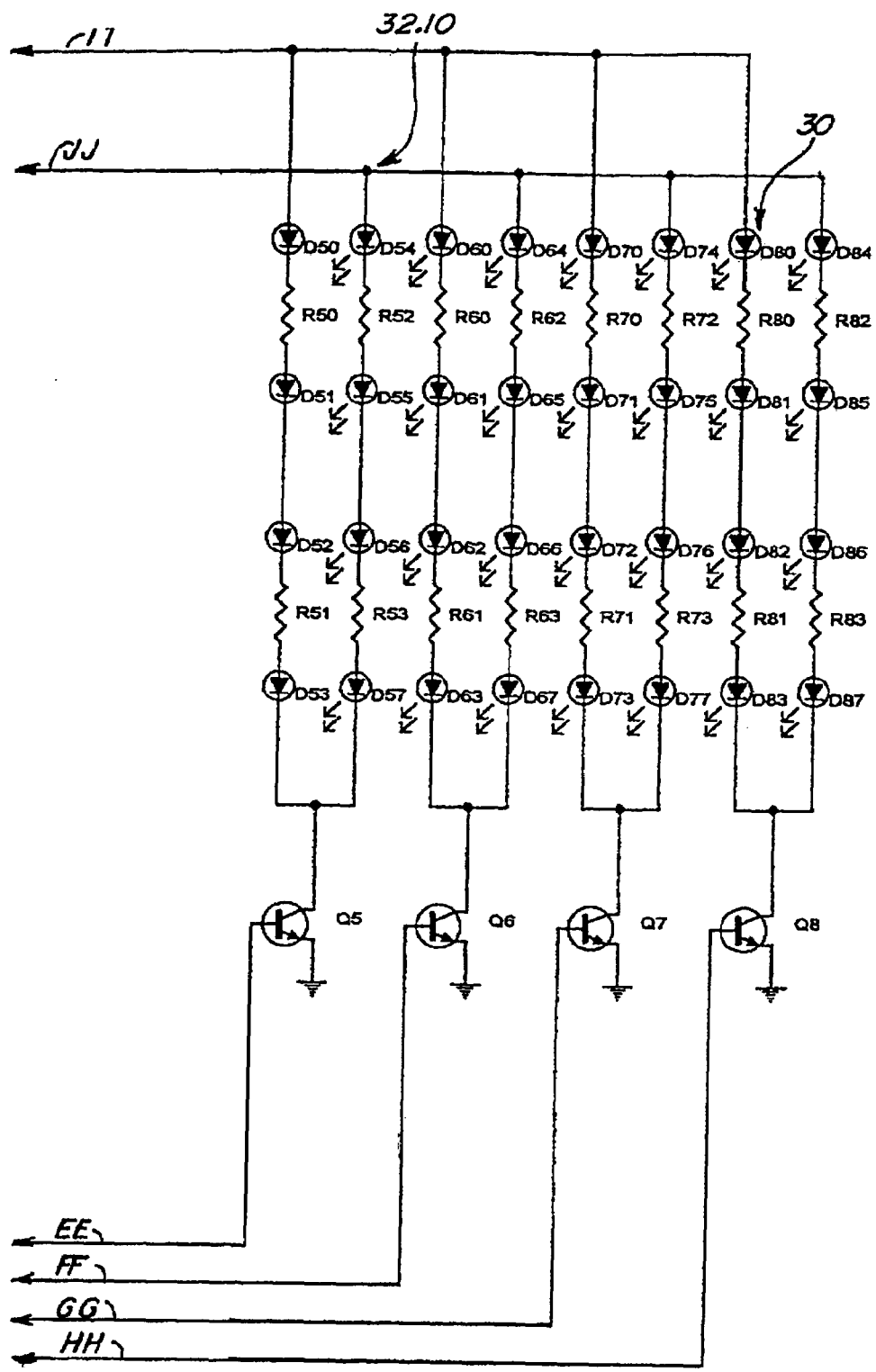

FIGS. 11A, 11B, and 11C show an embodiment of controller 50 capable of selectively activating columns 32, rows 34, individual or combinations of individual LED□s 30. Controller 50 generally comprises microprocessor 52 and circuitry 53 and is contained within, attached to, or an element of, LED support 12. It is envisioned that controller 50 may be programmed by an external controller 55 and powered through cable R.

In one embodiment, controller 50 generally comprises circuit board or LED mounting surface having microprocessor 52 attached to a low voltage power 10 supply, battery, or electrical source 56. Microprocessor 52 is configured through circuitry 53 to selectively activate columns 32, rows 34, or one or more individual LED□s 30. Transistors Q9 and Q10 are in electronic communication with microprocessor 52, power supply, battery, or electrical source 56, and their respective columns 32.9 and 32.10 of LED's 30. Columns 32 of LED's 30 are connected to transistors Q1–Q8, which are in turn connected to microprocessor 52 through resistors R1–R8. Microprocessor 52 is capable of selectively activating transistors Q1–Q8 to allow current flowing through transistors Q9 and Q–10 to activate the selected column 32 of LED's 30. This circuit is capable of producing any one or more of the different types of light signals as earlier identified.

In one embodiment, a rotating or oscillating light signal may be established by the sequential illumination of entire columns 32 of LED's 30 by turning a desired number of columns on and then sequentially illuminating one additional column 32 while turning another column 32 off. Alternatively, the rotating or oscillating warning light signal may be created by selectively activating columns 32 of LED□s 30. The following algorithm may be used to provide a counterclockwise revolving light signal (FIG. 9):

1) column A is activated at 0% duty cycle (column A 0%), column B 0%, column C 0%, column D 0%, column E 0%, column F 0%, column G 0%, column H 0%, column I 0%, and column J 0%;
2) column A 25%, column B 0%, column C 0%, column D 0%, column E 0%, column F 0%, column G 0%, column H 0%, column I 0%, and column J 0%;
3) column A 50%, column B 25%, column C 0%, column D 0%, column E 0%, column F 0%, column G 0%, column H 0%, column I 0%, and column J 0%;
4) column A 75%, column B 50%, column C 25%, column D 0%, column E 0%, column F 0%, column G 0%, column H 0%, column I 0%, and column J 0%;
5) column A 100%, column B 75%, column C 50%, column D 25%, column E 0%, column F 0%, column G 0%, column H 0%, column I 0%, and column J 0%;
6) column A 100%, column B 100%, column C 75%, column D 50%, column E 25% column, column F 0%, column G 0%, column H 0%, column I 0%, and column J 0%;
7) column A 75%, column B 100%, column C 100%, column D 75%, column E 50%, F 25%, column G 0%, column H 0%, column I 0%, and column J 0%;
8) column A 50%, column B 75%, column C 100%, column D 100%, column E 75%, column F 50%, column G 25%, column H 0%, column I 0%, and column J 0%;
9) column A 25%, column B 50%, column C 75%, column D 100%, column E 100%, column F 75%, column G 50%, column H 25%, column I 0%, and column J 0%;
10) column A 0%, column B 25%, column C 50%, column D 75%, column E 100%, column F 100%, column G 75%, column H 50%, column I 25%, and column J 0%;
11) column A 0%, column B 0%, column C 25%, column D 50%, column E 75%, column F 100%, column G 100%, column H 75%, column I 50%, and column J 25%;
12) column A 0%, column B 0%, column C 0%, column D 25%, column E 50%, column F 75%, column G 100%, column H 100%, column I 75%, and column J 50%;
13) column A 0%, column B 0%, column C 0%, column D 0%, column E 25%, column F 50%, column G 75%, column H 100%, column I 100%, and column J 75%;
14) column A 0%, column B 0%, column C 0%, column D 0%, column E 0%, column F 25%, column G 50%, column H 75%, column I 100%, and column J 100%;
15) column A 0%, column B 0%, column C 0%, column D 0%, column E 0%, column F 0%, column G 25%, column H 50%, column I 75%, and column J 100%;
16) column A 0%, column B 0%, column C 0%, column D 0%, column E 0%, column F 0%, column G 0%, column H 25%, column I 50%, and column J 75%;
17) column A 0%, column B 0%, column C 0%, column D 0%, column E 0%, column F 0%, column G 0%, column H 0%, column I 25%, and column J 50%;
18) column A 0%, column B 0%, column C 0%, column D 0%, column E 0%, column F 0%, column G 0%, column H 0%, column I 0%, and column J 25%;
19) column A 0%, column B 0%, column C 0%, column D 0%, column E 0%, column F 0%, column G 0%, column H 0%, column I 0%, and column J 0%;
20) return to step 1).

A clockwise revolving light signal may be created by performing steps 1–19 in descending order then repeating the steps. An oscillating light signal may be created by performing: (a) steps 7 through 16 in ascending order; (b) steps 7 through 16 in descending order; and (c) repeating (a) and (b).

A second embodiment of controller 50 provides a means for activating LED□s 30 individually to allow for greater flexibility in the type of warning light signal created. This embodiment of the invention is capable of displaying information in different colors or patterns. Depending on the size of the display, it may be necessary to scroll the symbols or characters across the display to accommodate for a larger visual appearance. It is envisioned that the mirror image of patterns, symbols, or characters could be displayed making the message easily readable by drivers viewing the signal in a rear view mirror. It is also envisioned that the warning light signal could display arrows indicating a direction a vehicle is to travel or other images as shown in FIG. 2. In addition, combinations of warning signal lights, direction arrows, and other information carrying signals or images, may be displayed simultaneously by the invention.

LED support 12 is envisioned to have several embodiments. One embodiment, shown in FIG. 9, consists of a panel 14 having front 16, back 18, top 20, bottom 22 and sides 24. LED☐s 30 are arranged on front 16, with domes 36 extending therefrom, in columns 32 and rows 34. LED☐s 30 are in electric communication with controller 50 which may be contained or sealed within LED support 12 to provide protection from the elements.

Figure 10:
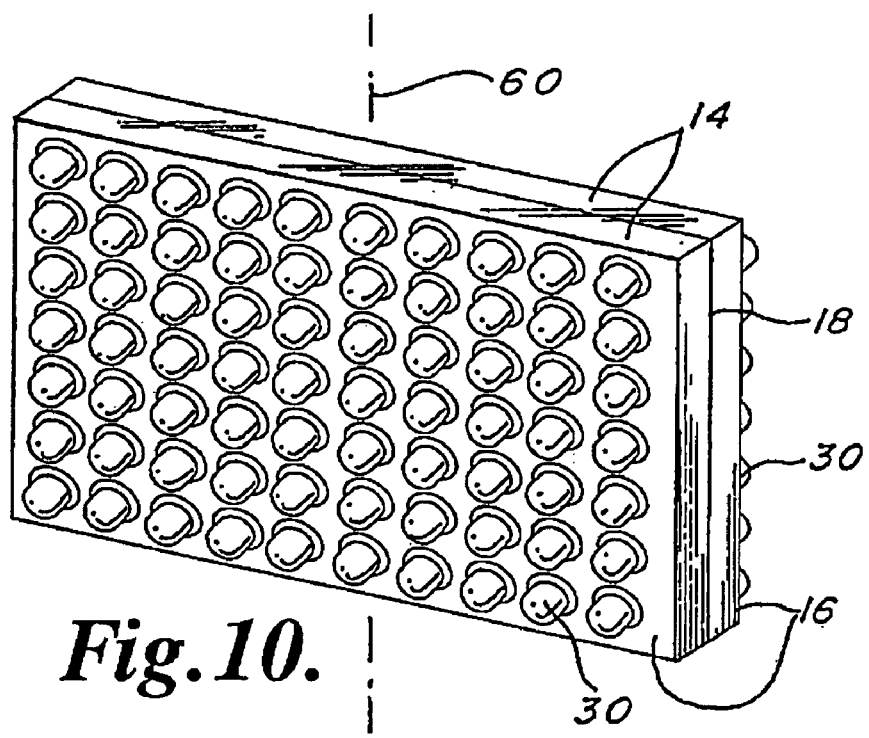
FIG. 10 is a perspective view of a warning light signal according to an embodiment of the invention.

Another embodiment of warning signal light 10 is depicted in FIG. 10. Here, the backs 18 of two panels 14 are attached together to allow for a light signal to be produced on two sides. The two panels 14 form LED support 12. Alternatively, it is envisioned that a single panel 14 having LED☐s arranged about front 16 and back 18 could be used as well.

Figure 8:
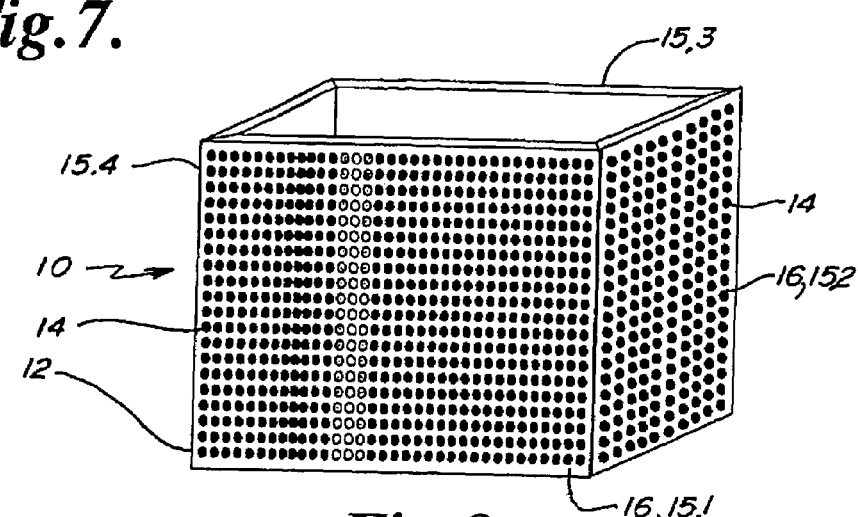
FIG. 8 is a perspective view of a warning light signal according to an embodiment of the invention.

FIGS. 6 and 8 show further embodiments of warning signal light 10. In FIG. 8, panels 14 are used to form an LED support 12 having four sides and generally shaped as squared. FIG. 6 shows panels 14 connected to form an LED support 12 having three sides and generally triangular in shape. In both embodiments, LED☐s 30 are arranged about the fronts 16 of the panels 14. It is further envisioned that panels 14 may be integral to each other.

Figure 13:
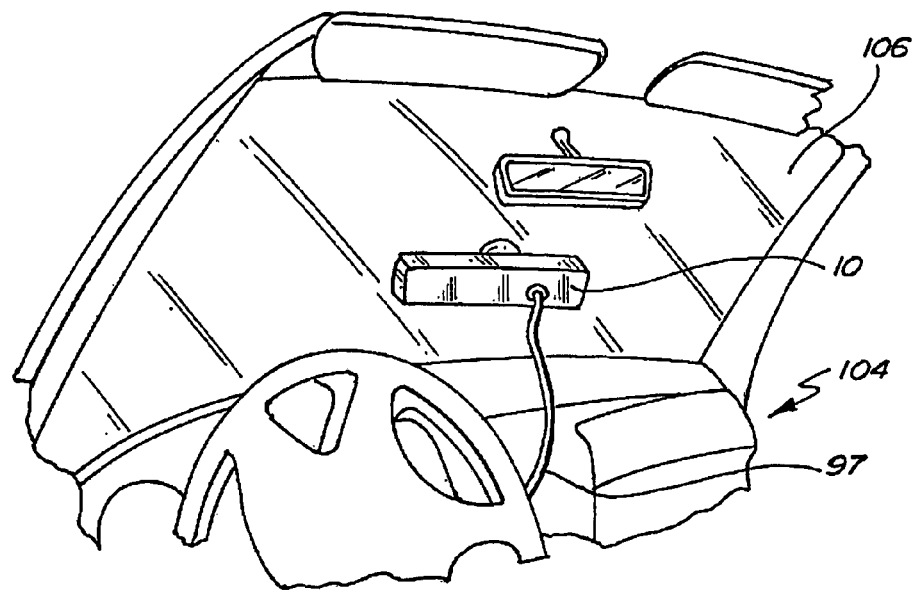
FIG. 13 is a perspective detailed view of a warning signal light attached to the interior of a windshield of an emergency vehicle.
Figure 14:
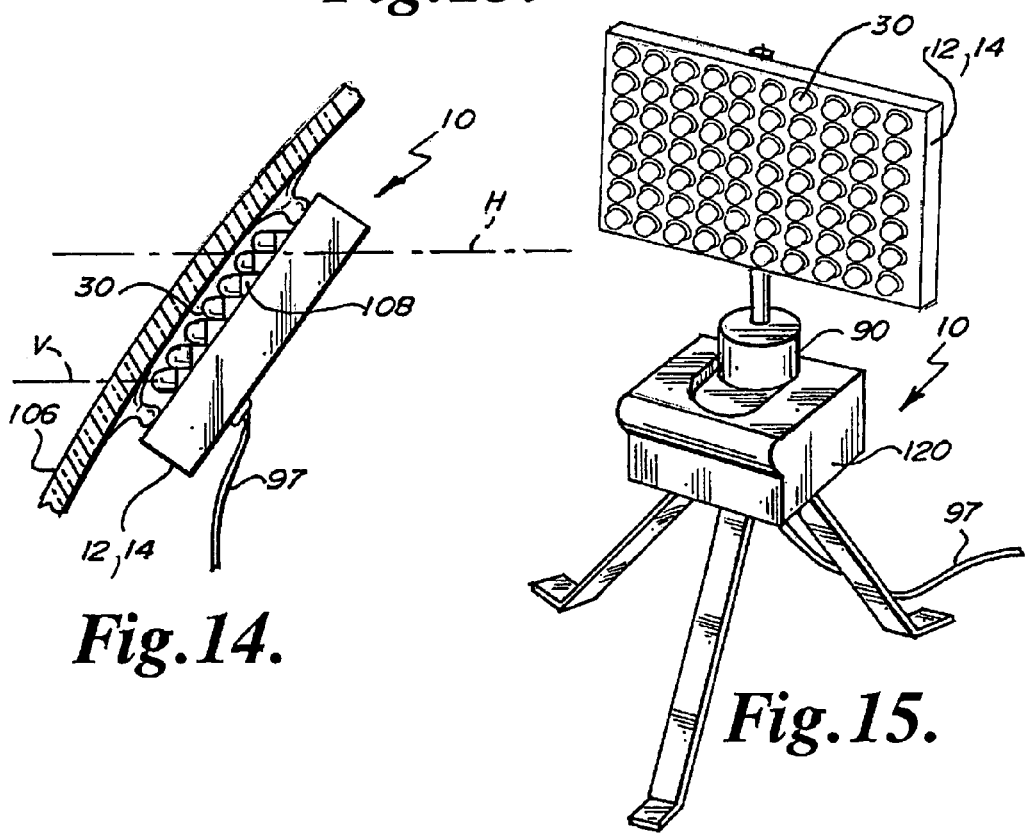
FIG. 14 is a side plan view of a warning signal light mounted to an interior surface of an emergency vehicle window having angularly offset individual LED light sources.

Yet another embodiment of warning signal light 10, consists of a flexible panel 14 and controller 50 to allow LED support 12 to be formed into various shapes. FIG. 5 shows LED support 12 formed into a cylinder. Further variations include the use of flexible panels 14 to form other shapes such as semicircles (FIG. 12) or to simply conform to a surface of an emergency vehicle (FIGS. 13 and 14). This embodiment is particularly useful for undercover vehicles which generally position the warning signal lights inside the vehicle. For example, panel 14 could be attached to the front, rear, or side window of an undercover police vehicle.

Numerous other shapes could be formed from panels 14 including those formed from combinations of flat, curved, and flexible panels.

In each of the embodiments discussed above, the array of LED☐s 30 may be formed of the same or differently colored LED☐s. Generally, each column 32 or row 34 may consist of a series of differently colored LED☐s. Controller 50 may be configured to select the color of the LED☐s to be illuminated forming the light signal. Accordingly, the user may select a blue, red, white, yellow, green, or amber color or any combination thereof to be used as the color of light signal. Alternatively, the warning signal 10 may be formed of individual LED☐s 30 which may be selectively illuminated for generation of a particular type of light signal.

It is also envisioned that the controller 50 may control warning signal lights 10 having multiple sides (FIGS. 5, 6, 8, and 10) such that each side is capable of producing warning light signals or combinations of warning light signals that are independent and/or different from those produced upon the other sides. For example, the squared shape warning signal light shown in FIG. 8 may produce or simulate a red revolving light on first side 15.1, while second side 15.2 is simultaneously producing a blue oscillating light, while third side 15.3 is producing or simulating a stationary white light, and while fourth side 15.4 is producing a white strobe light.

Another embodiment of warning signal light 10 is depicted in FIGS. 1 and 2 as light bar 70 which extends from driver side 100 to passenger side 102 of emergency vehicle 104. Cover 82 protects light bar 70 from the elements. Each side of light bar 70 may have LED☐s 30 to produce or simulate warning light signals on each side of emergency vehicle 104. Furthermore, controller 50 may be used to create multiple warning light signals on each side of light bar 70. For example, controller 50 may create a simulated revolving blue light positioned at front passenger side 102 of light bar 70, oscillating white lights positioned at front driver side 100, and yellow arrows there between. Additional or alternative warning light signals may be produced out the back 18 and sides of light bar 70. It is further envisioned that light bar 70 may consist of a single light source, a single row of light sources or a large array of LED☐s 30 across each side (not shown). This embodiment provides the largest display and, therefore, is best suited to display desired combinations of warning lights and images. It should be noted that the identified types of warning light signals, combinations and/or patterns of warning light signals, may also be reproduced through the illumination of a single row of LED light sources 30 and that the type of patterns previously identified are not intended to be exclusive in that an infinite variety of combinations and/or patterns are available for generation by controller 50.

Mechanical rotation and oscillation of warning signal lights 10 about axis "A" is possible by way of attachment to gyrator 90 depicted in FIG. 3. Gyrator 90 mounted to light bar 70, generally comprises electric motors 96 having cables 97. Gyrator 90 is configured to receive connecting portion 40 of warning signal light 10. Cable 97 is preferably connected to a power supply and either an external controller 55 or controller 50.

Gyrator 90 may be capable of rotating or oscillating warning signal light 10 about a single or dual axis of rotation "A". FIG. 3 shows gyrator 90 configured to rotate or oscillate warning signal light 10 about a vertical axis "A" by way of motor 96.1 and oscillate warning signal light 10 about a horizontal axis "A" by way of motor 96.2. Rotation or oscillation of warning signal light 10 about vertical axis "A" is accomplished through direct attachment of connecting portion to motor 96.1. Oscillation of warning signal light 10 about horizontal axis "A" is accomplished by attaching swivel arm 99 to bracket 99.1 and post 99.2 which is mounted to motor 96.2.

Alternative methods for imparting rotation or oscillation motion to warning signal light 10 may be accomplished through the use of electric motors, toothed gears, and worm gears. In addition, maintaining electrical communication between a power supply and an external controller 55 with a revolving or oscillating warning signal light 10 may be accomplished using brushes or other means without sacrificing the operation of the warning signal light 10.

In another embodiment as depicted in FIGS. 13 and 14, emergency vehicle 104 may include a front or rear windshield 106. The front or rear windshield 106 is generally angularly offset with respect to the vehicle at an approximate angle of 45 degrees. In this embodiment, the mounting of a panel 14 of light sources 30 in flush contact with the interior of a front or rear windshield 106 may occur through the use of angular offsets 108 for the light sources 30 such that light is transmitted from the light sources 30 at a horizontal visual line (V) which is substantially parallel to the plane of a vehicle and not at an approximate angle of 45 degrees upward, which corresponds to the angle for the front or rear windshield 106.

In this embodiment, the ease of visualization of a generated light signal is significantly enhanced by the downward angular offsets 108 which position the light sources 30 along parallel visual lines of sight (V). LED supports 12 or panels 14 may then be positioned in any desired location within the interior of a vehicle in flush contact or proximate to the front or rear windshield 106. A suitable cable 97 is required to provide electrical power for illumination of the light sources 30. It should be noted that the angle of incidence for the angular offsets 108 may vary considerably dependent upon the make or model for the vehicle to include the warning signal lights 10.

The warning signal light 10 may be used upon an automobile, motorcycle, snowmobile, personal water craft, boat, truck, fire vehicle, helicopter, and/or any other type of vehicle receptive to the use of warning signal lights 10. The LED support 12 or panel 14 may be mounted to the interior top dashboard of a vehicle proximate to the front windshield 106 or to the interior top rear dashboard proximate to the rear windshield 106 of a vehicle.

Mounting of a light support 12 or panel 14 to either the front or rear dashboards may minimize the necessity for inclusion of angular offset 108 for the light sources 30. The LED supports 12 or panels 14 may be releasably affixed to the interior of the front or rear windshields 106 via the use of suction cups, hook-and-loop fabric material such as Velcro□, and/or any other releasable affixation mechanism. An individual may then adjust and reposition the location of the light support 12 or panels 14 anywhere within the interior of a vehicle as desired for maximization of visualization of the warning signal lights 10.

Figure 15:
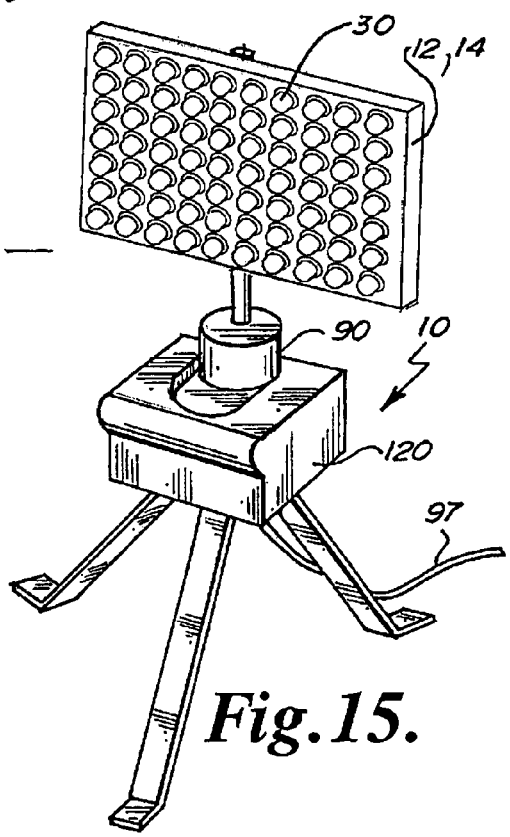
FIG. 15 is an environmental view of a warning signal light as engaged to a remote support device such as a tripod.

In another alternative embodiment as depicted in FIG. 15, warning signal light 10 may function as a remote, revolving, or stationary beacon. In this embodiment, LED support 12 or panel 14 is preferably releasably connected to a transportable support 120 via the use of a bracket. The transportable support 120 may be a tripod having telescoping legs or may be any other type of support. In this embodiment, LED light support 12 or panel 14 is electrically connected to an elongate electrical extension cable 97 which may include any desired adapter for electrical connection to a power source which may be a vehicle. The remote light support 12 or panel 14 may also include plug-in adapters for electrical connection to any desired electrical power source other than a vehicle as is available. Alternatively, the LED light support 12 or panel 14 may be electrically connected to a battery or rechargeable battery to provide power to the LED□s 30.

The transportable support 120 may also include gyrator 90 as earlier described to provide rotational or oscillatory motion for warning signal light 10. A controller 50 having a microprocessor 52 may also be integral to, or in electrical communication with, LED's 30 for the provision of multi-colored lights, one or more of the warning light signals or patterns or combinations of warning light signals as earlier described. In this embodiment, the warning signal light 10 may be physically separated from an emergency vehicle 104 any desired distance to facilitate or enhance the safety of a potentially dangerous situation necessitating the use of a warning light. Further, a series of remote warning signal lights 10 may be electrically coupled to each other for any desired distance to again facilitate the environmental safety of an emergency location.

Figure 16:
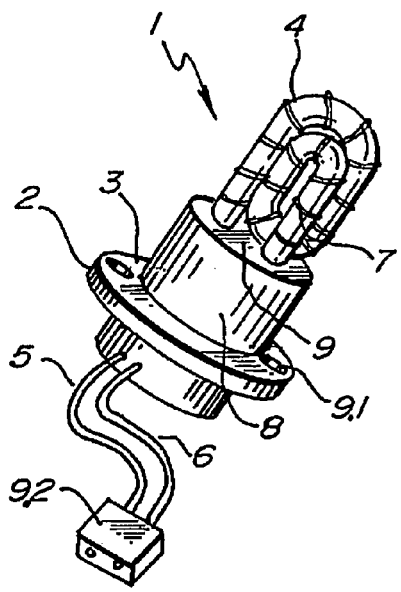
FIG. 16 is a detailed isometric view of a prior art xenon strobe tube and standard mounting base.

FIG. 16 shows a perspective view of a xenon lamp 1. Xenon lamp 1 has a base pedestal 2 which is typically formed of rubber, plastic, or other insulating material. Base pedestal 2 has a top surface 3 which may support a glass tube 4 which may have a looped curve such that an anode end and a cathode end are each supported on a top surface. The anode and cathode ends may be sealed and respective electrical conductors 5 and 6 may pass through the sealed ends and through the top surface 3. A trigger wire 7 may be helically wound about the exterior surface of the glass tube 4 and the ends of the trigger wire 7 may be passed through the top surface 3 of the base pedestal 2 to form a third conductor on the underside of the base pedestal 2.

Base pedestal 2 may have an upper cylinder portion 8 extending from a lower shoulder all of which may extend above the top surface 3. The upper cylindrical portion 8 may include an upper shoulder 9. A glass dome (not shown) may be sized to fit over the xenon lamp 1 and glass tube 4 for resting on the upper shoulder 9. The glass dome may be formed of a transparent or silicate glass material capable of withstanding heat stress. The outer diameter of the glass dome is typically about one inch which is sized to fit through the conventional opening in a typical vehicle lamp fixture. The exterior glass dome surface typically has a much lower temperature during operation than the exterior surface of the glass tube 4 forming a part of the xenon lamp 1. The temperature-drop between the glass tube 4 and the glass dome facilitates the use of coloring of the dome to provide a colored lamp by virtue of the xenon light intensity passing through the colored dome acting as a filter.

Figure 20:
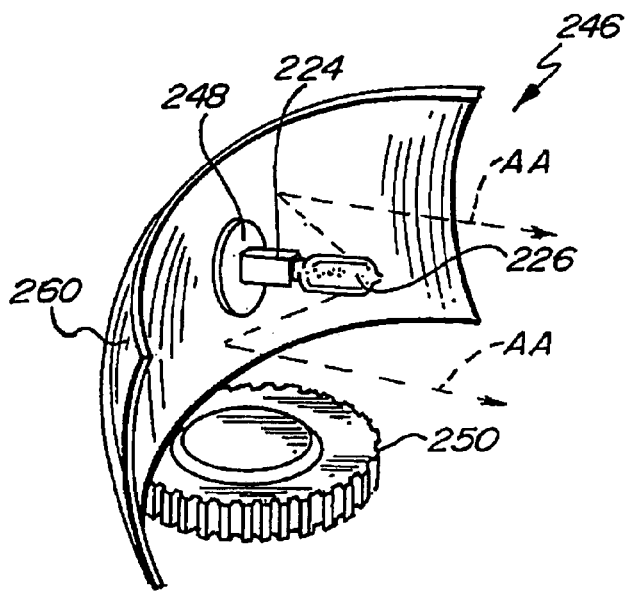
FIG. 20 is a front view of a standard prior art halogen light source mounted in a rotating reflector.
Figure 21:
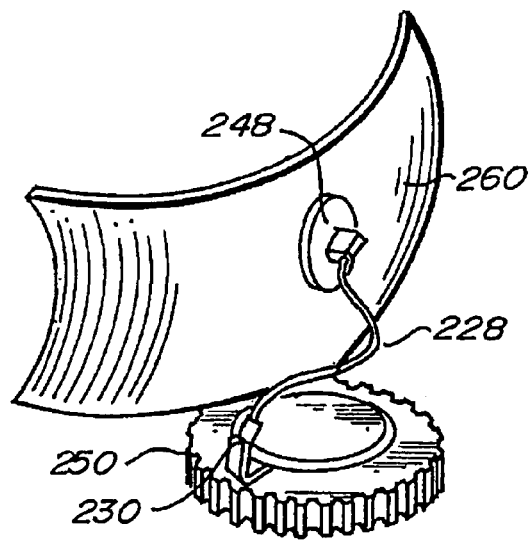
FIG. 21 is a detailed rear view of a rotating reflector mechanism.

The xenon lamp 1 is preferably aligned for insertion into a conventional opening 248 of a light reflector 260 (FIGS. 20 and 21). The light receptacle opening 248 in the light reflector 260 is typically about one inch in diameter; and the glass dome and base pedestal 2 are sized to fit within the light receptacle opening 248. The xenon lamp 1 in its final construction may include a cover plate (not shown) affixed over the bottom opening of the base pedestal 2 for affixation to a light reflector 260 via the use of screws which pass through the screw apertures 9.1. The anode, cathode, and trigger wire 7 traverse the base pedestal 2 and may include a plug 9.2 which is adapted for engagement to a controller/power supply for a motor vehicle.

The light reflector 260 may be a conventional light reflector of the type found in vehicles having a clear plastic or glass lens cover. The glass or lens cover may be fitted over the front edge of the reflector 260 in a manner which is conventional for vehicle lamps. The light reflector 260 may have a parabolic or other shape. The light reflector 260 may be mounted to a motor for rotation about a vertical axis. In this embodiment the light source/replacement lamp 200 may be integrally connected or affixed to the reflector 260 for simultaneous rotation about the vertical axis during use of the motor. (FIGS. 17, 20, 21, 22) Alternatively, the light source/replacement lamp 200 may be fixed proximate to the vertical axis where the light reflector 260 is rotated around the stationary replacement lamp 200 to provide for the visual appearance of a rotational light source.

In operation, the LED replacement lamp 200 may be constructed as a replacement part for a conventional incandescent or xenon gaseous discharge lamp. The standard mounting base 204 and LED support assembly 212 may be sized to readily fit into the same light opening as an incandescent lamp would require, although it is apparent the electrical driving circuit for the LED replacement lamp 200 may require modifications to accommodate the LED operating principles.

LED warning signal lamp 200 may be used in a variety of locations about a vehicle. The use of the LED warning signal lamps 200 are not necessarily limited to positioning adjacent to the head lamp or headlight, tail light, or turn signal illumination devices. The LED warning signal lamp 200 may be used as a rotational, pulsating, or oscillating reflector light within the interior, adjacent to a front, rear, and/or side window of a vehicle.

It is also envisioned that the controller 50 may control warning signal lights 200 independently of one another such that each warning signal lamp 200 is capable of producing warning light signals which are independent and/or different from those produced at another location about an emergency vehicle 104. For example, a front left location may produce a red colored light while simultaneously a front right location may produce an amber colored light and a right rear location may produce a green colored light and a left rear location may produce a blue colored light. The controller 50 may then alternate the color of the light illuminated from the warning signal lamp 200 in each area. Alternatively, the controller 50 may sequentially activate warning signal lamps 200 positioned about an emergency vehicle 104 to simultaneously produce a desired color or alternating sequence of colors. The controller 50 may simultaneously illuminate all LED warning signal lamps 200 to produce a flashing or strobe light which may be particularly useful in certain emergency situations. The controller 50 may also selectively illuminate individual LED warning signal lamps 200 in any desired color, pattern, and/or combination.

Figure 17:
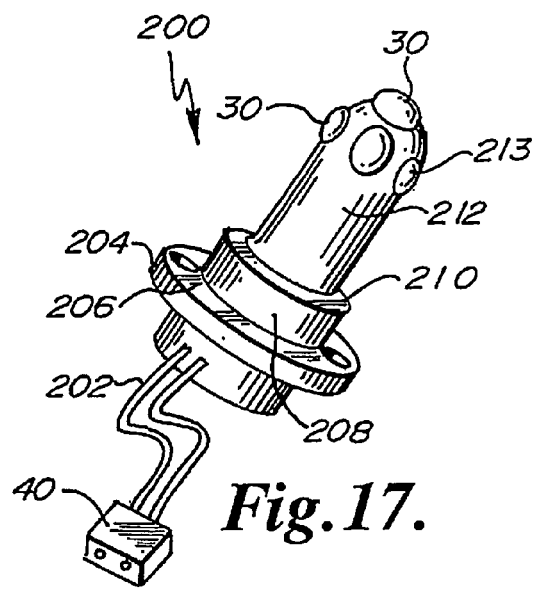
FIG. 17 is a detailed isometric view of the replacement LED light source and standard mounting base.

Referring to FIG. 17 in detail, an LED replacement lamp 200 is depicted. In this embodiment the LED replacement lamp 200 includes a standard mounting base 204 which includes a top surface 206. Extending upwardly from the top surface 206 is an upper cylindrical portion 208 which includes an upper shoulder 210. Extending upwardly from the upper shoulder 210 is an LED support assembly 212 which includes one or more LED lamp modules 213. The LED lamp modules 213 may be of the same or different colors. A wire 202 is in electrical communication with the plurality of LED lamp modules 213 to provide for electrical communication with the controller 50 to individually activate or illuminate LED lamp modules 213. A plug-in connector 40 may be coupled to the wire 202 for engagement to the controller 50 and/or power source of an emergency vehicle 104.

The LED replacement lamp 200 is adapted to be positioned in a one inch light receptacle opening 248 (approximate size) which has been previously placed through the backside of a reflector assembly 260. The LED replacement lamp 200 is used to replace a xenon gaseous discharge lamp or incandescent lamp as previously mounted to a base which is inserted into opening 248 in a reflector assembly 260. Illumination of one or more individual LED lamp modules 213, as mounted in the reflector assembly 260, enables the reflector assembly/lens to take on the appearance of a warning signal or emergency signaling lamp.

Figure 18:
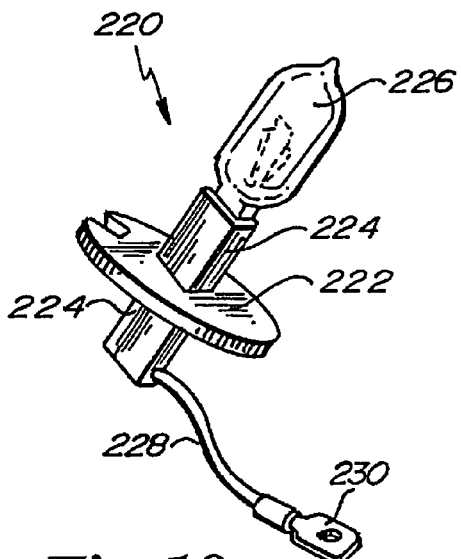
FIG. 18 is a detailed isometric view of a prior art incandescent lamp light source and standard mounting base.

Referring to FIG. 18, an incandescent lamp or quartz halogen H-2 lamp is depicted and in general is indicated by the numeral 220. The incandescent lamp assembly 220 is formed of a standard mounting base 222. A vertical post 224 extends upwardly from the standard mounting base 222. The incandescent light bulb 226 is mounted in the vertical post 224. The vertical post 224 may extend below the standard mounting base 222 to provide for electrical coupling with a wire 228 which includes a standard pin connector 230. The standard pin connector 230 is adapted for electrical communication to a power supply and/or controller 50 for activation of the incandescent lamp assembly 220. The incandescent lamp assembly 220 may be stationary or mounted in a rotational light reflector 260. The light bulb 226 may be a halogen H-2, 55 watt, lamp.

Figure 19:
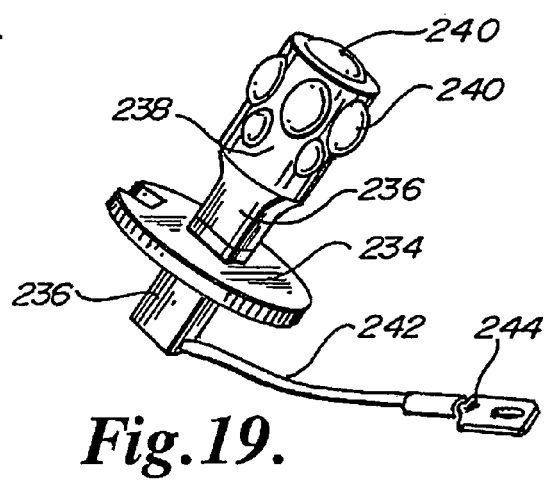
FIG. 19 is a detailed isometric view of a replacement LED lamp and standard mounting base.

As depicted in FIG. 19, LED replacement lamp 200 is adapted to replace the incandescent lamp assembly 220 in a stationary or rotational light reflector 260. The LED replacement lamp 200 as depicted in FIG. 19 includes a standard mounting base 234 and a vertical post 236. The vertical post 236 may extend upwardly from the standard mounting base 234 and may alternatively extend below the standard mounting base 234. An LED mounting area 238 may be integral or affixed to the upper section of the vertical post 236. The LED mounting area 238 includes a plurality of individual LED module lamps 240 which may be illuminated individually, sequentially, or in combination with other light sources.

The individual LED module lamps 240 are in electrical communication with a wire 242 which includes an integral standard wire connector 244. The wire connector 244 is adapted to be plugged into a controller 50 or power supply. Communication is thereby provided for selective illumination of the individual LED module lamps 240. A group of individual LED module lamps 240 may be mounted in the LED mounting area 238. The LED replacement lamp 200 is adapted to replace the incandescent lamp assembly 220 or a xenon gaseous discharge lamp assembly base of FIGS. 16 or 18. The purpose of the LED replacement lamp assembly 200 is to replace existing xenon gaseous discharge and incandescent lamps with new LED technology while simultaneously utilizing existing standard bases in a standard lamp enclosure. For example, an individual may choose to replace a halogen "H-2" 55 watt lamp with an "LED-2" lamp in an existing rotating light fixture with no other structural modifications, yet achieving the advantages of less power consumption, greater reliability, easier installation, less RF emissions (which reduces interference with radio or electronic equipment), cooler operating temperatures, simplified circuitry, longer life, greater durability and duty capability, and simultaneously providing pure and easier-to-see color light output.

As depicted in FIG. 20, a rotational light reflector 246 is disclosed. The rotational light fixture 246 includes a reflector assembly 260 having a standard opening 248. The incandescent light assembly 220 is positioned in the standard opening 248 for extension of the vertical post 224 outwardly from the reflector assembly 260 for positioning of the light bulb 226 in a desired location. Light emitted from the standard halogen light bulb 226 reflects off the parabolic-shaped reflector assembly 260 for transmission of light in a direction as indicated by arrows AA for visualization by individuals. Reflector assembly 260 and light source 226 may be rotated via the use of gears 250 which are driven by electrical motors not shown. In this manner, the rotational light fixture 246 including the reflector assembly 260 may be rotated at any desired velocity as preferred by an individual.

As may be seen in FIG. 21, a rear or back view of the rotational light fixture 246 is provided. As may be seen in FIG. 21, the light source is positioned in the standard opening 248. The wire 228 is in electrical communication with the light source and is connected via the standard pin connector 230 to a power source.

Figure 22:
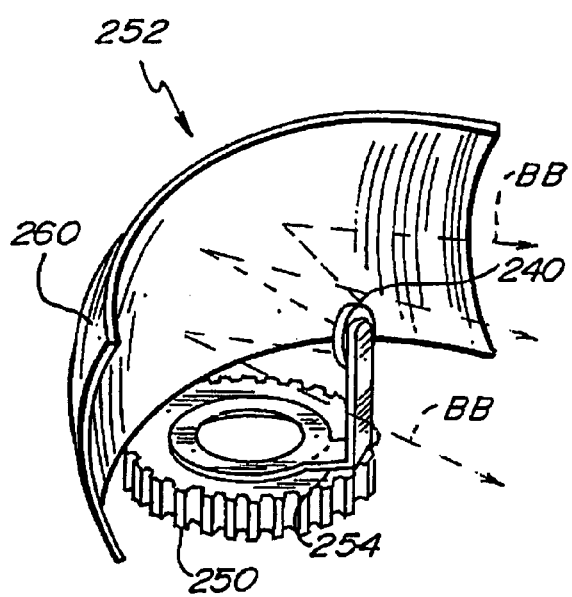
FIG. 22 is a detailed front view of the LED light source mounted to a rotating reflector.

As depicted in FIG. 22, an alternative rotational light fixture 252 is depicted. Rotational light fixture 252 includes a reflector assembly 260 which may be parabolic in shape for the transmission of light along a common axis as depicted by arrows BB for visualization by an individual. In this embodiment, the individual LED module lamps 240 may be positioned to the front of the reflector assembly 260 through the use of a frame 254. The frame 254 may be integral or connected to a gear 250. The gear 250 may be driven by a motor for rotation of the light fixture 252. The individual LED module lamps 240 are in electrical communication with a power source not shown.

The rotational light fixture 252 may also be adapted for the provision of an oscillating or pulsating warning light signal.

Figure 23:
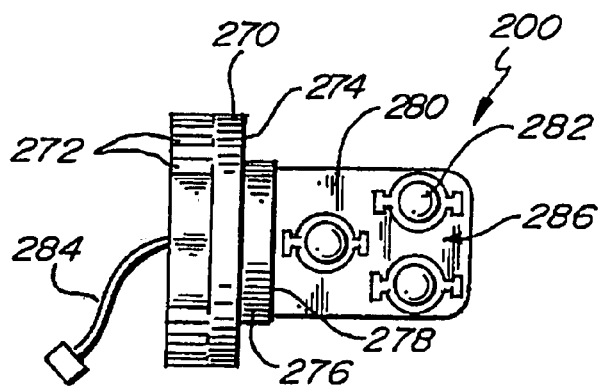
FIG. 23 is a detailed front view of a replacement LED light source.
Figure 24:
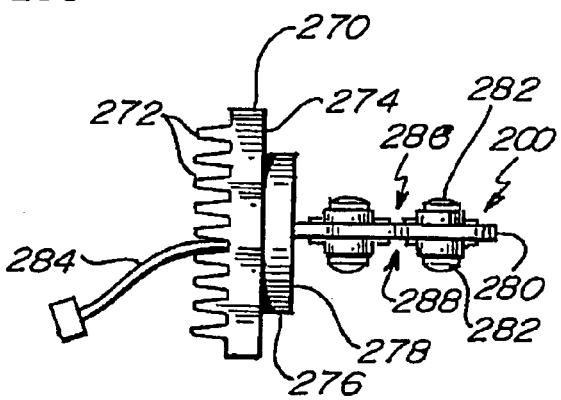
FIG. 24 is a detailed side view of a replacement LED light source.
Figure 25:
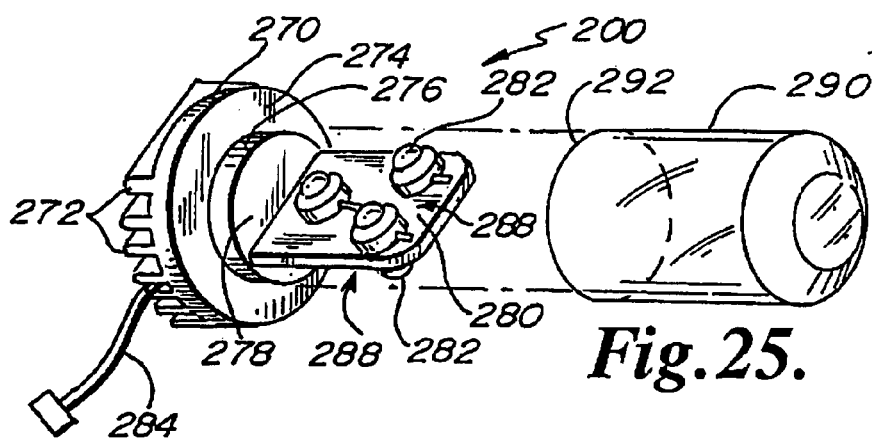
FIG. 25 is a detailed isometric partially exploded view of a replacement LED light source and cover.

An alternative replacement LED lamp 200 is depicted in FIGS. 23–25. In this embodiment the LED replacement lamp 200 includes a standard mounting base 270. The standard mounting base 270 also includes a plurality of teeth 272. The teeth 272 are adapted for mating coupling with gears integral to a motor and/or reflector 260, or rotational light fixture 246 to facilitate rotation and/or oscillation of the replacement LED lamp 200. The standard mounting base 270 also includes a top surface 274 opposite to the teeth 272.

An upper cylinder portion 276 is adjacent to the top surface 274. The upper cylinder portion 276 includes an upper shoulder 278. Extending upwardly from the upper shoulder 278 is a circuit board, LED mounting surface, or support 280 which includes one or more LED illumination sources 282. The LED illumination sources 282 may be of the same or different colors. A wire 284 is in electrical communication with the LED illumination sources 282 to provide for communication and contact with the controller 50 for combination and/or individual illumination of the LED illumination sources 282. A standard plug-in connector may be integral to the wire 284 to facilitate coupling engagement to the controller 50 and/or power source for a vehicle 104.

The circuit board or LED mounting surface 280 is adapted to include a first side 286 and an opposite side 288. A plurality of LED illumination sources 282 are disposed on both the first side 286 and the opposite side 288 of the replacement lamp 200.

A glass dome or protector 290 is adapted for positioning over the circuit board or LED mounting surface 280 for sealing engagement to the top surface 274 of the standard mounting base 270. The glass dome 290 may be formed of transparent plastic material or a transparent or silicate glass material capable of withstanding heat stress. The glass dome 290 protects the circuit board or LED mounting surface 280 and the LED illumination sources 282 from contamination and from exposure to moisture during use of the replacement lamp 200. In this regard, the sealing lip 292 of the glass dome 290 is securely affixed to the top surface 274 to effectuate sealing engagement therebetween. The outer diameter of the glass dome 290 is about one inch which is sized to fit within the conventional opening 248 in a typical lamp fixture or reflector assembly 260.

The replacement lamp 200 depicted in FIGS. 23, 24, and 25 is also adapted to be positioned in a one inch light receptacle opening 248 which has been placed into a reflector assembly 260. Illumination of one or more individual LED illumination sources 282 as disposed on the circuit board or LED mounting surface 280 enables the replacement lamp 200 to take on the appearance of a warning signal or emergency signaling lamp.

The replacement lamp as depicted in FIGS. 23, 24, and 25 may alternatively permit the circuit board 280 to extend below the upper shoulder 278 to facilitate affixation and positioning relative to the standard mounting base 270.

The controller 50 may regulate the illumination of the LED light sources 282 individually, or in combination, to provide a desired warning lighting effect for the replacement lamp 200. Also, the controller 50 may illuminate the LED light sources 282 individually, or in combination, independently with respect to the first side 286 and the opposite side 288 to provide different warning light effects to be observed by an individual dependant upon the location of the person relative to the light source. The controller 50 may also simultaneously or independently regulate the light intensity for the LED illumination sources 282 to provide for a pulsating, modulated or variable light intensity for observation by an individual.

In an alternative embodiment, the LED warning signal lamps 10 or LED replacement lamps 200 may be electrically coupled to a controller 50 which in turn is used to provide a modulated light intensity for the light source. A modulated light intensity enables the provision of various light output or patterns of illumination for creation of a plurality of visually distinct warning light signals without the use of mechanical devices. In these embodiments, the controller 50 illuminates selected light sources 282 and the controller 50 may also regulate and/or modulate the duty cycle for the light sources 282, thereby varying the intensity of the observed light. In addition, the controller 50 may modulate the duty cycle for the LED warning signal lamps 10 or LED replacement lamps 200 in accordance with a sine wave pattern having a range of 0 to full intensity. At the instant of full intensity, the controller 50 may also signal or regulate an illumination burst for observation by an individual. The controller 50 operating to regulate and/or modulate the light intensity for the warning signal lamps 10 or LED replacement lamps 200 in conjunction with illumination and non-illumination of selected light source 282 may establish one or more of the types of light signals identified herein.

The controller 50 may also regulate the modulated light intensity for the provision of a unique variable intensity warning light signal. The unique variable intensity light source is not required to cycle through a zero intensity phase. It is anticipated that in this embodiment that the range of intensity will cycle from any desired level between zero to full intensity. A range of light intensity may be provided between thirty percent to full intensity and back to thirty percent as regulated by the controller 50. An irregular pattern of variable power intensity may be utilized to create a desired type of warning light effect. In addition, the controller 50 may also sequentially illuminate adjacent columns 32 to provide a unique variable rotational, alternating, oscillating, pulsating, flashing, and/or combination variable rotational, alternating, pulsating, oscillating, or flashing visual warning light effects. A pulsating warning light signal may therefore be provided through the use of modulated light intensity to create a varying visual illumination or intensity effect. The controller 50 may also modulate the light intensity for any combination of light sources 30 or 282 to provide a distinctive or unique type of warning light signal.

The use of a controller 50 to provide a modulated light intensity for a light source may be implemented in conjunction with replacement lamps 200, flexible circuit boards having LED light sources 30, paneled circuit boards or LED mounting surfaces having LED light sources 30, light bars 70 having LED light sources 30, a cylindrical, square, rectangular, or triangular-shaped circuit boards having LED light sources 30 and/or any other type or shape of LED light sources including but not limited to the embodiments described herein.

Figure 35:
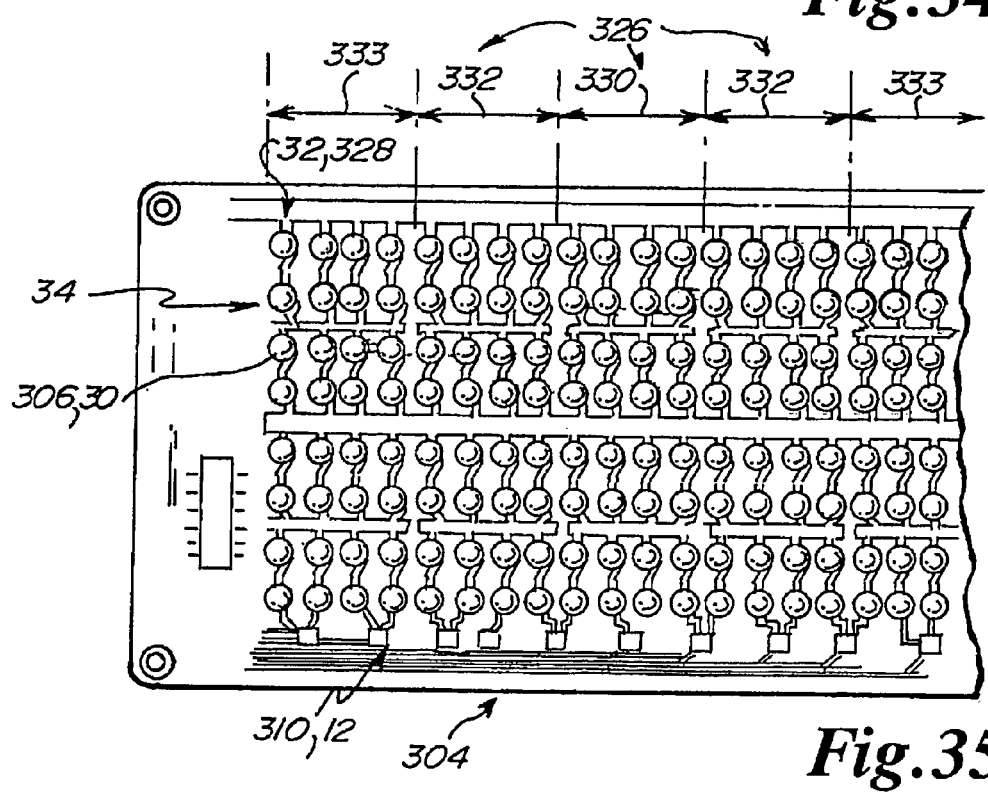
FIG. 35 is an alternative detailed view of an LED light source having sectors.
Figure 40:
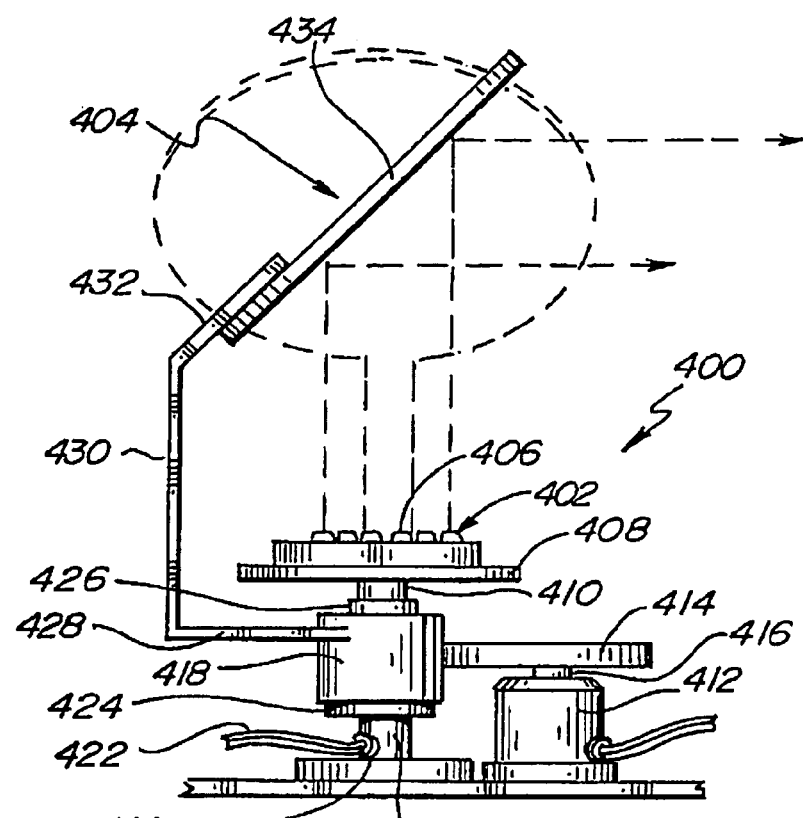
FIG. 40 is an alternative detailed side view of a reflector assembly.

Further, the controller 50 may be utilized to simultaneously provide modulated or variable light intensity to different and/or independent sections, areas, and/or sectors 326 of a light source (FIG. 35). Also, the controller 50 may be utilized to simultaneously provide modulated or variable light intensity to different and/or independent sectors, areas, and/or sections 326 of the forward facing side or rearward facing side of a light support or light bar 70 for the provision of different warning light signals or a different warning light effects on each side. In this embodiment it is not required that the forward facing and rearward facing sides of the light support or light bar 70 emit the identical visual patterns of illuminated light sources 30. The controller 50 may regulate and modulate the variable light intensity of any desired sector 326 of the forward facing side independently from the rearward facing side of the light support or light bar 70. An infinite variety of patterns and/or combinations of patterns of warning light signals may be provided for the forward facing side and the rearward facing side of the light support or light bar 70.

The modulated light intensity may be regulated by the controller 50 to create a unique warning light signal within a single sector 326 or in conjunction with multiple separated or adjacent sectors 326 of light bar 70 or light support for the provision of any desired composite emergency warning light signal. All individual LED light sources 30 within a light bar 70 or light support may be simultaneously exposed to incrementally increased modulated light intensity to provide for an incremental increase in illumination. An illumination burst may be provided at any time during the incremental increase of illumination. The modulation of the light intensity in conjunction with the incremental increase in illumination of all LED light sources 30 within light bar 70 or light support may provide the appearance of rotation of a warning light signal when observed by an individual. The illumination of the individual light sources 30 may then be incrementally decreased. The light intensity is not required to be regularly incrementally increased or decreased or terminated. It is anticipated that any pulsating and/or modulated variable light intensity may be provided by the controller 50 to the LED light sources 30.

All individual LED light sources 30 within a light bar 70 or light support are not required to be simultaneously and incrementally illuminated to provide for the appearance of rotation. For example, a light bar 70 or light support may be separated into one or more distinct segments 326 which are formed of one or more columns 32 of LED light sources 30. A particular segment 326 may be selected as a central illumination band which may receive the greatest exposure to the modulated or variable light intensity and, therefore, provide the brightest observable light signal. (FIG. 35) An adjacent segment 332 may be disposed on each side of the central illumination band 330 which in turn may receive modulated or variable light intensity of reduced magnitude as compared to the central illumination band 330. A pair of removed segments 333 may be adjacent and exterior to the segments 332, and in turn, may receive exposure to a modulated light intensity of reduced magnitude as compared to segments 332. The number of desired segments may naturally vary. The controller 50 may thereby regulate the light intensity to provide a modulated or variable light signal for each individual segment 330, 332, or 333 (FIG. 35) to provide for a unique warning light effect for the light bar 70 or light support.

The provision of a modulated light intensity to the light bar 70 or light support may also be coupled with, or in combination to, the sequential illumination of columns 32 as earlier described. In this situation, the warning light signal may initially be dim or off as the individual columns 32 are sequentially illuminated and extinguished for illumination of an adjacent column or columns 32. The light intensity for the illuminated column or columns 32 may simultaneously be incrementally increased for a combination unique rotational and pulsating modulated or variable warning light signal.

Each individual LED light source 30 preferably provides an energy light output of between 20 and 200 or more lumens. Each support 12 may be controlled as part of an overall warning light signal or pattern where individual supports 12 may be illuminated to provide a desired type or combination light signal in addition to the provision of a modulated or variable light intensity for the light source 30.

Modulated light intensity may be regulated by the controller 50 to create the appearance of rotation within a single support 12 or in conjunction with multiple separated, independent or adjacent supports 12 for the provision of a composite emergency warning light signal.

The controller 50 may also provide for the random generation of light signals without the use of a preset pattern of variable light intensity. Controller 50 provides a means for activating LED's 30 individually to allow for greater flexibility in the type of warning light signal created. This embodiment of the invention is also capable of displaying information in a variety of different colors or sequential illumination of colors.

Figure 33:
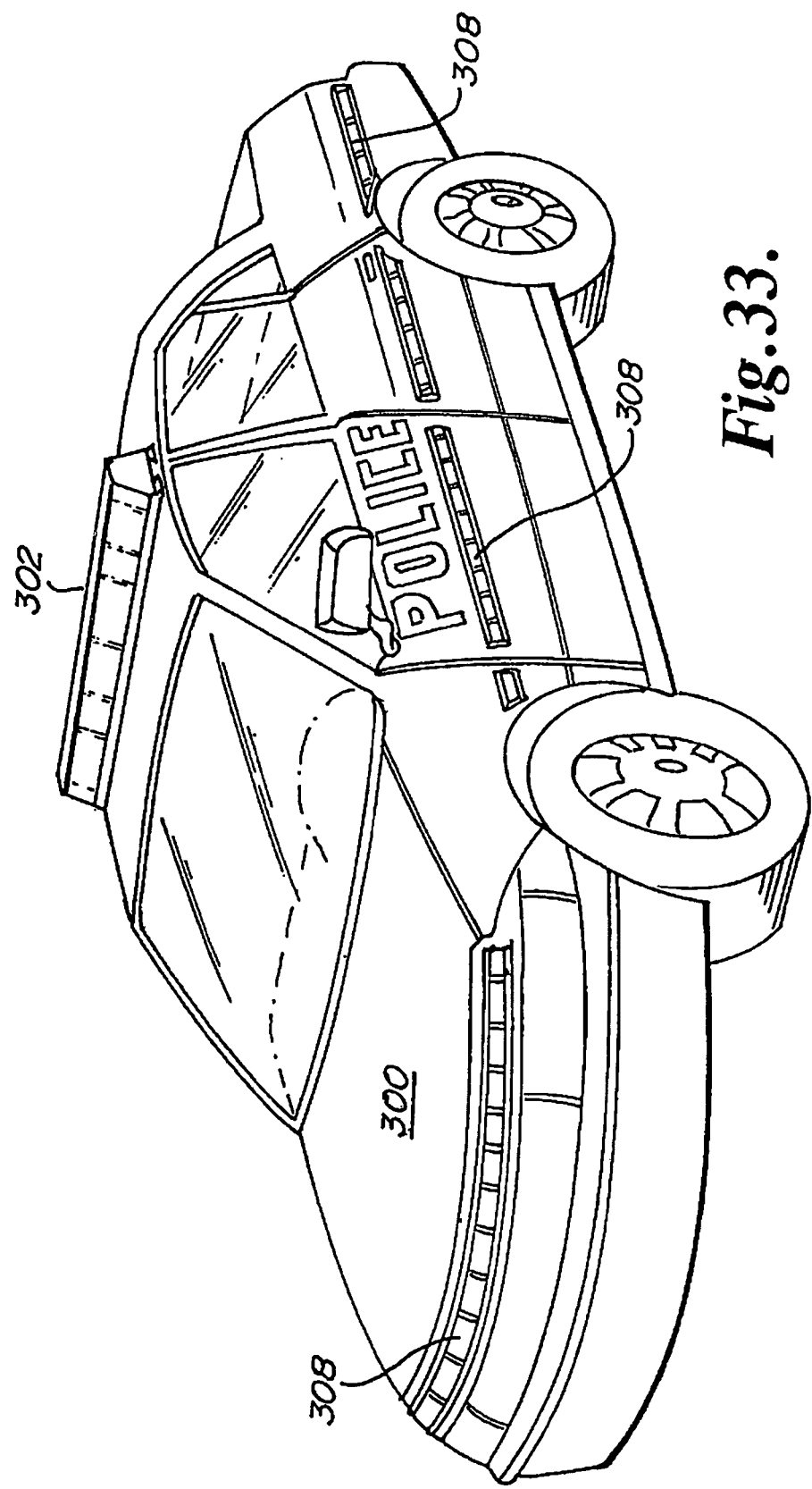
FIG. 33 is an environmental view of an emergency vehicle having strip LED light sources.
Figure 34:
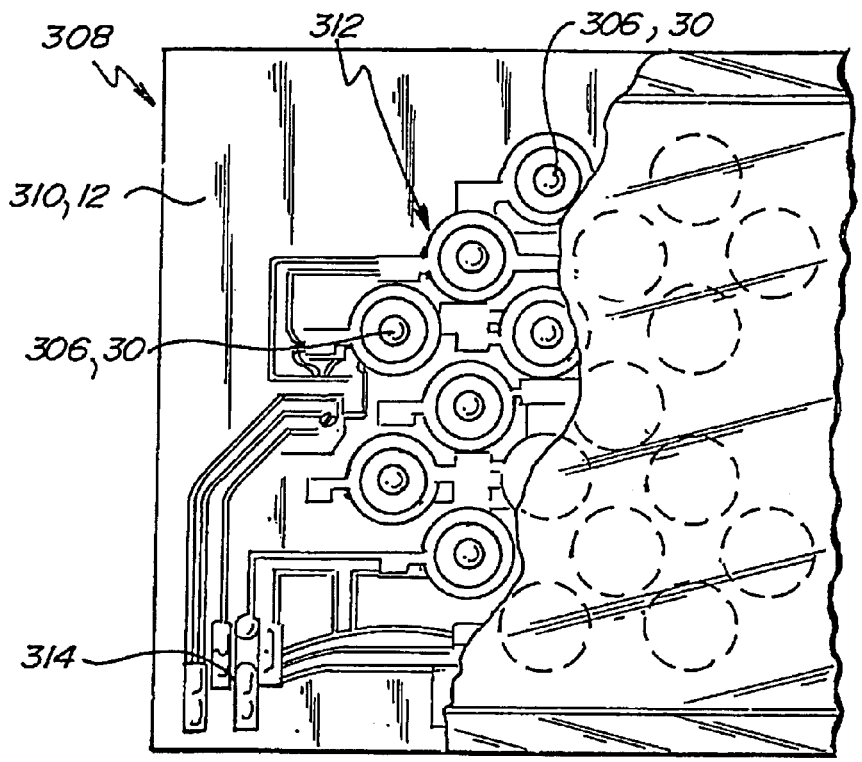
FIG. 34 is an alternative detailed partial cut away view of a strip LED light source.

Referring to FIGS. 33, 34, and 35, the emergency vehicle 300 includes a light bar or light support 302 which may include one or more panels of LED light sources 306. A strip LED light source 308 may also be secured to the exterior of the emergency vehicle 300 at any location. It is anticipated that the strip LED light source 308 may encircle an emergency vehicle 300 to enhance the visualization of the emergency vehicle 300 positioned proximate to an emergency situation.

Figure 31:
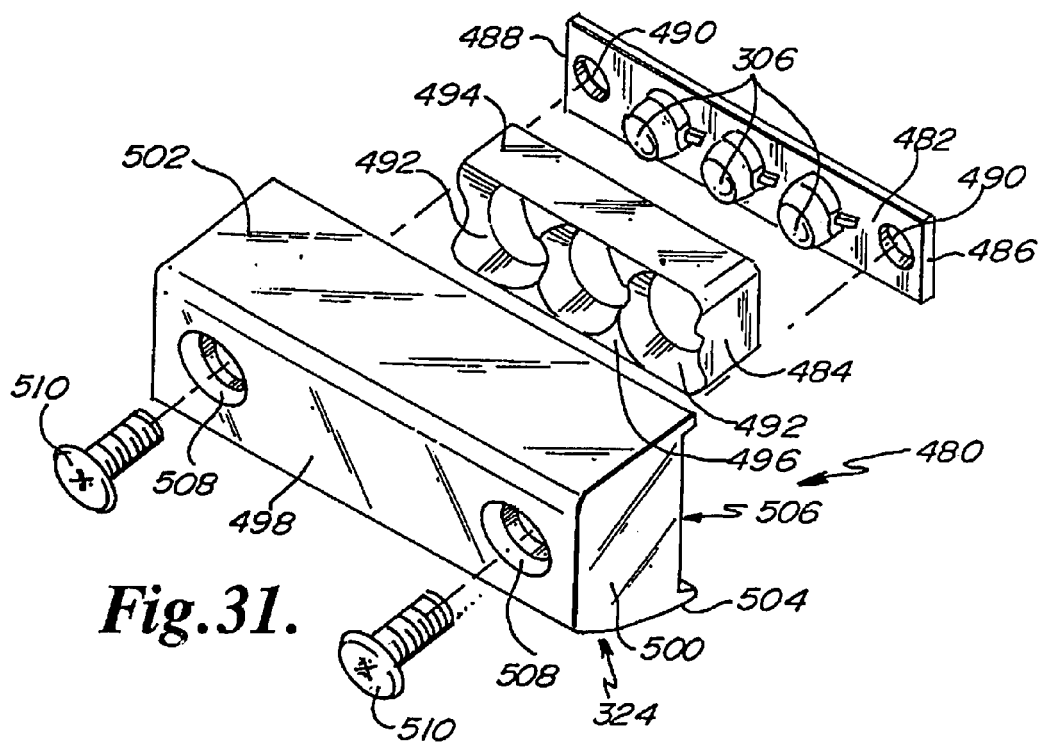
FIG. 31 is an exploded isometric view of an alternative culminator assembly and modular LED light source.
Figure 32:
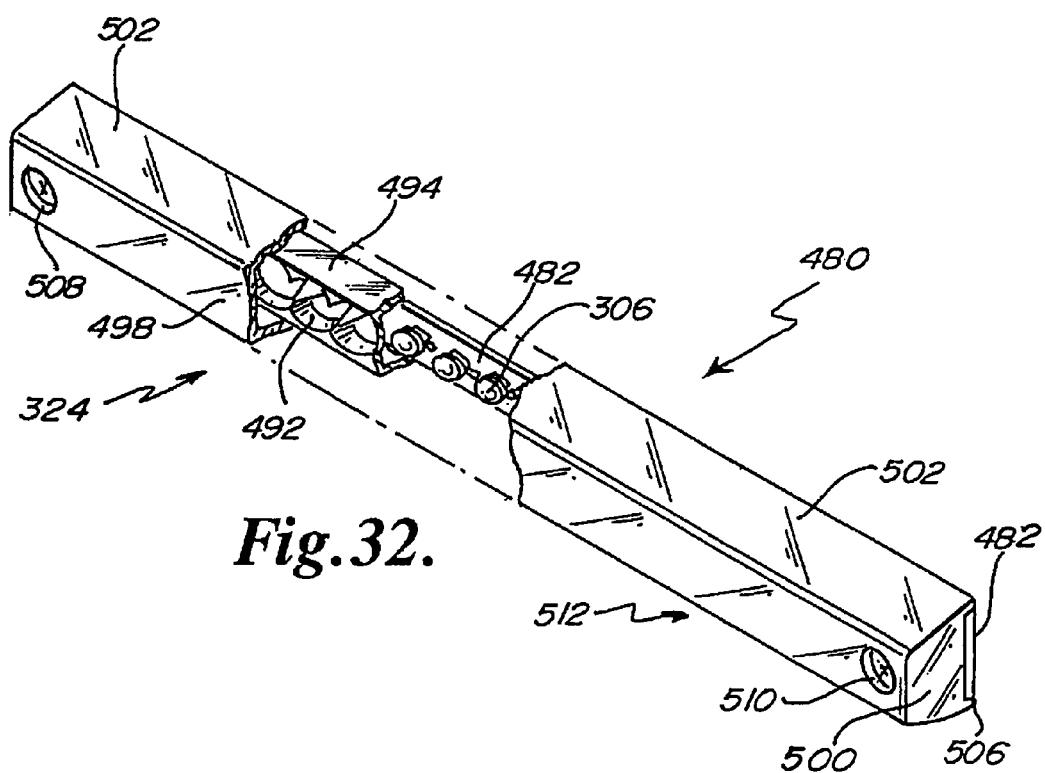
FIG. 32 is an alternative partial cut away isometric view of an alternative culminator assembly and LED light source.

Referring to FIG. 34, the strip LED light source 308 is comprised of a circuit board 310 having an array 312 of individual LED light sources 306. The LED light sources 306 are in electrical communication with each other via electrical contacts 314. Each circuit board 310 is in electrical communication with a power supply and/or controller 50 via the use of wires. Each individual LED light source 306 as included within a strip LED light source 308 may be enclosed within a reflector 370 to facilitate and maximize light output along a desired visual line of sight. (FIGS. 26–30) The LED light sources 306 have maximum illumination at an angle of incidence approximately 40□–45□ downwardly from vertical. The strip LED light sources 308 also include a back-side. The back-side includes an adhesive, magnetic, or other affixation device which may be used to secure the strip LED light sources 308 to the exterior of an emergency vehicle 300 in any desired pattern or location. The strip LED light sources 308 may also be enclosed within a transparent cover 324 which prevents moisture or other contamination from adversely affecting the performance of the LED light sources 306 during use. (FIGS. 31–32)

Wires of adjacent strip LED light sources 308 may be intertwined to extend across a vehicle for coupling to a power supply at a central location. The wires may be connected to the controller 50 which may be used to regulate the illumination of individual LED light sources 306 and/or individual panels of the strip LED light sources 308 to provide the types of light signals previously identified herein. The individual LED light sources 306 within the strip LED light source 308 may be of a single or variety of colors as earlier described. Adjacent strip LED light sources 308 may be electrically coupled to each other in parallel or series electrical connections for electrical communication to a centrally located controller and power source.

The individual LED light sources 306 as incorporated into the array 312 of the strip LED light sources 308 are sturdy and do not fail or separate from a vehicle 300 when exposed to rough operating conditions. The transparent cover 324 for the strip LED light sources 308 may be formed of sturdy and resilient plastic material which prevents water penetration and/or contamination to the circuit board 310 and/or individual light sources 306.

The strip LED light sources 308 may individually be formed into supports of any size. It is anticipated that the strip LED light sources 308 may have the approximate dimensions of three inches in length, three inches in width, and one-half inch in thickness for use in affixation to the exterior of an emergency vehicle 300.

Referring to FIG. 35, a panel 304 of individual LED light sources 306 is depicted. The panel 304 may form the illumination element for the strip of LED light 20 sources 308 and/or light bar 70 or light support 12, 302 as affixed to an emergency vehicle 300. Each panel 304 contains a plurality of rows 34 and columns 32, 328 of individual LED light sources 306. The panels 304 are in electrical communication with the controller 50 and power supply (now shown). The panels 304 may be controlled individually to create a desired warning light signal for an emergency vehicle 300. Each panel 304 may be controlled as part of an overall warning light signal or pattern where individual panels 304 or combinations of individual panels 304 may be illuminated to provide for the appearance of rotation and/or oscillation through the selective illumination of light sources or through the use of a modulated light intensity light source.

The strip LED light sources 308 may be organized into distinct sections, segments, and/or sectors 326 for individual illumination by the controller 50. Each distinct segment, section, and/or sector 326 may therefore be illuminated with a visually different and distinct type of light signal with, or without, modulated or variable light intensity for the creation of a desired type of unique warning lighting effect for a vehicle. An infinite variety of colors and/or patterns, combinations, or sequences of light signals may be established for the emergency vehicle 300 through the use of the controller 50.

Figure 43:
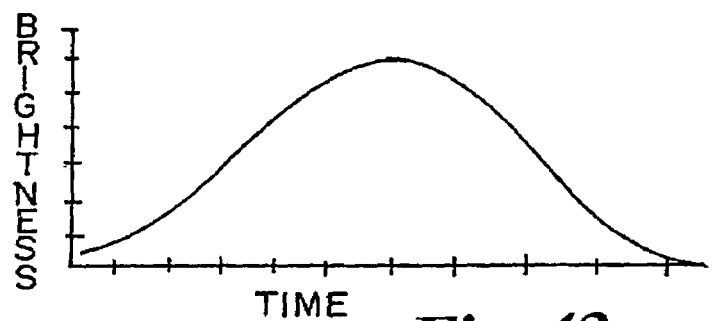
FIG. 43 is a graphical representation of a modulated or variable light intensity curve.

Modulated light intensity may be regulated by the controller 50 to create the appearance of rotation or pulsation within a single panel 304, strip 308, or in conjunction with multiple separated or adjacent panels 304 or strips 308 for the provision of a composite warning light signal. The warning light signal for each or a group of panels 304 or strips 308 may also be regulated by the controller 50 for the provision of a modulated light intensity for an observable warning light signal. All individual LED light sources 306 within a panel 304 or strip 308 may also be exposed to an incrementally increased modulated duty cycle or light intensity to provide for the incremental increase in illumination for a warning light signal. The modulation or light intensity curve is anticipated to resemble a sine wave pattern when the warning light signal provides the appearance of rotation (FIG. 43). After a desired level of illumination has been obtained, the duty cycle for the individual light sources 306 may then be incrementally decreased. The duty cycle is not required to be terminated. Each individual LED light source 306 is not required to receive the same level of duty cycle from the controller 50. Therefore, different individual LED light sources 306 may receive different duty cycles within a single warning light signal. Individual LED light sources 306 within panel 304 are not required to be simultaneously and incrementally illuminated to provide for the appearance of rotation. It is anticipated that a pulsating and/or modulated variable light intensity may be provided by the controller 50 for regulation of the duty cycle from thirty percent to maximum and back to thirty percent which affords a desirable type of pulsating modulated variable light effect.

The provision of a modulated light intensity to the panels 304 may also be coupled with, or in combination to, the sequential illumination of columns 328 as earlier described. In this situation, the warning light signal may initially be dim or off as the individual columns 328 are sequentially illuminated and extinguished for illumination of an adjacent column or columns 328. The duty cycle or light intensity for the illuminated column or columns 328 may simultaneously be incrementally increased for a combination unique rotational and pulsating modulated light signal. In addition, the controller 50 may be programmed to provide the appearance of rotation pulsation and/or oscillation or for illumination of other types or combinations of types of lighting effects.

The provision of a modulated light intensity may be implemented in association with a light bar or light support 302, a cylindrical panel, a strip of lights 308, flat panels 304, or any other type of light source as described herein.

Figure 48:
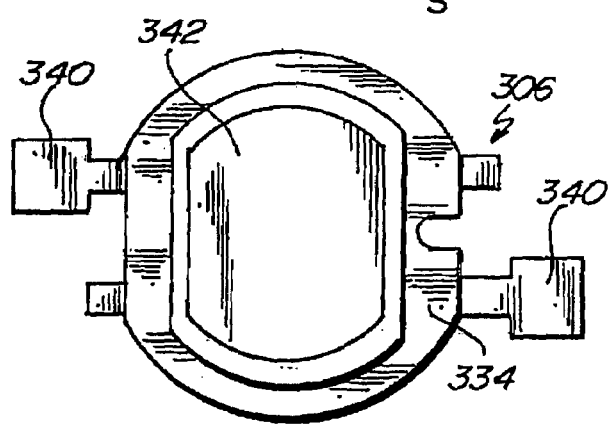
FIG. 48 is a detailed back view of an individual LED light source.
Figure 49:
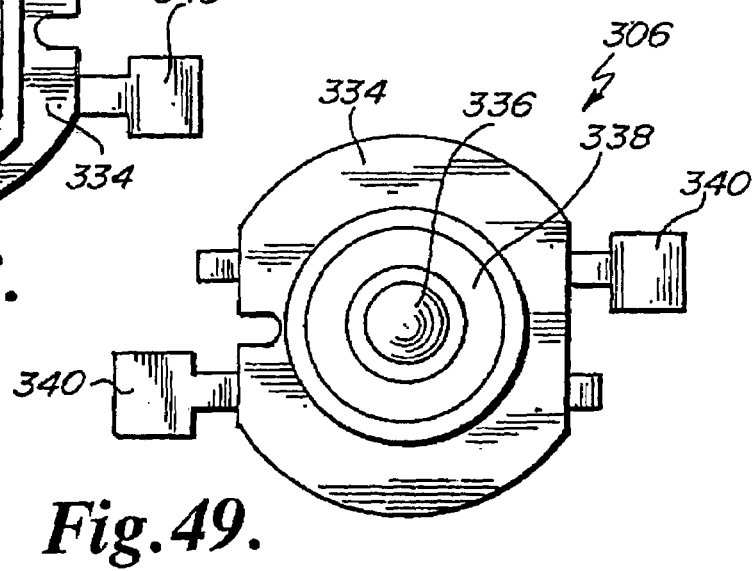
FIG. 49 is a detailed front view of an individual LED light source.

Referring to FIGS. 48 and 49, an individual LED light source 306 is depicted in detail. The LED light source 306 may include a ceramic and/or heat resistant base 334. Centrally within the ceramic and heat-resistant base 334 is positioned a light source 336. The light source 336 may be enclosed within a protective cover 338. Extending outwardly from the individual light source 306 are a pair of contact paddles 340 which provide for the electrical contacts for illumination of the light sources 336 during use. The back of the LED light source 306 includes a slug 342. The slug 342 is designed to be positioned within circular openings 344 of a circuit board or LED mounting surface 346 (FIG. 36). The circuit board or LED mounting surface 346 establishes a heat sink within an aluminum base or frame 348 as depicted in FIGS. 38 and 39. The LED light sources 306 as depicted in FIGS. 48 and 49 provide for a light intensity varying between 20 and 200 lumens or higher. The positioning of the slug 342 in the circular openings 344 of the circuit board or LED mounting surface 346 assists in the establishment of the heat sink. A heat sink is desirable because the individual LED light sources 306 may have a sufficient level of power output during use to develop heat. As a result, the slugs 342 are positioned within the circular opening 344 and may be fully engaged to an adhesive for affixation to an aluminum base 349 (FIGS. 38 and 39). This combination assists in the dissipation of heat during use of the individual LED light sources 306 enhancing the performance of the light support 302.

As may be seen in FIGS. 31, 32, 37, 38, 39, and 50, in an alternative embodiment, the light bar, light support 302, or panel 304 may be formed of a single row of LED light sources 306. Within this embodiment, the LED light sources 306 are positioned within circular openings 344 of circuit board or LED mounting surface 346 (FIG. 37). Circuit board 346 may be affixed to aluminum base 348 through the use of adhesive including glass beads where the circular openings 344 assist in the establishment of a heat sink for the individual LED light sources 306. The use of adhesive including glass beads to affix the LED light sources 306 and circuit board 346 to the aluminum base 348 assists in the creation of electrical contact for the light bar or light support 302.

As depicted in FIGS. 37, 38, and 39, the top surface of the circuit board or LED mounting surface 346 may include two reflectors or mirrors 350. The reflectors or mirrors 350 are preferably elongate and are positioned substantially parallel to each other and are adjacent or aligned to the row of individual LED□s 306. The reflectors or mirrors 350 diverge upwardly and outwardly from a position proximate to the LED light source 306 and aluminum base 348. As such, the mirrors 350 have a separation distance which is narrow proximate to the LED light sources 306, where the separation distance becomes larger as the distance vertically from the aluminum base 348 increases.

The brightest or most intense light of the individual LED light sources 306 is provided at an acute angle of approximately 40□ to 42□. The reflector or mirror 350 as angled upwardly and outwardly relative to the row of LED light sources 306 reflects light exiting the LED light sources 306 along a desired line of sight which corresponds to perpendicular observation by an individual. The reflectors or mirrors 350 maximize the efficiency of the light sources 306 by reflecting light along the line of sight to be observed by an individual during an emergency situation. The reflectors or mirrors 350 may have a polished or non-polished surface depending on the brightness desired for the light support 302. The reflectors or mirrors 350 may also include one or more reflective sections 374 and/or transparent or clear sections 372. The transparent or clear sections 372 and the reflective sections 374 are described in detail with reference to FIGS. 26–30 below. The surface of the reflectors or mirrors 350 may also include any desired combination of sections, patterns, stripes, rows, and/or columns of clear or transparent sections 372 and/or reflective sections 374 for reflection of light illuminated from the individual LED light sources 306 during the provision of a warning light signal.

Wires 354 connect the circuit board 346 to the power supply and controller 50. A modulated light source may thereby be provided to the light support 302 which includes the reflector or mirrors 350. In this embodiment, the sequential illumination of individual LED's 306 may occur to provide a desired type of warning light signal. Also, the circuit board 346 as engaged to the base 348 may be separated into segments 326 of LED light sources 306 for use in combination with a modulated light intensity electrical source.

As depicted in FIGS. 38 and 39, the frame 348 includes a base 349. The base 349 may include a holding cavity 358. In the holding cavity 358 is preferably positioned a circuit board or LED mounting surface 360 which includes a plurality of circular openings 344. In each circular opening 344, is positioned an individual LED light source 306. Above the holding cavity 358 is a first support 362 and a second support 363. The first support 362 and second support 363 have an angled interior edge 364. Each angled interior edge 364 is adapted to receive a reflector or mirror 350. Each mirror 350 is utilized to reflect light illuminated from an individual light source 306 along a visual line of sight as depicted by arrow AA of FIG. 39. The first and second supports 362, 363 may also include a positioning ledge or notch 366 which is adapted to receive a glass or transparent plastic cover lens 368 which serves as a protector for the frame 348 and individual LED light sources 306.

Figure 50:
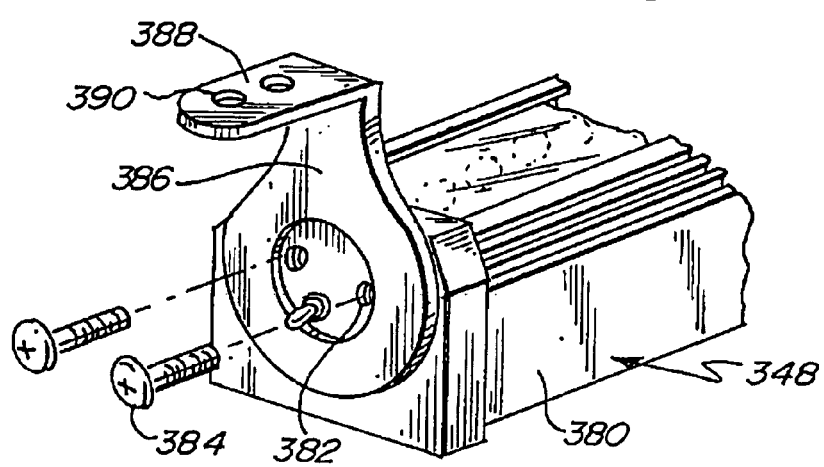
FIG. 50 is a detailed end view of one embodiment of a reflector assembly.

Referring to FIG. 50, the frame 348 may be elongate having a first end 380 and a second end (not shown). The first end 380 and the second end each include and affixation area 382 which may be threaded for receiving engagement to a fastener 384. A bracket 386 may be rotatably engaged to the first end 380 and second end by tightening of the fasteners 384 relative to the affixation areas 382. The bracket 386 includes and angled portion 388 which may include a second fastener 390 which may be formed of suction cups. Alternatively, the second fastener 390 may be screws, bolts, and/or rivets for attachment of the frame 348 at a desired location relative to the interior or exterior of a vehicle 300.

Figure 29:
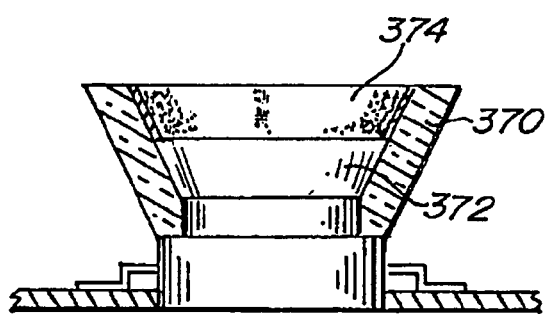
FIG. 29 is an alternative cross-sectional side view of a culminator cup.

Referring to FIGS. 26–30, a reflector or culminator for the individual LED light sources 306 is disclosed. The reflector or culminator is indicated in general by the numeral 370. The reflector or culminator 370 may be conical in shape and may be configured to encircle an individual LED light source 306. The reflector or culminator 370 may also be partially transparent. The reflectors 370 may be formed of clear sections 372 and/or reflective sections 374. In FIG. 29, the clear section 372 is positioned proximate to the LED light source 306 and the reflective section 374 is positioned to the top of the reflector 370.

Figure 28:
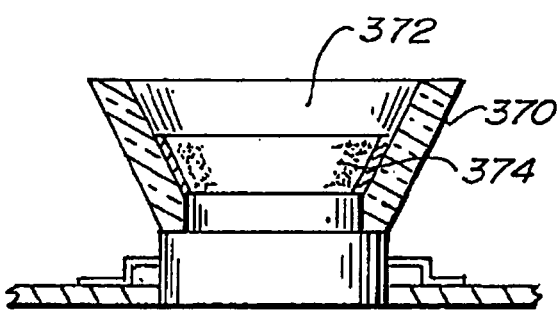
FIG. 28 is an alternative cross-sectional side view of a culminator cup.
Figure 30:
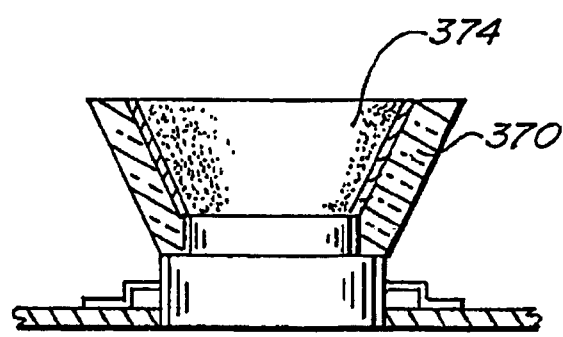
FIG. 30 is an alternative cross-sectional side view of a culminator cup.

In FIG. 28, the reflective section 374 is positioned proximate to the LED light source 306 and the clear section 372 is positioned to the top of reflector or culminator 370. As may be seen in FIG. 30, the entire interior surface of the reflector or culminator 370 may be formed of a reflective section 374. A plurality of clear sections 374 may be utilized within each reflector or culminator 370.

The use of a combination of clear sections 372 and reflective sections 374 enable an individual to select a configuration for the provision of partial illumination along an angle which is not parallel to a desired line of sight. An individual may thereby observe an illuminated light signal from the side or top of a light bar or light support 302 as opposed to being aligned with a desired line of sight.

Each of the culminator or reflector cups 370 includes an angled interior surface which extends upwardly and diverges outwardly from a central opening 394. Each central opening 394 is constructed and arranged for positioning approximate to and over an LED light source 306. Each of the culminator or reflector cups 370 also preferably includes an angled exterior surface which extends upwardly and diverges outwardly from a bottom or base which is positioned approximate to an LED mounting surface or circuit board 346.

Figure 26:
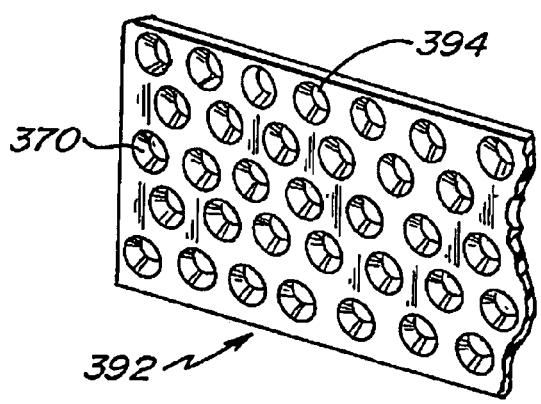
FIG. 26 is a detailed isometric view of a reflector or culminator.
Figure 27:
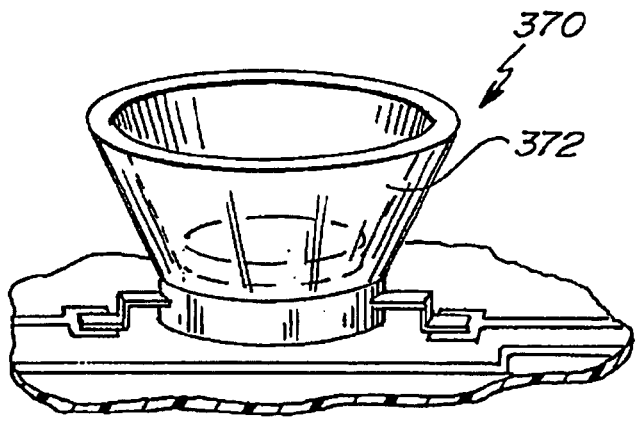
FIG. 27 is a detailed isometric view of a culminator cup.

Referring to FIG. 26 a plurality of culminator cups or reflectors 370 may be formed into a culminator assembly or array 392. The culminator assembly or array 392 is adapted for positioning over an array of LED light sources 306. Examples of arrays of LED light sources 306 which may be utilized with a culminator assembly 392 are depicted in FIGS. 3–10, 12, 14, 15, 23–25, 31, 32, 34, 35, 37, 39, 40, 44, and 47.

Each culminator array 392 is formed of a reflective material which has plurality of reflective cups 370 disposed there through. Each opening 394 is adapted for positioning over an LED light source 306. The culminator array 392 has a sufficient thickness to establish an interior reflective surface having a sufficient dimension to reflect light as emitted from the LED light sources 306. Alternatively, the interior surface of each reflector cup 370 may be entirely or partially coated with reflective material. The entire culminator assembly 392 is not required to be formed of reflective material provided that the interior surface of the reflector cups 370 are coated at least partially with reflective material.

The culminator array 392 may be formed in any shape including but not necessarily limited to square, rectangular, triangular, linear, circular, oval, and special or other irregular shapes for use in reflecting light emitted from an LED light source 306. The interior surface of any desired number of culminator cups 370 may also be coated with reflective 374 and non-reflective 372 sections as earlier described.

The strip LED light source 308 and LED light sources 306 in frame 348 are designed to operate on a 12 volt power supply which is available in a standard emergency vehicle battery. The frame 348 and strip LED light source 308 are enclosed in a waterproof protector to minimize the risk of contamination or failure from any exposure to moisture or dust or dirt. The use of the strip LED light sources 308 and frame 348 minimize the necessity to modify the exterior of an emergency vehicle 300 through the placement of holes or other apertures. In these embodiments, the wires 354 and 316 may be adhesively secured to the exterior of a vehicle for entry into the power source and controller 50 at a common location.

The strip LED light sources 308 may be used on other devices and are not necessarily limited to use on an emergency vehicle 300. It is anticipated that the strip LED light sources 308 may be used on a variety of apparatus including but not limited to snowmobiles, water craft, helmets, airplanes, or any other device which may accept use of an LED light source.

In FIGS. 40–43 a warning signal light 400 is depicted which in general includes a light source 402 and a rotatable reflector 404. The light source 402 may include one or more individual LED illumination devices 406. The light source 402 may include a base 408 which may be mounted on a post 410. The light source 402 may either be stationary or rotate as desired.

A motor 412 is electrically connected to a power supply for rotation of a wheel or gear 414. The wheel or gear 414 is connected to the motor 412 by a shaft 416. The wheel or gear 414 is in contact with, or is engaged to, a rotatable collar 418 which may be adapted to rotate freely about the post 410 during operation of the motor 412. The wheel or gear 414 may be formed of rubber material or any other desired material.

Alternatively, the wheel 414 may include teeth and function as a gear for engagement to corresponding grooves and teeth as integral to the exterior surface of the collar 418.

An aperture 420 may pass through post 410 to receive wires 422 for the provision of power to LED light source 402. A washer or support device 424 vertically supports rotatable collar 418 on post 410 from a position below collar 418. A positioner 426 functions to restrict the vertical movement of the collar 418 upwardly during engagement of the motor 412 and rotation of the wheel 414 and collar 418.

A horizontal support arm 428 extends outwardly from collar 418. A vertical support arm 430 extends upwardly form horizontal support arm 428. Angular support arm 432 extends inwardly and upwardly from vertical support arm 430 for positioning of a reflector or mirror 434 above light source 402. The reflector or mirror 434 is positioned at an approximate angle of forty-five degrees relative to the light source 402. Light as emitted vertically from the light source 402 may then reflect from the reflector 434 along a substantially perpendicular line of visual sight. The reflector 434 rotated ninety degrees is depicted in phantom line as an oval due to the angular offset of approximately forty-five degrees.

The use of motor 412 rotates wheel 414 which in turn rotates collar 418 and reflector 434 in a circular direction about light source 402 for the provision of an observed rotational warning light source. In addition, the light source 402 may be electrically coupled to a controller 50 to provide a modulated, alternating, variable, pulsating, or oscillating light source simultaneously to the rotation of the reflector 434 about light source 402.

Figure 41:
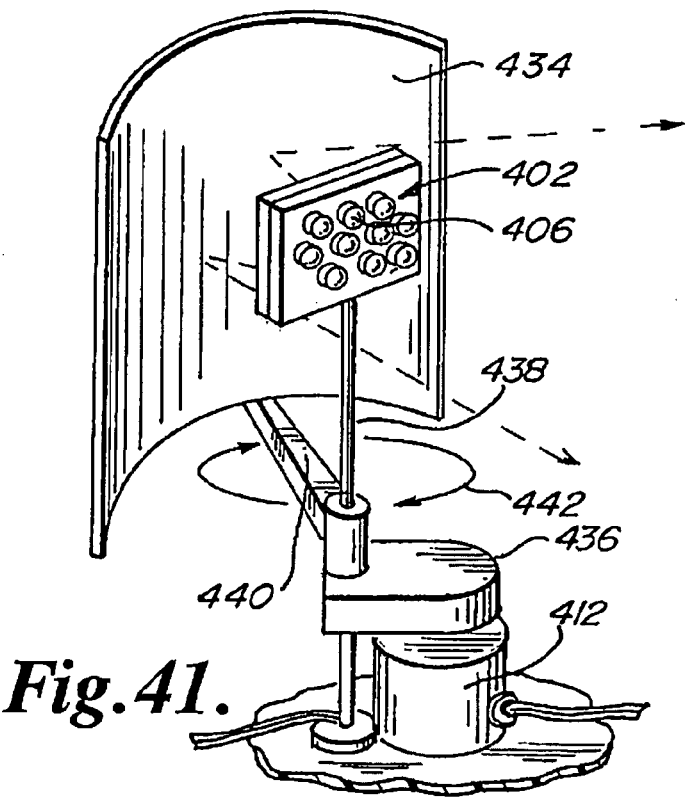
FIG. 41 is an alternative detailed isometric view of a reflector assembly.

Referring to FIG. 41 the warning signal light 400 includes a light source 402 which is rotatable in conjunction with the reflector 434. In this embodiment the motor 412 is connected to a first gear which is enclosed within casing 436. A second gear is also enclosed within casing 436 and is coupled to the first gear for rotation of the reflector 434. A vertical rod 438 is affixed or integral to the second gear. The vertical rod 438 supports the LED light source 402 as positioned adjacent to reflector 434. An angled brace 440 is also engaged to rod 438. Angled brace 440 supports reflector 434 during rotation of reflector 434 which represents a circular motion as depicted by arrow 442. In this embodiment reflector 434 is arcuate in shape and may be parabolic. Light emitted from light source 402 may then be reflected by the arcuate reflector 434 along a desired line of sight. The engagement of the motor 412 rotates the light source 402 and reflector 434 to provide a rotational light source as observed by an individual. The light source 402 may be coupled to a controller 50 to provide for a modulated, alternating variable, and/or pulsating light signal in conjunction with the rotation of the reflector 434.

Figure 42:
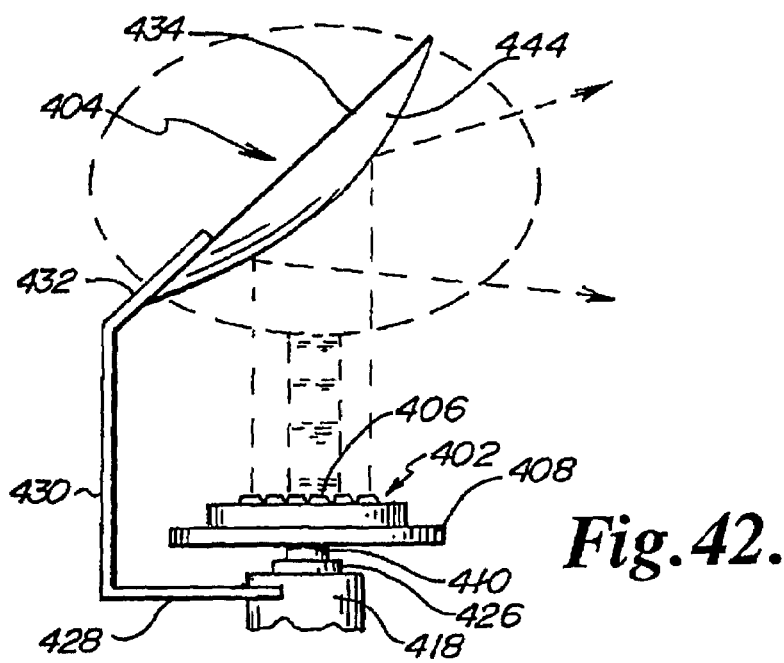
FIG. 42 is an alternative detailed side view of a reflector assembly.

Referring to FIG. 42, the reflector 434 is not required to be flat and may include a convex or concave face 444. The provision of a convex or concave face 444, is utilized to assist in the creation of a unique variable light effect as observed by an individual. Light as emitted from the light source 402 may then be reflected at any desired angle other than perpendicular for observation by an individual. The pulsating intensity of the light as observed by an individual may then be unique, especially when used in conjunction with the rotated reflector 434 and variable or modulated light intensity from the controller 50. In addition, the use of a convex or concave reflector 444 may expand or enhance the observation of the warning signal light 400 by individuals beyond a perpendicular line of sight. The warning signal light 400 may then be observed above or below a light source 402. The reflector 434 as rotated ninety degrees is depicted in phantom line and is generally oblong or oval in shape.

FIG. 43 represents graphically the variable or pulsating illumination of the observed light as reflected from the reflector 434 of FIG. 42. Time is represented along the x-axis and increasing brightness is depicted along the y-axis. The graph of FIG. 43 shows the gradual increase in brightness of the observed light as the reflector 434 is rotated to a maximum illumination corresponding to direct in line observation of the warning light signal and then the gradual decrease in observed light intensity as the reflector 434 is rotated away from direct in line sight. The observed warning light signal is not required to be extinguished and may be reduced to a minimum observable intensity of approximately thirty percent.

Figure 44:
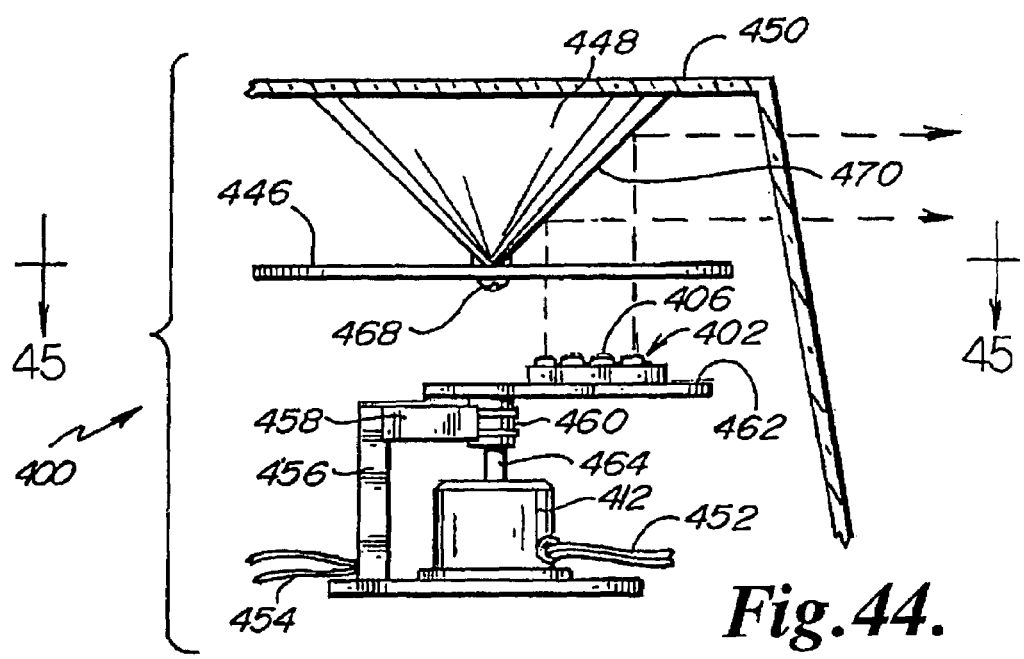
FIG. 44 is an alternative detailed partial cross-sectional side view of a reflector assembly.

Referring to FIG. 44, the warning signal light 400 in general includes a light source 402 which may be rotated through the use of a motor 412 for transmission of light through a filter 446 for reflection from a conical reflector 448 as mounted to the interior of a light bar or light support 450.

Power for motor 412 is supplied through wires 452 from a power source not shown. Power for the light sources 402 is provided through wires 454 in support 456. Brushes 458 may be in electrical communication with the power from the wires 454 to transmit electrical current to a second set of brushes 460 utilized to communicate power to the light sources 402. The base 462 of the light source 402 may preferably be formed of an electrically conductive material to facilitate the provision of power to the light sources 402.

Figure 45:
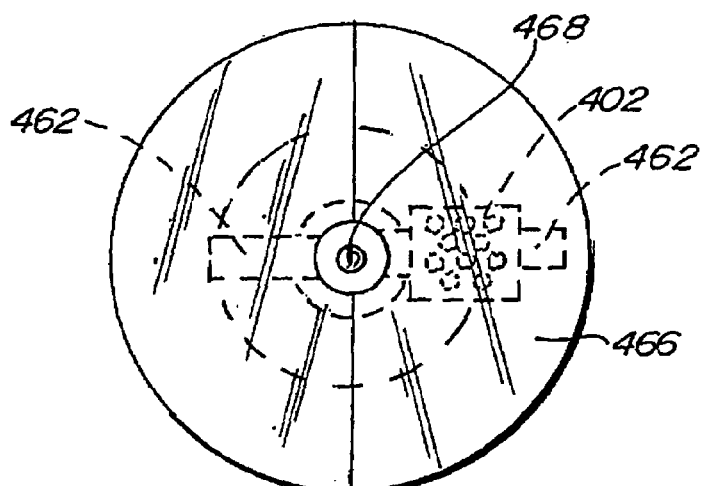
FIG. 45 is a partial phantom line top view of the reflector assembly taken along the line of 45—45 of FIG. 44.

A shaft 464 preferably extends between the motor 412 and the base 462 where operation of the motor 412 causes rotation of the shaft 464 and the base 462 having the light sources 402. Light is transmitted vertically upward from the light sources 402 through the filter 446. (FIGS. 44 and 45.)

The filter 446 may include one or more sections of tinted material 466. The filter 446 may be stationary or may be rotatable. The tinted material 466 may be any color or opaque to establish a desired illumination effect for an emergency warning signal light. Any number of tinted sections 466 or transparent areas may be placed on the filter 446. The filter 446 may be formed of glass or plastic or other sturdy material. The tinted sections 466 may be integral to or placed upon the filter 446 dependent upon construction considerations. The filter 446 may be attached to the conical reflector 448 by a fastener 468.

The conical reflector 448 may include a straight reflective edge 470. Alternatively, the reflective edge 470 may be concave or convex to establish a unique lighting effect. The conical reflector 448 may be affixed to, and descend from, the top of a light bar or light support 450 as may be attached to an emergency vehicle 300.

Light transmitted upwardly from the light sources 402 passes through either a substantially transparent section or through the tinted or opaque material 466 which may block light transmission or alter the color of the light. Light is then reflected from the conical reflector 448 at a desired angle for transmission through the vertical sections of the light bar or light support 450 for observation by an individual.

Figure 46:
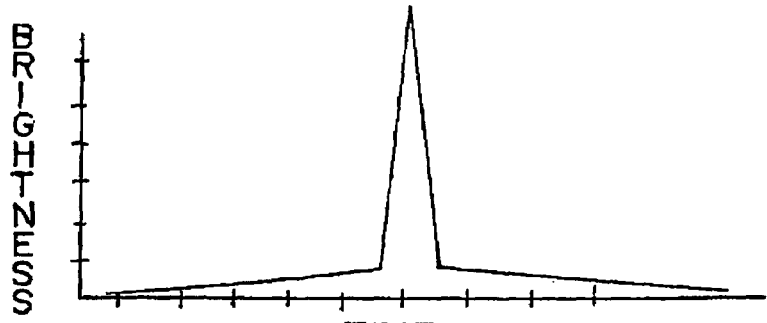
FIG. 46 is an alternative graphical representation of a modulated or variable light intensity curve.

FIG. 46 represents graphically the intensity of the observed light as reflected from the conical reflector 448 of FIG. 44. Time is represented along the x-axis and observed brightness is represented along the y-axis. The observed light signal transmitted from the warning signal light of FIG. 44 is much steeper which corresponds to a shorter period of observation more similar to a flashing light signal. The light sources may also be coupled to a controller 50 for the provision of a variable, modulated and/or pulsating light effect.

Referring to FIGS. 31 and 32 a modular light support 480 in general includes an LED mounting surface 482 having one or more LED light sources 306, a culminator assembly 484 and a cover 324.

The LED mounting surface 482 is elongate and includes a plurality of LED light sources 306. In general, one to five LED light sources 306 are disposed in a linear orientation along the LED mounting surface 482 which may be a circuit board as earlier described. The LED mounting surface 482 also includes a first end 486 and a second end 488. An opening 490 is positioned through the LED mounting surface 482 proximate to each of the first end 486 and second end 488.

The culminator assembly 484 preferably includes a plurality of reflector cup areas 492. The culminator assembly 484 also preferably includes a plurality of support walls 494, a top surface 496, and a plurality of openings 490. Each of the openings 490 is sized to receivingly position and hold the individual LED light source 306 during assembly of the modular light support 480. The reflector cup areas 492 are equally spaced along the culminator 484 to correspond to the spacing between the individual light sources 306 as disposed on the LED mounting surface 482.

The cover 324 is preferably transparent permitting transmission of light emitted from the LED light supports 306 therethrough. The cover 324 includes a forward face 498, a pair of end faces 500, a top face 502 and a bottom face 504. Each of the pair of end faces 500 includes a receiving notch 506 which is adapted to receivingly engage the LED light mounting surface 482 during assembly of the modular light support 480. An affixation opening 508 traverses the forward face 498 proximate to each of the pair of end faces 500. A fastener 510 passes through the affixation opening 508 for engagement to the opening 490 to secure the LED mounting surface 482 into the receiving notch 506. The culminator assembly 484 is then positioned within the interior of the cover 324 where the top surface 496 is proximate to the forward face 498. The illumination of the LED light sources 306 then transmits light through the forward face 498 for observation of an emergency warning light signal.

Specifically referring to FIG. 32 one or more modular light supports 480 may be positioned adjacent to each other for the creation of a light bar or light stick 512. The modular light supports 480 and/or light bar or light stick 512 may be coupled to a controller 50 which may independently and/or in combination provide a plurality of independent and visually distinct warning light signals as earlier described. In addition, the controller 50 may provide modulated and/or variable light intensity to the individual LED light sources 306 to establish unique warning light signal effects. The controller 50 may individually illuminate LED light sources 306 to provide for one or a combination of colored light signals as earlier described.

Any number of modular light supports 480 may be positioned adjacent to each other to comprise a light bar or light stick 512. A plurality of modular light supports 480 may be positioned at any location about the exterior or within the interior of a vehicle.

Figure 47:
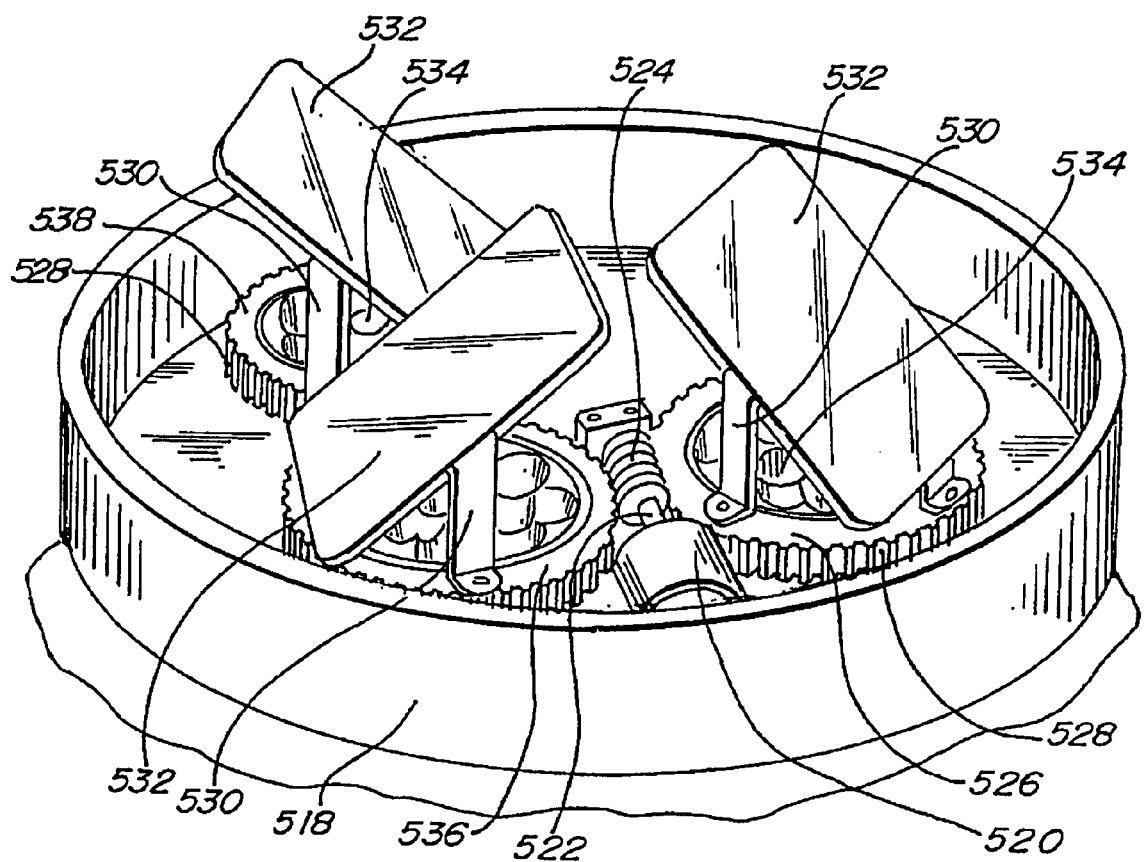
FIG. 47 is an alternative isometric view of a reflector assembly.

Referring to FIG. 47 an alterative embodiment of a reflector assembly is disclosed. In general, the reflector assembly of FIG. 47 includes an enclosure 518. Positioned within the interior of enclosure 518 is a motor 520 having a shaft 522 and a gear 524. A first support 526 has a periphery having a plurality of teeth 528 adapted to releasably engage the gear 524. The first support 526 includes a mirror bridge 530 which is used to position a mirror 532 at an approximate angle of 45° relative to a LED light source 306. Within the interior of the first support 526 is located a culminator assembly 534 which may include one or more reflective cups. Individual LED light sources 306 are positioned within each of the culminator cups of the culminator assembly 534 to maximize illumination of emitted light for reflection from the mirror 532.

On the opposite side of gear 524 is located second support 536. Second support 536 also includes a periphery having a plurality of teeth 528, a mirror bridge 530, a mirror 532, and a culminator assembly 534 disposed adjacent to a plurality of individual LED light sources 306.

A third support 538 is adjacent to the second support 536. The third support 538 also includes a periphery having a plurality of teeth 528, a mirror bridge 530, and a mirror 532 disposed at a 45° angle above a culminator assembly 534. A plurality of individual LED light sources 306 are disposed within the reflector cups of the culminator assembly 534. The teeth 528 of the third support 538 and second support 536 are coupled so that rotational motion provided to the second support 536 by the gear 524 is transferred into rotational motion of the third support 538.

In operation, the individual LED light sources 306 are connected to a power source and/or a controller 50 as earlier described. An infinite number of independent visually distinctive warning light signals may be emitted through the use of the rotational reflector as depicted in FIG. 47. An infinite number of warning light signal combinations may also be provided by the controller 50 for use with the rotational reflector of FIG. 47.

Each of the mirrors 532 may be positioned for reflection and transmission of light to a desired field of vision relative to the rotational reflector. A flashing and/or rotational light source may be provided for observation by an individual.

The first support 526, second support 536, and third support 538 may be synchronized to provide for a unique warning signal light for observation by an individual. The engagement of the motor 520 for rotation of the gear 524 simultaneously rotates the first support 526, second support 536 and third support 538 for the provision of a warning light signal.

LED technology enables the selection of a desired wavelength for transmission of light energy from the individual LED light sources 306. Any wavelength of visible or non-visible light is available for transmission from the LED light sources 306. As such, generally no filters are required for use with individual LED light sources 306. The individual LED light sources 306 may be selected to provide for any desired color normally associated with the use in emergency vehicles such as amber, red, yellow, blue, green and/or white.

The controller 50 may simultaneously display any number of combinations of warning light signals. For example, the controller 50 may provide for a solitary light signal for transmission from a light source. Alternatively, the controller 50 may effect the transmission of two signals simultaneously from the identical light source where a first warning light signal is emitted from one portion of the light source and a second warning light signal is emitted from a second portion of the light source. Alternatively, the controller 50 may alternate two warning light signals where the first area of the light source first transmits a first warning light signal and secondly transmits a second warning light signal. The second area of the light source initially transmits the second warning light signal and then transmits the first warning light signal. Further, the controller may transmit two independent and visually distinct warning light signals simultaneously within different areas of light source. The controller 50 may also reverse the warning light signals for simultaneous transmission between different areas of the light source. Further, the controller 50 may regulate the transmission of more than two visually distinct types of warning light signals from a light source at any given moment. The controller 50 may alternate warning light signals within different areas or enable transmission of warning light signals in reverse alternating order for the creation of an infinite variety of patterns of visually distinct warning light signals for use within an emergency situation. The controller 50 may also permit the transmission of a repetitive pattern of warning light signals or a random pattern of visually distinct warning light signals.

Figures 51, 52:
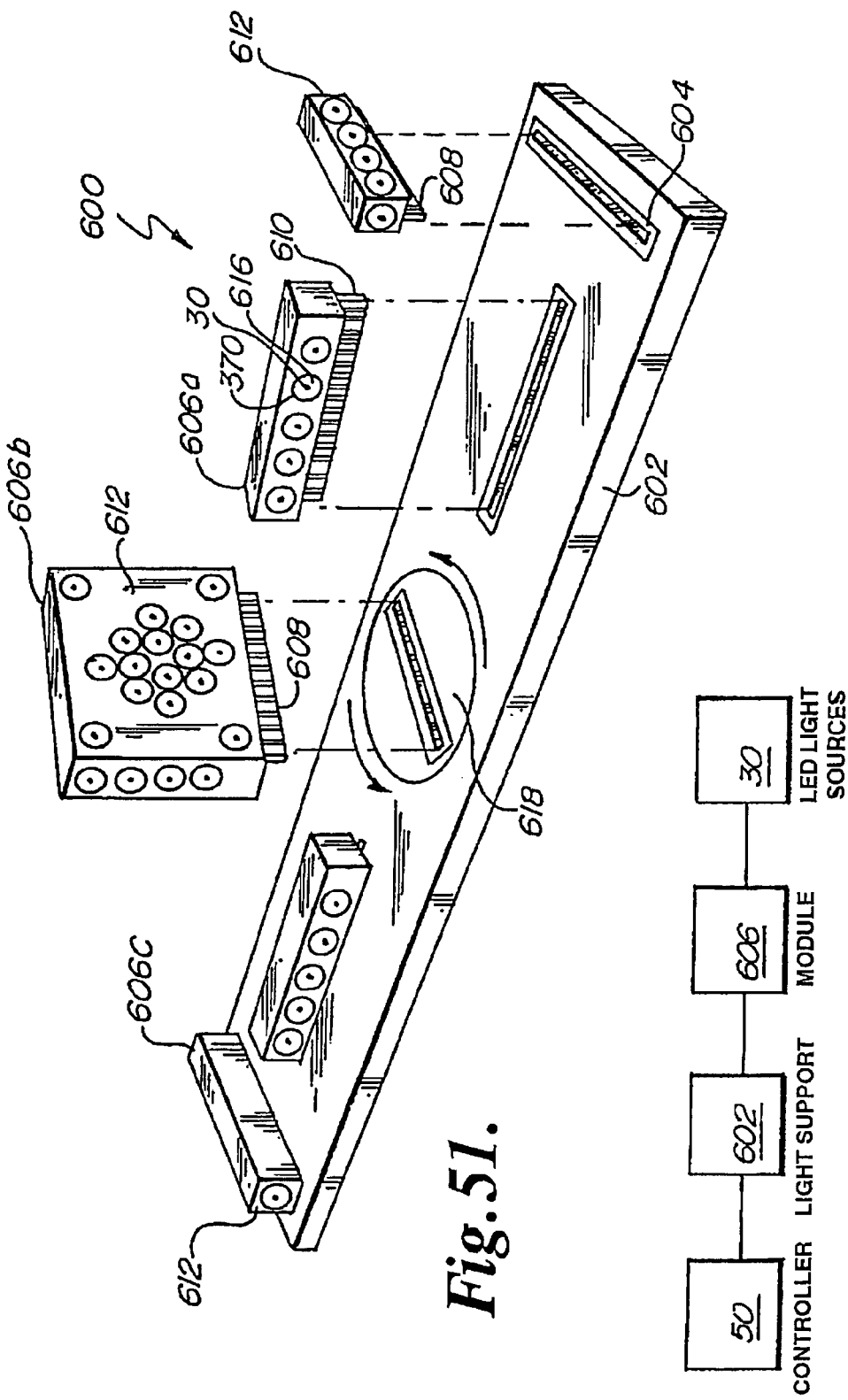
FIG. 51 is a perspective view of a modular warning light signal according to an embodiment of the invention.
FIG. 52 is a block diagram of an electrical schematic of an embodiment of the invention.

Turning to the embodiment shown in FIG. 51. FIG. 51 shows a possible configuration of a warning signal light 600 having modular components. In the embodiment shown a light support 602 has a plurality of module receiving ports 604. The module receiving ports 604 are constructed and arranged to provide electrical communication respectively to a module support member 610 of a module 606 received therein. Each of the module support members 610 may be made up of connection teeth or contacts 608 which electrically contact and engage the receiving ports 604 when inserted therein. Each module 606 has at least one visible light signal display surface 612 which has one or more light sources 30 removably mounted thereon. The light sources 30 are light emitting diodes, such as have been previously discussed. About each light source 30 may be a culminator 370. Furthermore, each culminator 370 may include a reflective surface 616 at least partially disposed thereon. Reflector 616 more efficiently directs the light emitted from light source 30 in a desired direction. In an additional embodiment of the invention the reflector 616 may be adjustable so as to redirect and/or focus light emitted from the light source 30 during use. Also, the visible surface 612 or the individual culminator cups 370 and reflectors 616 may also have one or more lenses equipped thereon to provide the warning signal light with the ability to magnify and/or diffuse emitted light.

In the embodiment shown, the module support members 610 and the module receiving ports 604 respectively are uniform in size. The uniformity of the ports 604 and the members 610 allows modules 606 to be readily replaced and also provides the invention with the capacity to have variously sized and shaped modules 606 to be interchanged and arranged in various configurations. For example a relatively elongated module, such as is indicated by reference numeral 606a, could be positioned in any of the various ports 604 shown and could likewise be replaced with any other module such as the more vertically oriented module 606b, or the remaining module type 606c. Such modularity and standardization of connections provides the present invention with a tremendous variety of module configurations which may be readily reconfigured as desired.

In addition to providing a variety of module types, the present invention also provides for a variety of mechanisms to be associated with the ports 604. In the embodiment shown for example, a rotation mechanism 618 has a port 604 mounted thereon. Any number of rotation mechanisms 618 could be included on the surface of the support 602 such as is shown. Alternatively a similar mechanism or mechanisms could be included on one or more surfaces of a module 606 to provide a dedicated rotation module. The rotation mechanism 618 could also be configured as a gyrator or other motion producing device.

It must also be noted however that the three types module varieties 606a, 606b and 606c presently shown and described are merely three examples of potential module sizes and shapes. It should be understood that modules 606 may be configured in any size or shape as desired. As indicated above, in order to ensure the greatest ease of use and elegance in design, it may be desirable to provide the various modules 606 with uniform support members 610 and also provide the support 602 with similarly uniform ports 604. However, in order to ensure that only certain module types are utilized in certain ports, it is recognized that the present invention could also utilize a support 602 having a variety of port 604 configurations with modules 606 having module supports 610 sized to correspond with specific ports and/or ports 604.

In keeping with the modular construction of the present invention, it should also be understood that the support 602, like most of the components thus described could be embodied in a variety of shapes and sizes. Preferably, the support 602 is a circuit board with a number of ports 604 included thereon. In one aspect of the invention, the support 602 could be embodied as several supports with each support having a unique arrangement of modules and light sources. The electronic schematics shown in FIGS. 52–55 show some possible configurations and their associated electronic connections between the various components of the invention.

Figures 53, 54:
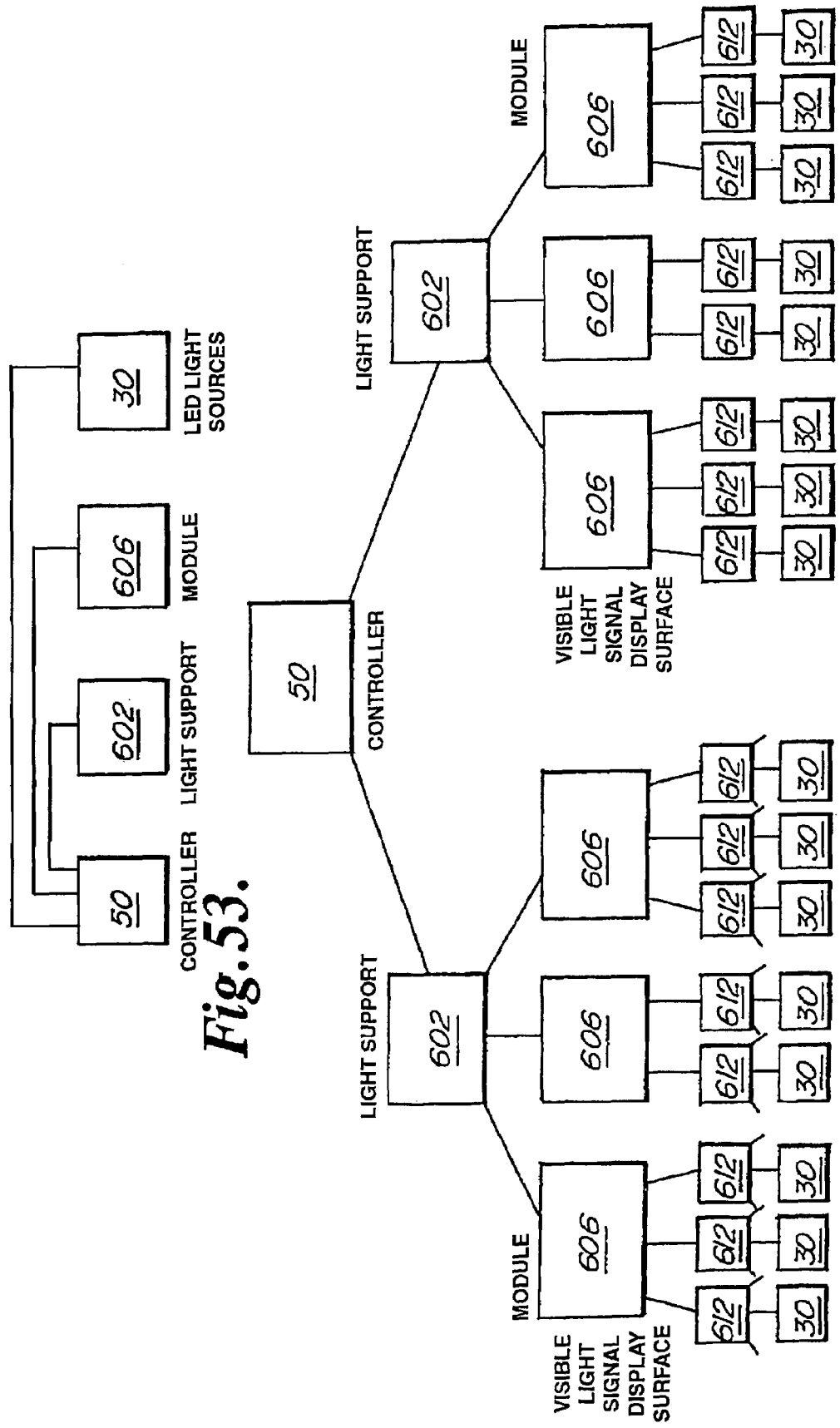
FIG. 53 is a block diagram of an electrical schematic of an embodiment of the invention.
FIG. 54 is a block diagram of an electrical schematic of an embodiment of the invention.

Starting in FIG. 52, an embodiment of the invention is shown where the controller 50 is in electronic communication with one or more supports 602, which are in turn in electronic communication with one or more modules 606, which are in turn in electronic communication with one or more light sources 30. FIG. 53 shows a similar series of electric pathways, but in the present embodiment the controller 50 may also be in direct electric communication with each of the various components, support(s) 602, module(s) 606 and light source(s) 30, independent of one another.

In the embodiment shown in FIG. 54, the individual visible surfaces 612 of the various modules 606 may be controlled by the controller 50. Though not indicated in the schematic, the various components supports 602, modules 606, visible surfaces 612 and light sources 30 may be independently controlled by the controller 50 or may be selectively activated via the electronic pathway shown.

Figure 55:
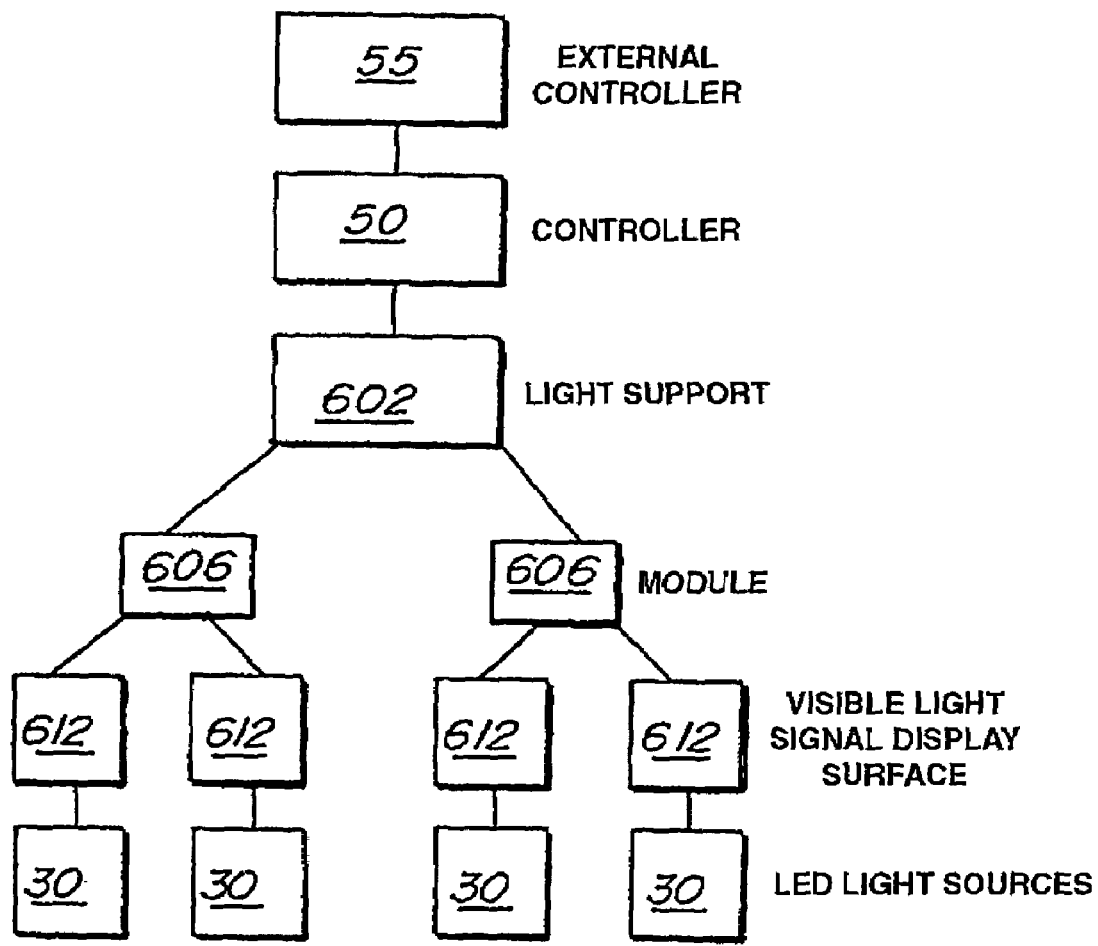
FIG. 55 is a block diagram of an electrical schematic of an embodiment of the invention.

In the embodiment shown in FIG. 55, a support 602 includes a controller 50. Each controller 50 is in electronic communication with an external controller 55 in the manner previously discussed. The embodiment shown in FIG. 55 may include numerous independently controlled supports 602 which are in communication with the external controller 55. Individual controllers 55 may also be included with each modules 606 to provide for a warning signal light having numerous predetermined light signals or patterns which may be displayed by sending a single signal from the external controller 55 to the various controllers 50.

In reference to the various embodiments shown in FIGS. 52–55, additional components may be added to any of the various embodiments shown and that numerous configurations other than those shown or described could be created. The present invention is directed to all possible arrangements of the various components described herein regardless of the number, type or arrangement of the components described herein.

The controller 50 and/or external controller 55 described in relation to FIGS. 52–55 may provide modulated and/or variable illumination to individual light sources 30 or modules 606. The controller 50 or external controller 55 may selectively illuminate any combination of individual light sources 30 or modules 606 to provide an infinite variety of patterns and/or combinations of patterns for a warning light signal independently of, or in combination with, the provision of modulated or variable light intensity.

Figure 56:
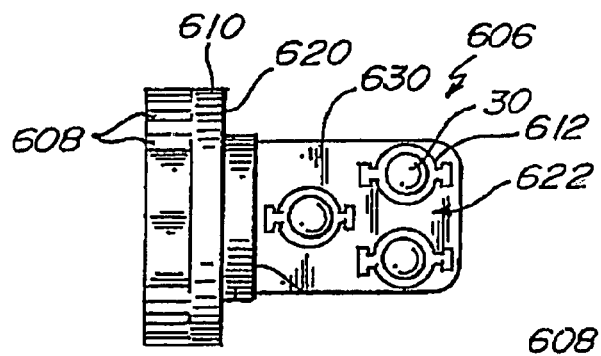
FIG. 56 is a detailed front view of a replacement LED light source.
Figure 57:
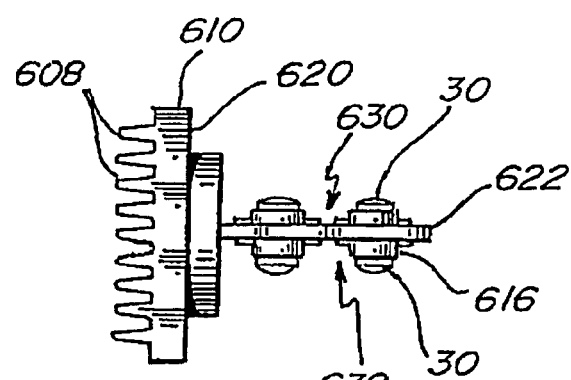
FIG. 57 is a detailed side view of a replacement LED light source.
Figure 58:
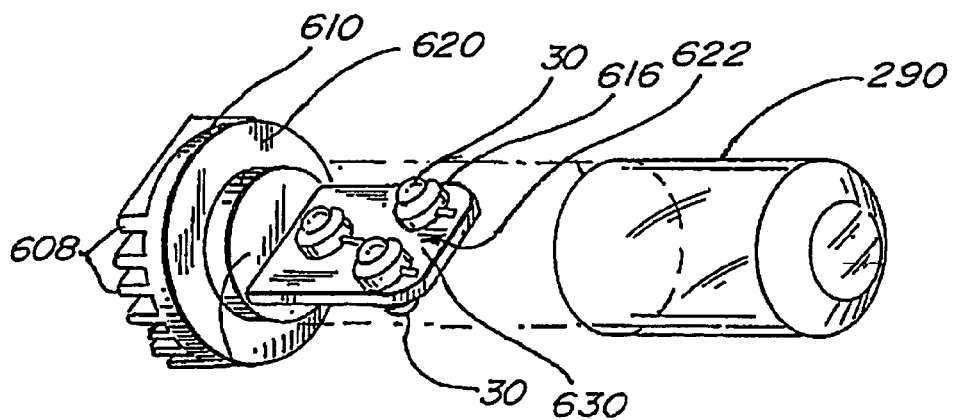
FIG. 58 is a detail partially exploded isometric view of a replacement LED light source and cover.

Turning to FIGS. 56–58, several views of an example of a module 606 is shown. Typically, a module will include a base portion 620 and light mounting portion 622. The base portion 620 will include the support member 610 which will typically include a plurality of electric contacts 608. The support member 610 and the electric contacts 608 are removably engageable to a port 604. The contacts 608 provide the module 606 with an electric path to the support 602 and controller 50 such as is shown in FIGS. 51–55.

The light mounting portion 622 preferably is a vertically oriented circuit board 630 which includes one or more light sources 30 and associated culminator cups 370 with reflective surfaces 616 removably mounted thereon. The light sources are preferably LEDs. As shown in FIG. 51 the light mounting portion 622 may be enclosed in a transparent cover or dome such as protector 290.

As depicted in FIGS. 61, 62, 65, and 66, an LED take-down light 700 and an LED alley light 702, 800, 808 are shown as being integral to a light bar 704, 760 mounted to an emergency vehicle 706.

The LED take-down light 700 may include one or more LED☐s 336. The LED☐s 786 forming the LED take-down fight 700 may each be surrounded by a culminator 370 as depicted and described with reference to FIGS. 26–32 having one or more reflective sections 374 for transmission of light along a desired line of illumination. Alternatively, a reflector 350, 434 may be positioned adjacent to LED light sources 336 as described in reference to FIGS. 37–47. The reflector 350, 434 used in conjunction with take-down light 700 may be stationary or may be rotatable through the use of a rotational device. The LED☐s 786 forming the LED take-down light 700 may also be angularly offset with respect to horizontal to provide illumination along a preferred line of illumination as depicted with reference to FIGS. 13 and 14.

The LED take-down light 700 may be integral to, or mounted upon, the light bar 704, 760. The LED take-down light 700 may be formed of panels or modules of LED illumination sources as depicted and described in FIGS. 31–32 and 51–58. The LED take-down light 700 may also include circuit boards as earlier depicted and described further using culminator reflectors 370, within a frame or support assembly.

The use of an LED take-down light 700 incorporating LED technology improves illumination of areas in front of an emergency vehicle by flooding the area occupied by a stopped vehicle with light while simultaneously secreting the actions and location of law enforcement personnel during law enforcement activities. The illumination of the LED take-down light 700 also assists in enhancing the visibility of an emergency vehicle during dark illumination conditions which in turn improves the safety for law enforcement personnel.

The LED take-down light 700 is preferably coupled to a power supply, battery, or other low voltage power source. The take-down light 700 may also be electrically coupled to a controller 50 for illumination of all or part of the LED light sources 786 to provide for a desired level of illumination for an area adjacent to an emergency vehicle. The controller 50 may alternatively provide one or more of the many types of light signals as earlier described.

Further, the intensity of the LED light sources 786 may be selectively regulated by a controller 50 dependent upon the darkness of the conditions to be illuminated during law enforcement activities. The controller 50 may be coupled to a light or photosensitive detector to assist in the selection of a desired level of light output dependent upon the environmental conditions encountered by the law enforcement personnel during use of the LED take-down light 700.

The LED take-down light 700 may be formed of one or more adjacent panels or modules 784 of LED illumination sources 786 along a front face 710, 764 for a light bar 704, 760. Alternatively, a plurality of panels or modules 784 of LED light sources 786 may be formed along the front face 710, 764 of the light bar 704, 760 as well as a plurality of panels or modules 784 of LED light sources 786 along the rear face 712, 776 of the light bar 704, 760. The panels or modules 784 selected for the LED illumination sources 786 may be linear, square, rectangular and/or may have two or more sides, or may be a single illumination source. Each individual panel or module 784 of LED illumination sources 786 may be independently illuminated by a controller 50 to provide one of a plurality of individual and distinct warning light effects. For example, a first, third, and fifth panel or modules 784 of LED sources 786 may be illuminated where the second and fourth panels or modules 784 are not illuminated. Alternatively, the first, third, and fifth panels or modules 784 of LED light sources 786 may be continuously illuminated and the second and fourth panels or modules 784 may be illuminated to provide a flashing or strobe light signal. Illumination of any combination of panels or modules 784 may be provided to create a preferred unique warning light signal for the LED take-down light 700. A constant illumination signal may be provided or a flashing, strobe, and/or modulated light intensity may occur to provide one of a plurality of distinct light signals for use within an emergency situation.

The LED light sources 786 within the LED take-down light 700 may be angularly offset as depicted within FIG. 14 to provide a maximum illumination at a preferred distance adjacent to the front of a law enforcement vehicle.

The LED take-down light 700 may be releasably secured to the top of an emergency vehicle or light bar 704, 760 through the use of standard affixation mechanisms including, but not limited to, the use of suction cups, hook and loop fasteners, brackets, screws, bolts, and/or other fasteners. The LED take-down light 700 may be permanently secured to a light bar 704, 760 or may be releasably attached thereto for separation and use as a remote beacon as described in reference to FIG. 15.

The take-down light 700 may alternatively be formed of strips of LED light sources 308 as previously disclosed in reference to FIG. 34. During use of strip LED light sources 308 a culminator/reflector 370 may be used for positioning adjacent to each individual LED light source 336 to reflect light along a desired line of illumination. The strip LED light sources 308 may preferably include adhesive backing material. The adhesive backing material may be used to permanently or releasably secure the strips of LED light sources 308 in a desired location within the LED take-down light 700.

Alternatively, the take-down light 700 may be integral to light bars previously illustrated and described.

As depicted in FIGS. 61, 62, 65, and 66, the LED alley lights 800, 808 provide perpendicularly outward illuminating areas adjacent to the drivers side and passengers side of the vehicle 706. The LED Alley lights 800, 808 are almost identical in construction and functionality to the LED take-down light 700. The LED alley lights 800, 808 may be mounted to a mechanical pivot, gears, and/or rotational device which may include an electric motor. The rotation of the mechanical pivot, or gears may alternatively be terminated to permit fixed angular illumination of areas adjacent to a law enforcement vehicle 706 which are not perpendicular to either the drivers or passenger sides in a manner similar to the functionality and operation of a spot light. In this regard, the LED alley lights 800, 808 may be manipulated forwardly, rearwardly, upwardly, and/or downwardly to provide illumination of a desired area relative to an emergency vehicle 706.

The LED alley lights 800, 808 may be integral to, or removable from, the opposite ends of light bar 704, 760. As such, the LED alley lights 800, 808 may be releasably secured to opposite ends of the light bar 760 through the use of fasteners such as bolts and nuts, screws, adhesives, straps, and/or hook and loop fabric material. An individual may simultaneously illuminate the LED take-down light 700 and the LED alley lights 800, 808 or may alternatively illuminate the LED alley lights 800, 808 independently from the LED take-down light 700 within an emergency situation.

Referring to FIGS. 61, 62, 65, and 66, the take-down light 700 may be positioned inside of a housing, base, or enclosure 780 which has a transparent surface 782 permitting light as emitted from LED light sources 786 to pass therethrough. Within the interior of the base/housing 780 are located one or more light emitting diode light modules 784. Each LED light module 784 may include one or more individual light emitting diodes 786 as integral to circuit board 788. The functions and operation of LED light sources, LED□s, and circuit boards are identical to the light sources described in reference to FIGS. 31 and 32. Each LED light module 784 may also include electrical couplers or connectors 790 which may be adapted for penetrating engagement into a receiving slot 792. The LED light modules 784 as earlier described with reference to FIGS. 51–58 facilitate ease of replacement herein. An individual may thereby easily replace and/or substitute an LED light module 784 with another LED light module having the same or different colors or intensity characteristics. The circuit board 788 and/or LED light modules 784 may be panels or strips as described with reference to FIGS. 34 and 35.

The LED lights 786 are preferably spaced about circuit board 788 in any pattern and/or combination including the use of a linear configuration. Adjacent to each LED light module 784 is positioned a reflector which may be a culminator 730, 534, as earlier described in reference to FIGS. 26–32 and 47. Alternatively, a reflector or mirror 802, 434, 350, as described in reference to FIGS. 21, 22, 37–39, 40–42, and 47, may positioned adjacent to LED light modules 784 to reflect light emitted by LED□s 786 in a desired direction for maximization of illumination characteristics for the alley lights 800, 808 and/or take-down light 700. The utility of the alley lights 800, 808 and/or take-down light 700 is thereby enhanced. The reflectors 370, 534, 434, 802, or 350 may be integral and/or attached to circuit board 788, a frame, or to a support adjacent to circuit board 788 to reflect light emitted from LED□s 786 in a desired direction.

Within the housing/enclosure 780 is located a motor 794 having a worm gear 796 engaged to a shaft 798. Engagement of motor 794 rotates shaft 798 in turn rotating worm gear 796. The motor 794 is electrically coupled to the electrical system and/or controller 50 for the emergency vehicle.

A first alley light 800 may be positioned within housing 780 proximate to motor 794. The first alley light 800 may be stationary and/or rotatable relative to the light bar 760. The first alley light 800 may or may not be engaged to a gear 804. If rotation of the first alley light 800 is desired, then gear 804 may include a receiving slot 792 to provide electrical connection and power to the LED light module 784 for provision of light. Gear 804 may also be coupled to worm gear 796 for the provision of rotation and/or oscillation motion. If motion of first alley light 800 is not desired, then stationary positioning of LED light modules 784 relative to housing 780 may be provided with suitable electrical connection to a vehicle power source.

Take-down light 700, first alley light 800, and second alley light 808 may be alteratively formed in any shape as earlier described in reference to FIGS. 4–10, 12, 23–25, 31, 32, 34, 35, 37–39, 51, and 56–58. Take-down light 700, first alley light 800, and second alley light 808 may be stationary within housing 780.

A second gear 806 may be provided for central positioning within housing 780. The second gear 806 may be coupled to gear 804 which may in turn be coupled to worm gear 796 as connected to shaft 798. Rotation of shaft 798 by motor 794 thereby imparts rotation of gear 804 and second gear 806. Alternatively, the shaft 798 may be elongate including worm gear 796 for direct coupling to second gear 806. Rotation of 360° or oscillating rotation of second gear 806 may therefore be provided.

Second gear 806 may also include a receiving slot 792 adapted to receivingly engage electronical connectors 790 as integral to circuit board 788 of LED light modules 784. Light modules 784 also include a plurality of individual LEDs 786 which may each be positioned within a culminator 534, 370, 802. A controller 50 may be electrically connected to each LED light modules 784 as coupled to gear 804, second gear 806, third gear 810, and/or housing 780 for selectively illumination of individual LED□s 786, or for illumination of any combination of LED□s 786. The features as earlier described for controller 50 are equally applicable for use with the take-down light 700, first alley light 800, and second alley light 808, relative to distinct types and combinations of types of warning light signals.

Second gear 806 may be further coupled to third gear 810 which may include a receiving slot 792 adapted for electrical coupling to connector 790 of take-down light 700. Second alley light 808 is designed to be rotated and to sweep forwardly to the front of an emergency vehicle at such times when the intersection clearing light mode has been activated. During activation of the intersection clearing light mode, the take-down light 700 as electrically coupled or integral to third gear 810 will rotate sweeping to the outside front corner of an emergency vehicle.

The controller 50 is in electrical communication with the take-down light 700, the first alley light 800, and the second alley light 808. Any number of take-down lights 700 or alley lights 800, 808 may be used in association with a light bar 704, 760. The controller 50 may additionally regulate the rotation of the motor 794 for imparting rotation to the take-down light 700, and/or the alley lights 800 and 808.

The controller 50 activating the motor 794 may selectively initiate an intersection clearing illumination mode or sequence. Motor 794 causes the shaft 798 to rotate imparting motion to the worm gear 796. The rotation of the worm gear 796 may then be transferred to the first alley light 800 through coupling to the first gear 804. Alternatively, the worm gear 796 may be, directly coupled to the second gear 806. In another embodiment, motion may be imparted to the second gear 806 through the use of a tie bar 824 as connected between the second gear 806 and the first gear 804. Rotation of the worm gear 796 rotates first gear 804 whereupon motion may be transferred to the second gear 806 for movement of the second alley light 808. Rotation may be further transferred to the take-down light 700 via the coupling of the third gear 810 to the second gear 806. The tie bar 824 may extend between gear 804 and second gear 806 to synchronize motion, rotation, and illumination of the first alley light 800 relative to the second alley light 808 and take-down light 700.

Each of the first alley light 800, second alley light 808, and take-down light 700, are in electrical communication with a power source for a vehicle and are further in communication with the controller 50. The controller 50 may independently impart motion to the take-down light 700, first alley light 800, and second alley light 808. The alley lights 800, 808, and take-down light 700 may be selectively illuminated without initiation of rotational motion as regulated by the controller 50. Alternatively, the controller 50 may signal engagement of the motor 794 to impart rotation to any one of the first alley light 800, second alley light 808, and/or take-down light 700 for use as an intersection clearing light. The controller 50 is therefore capable of simultaneously regulating motion of the rotational devices such as gears 804, 806, and 810 and illumination of selected individual or groups of LED☐s 786 to provide independent or combination light effects.

The intersection clearing light mode may generally be initiated by the controller 50 which signals motor 794 to rotate second gear 806 either through rotation of first gear 804 or through direct contact with worm gear 796. The first or at rest position for the second alley light 808 directs the transmission of light in the direction depicted by arrow 812 which is generally perpendicular to the longitudinal axis of a vehicle. As the intersection clearing light mode is engaged, the counter clockwise rotation of gear 804 causes the clockwise forward rotation of the second gear 806 according to arrow 814 until an angle of forward rotation 816 is achieved. The direction of forward rotation 816 transmits light emitted from LED light modules 784 forwardly towards a corner of a vehicle at an approximate angle ∝ of 45°. The controller 50 may then continue to rotate the gears 804, or 806, in a counter clockwise direction for 360° rotation, or alternatively the controller 50 may signal the motor 794 to reverse direction to rotate the second alley light 808 rearwardly back to the first at rest position indicated by number 812. During the clockwise rotation of the worm gear 796, the second gear 806, third gear 810 and take-down light 700 may be rotated in a counter clockwise direction. The initial at rest position for the take-down light 700 is forwardly with respect to the alley lights 800, 808. The engagement of the intersection clearing light mode rotates the take-down light 700 outwardly towards the sides of an emergency vehicle from a first position indicated at 818 to a second position indicated at 820 as depicted by arrow 822 of FIG. 65.

Alternatively, the first alley light 800 may be rotated simultaneously with the second alley light 808 by engagement between the first gear 804 and second gear 806. Synchronous rotation between the first alley light 800 and the second alley light 806 may be provided through the use of the tie bar 824 or through direct coupling engagement of gears 804 and 806.

Figure 66:
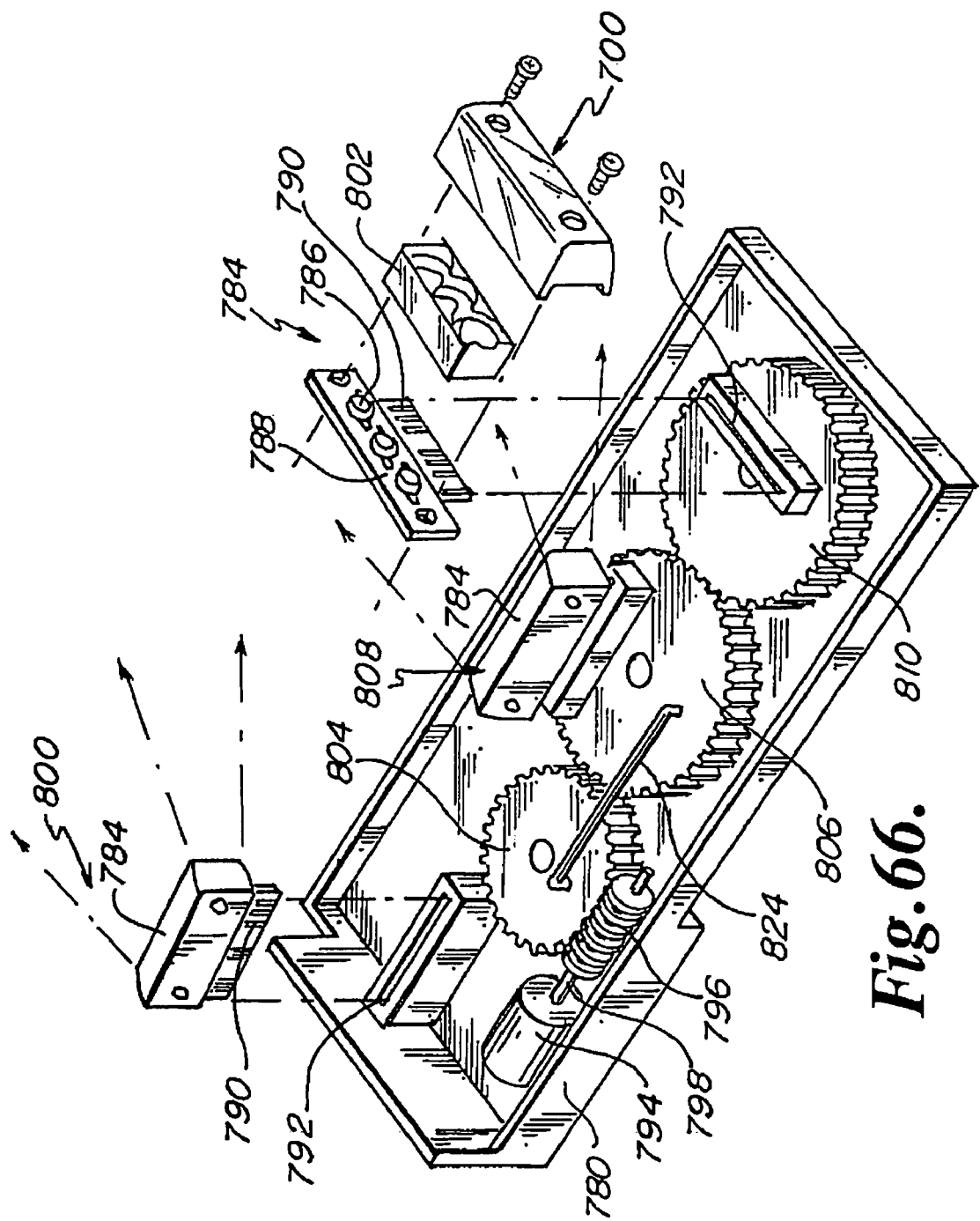
FIG. 66 is an exploded isometric view of the take-down light and alley light.

In an alternative embodiment as depicted in FIG. 66, the first gear 804 is not required to be connected to the second gear 806 with the exception of the tie bar 824. The tie bar 824 extends between the first gear 804 and the second gear 806 and is pivotally and rotatably engaged to each of the first and second gears 804, 806 respectively. The initial positioning of the tie bar 824 on the first gear 804 may be initially indicated as the at 0° location. The initial position of the tie bar 824 on the second gear 806 may also be initially indicated as the at 0° location where the tie bar 824 extends in a linear direction between the first and second gears 804, 806 proximate to the circumference of each of the first and second gears 804, 806 respectively.

The second alley light 808 is initially positioned for transmission of light outwardly from the housing 780 opposite to the location of the tie bar 824. The second alley light 808 is positioned for light transmission at a location approximately 180° from the tie bar 824 on the second gear 806.

As the motor 794 is engaged, the first gear 804 may be rotated in either a clockwise or counter clockwise direction relative to the housing 780. A clockwise rotation of the first gear 804 will be described herein for transfer of motion to the second gear 806 and third gear 810. Alternatively, the motor 794 may be configured to rotate the first gear 804 in a clockwise direction for a desired period of time or distance, and then reverse directions for counterclockwise rotation of the second gear 806 for a desired period of time or distance. In an oscillating sequence the first gear 804 may be initially rotated 90° in a clockwise direction or counter clockwise direction and then the direction of rotation may be reversed for rotation of 90° or 180°, whereupon rotation may again be reversed for continued rotation of either 90° or 180° in the initial direction.

In a 360° rotation cycle of the first gear 804 in a clockwise direction, motion is transferred to the second gear 806 and third gear 810 in a push-pull configuration through the tie bar 824. Clockwise rotation of the first gear 804 from a position of 0° to a position of approximately 90° causes the second gear 806 to be pulled by the tie bar 824 moving the position of the second alley light 808 from an initial position of 180° to a position of approximately 270°. Continued rotation of the first gear 804 from a position at 90° to a 180° location preferably causes the second gear 806 to be pushed by the tie bar 824 causing the second alley light 808 to be rotated in a reverse direction from a 270° position back to a 180° position. Continued rotation of the first gear 804 in a clockwise direction from a position 180° to a 270° location, in turn causes the tie bar 824 to pull the second gear 806 causing the second alley light 808 to continue to be rotated in a reverse direction from a position of 180° to a 90° location. Continued rotation of the first gear 804 in a clockwise direction from a 270° position to a 360° or initial position in turn causes the tie bar 824 to push the second gear 806 causing the second alley light 808 to reverse directions to be rotated from a 90° position to an initial or starting position of 180°.

Rotational motion is also, in turn, transferred to the third gear 810 due to the coupling engagement with the second gear 806. The rotational motion of the third gear 810 relative to the second gear 806 is in the opposite direction. The initial positioning of the take-down light 700 on the third gear 810 is offset relative to the second alley light 808. The initial positioning of the second alley light 808 may be indicated as 180° and the initial position of the take-down light 700 may be initially indicated as 270°. The third gear 810 and the take-down light 700 are, therefore, initially rotated from 270° in a counter clockwise direction to approximately 180°. The rotation of the third gear 810 and the take-down light 700 is then reversed from 180° back to 270° and then to 360° where rotation may be reversed back to 270°. The take-down light 700 therefore wags and oscillates between 360° or 0° to 180° through an initial positioning of 270°. Simultaneously, the second alley light 808 is wagged or oscillated between 90° and 270° through an initial position of approximately 180°.

The offset positioning of the second alley light 808 relative to the take-down light 700 prevents obstructed contact between the two light modules 784 permitting free rotational motion therebetween. The offset positioning of the second alley light 808 relative to the take-down light 700 enables the utilization of oversized or enlarged LED light modules 784 as engaged to the second or third gears 806, 810 respectively. The illumination as transmitted by the LED light modules 784 may thereby be significantly increased.

Alternatively, the rotation of the second gear 806 and third gear 810 may occur through an arc of approximately 360°. The controller 50 is not required to continuously illuminate either the take-down light 700, first alley light 800, and/or second alley light 808. Alternatively, the first gear 806, and third gear 810 may be rotated to a desired position such as indicated by the numbers 820, 816, and oscillated for return to an initial position 818, 812. The controller 50 may regulate the rotation of the gear 804, second gear 806, and third gear 810, for illumination of LED☐s 786 during use as an intersection clearing light. The intersection clearing light, take-down light, and/or alley lights, are positioned inside the housing 780 proximate to the distal ends of LED light bar 760 as depicted in FIG. 63.

The intersection clearing lights, take-down lights 700, and/or alley lights 800, 808, may additionally be activated by a switch for regulation of rotation to a desired angle where upon rotation may be terminated. In this situation, the take-down lights 700, and/or alley lights 800, 808, may be utilized in a manner similar to a spotlight integral to a vehicle and as controlled by an operator. The controller 50 or switch may be utilized to provide any angle of illumination within an arc of approximately 180° relative to a vehicle between an angle of approximately 45° forwardly and inwardly to an approximate angle of 135° rearwardly and outwardly relative to the front and sides of a vehicle. The controller 50 or switch may also be utilized to provide any desired angle of illumination for the alley lights 800, 808, within an arc of approximately 140° relative to a vehicle between an angle of approximately 70° forwardly and outwardly to an approximate angle of 70° rearwardly and outwardly from the sides of an emergency vehicle. A wide area of illumination to the front and sides of an emergency vehicle is thereby provided by the alley lights 800, 808, and take-down light 700 either independently and/or in combination.

In an alternative embodiment, a plurality of take-down lights 700 may be positioned adjacent to each other and disposed along the longitudinal length of a light bar 760 above the front face 764 and/or rear face 766. Alternatively, the take-down lights 700 may be formed of a plurality of LED light modules 784 positioned adjacent to each other along the entire length of the front face 764 and/or rear face 766 of a light bar 760. (FIG. 63.) The LED light sources 336, 786 in this embodiment are connected to the controller 50. The controller 50 may selectively illuminate one or more LED lights 336, 786 to provide any desired intensity of light to be used in a take-down situation by law enforcement personnel.

As depicted in FIGS. 31, 32, and 63, a single row of LED light sources 336, 786 is disposed on front face 764 and rear face 766 of LED light bar 760. Alternatively, a plurality of rows and/or columns of LED light sources 336, 786 as generally illustrated and described in relation to FIGS. 7, 9, 12, 34, and 35, may be utilized on front face 764 and/or rear face 766. A linear culminator assembly 484 (FIGS. 30 31, 32), or a culminator assembly 392 in the form of an array (FIG. 26), may be positioned adjacent to LED light sources 336, 786. Alternatively, reflectors 350 such as mirrors as illustrated in FIGS. 37–39, may be engaged to front face 764 and/or rear face 766 adjacent to LED light sources 336, 786.

A transparent surface 782 is preferably in sealing engagement with the housing 780 to prevent moisture or other contamination from adversely affecting the performance of the take-down light 700 and/or the alley lights 800, 808. The transparent surface 782 is preferably of sufficient strength and durability to not fracture, break, and/or fail when exposed to adverse environmental and/or weather conditions including but not limited to the exposure to rock or gravel strikes.

Figure 59:
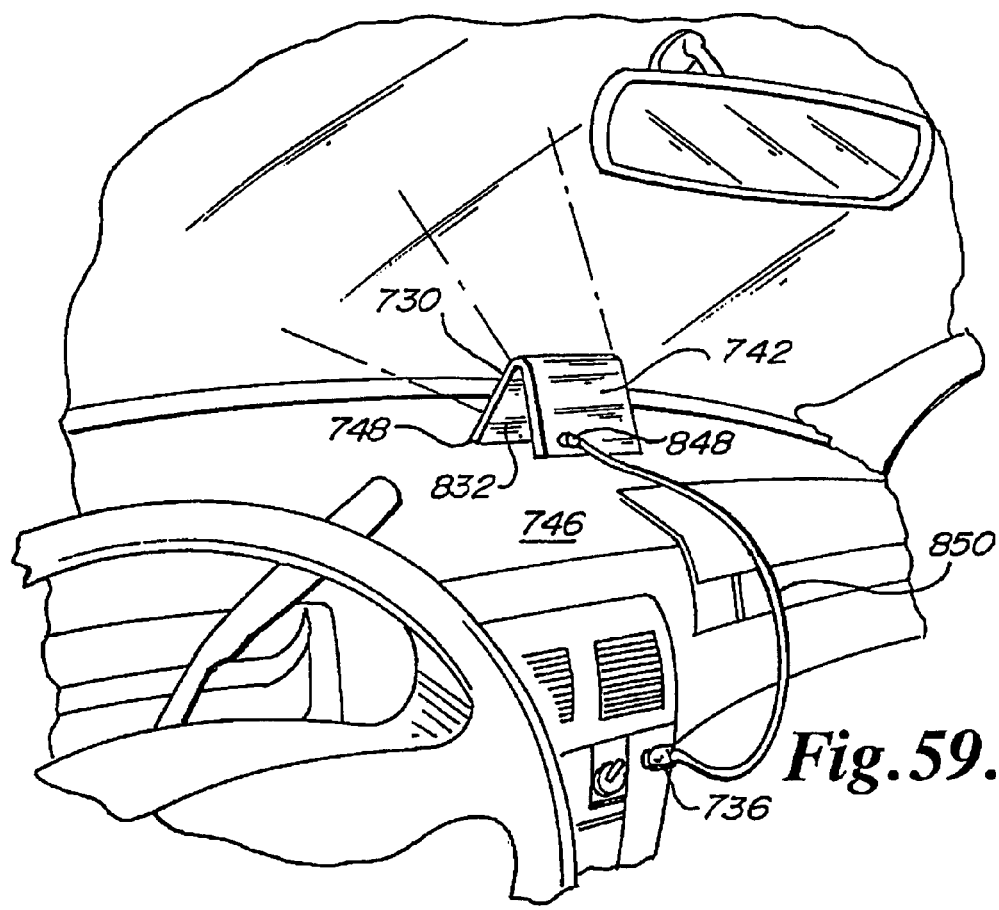
FIG. 59 is an environmental view of an LED personal warning signal light positioned on a dashboard of an emergency vehicle and electrically coupled to a power source such as cigarette lighter receptacle.
Figure 60:
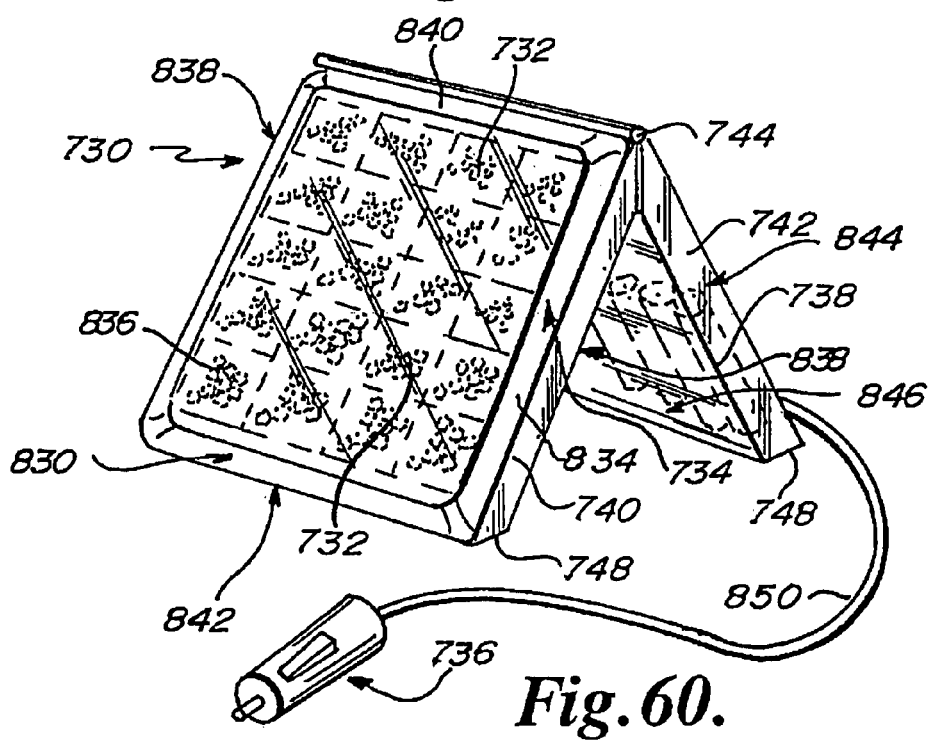
FIG. 60 is a detail isometric view of the LED personal warning signal light and electrical coupler.
Figure 61:
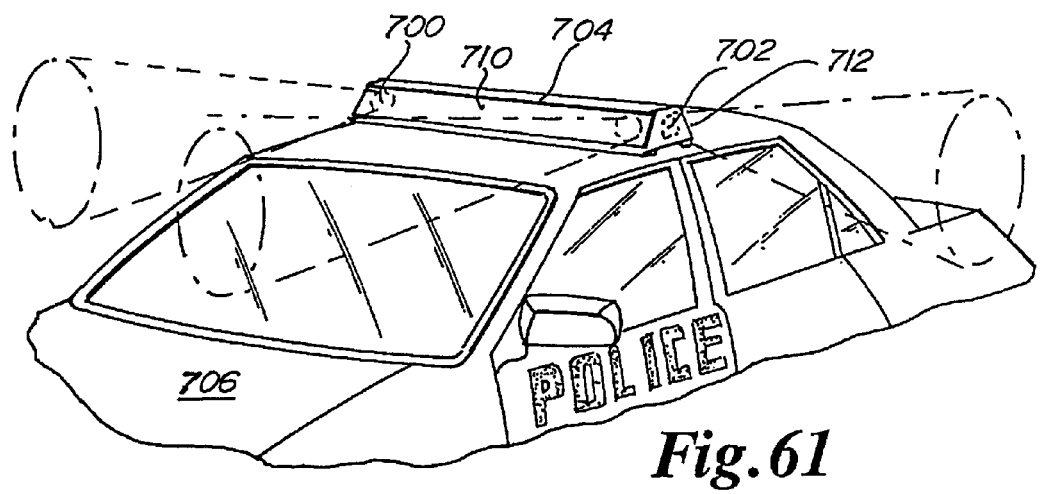
FIG. 61 is an environmental view of an LED take-down light source and an LED alley light source mounted to the light bar of an emergency vehicle.
Figure 62:
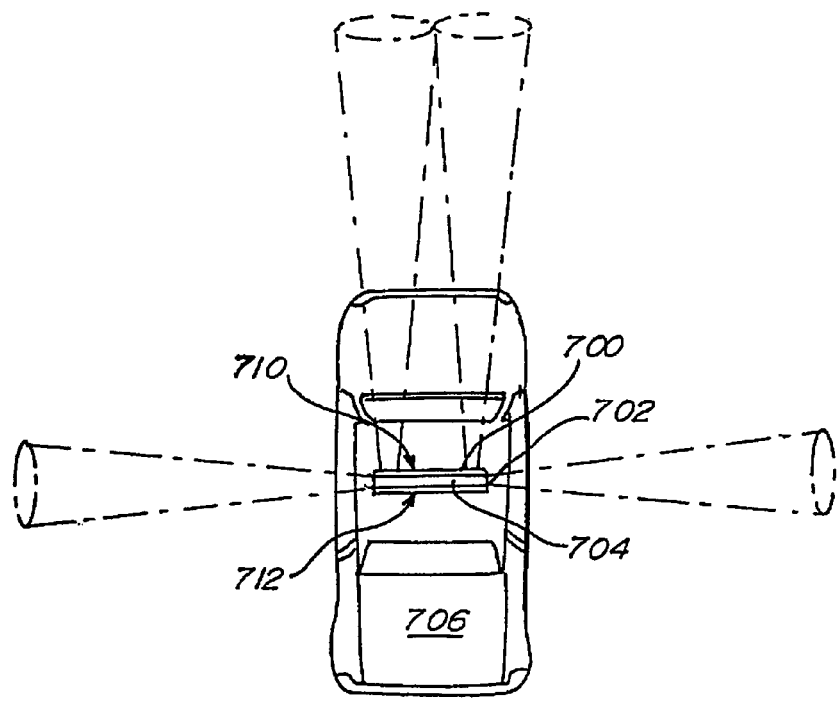
FIG. 62 is a top environmental view of an LED take-down light source and an LED alley light source mounted to the light bar of an emergency vehicle.

Referring to FIGS. 59 and 60, a personal LED warning signal light 730 is shown. The personal LED warning signal light 730 is formed of a plurality of individual LED light sources 732 which may provide illumination in any desired color. The individual LED light sources 732 may be selectively illuminated by a controller 50 for the provision of any desired combination or pattern of visually distinctive warning light signals as earlier described.

The personal LED warning signal light 730 may be formed of columns or rows of individual LED light sources 732 which may in turn be sequentially illuminated to provide the appearance of a scrolling or rotating light source.

The individual light sources 732 may be formed in an array, panel, or single line, and may include an adhesive backing as earlier described. Further, the individual LED sources 732 may be angularly offset as depicted within FIG. 14 to maximize light output along a desired line of illumination. The personal LED warning signal light 730 includes a circuit board or LED mounting surface 482 which may be electrically coupled to a controller 50. The types of lighting effects available for illumination by the personal warning signal light 730 include but are not necessarily limited to the types of light signals and/or combinations of light signals as earlier described.

The personal LED warning signal light 730 may also include a culminator or reflector 370 as earlier described disposed about the LED light sources 732. The culminator or reflector 370 preferably assists in the maximization of light output. The culminator 370 may also be angularly offset to conform to any angular offset of LED light sources 732.

The personal LED warning signal light 730 may be the approximate size of a hand held calculator for convenient transportation within the pocket of law enforcement personnel. The personal LED warning signal light 730 may also be enclosed within a hard or soft sided case 734. Alternatively, the case 734 may have an exterior appearance designed to secrete the function of the personal LED warning signal light 730. For example, the case 734 may be configured to have a first area having a removable or retractable cover to reveal the LED light sources 732. Alternatively, the case 734 may be formed to resemble an article used to transport tobacco products similar to a cigarette case. Alternatively, the case 734 may include a removable or retractable face which is designed in appearance to resemble a hand held calculator, personal electronics device, and/or electronic address book.

The personal LED warning light 730 includes a plug in adaptor 736 which is used to establish an interface for coupling engagement to the cigarette lighter receiver of a motor vehicle. A low voltage power supply is thereby available for the personal LED warning signal light 730 when used in conjunction with a motor vehicle. The plug in adaptor 736 may also resemble a power cord for a cellular telephone thereby hiding the function of the personal LED warning signal light 730. Alternatively, the personal LED warning signal light 730 may be powered by one or more batteries 738.

During use, the personal LED warning signal light 730 may be withdrawn and opened to expose a first panel 740 and a second panel 742. The first panel 740 and the second panel 742 are joined together by a hinge 744. Following opening, the plug in adaptor 736 may be engaged to either the first panel 740 or to the second panel 742 and to a cigarette lighter receptacle for the provision of low voltage power to the personal LED warning signal light 730. The personal LED warning signal light 730 may then be placed upon the dashboard 746 of a motor vehicle or held for use as a warning signal light by undercover law enforcement personnel.

The first panel 740 and the second panel 742 may each include a tacky and/or adhesive base 748 which functions to assist in the retention of the personal LED warning signal light 730 upon the dashboard 746.

The personal warning signal 730 may include a frame 830 having a back surface 832. The frame 830 includes a lip 834 which is adapted for positioning and retention of a transparent protector 836. The transparent protector 836 is water resistant and prevents water and/or other contamination from adversely affecting the performance of the LED light sources 732. The frame 830 also includes a pair of parallel sides 838, hinge side 840, and support side 842. The support side 842 may be angled to facilitate positioning upon the dashboard of a vehicle.

An opaque cover or second panel 742 includes a receiving ledge 844 which is adapted for nesting and covering engagement relative to the parallel sides 838 during closure of the second panel or opaque cover 742 over the transparent protector 836. The second panel 742 therefore conceals the LED light sources 732 during periods of non-use. The personal warning signal light 730 may also have a first nested closed position and a second open signaling position as indicated in FIGS. 59 and 60. A switch may also be provided which is adapted to detect the closure of the second panel 742 relative to the first panel 740 for termination of power and illumination of the LED light sources 732. The personal warning signal light 730 may also include a power saving feature to prolong the utility and life of internal batteries 738.

An electrical receiving port having a cover may be placed in either the support side 842 or the tacky or adhesive base 748. The electrical receiving port is adapted to receivingly engage a plug 848 of a power cord 850. The power cord 850 may includes an adapter 736 for insertion into the cigarette lighter receiving port. Alternatively, the plug 848 may be inserted into an electrical receiving port integral to either the opaque exterior surface 846 and/or frame 830.

The personal warning signal light 730 includes an internal controller 50 as earlier described. Alternatively, the personal warning signal light 730 may include an external programmable controller. A selector switch may also be provided for activation of pre-stored and/or programmed light signals for illumination during use of the personal warning signal light 730.

The personal warning signal light 730 may be configured in any shape including, but not necessarily limited to, square, rectangular, round, and/or oval. A reduced thickness dimension may be provided following closure of the second panel 742 relative to the frame 830 for placement in the first nesting closed position. The second panel 742 also functions to provide for sealing engagement to the frame 830. The LED light sources 732 are rugged and shock absorbent facilitating transportation and prolonged usefulness by an individual.

Referring to FIGS. 63 and 64 an LED light bar 760 is disclosed. The LED light bar 760 may be formed of a base 762 which extends longitudinally, traversing the roof of an emergency vehicle. The base 762 includes a front face 764 and a rear face 766. Each of the front and rear faces 764, 766 include LED illumination devices 336, 786 which may be configured similarly to the modular light support 480 identified and described relative to FIGS. 31–32. The LED illumination devices 336, 786 along the front face 764 and rear face 766 are positioned within the interior of the base 762 and are enclosed therein by a transparent protective cover 860 to minimize contamination and/or exposure to water. The transparent protective cover 860 may be placed into sealing engagement with either the front face 764 and/or rear face 766 through the use of a gasket and/or sealant or any other preferred mechanical and/or chemical sealing mechanism. The protective cover 860 as engaged to the front face 764 and rear face 766 is formed of a transparent material such as plastic, and/or glass to provide for transmission of light from individual LED light sources 336, 786 for observation by an individual.

As earlier depicted with reference to FIGS. 31 and 32 the LED light sources 336, 786 may be formed into modular units which may be regularly spaced along the front face 764 and rear face 766. The LED light sources 336, 786 integral to the front face 764 and/or rear face 766 are each positioned within a culminator 370, 484 as earlier described. The reflector devices as depicted and described with reference to FIGS. 37–39 may be incorporated into modular light supports 480 for utilization along a front face 764 and/or rear face 766 of LED light bar 760. The number of light emitting diode light sources 336, 786 forming each individual modular unit 480 may vary. Each modular unit 480 may include between 2 and 20 LED light sources 336, 786. Each of the LED light sources 336, 786 is electrically connected to a circuit board 346 having heat sink wells 344 as earlier described in reference to FIG. 36. The construction of the modular light supports 480 and LED light sources 336, 786 facilitates ease of color modification and versatile alternative configurations for light transmission from the light bar 760. The LED light sources 336, 786 as integral to the base 762 proximate to the front face 764 and/or rear face 766 may be formed of one or more colors. The modular light supports 480 also may preferably include electrical couplers or connectors 790 as earlier described.

Each modular light support 480, and/or individual LED light source 336, 786 is in electrical communication with the controller 50. The controller 50 regulates the illumination of LED light sources 336, 786 to provide any desired color, pattern, combination of patterns, and/or types of light signals as earlier identified. The controller 50 may also preferably regulate the illumination of modules 480 and/or individual LED light sources 336, 786 independently between the front face 764 and the rear face 766. The controller 50 may further regulate the individual illumination of LED light sources 336, 786 within sections and/or sectors along the front face 764 independently with respect to each other and independently with respect to the rear face 766. The controller 50 may also regulate the illumination of LED light sources 336, 786 in any desired individual combination, pattern, or sector, for the provision of an infinite variety of different types of light signals. For example, one portion of the front face 764 may transmit a stroboscopic light signal. Simultaneously and/or alternatively, another portion or sector of the front face 764 may transmit a different colored flashing light signal at varying time intervals. Alternatively, a third portion of the front face 764 may transmit a third color of a pulsating modulated or variable lighting effect. The examples illustrated herein are, by no means, restrictive of the infinite variety of combinations or types of light signals which may be regulated by the controller 50 during use of the LED light bar 760.

The controller 50 is in electrical communication with the modular light supports 480, LED light sources 336, 786 take-down lights 700, alley lights 800, 808, and pod illumination devices 770 during use of the LED light bar 760. The controller 50 may therefore regulate the modular light sources 480, take-down lights 700, alley lights 800, 808, and pod illumination devices 770 either simultaneously, independently, and/or in combination. Further, the controller 50 is also in electrical communication with rotational and/or reflector devices such as earlier described with reference to the intersection clearing light. The controller 50 may also be in electrical communication with the reflector as described in detail with respect to FIG. 47 which may be positioned within the pod illumination devices 770.

Light bar 760 includes base 762 which is elevated with respect to the roof of an emergency vehicle to enhance visualization during use.

The LED take-down light 700 and/or alley lights 800, 808 may be integral to the base 762 proximate to each of the first and second ends 862, 864 of light bar 760. An end cap 772 may be secured to the first and second ends 862, 864 of the base 762. Each end cap 772 encloses the take-down light 700 and alley lights 800, 808. The end caps 772 may be elevated above or alternatively may rest upon the roof of an emergency vehicle and may assist to support the longitudinally extending base 762. The end caps 772 provide for visualization of the LED light bar 760 from the sides of an emergency vehicle. Each end cap 772 may have the same width dimension as the base 762 or have larger or smaller dimension as dictated by manufacturing and performance considerations.

Supports 774 extend angularly upwardly and forwardly from the base 762 for elevation and of the pod illumination devices 770 above the base 762. The supports 774 preferably are substantially vertical and are angled inwardly and forwardly toward the front face 764 of the LED light bar 760. The supports 774 may be formed of any material provided that the essential functions, features, and attributes described herein are not sacrificed. The supports 774 are aerodynamically designed to improve the efficiency for the LED light bar 760.

Each pod illumination device 770 is elevated by at least one and preferably two supports 774. The elevation of the pod illumination devices 770 above the light bar 760 enhances illumination source differentiation of light signals as observed by individuals.

The pod illumination devices 770 may either be circular, oval, square, rectangular, or any other shape. The pod illumination devices 770 include LED light sources 336, 786 as earlier described. The visualization of the LED light bar 760 is enhanced by the pod illumination device 770 permitting observation at all angles relative to an emergency vehicle.

The pod illumination devices 770 include a frame 866 comprised of metal, plastic, rubber, and/or any other sturdy material. The frame 866 includes a transparent protective cover 868 which functions to prevent moisture or other contamination from adversely affecting the performance of the LED light source 336, 786. The transparent protective cover 868 is formed of a material such as plastic or glass to permit light transmission therethrough during use of the light bar 760.

Each LED light bar 760 has at least one and preferably two or more pod illumination devices 770 for the provision of warning light signals for observation by individuals. Each of the pod illumination devices 770 are disposed proximate to either the first end 862 and/or second end 864 of light bar 760. Alternatively, a pod illumination device may be centrally disposed between the first end 862 and second end 864 at light bar 760.

A controller 50 is preferably in electrical communication with the LED light sources 336, 786 integral to the pod illumination devices 770 to provide for an infinite variety unique lighting signals as earlier described. The controller 50 may independently illuminate the pod illumination devices 770 relative to each other or provide different light signals within each pod illumination device 770.

Each pod illumination device 770 may include individual columns and rows of multicolored LED light sources 336, 786. Each individual light emitting diode light source 336, 786 integral to the pod illumination device 770 may also be enclosed within a culminator and/or reflector 370, 484 as earlier described having reflective and/or transparent sections. Alternatively each pod illumination device 770 may also include a reflector assembly as illustrated and earlier described within FIG. 47 which includes a culminator 370, 534 and rotational mechanism or motor 794 as positioned within the frame 866. The motor 794 provides rotational or oscillating motion to the reflector 532. Alternatively, reflector devices as earlier described with reference to FIGS. 37–42, and 44–45 may be incorporated into pod illumination devices 770. The pod illumination devices 770 also may include a frame 866 having a cover or top 874 which is removable to provide access to either a reflector assembly, culminator, modular light supports 480 and/or LED light sources 336, 786 for repair or replacement therein. The cover or top 874 may be affixed to the pod illumination devices 770 by any conventional means including but not limited to the use of bolts, screws and/or wing nuts.

Figure 4:
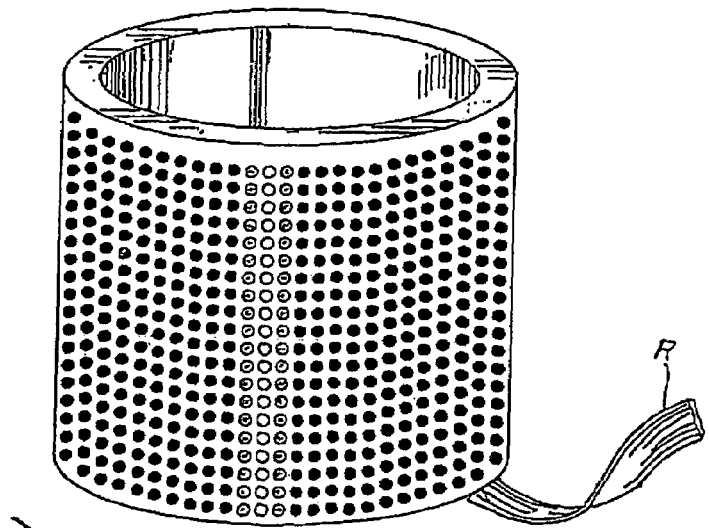
FIG. 4 is a perspective view of a warning signal light according to an embodiment of the invention depicting the sequential activation of columns of light-emitting diodes (LED's).
Figure 12:
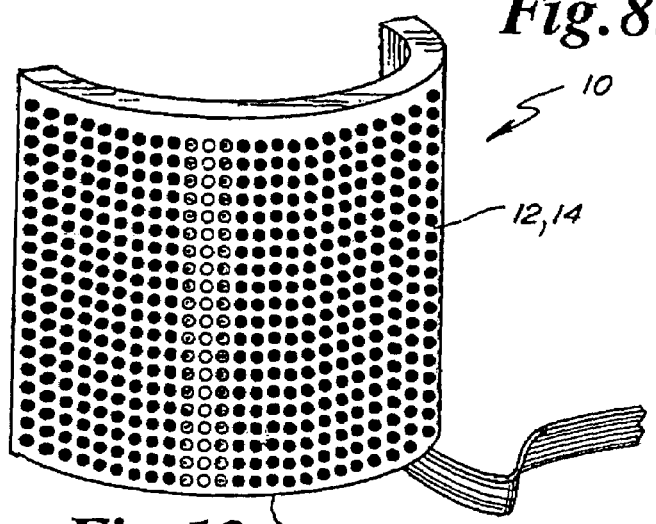
FIG. 12 is a perspective view of a warning signal light according to an embodiment of the invention.

Alternatively, the pod illumination devices 770 may include flexible circuit boards as illustrated and described in FIGS. 4, 5, and 12. The pod illumination devices 770 and frame 866 provide an aerodynamic encasement for the LED light sources 336,786. Additionally, the LED light sources 336, 786 may be angularly offset as previously described in reference to FIG. 14 to enhance visualization of the emitted light signal along a desired line of sight.

The LED light bar 760 provides an aesthetically pleasing visual shape representative of a high technology appearance to enhance the visualization of a law enforcement vehicle. The LED light bar 760 includes an aerodynamic design to reduce drag during use of an emergency vehicle.

The pod illumination devices 770 may include modular light supports 480, 606 as earlier described in reference to FIGS. 23–25, 31–32, and 51–58 herein. Alternatively, the light emitting diode light sources 336, 786 as disposed in pod illumination devices 770 may be configured in any desired shape or panel as earlier described in reference to FIGS. 4–10, 12, 14, 23–25, 31–32, 34, 35, and 37–46, herein. The LED light sources 336, 786 may therefore be replaceable along with a circuit board, or alternatively, the entire pod illumination device 770 may be replaceable.

If modular LED light sources 480, 606 are utilized within pod illumination devices 770 then rotational mechanisms as described in FIGS. 21, 22, 40–42, 44, 47, 51, 63, and/or 65, may be utilized individually, exclusively, and/or in combination with controller 50 to provide a desired rotating and/or oscillating warning signal light. Alternatively, the module light sources 480, 606 are not required to be utilized in association with a rotational device where the controller 50 may be exclusively utilized to selectively illuminate individual and/or combinations of LED□s 336, 786 to provide a desired type of warning light signal.

If non-modular light sources 336, 786 are utilized within pod illumination device 770, then rotational mechanisms as described in FIGS. 21, 22, 40–42, 44, 47, 51, 63, and 65, may be utilized individually, exclusively, and/or in combination with a controller 50 to provide a desired rotating and/or oscillating warning light signal. Alternatively, the non-modular LED light sources 336, 786 are not required to be utilized in association with a rotational device where the controller may be exclusively utilized to selectively illuminate individual and/or combinations of LED□s 336, 786, to provide a desired type of warning light signal.

The LED light bar 760 may be constructed and arranged as a one piece unit including the base 762, end caps 772, supports 774, and pod illumination devices 770. Alternatively, the elements of the base 762, pod illumination devices 770, end caps 772, and supports 774 may be releasably secured to each other by any desired affixation mechanism.

The rotational light signal provided by the LED light bar 760 and particularly the pod illumination devices 770 may be provided by mechanical rotational elements as earlier described, mirror rotational elements, and/or a controller 50 for selectively illuminating individual columns and/or rows of light emitting diodes 336,786.

In an alternative embodiment, an LED light support having at least one LED illumination source may simultaneously produce and emit a warning light signal and a systematic information transfer through encrypted/pulsed light or SIT-TEL pulsated light signal, within the warning light signal where the SIT-TEL pulsed light signal is not visible to an unaided eye. The SIT-TEL pulsed light signal functions as a free space carrier of information for processing by a receiver unit. The SIT-TEL pulsed light signal may also be used independently and is not required to be incorporated as a distinguishable component of a warning light signal. In this instance the SIT-TEL pulsated light signal appears as a continuous light source.

Light emitting diodes may be manufactured to emit light at any wavelength from infrared to visible. Therefore, an infinite variety of colors of different wavelengths of LED□s are available. LED□s also are extremely flexible in the provision of an instantaneous light signal which minimizes and/or eliminates carry over illumination after termination of power. For example, the application of power to a traditional light source frequently causes electrons to pass through a filament which in turn causes the temperature of the filament to increase emitting the visible light. The termination of power to a traditional light source having a filament does not immediately terminate the provision of light. A carry over illumination effect continues as the traditional light source filament cools. The traditional light source filament therefore is not flexible for receipt of a very rapid pulsed power supply for transmission of a pulsed light signal.

An LED light source however is well adapted to receive a rapid pulsed power supply for the provision of a pulsed light signal. In fact, LED□s have the capability to pulse thousands of times per second where the rapid pulses are unobservable to an unaided human eye. In these instances, the pulsed LED light source will appear to an individual to be a constant light signal where the pulses are not recognizable. The flexibility to provide a pulsed light signal may also be incorporated into and be a simultaneously non-recognizable portion of a warning light signal. Previously identified types of warning light signals include, but are not necessarily limited to, flashing, stroboscopic, modulated, variable, pulsating, revolving, oscillating, alternating, sequencing, arrows, characters, and/or any other type of warning light signal. A dual function light signal may be provided including an observable warning light signal and secondly a communication carrier which is not normally observable within the warning light signal.

The duty cycle and/or power to be provided to an LED light source is regulated by a controller which includes a rapid switch to enable the rapid pulsation of electrical current to the LED light source, which in turn causes the provision of a pulsating light. Simultaneously, the controller may also regulate an observable light signal for illumination in minutes, seconds, and/or fractions of seconds to provide a desired type of unique light effect.

Pulsated light signals may function as a means for free space communication of information particularly in substitution for radio frequency transmissions which have been strictly regulated by the Federal Communications Commission. The FCC has significantly limited the availability of wavelengths of radio frequency transmissions and has restricted zones of use of radio frequency transmissions to eliminate interference issues which may cause a safety concern to individuals. The accessibility to radio frequency signaling devices and shortage of available wavelengths of radio signals necessitates substitute avenues of communication such as the transmission and reception of pulsated light signals. The use of pulsed LED air to air light communication signals eliminates the necessity for expensive cable, wire, and/or fiber optic communication devices and the corresponding infrastructure associated with traditional forms of communication.

No device is known which replaces conventional lighting with a pulsed light communication device for transfer of information in a community or residential setting. A need exists for the use of general lighting replaced by communicating lights which are more durable, reliable, and fulfill the requirements of the conventional lighting, while functioning as a communication channel in free space. The LED SIT-TEL illumination sources 803 may digitally communicate signals, and the receivers 819 enable communication from device to device through already existing light sources and systems, i.e., street lights, houses, etc., to create a free flow of communication using free space throughout the community/population centers. The SIT-TEL pulsed light signals are not limited to use with emergency communication. The SIT-TEL LED illumination sources 803 generally may be formed of solid state light components capable of high speed switching which are able to sustain single or multi-plex channels of communication while appearing as a regular light. The SIT-TEL LED illumination sources 803 thereby fulfill the requirements of conventional and non-conventional lighting as well as emergency or warning light systems.

The SIT-TEL LED pulsed light signal system in general is formed of an LED support 801 having one or more first LED illumination devices 803 electrically coupled thereto. The LED support 801 may be formed in any shape as earlier described. The LED support 801 may also be stationary and/or secured to a rotational device 805 as earlier described.

The first LED illumination sources 803 may be comprised of a single LED which has been selected for transmission of a specific wavelength of emitted visible or nonvisible light. Each first LED illumination source 803 may also be positioned to the interior of a culminator reflector assembly 807 as earlier described. Alternatively, a stationary and/or rotatable reflector 809 may be positioned proximate to the first LED illumination source 803 to reflect a pulsed light signal along a desired line of sight, vector, and/or path.

The LED support 801 may alternatively be formed of a plurality of first LED Us 803 having the same or different wavelengths of emitted visible or nonvisible light. The LED support 801 may also be organized into specific sectors 811 of select first LED illumination sources 803 of the same or different wavelengths of visible or non-visible light.

The LED support 801 and the first LED light sources 803 are electrically coupled to a power source 813 as regulated through a controller 815. The power source 813 may be a low voltage, low current power supply and may include a rechargeable battery capable of receiving recharge through coupling to a solar energy cell 817. Other sources of electrical power may be suitable substitutes herein. The controller 815 regulates and/or modulates the duty cycle to be exposed to the individual first LED light sources 803 for the creation of a desired type and/or pattern of warning light signal. The controller 815 also preferably regulates and/or modulates the duty cycle to be supplied to the individual first LED illumination sources 803 for the creation of a desired type and/or pattern of SIT-TEL pulsed light signal. A variable duty cycle may also be applied to the first LED light sources 803 through the controller 815 as well as regulation of the type or combination of distinct types of light signals as earlier described. In addition, the same types and/or combinations of types of light signals whether warning light signals and/or SIT-TEL pulsated light signals, may be provided simultaneously and/or independently of each other within different sectors 811 of the LED light support 801.

The LED light support 801 may include an almost infinite variety of individual first LED light sources 803 as configured in any combination, sector, color, and/or pattern. A request by an operator for a particular color or wavelength of LED pulsating or warning light signal may therefore be provided through the controller 815, which selectively illuminates a desired and recognizable combination of individual first LED light source 803 wavelengths to provide the composite light signal. The combination of independent first LED illumination sources 803 by the controller 815 is particularly useful in the creation of white light which may be formed of a plurality of individual LED light source 803 wavelengths, where each individual first LED light source 803 is an independent channel of pulsed light. A composite white light signal may therefore include in excess of 100 channels of independent and distinct wavelengths of pulsed first LED light sources 803 where each wavelength of first LED light sources 803 is pulsating at an approximate rate of 1000 pulses per second. The rapid rate of pulsation for the first LED light sources 803, produces a staggering volume of information for receipt by a second controller 827. Naturally, a significant number of second receivers 823 may be required to receive all transmitted information. It may also be preferable to have the number of second receivers 823 equal or exceed the number of wavelength channels utilized by the first LED illumination sources 803 for transmission of information.

The LED light support 801 also includes a first receiver 819 which is electrically coupled to a converter 821. The converter 821 is coupled to the controller 815. The first receiver 819 is capable of recognizing and receiving a SIT-TEL signal which may be transmitted either as a directional and/or non-directional pulsated light signal. The operational range for the first receiver 819 and the first LED illumination sources 803 is dependent upon the environmental conditions such as humidity, air pressure, air temperature, and pollution factors. It is anticipated that in good environmental conditions that the effective operational range of the first receiver 819 and first LED illumination sources 803 will exceed one half mile and extend to three miles or more.

The first receiver 819 is constructed and arranged to receive SIT-TEL LED pulsed light signals as generated by a second independent LED illumination source(s) 829 having a recognizable wavelength. The received SIT-TEL LED pulsated light signal is converted into a digital signal by a converter 821 for communication to the controller 815. The controller 815 receives the converted digital signal for processing and extraction of transmitted information to respond to an interrogation or information transmission request. The controller 815 continues to process the received digital signal for preparation of an appropriate responsive signal. At the direction of an individual the controller 815 then communicates the responsive signal to the converter 821 which in turn converts the responsive signal to a series of pulses for transmission from the first LED illumination source 803 as a responsive pulsed SIT-TEL LED optical free space communication signal.

The responsive SIT-TEL LED pulsed light signal in turn is received by a second receiver 823 as coupled to a second converter 825, second controller 827, and second LED illumination device 829. The second receiver 823, second converter 825, and the second controller 827 proceed to translate and process the SIT-TEL pulsed light signal containing communications which originated from the first controller 815.

Figure 86:
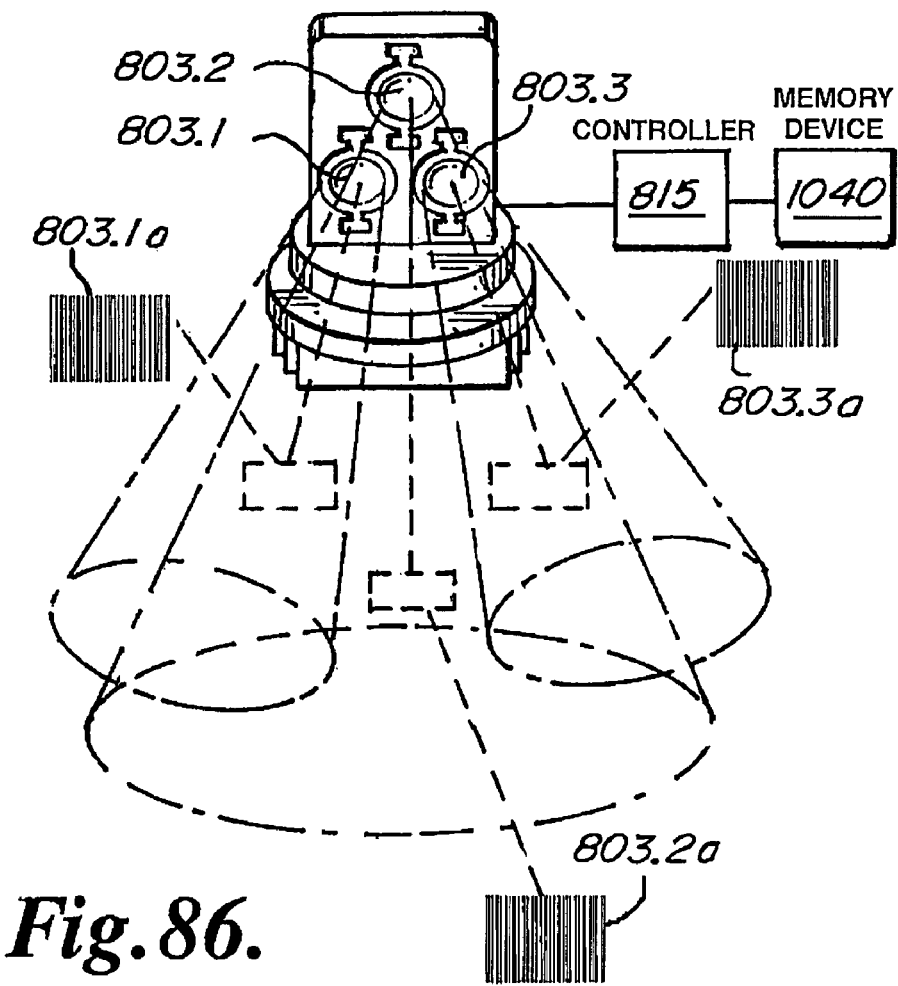
FIG. 86 is a detail view of the SIT-TEL pulsed light communication system.
Figure 87A:
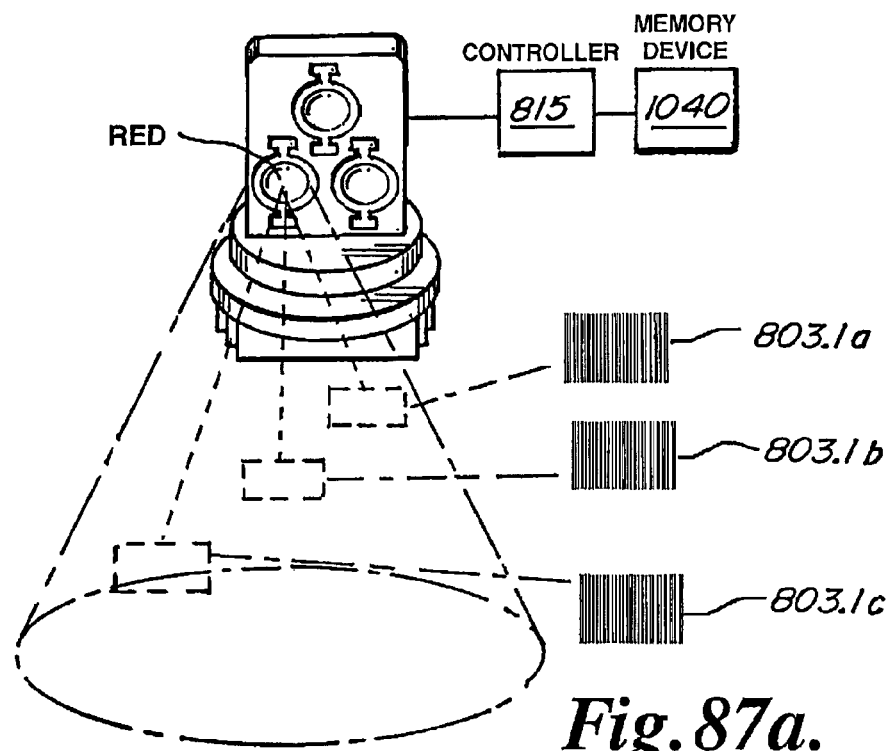
FIG. 87A is an alternative detail view of the SIT-TEL pulsed light communication system.
Figure 87B:
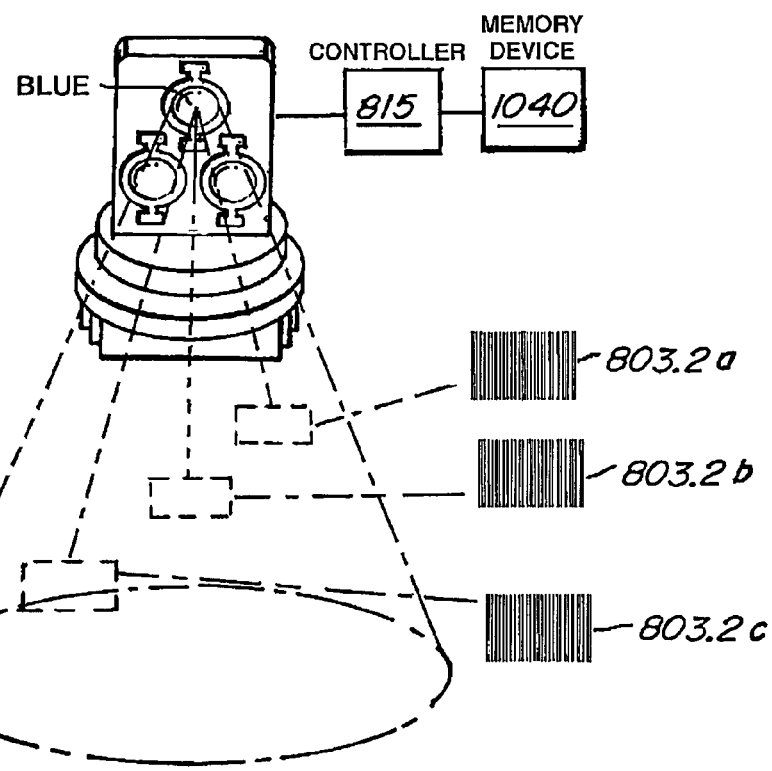
FIG. 87B is an alternative detail view of the SIT-TEL pulsed light communication system.
Figure 87C:
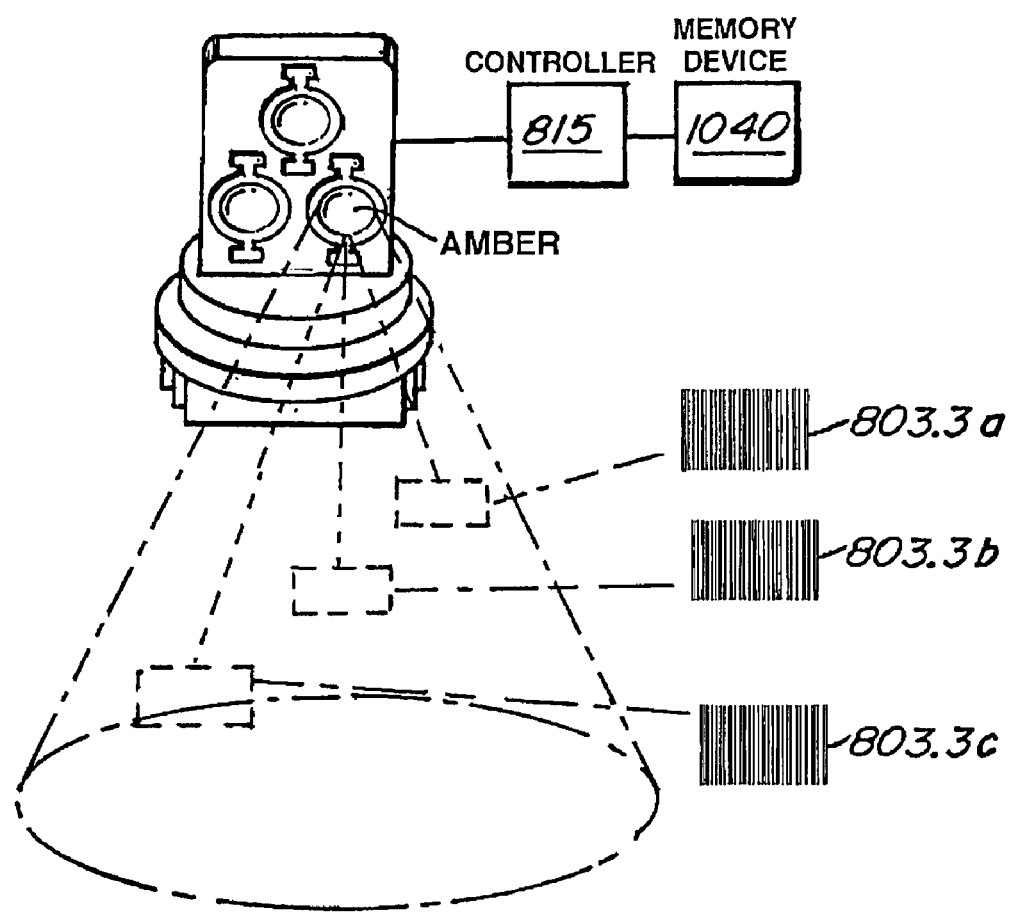
FIG. 87C is an alternative detail view of the SIT-TEL pulsed light communication system.
Figure 88A:
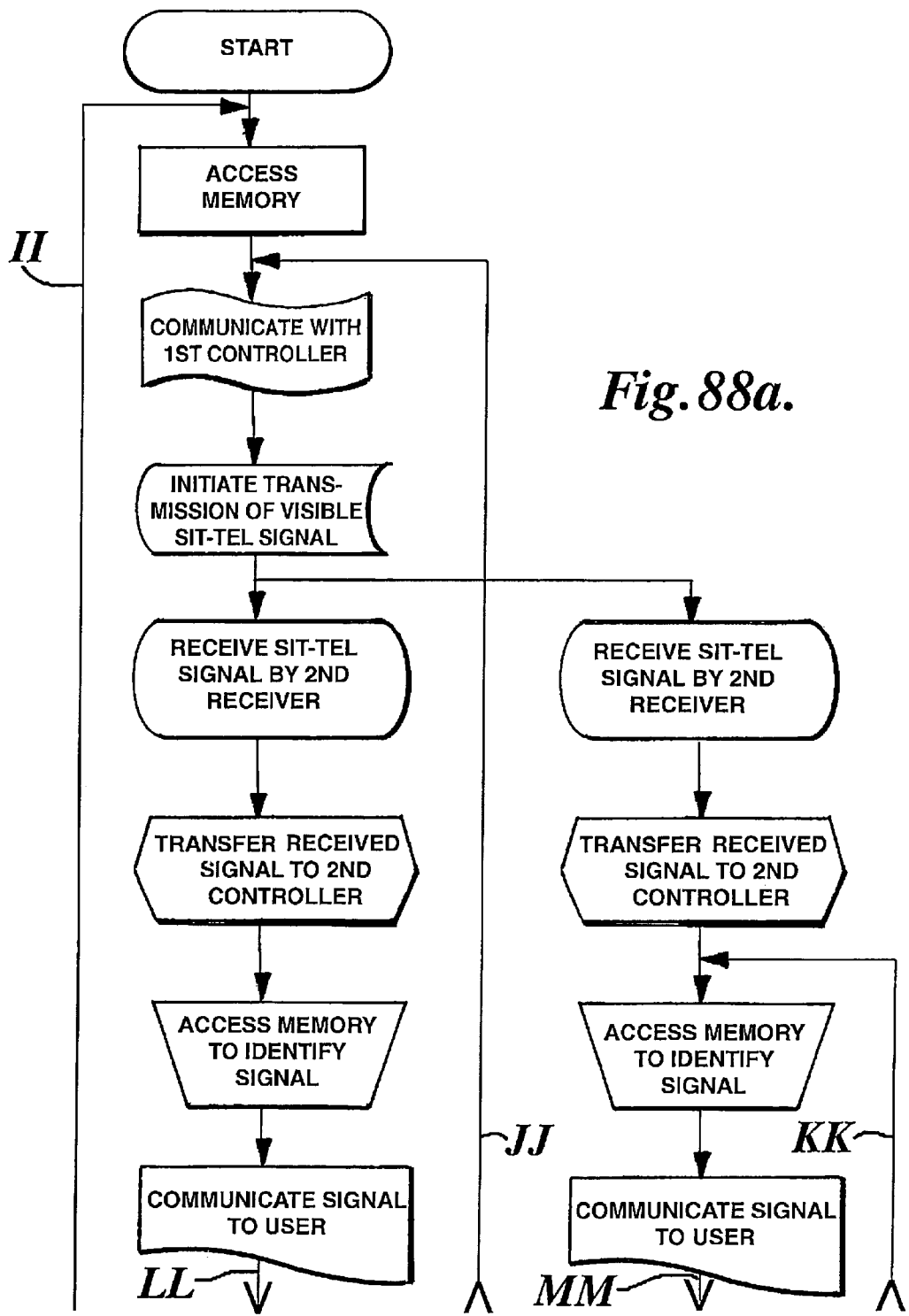
Figure 88C:
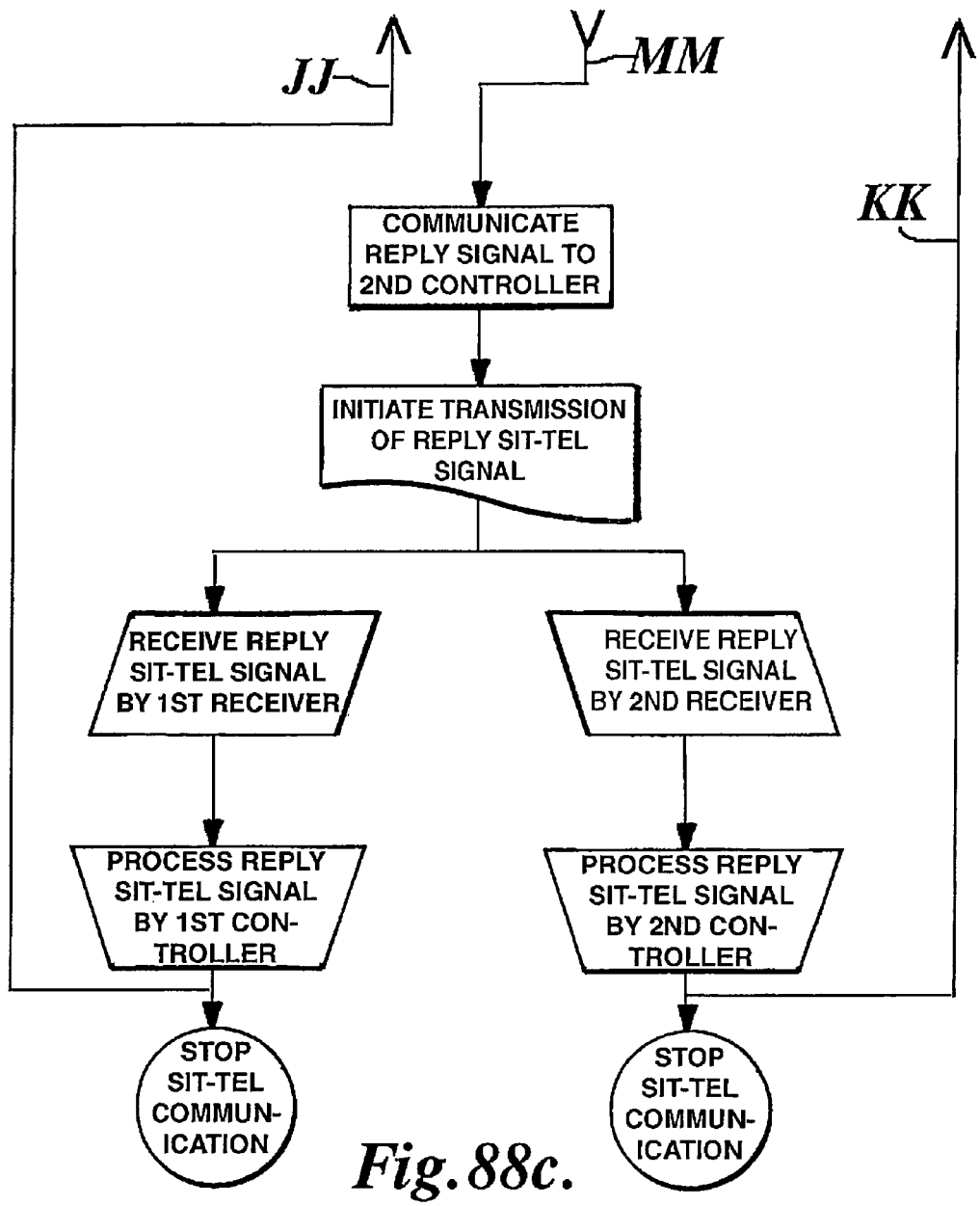

The first controller 815 and the first LED individual light sources 803 as well as the second controller 827 and second LED illumination sources 829 are constructed and arranged to regulate the transmission of an infinite variety of SIT-TEL pulsed LED free space optical light signals. The types of SIT-TEL LED pulsed optical light signals may include but are not necessarily limited to pre-stored characters, numbers, and/or words, and/or terms as identified by an assigned combination of long or short pulses or bar code type or form of signal 803.1, 803.2, 803.3, 803.1a, 803.1b, 803.1c, 803.2a, 803.2b, 803.2c, 803.3a, 803.3b, and 803.3c. (FIGS. 86–87C.) The pulsed LED light signals may be generated so that each pulsed LED light signal has an identical duration as a portion of a SIT-TEL communication. Alternatively, the pulsed LED light signals may have different durations. Any number of pulsed light signals having the same or different durations may be grouped into a signal packet. Each packet or combination of signals may be assigned a character, number, or other information as data within a memory which may be integral to a controller 815. Individual packets of grouped pulsed LED SIT-TEL light signals may be combined into a message, word, and/or character for processing and/or translation by a second controller 827 for communication of information to an individual. The first illumination sources 803 and the second illumination sources 829 are constructed and arranged to emit and/or transmit thousands of pulses of LED light within a time period of approximately one second. The pulsation rate for the SIT-TEL LED pulsed light signal is not observable to the unaided eye. The volume of available combinations of SIT-TEL LED pulsed light signals within a very short period of time enables transmission of a significant amount of information subject to processing via a first or second controller 815, 827.

The first and second controllers 815, 827 respectively, each include a memory having stored software and data files for processing of received SIT-TEL LED pulsed light signals. The memory and available stored data facilitate the immediate and automatic recognition of an environmental condition, parameter, or generation of a pre-stored SIT-TEL pulsed light response. One example of recognition of an environmental condition or situation is when information is desired from a source having an interrogating or second controller 827 which requests through a SIT-TEL pulsed light signal the identity and/or status of a first controller 815. The responsive first controller 815 upon receipt of a verified interrogation SIT-TEL signal request initiates a responsive SIT-TEL LED pulsed light signal which communicates the identification and/or other requested information. A second example of recognition of an environmental condition and/or situation is when a first receiver 819 encounters a continuously emitted SIT-TEL LED pulsed light signal which may function as a warning to trigger an audible or visual alarm to the first controller 815, to minimize safety risks to individuals.

A first controller 815 and a second controller 827 each preferably contain software establishing a recognition or handshake protocol for acknowledgment, receipt, and transmission of information optically through free space SIT-TEL LED pulsed light signals. The handshake protocol initiates upon the first receiver 819 acknowledging being tagged, or receiving an initial pulsed SIT-TEL LED light signal from a second controller 827. A responsive signal is then generated by the first controller 815 for transmission to the second receiver 823. An acknowledgment message is returned by the second controller 827 to the first receiver 819. A preselected pattern of acknowledgments are interchanged to verify readiness for transmission and receipt of desired information through the transmission of free space pulsed SIT-TEL LED light signals. Following transmission of the demanded information and/or data, additional verification and/or acknowledgment transmissions may occur between the first receiver 819 and the second receiver 823 prior to the termination of contact through the use of a sign off protocol.

The first and second receivers 819, 823 are constructed and arranged to recognize certain wavelengths of incoming pulsed SIT-TEL LED light signals. The first and second receivers 819, 823 may be constructed of a plurality of photo detectors, photo diodes, optical transceivers, and/or photo detecting elements to simultaneously, individually, and/or sequentially receive transmissions of SIT-TEL LED pulsed light signals of differing wavelengths. The first and second controllers 815, 827 respectively may also be coupled to an automatic and/or manual scanner 831 or dial which may be manipulated to tune into another wavelength of transmitted SIT-TEL LED pulsed light signals. For example, an individual observing a predominantly red SIT-TEL LED light signal who is expecting to receive a transmitted pulsed SIT-TEL LED light signal may dial and/or tune a first receiver 819 to a red spectrum wavelength to locate the signal. Similarly, adjustments are available for other observed colors. The scanning for pulsed SIT-TEL LED light signals may also be automated by the scanner 831. The scanner 831 and/or first and second receivers 819, 823 are constructed and arranged to independently and/or simultaneously receive directional and/or non-directional pulsed SIT-TEL LED light signals for transmission and communication of information between geographically removed LED illumination sources 803, 829.

The use of a combination and/or independent warning light signal and/or pulsated light signal is particularly applicable for use in motor vehicles. The light support 801 may be integral and/or fixed to a light bar 833 as engaged to a motor vehicle or emergency vehicle 835. During use of the SIT-TEL communications system, where information is transmitted upon carrier pulsated free space SIT-TEL LED light signals, the second receiver 823, second controller 827, and second LED illumination devices 829 may be integral and/or attached to the light bar 833. The first receiver 819, first controller 815, and first LED illumination sources 803 are preferably integral with and/or affixed to a motor vehicle license plate 837. The license plate 837 may include a recessed area 839 or a transmission opening 841 which is adapted to receive the first receiver 819 and the first LED illumination sources 803. A transparent cover 843 preferably traverses the recessed area 839 and/or transmission opening 841 to protect the first receiver 819 and first LED illumination sources 803 from contamination during use of the SIT-TEL pulsated light system. A battery 845 and/or power connector 847 may be coupled to the first controller 815 which is located upon the non-exterior face of the license plate 837. The battery 845 may be a lithium battery having an approximate life span of five years or more. Alternatively, the battery 845 may be rechargeable through the use of solar powered cells or other electrical source. Further, the power connector 847 may be coupled to a vehicle electrical system for the provision of power to the first controller 815, first receiver 819, and first LED illumination sources 803. The transparent cover 843 is formed of a sufficiently sturdy transparent material to prevent tampering and/or disconnection of the first receiver 819 or the first LED illumination sources 803.

The first LED illumination sources 803, first controller 815, and first receiver 819 as integral to the license plate 837 are conspicuously positioned upon a motor vehicle which is potentially subject to interrogation by law enforcement officers within law enforcement vehicles.

Figure 81:
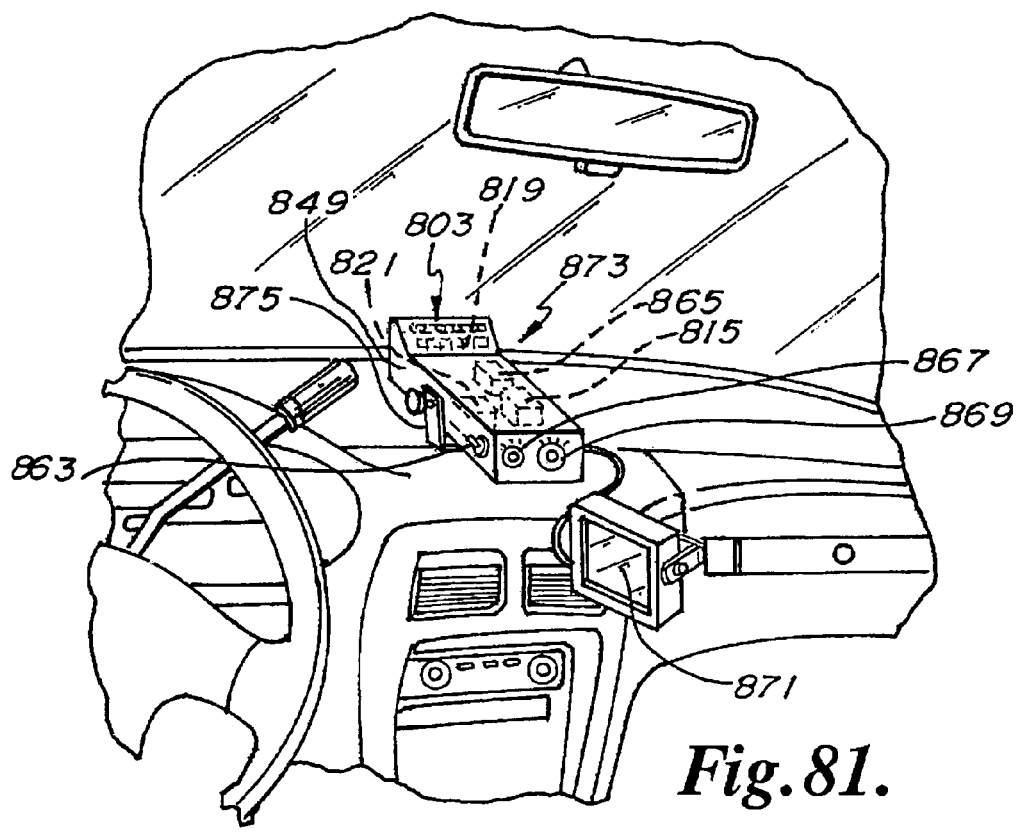
FIG. 81 is an environmental view of a dashboard and pulsed light signaling system engaged to an emergency vehicle.
Figure 82:
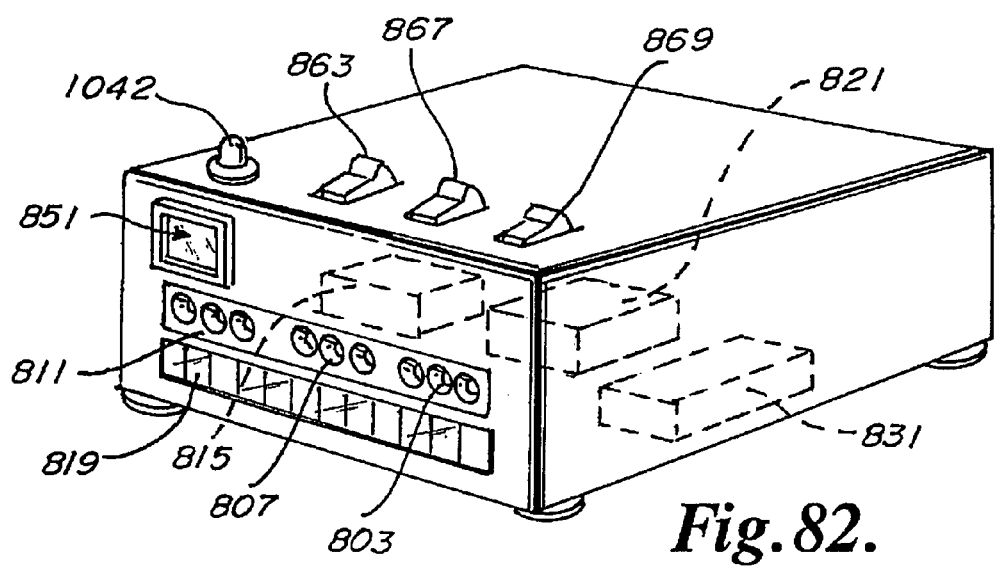
FIG. 82 is an alternative partial phantom line view of a pulsed light signaling system.
Figure 83:
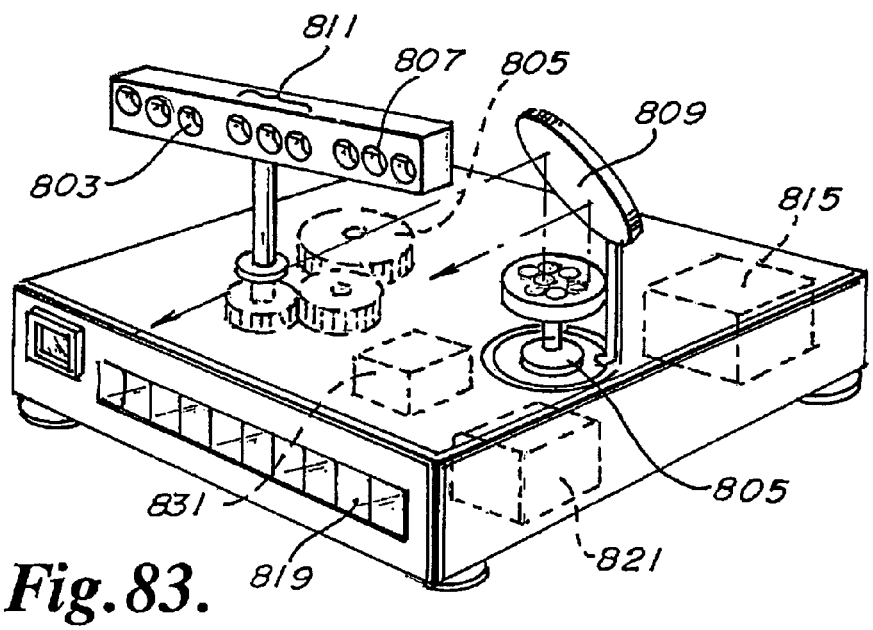
FIG. 83 is an alternative partial phantom line view of a pulsed light signaling system.

The first controller 815 may additionally be electrically connected to a first signaling device 849 which may be attached to the dashboard of the motor vehicle. (FIG. 81.) Alternatively, the first signaling device 849 may be wired into a radio for a motor vehicle. The first signaling device 849 is constructed and arranged to receive a signal from the first controller 815 during situations in which the first receiver 819 has detected a traffic warning message as generated by a SIT-TEL pulsed LED signal emitted from the second LED illumination devices 829 as generated by a second controller 827 within a law enforcement vehicle 835. The first signaling device 849 thereby provides a visual LED signal 1042 to the occupants of a motor vehicle as to the presence of a police officer necessitating clearance of a roadway. (FIG. 82.) Alternatively, the first signaling device 849 may be coupled and/or electrically connected to the radio of a motor vehicle to provide an interrupt switch. Activation of the interrupt switch may cause termination of internal radio or stereo transmissions within a passenger vehicle. Alternatively, the activation of the interrupt switch may permit activation of a database having pre-recorded oral communications for broadcast over a speaker system to orally advise a passenger of a motor vehicle as to the presence of an emergency situation necessitating the clearance of a roadway. Alternatively, during periods when a motor vehicle radio has not been activated, the first controller 815 may activate the first signaling device 849 to engage a motor vehicle radio for the provision of an audible warning alarm. The first controller 815 may additionally include prerecorded voice recognition messages which may be initiated by the first controller 815 upon receipt of an appropriate signal from the second LED illumination devices 829. The audible and/or oral prerecorded signal may advise an occupant of a motor vehicle as to the presence of an emergency situation through oral communication as generated over the radio system of the vehicle. The first signaling device 849 may also emit a verification buzzing or alarm signal when activated by the first controller 815 to warn an occupant of a motor vehicle as to the existence of an emergency situation.

The first receiver 819 may be formed of a relatively flat and thin rectangular sensor 851 which may be positioned adjacent to a window within the interior of a motor vehicle. The first receiver 819 is preferably electrically connected to both the first controller 815 and the first signaling device 849. The first receiver 819 is preferably constructed and arranged to receive pulsed SIT-TEL LED optical signals for transmission to the first converter 821 for communication to the first controller 815 for processing.

The first receiver 819 may additionally be constructed and arranged to receive a polarized pulsed SIT-TEL LED light signal as may be reflecting from the interior windows of a motor vehicle. The first receiver 819 may be placed at any location about a motor vehicle and is not limited to affixation to a license plate 837. The first receiver 819 is preferably placed at a location about a motor vehicle which is easily accessible to transmitted directional and/or non-directional pulsed SIT-TEL light emitting diode signals as generated by the second LED illumination devices 829.

The second LED illumination device 829, second controller 827, second receiver 823, and second converter 825 are generally attached or integral to an emergency vehicle such as a police squad automobile. The second LED illumination device 829 and second receiver 823 may be attached to a light bar 833 at a central and/or other convenient location. The second controller 827 may be positioned to the interior of the light bar 833 or located within the interior of the emergency vehicle or police squad automobile. A power supply such as a battery may be integral to the light bar 833. Alternatively, power may be provided to the components of the second controller 827, second receiver 823, second converter 825, and second LED illumination devices 829 through the use of a removable power cord coupled to a receptacle such as a cigarette lighter, or may be hardwired to the electrical system of the emergency vehicle. The low voltage requirements for the pulsed SIT-TEL LED signaling system does not adversely affect the power parameters for the emergency vehicle. The first signaling device 849 may also include a switch 863 disposed at a convenient location within the interior of the emergency vehicle for activation of the pulsed SIT-TEL LED signaling and/or interrogation system. A scanner 865 may also be coupled to the second controller 827 to facilitate recognition of the wavelength of the pulsed SIT-TEL LED light.

A selection switch 867 may also be coupled to the second controller 827 to regulate the emission of focused optics and/or wide angle directional or non-directional pulsed SIT-TEL LED light signals from the second LED light sources 829. A wavelength switch 869 may also be coupled to the second controller 827 to enable adjustment or change to the wavelength of emitted pulsed SIT-TEL LED light signals. An officer and/or law enforcement personnel may therefore select from an almost infinite variety of visible and/or non-visible light signals. The second controller 827 is preferably additionally electrically connected to a terminal 871 within an emergency vehicle 835 and/or police squad automobile to visually generate information observable on a screen or display by an officer. (FIG. 81.)

Figure 85:
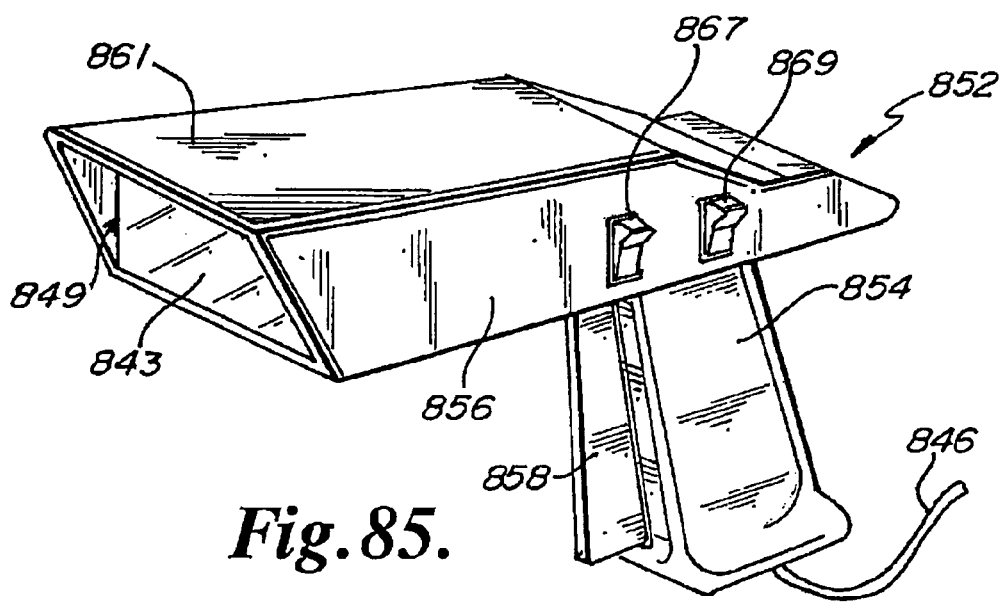
FIG. 85 is a detail alternative view of the hand held pulsed light signaling system.

Alternatively, the second LED illumination device 829 and/or second receiver 823 may alternatively be incorporated into a hand held unit 852 for use in specific targeting of motor vehicles by law enforcement personnel. (FIG. 85.) The hand held unit 852 includes a hand grasping portion 854 and a main body portion 856. A trigger 858 may be included in the handle grasping portion 854. The trigger 858 enables a law enforcement officer to instantaneously and selectively activate the generation of a pulsed SIT-TEL LED light signal from the second LED illumination device 829 to initiate interrogation of a first controller 815 and first receiver 819. The main body portion 856 includes a forward end 861 which is the location of the second LED illumination device 829 and second receiver 823. The second controller 827, second converter 825, and/or battery 845 may be located in either the main body portion 856 and/or the handle grasping portion 854 dependent upon space availability considerations.

Power may be provided to the hand held unit 852 through the use of a battery, power cord, having an adapter for coupling to a cigarette lighter receptacle, and/or directly hard wire connected to the electrical system of a motor vehicle 835.

The handle grasping portion 854 and/or the main body portion 856 may also include a selection switch 867 and/or wavelength switch 869 as earlier described. A scanner 865 may also be integral or connected to the main body portion 856 for identification and recognition of pulsed SIT-TEL LED light signals to be received by the receiver 823. The hand held unit 852 and second LED illumination devices 829 may also generate focused optics and/or a wide angle directional or non-directional pulsed SIT-TEL LED light signals within the visible or non-visible spectrum. The hand held unit 852 is also electrically connected to a terminal 871 within an emergency vehicle 835 and/or police squad to visually generate information observable on a screen by an officer.

The features as earlier identified for the pulsed SIT-TEL LED light signal system as integral to a light bar 833 and/or hand held unit 852 are equally applicable to a stationary unit 873. It is anticipated that a stationary unit 873 is releasably mounted to a dashboard of an emergency vehicle through the use of brackets 875. The stationary unit 873 may be provided with or without a hand grasping portion 854. In one embodiment a handle grasping portion 854 may also be omitted and/or eliminated where the trigger 858, switch 863, select switch 867, and/or wavelength switch 869 are preferably located on the main body portion 856, at a location convenient for manipulation by an officer. A scanner 865 as earlier described may also be integral or releasably coupled to the stationary unit 873. The stationary unit 873 has the capability and flexibility to recognize and emit an almost infinite variety of pulsed SIT-TEL LED light signals. Further, the stationary unit 873 may also be connected and/or releasably coupled to a terminal 871 integral to an emergency vehicle 835 for a visual display of information representative of translated received pulsed SIT-TEL LED light signals.

The license plate 837 and SIT-TEL signaling system may be encapsulated within a protective cover. Alternatively, the rear face of the license plate 837 may be encapsulated to protect the first controller 815, first receiver 819, and first LED illumination sources 803 from damages caused by undesirable moisture, dirt, dust, and/or other foreign particles.

The rapid pulsation of electrical energy through the first LED light sources 803 potentially may generate undesirable excessive heat. A heat sink for the license plate 837 is generally not required because the duration of illumination of a pulsed SIT-TEL LED light signal, is anticipated to be sufficiently short to avoid the build-up of excessive undesirable heat. Alternatively, the license plate 837 and/or light support 801 may function as a heat sink to dissipate heat generated by the first LED light sources 803, during illumination of a pulsed SIT-TEL LED light signal.

The first LED light sources 803 and the second LED light sources 829 are preferably positioned within a culminator and/or a reflector 807 as earlier described. The angle of the interior face of the culminator 807 relative to horizontal, and/or the angle of the reflective face of the reflector 807 relative to horizontal generally imparts a desired amount of focus for the generated pulsed SIT-TEL light signal. The focus of the generated pulsed LED light signal is also impacted by the wavelength selected to be illuminated by the controllers 815, 827 respectively.

A SIT-TEL pulsed light signal is used independently and/or in combination with an observable warning light signal to supplement awareness of an emergency situation. Law enforcement and/or emergency vehicles 835 frequently utilize sirens to warn motorists as to the existence of an emergency situation. Sirens of the past have increased in decibel volume through increases in applied power. In the past, sirens have been operated by application of approximately 68 watts of power. The amount of power to sirens has significantly increased to 200 to 400 watts. The significant increase in power applied to sirens has been partially in response to the manufacture of quieter automobile interiors which has significantly reduced the volume of exterior road noise. In addition, automotive stereo systems have significantly improved, further reducing a motor vehicle occupants ability to hear an emergency siren. Siren volume has therefore increased to a point where unprotected hearing to individuals may cause injury. It is anticipated that the volume of sirens may be required to be reduced necessitating alternative avenues of communication of information related to the existence of an emergency situation. One solution to improve the recognition of the existence of an emergency situation is to position a first receiver 819 within the interior of a vehicle. The location of the first receiver 819 is not critical due to the reflection of the pulsed SIT-TEL LED light signal off the interior windows which will strike the first receiver 819.

It is anticipated that a pulsed SIT-TEL LED light signal may be used in any number of activities to facilitate the performance of law enforcement or emergency duties. The SIT-TEL LED pulsed light signal communication system may be used as an interrogation device upon a targeted motor vehicle. A law enforcement second LED illumination device 829 may be activated via a switch 863 and/or trigger 858 to generate a first SIT-TEL LED pulsed light signal to be received by the first receiver 819 as integral to a license plate 837 and/or located within a motor vehicle. (FIGS. 69–70.) The targeted first receiver 819 then preferably generates an electrical signal to the first converter 821 for transfer to the first controller 815. A responsive message is generated by the first controller 815 for transmission by the first LED illumination sources 803. The responsive pulsed light signal will include a recognizable pattern of pulsed SIT-TEL LED light which may not be observable by the unaided eye. The responsive pulsed SIT-TEL LED light signal will therefore transfer basic information such as make, model, license plate number, status of license tab registrations, driving after revocation, and/or expiration of insurance, for a tagged and/or interrogated motor vehicle. The responsive SIT-TEL signal received by the second receiver 823 of the law enforcement vehicle will be processed by the second controller 827 for coupling to a database and/or microprocessor integral to a terminal 871 within a police vehicle 835. Data therefore may be instantaneously retrieved for display to law enforcement personnel related to the likely occupant and/or criminal and/or driving record of the tagged vehicle without the necessity for an officer to close distance to the suspect vehicle to permit unaided observation of the license plate 837. The speed and ease of access to Department of Motor Vehicle information to aid an officer is therefore significantly enhanced permitting an officer to maintain a desired distance from the targeted vehicle. The use of a pulsed SIT-TEL LED light signal as free space carrier of information eliminates the necessity for a law enforcement vehicle to expend significant economic resources for costly optical aids. The selection of directional or non-directional pulsed SIT-TEL LED signals also permits a law enforcement vehicle to interrogate a significant number and/or virtually all motor vehicles on a roadway to search for a stolen car and/or abduction where time is of the essence to insure safety to an individual. In addition, a passive search may be activated for the pulsed SIT-TEL light communication system to attempt to identify any motor vehicles within a particular class. The electric coupling to a processor integral to a law enforcement vehicle enables an officer to access a database to check for outstanding warrants for an individual. If information is received concerning an individual which would raise a safety concern for the law enforcement personnel then sufficient time is provided to immediately request backup prior to the initiation of a motor vehicle stop.

The pulsed SIT-TEL LED illumination system may also be used to enhance positioning and/or mapping of a travel route for an emergency vehicle 835 by periodic verification of position locators within a geographic area. This feature may be particularly useful in fire safety applications. The pulsed SIT-TEL LED illumination system also provides to law enforcement personnel immediate verification that a correct vehicle has been tagged for interrogation through the issuance of a responsive pulsed SIT-TEL LED light signal for transmission to and receipt by the second receiver 823. The accuracy of law enforcement activities is thereby significantly improved.

The pulsed SIT-TEL LED light signal may also be used as optical pulses to be received by a first receiver 819 to enter a security code for access to a gated community, garage, and/or secure parking lot. In these instances, the second LED illumination sources 829 generate a pulsed SIT-TEL LED light signal for receipt by the first receiver 819 which in turn is coupled to a first controller 815 and a switch to open an otherwise locked gate. The pulsed SIT-TEL LED light signal may also be used by law enforcement and/or highway personnel to modify illuminated highway signs. A second LED light source 829 may generate a coded signal for modification of a stationary illuminated street sign for display of a new message.

The first and second controllers 815, 827, preferably decipher a digitized received pulsed light signal so that appropriate action may be initiated. Further, the pulsed LED lighting system may be used to verify speed and/or separation distance from a stationary second light emitting diode illumination source 829 and second receiver 823.

In an alternative embodiment, a wide angle passive pulsed second SIT-TEL LED illumination signal 829 may interrogate an automobile for return of abbreviated and/or select information such as expired license plate tabs. The initial pulsed SIT-TEL LED light signal may therefore be constructed and arranged to request the provision of specific information related to a motor vehicle.

In an alternative embodiment, the first controller 815 may be electrically coupled to a motor vehicle speedometer. If the motor vehicle exceeds a certain pre-stored speed then the first controller 815 may signal the first LED illumination sources 803 to initially generate an excessive speed signal to be received by a second receiver 823 integral to a law enforcement vehicle 835.

Transportation markers such as road signs and/or mileage signs may include a pulsed SIT-TEL LED signaling device to communicate information to a motor vehicle particularly with respect to location or road detour routes.

Figure 71:
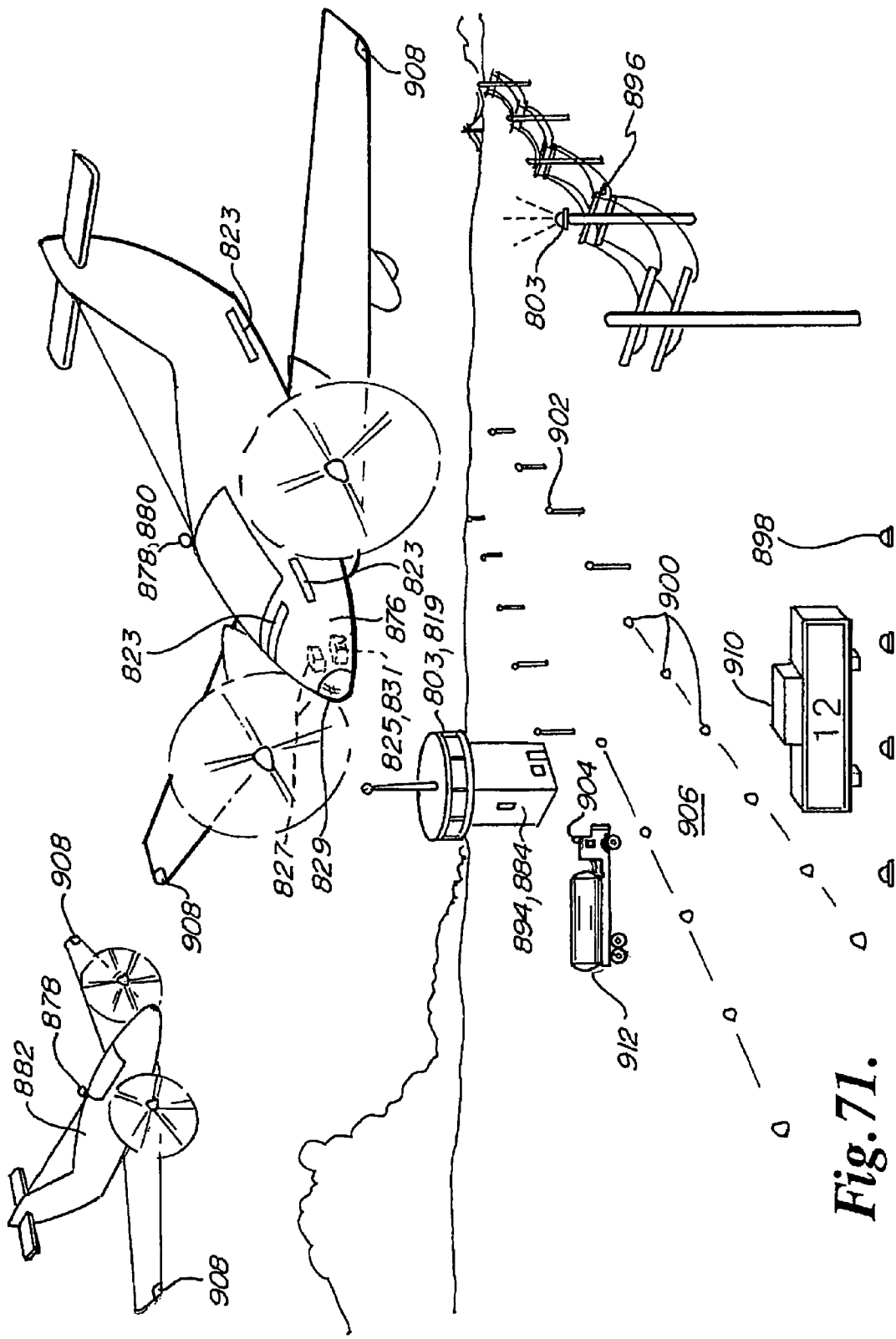
FIG. 71 is an environmental view of an LED SIT-TEL pulsating light signal in an airport environment.

The pulsed SIT-TEL LED light signaling system may also be incorporated into aircraft. (FIG. 71.) A necessity exists for use of the pulsed SIT-TEL LED light signaling system in an aircraft due to the shortage of available radio frequencies and the problems associated with radio frequency communication saturation in air traffic control zones and air traffic interference in controlled air zones. Further, radio interference between geographic areas provides incomplete availability or protection during use of radio frequency air warning systems.

Aircraft anti-collision warning systems are extremely important for pilot and civilian safety. A need exists to supplement known aircraft anti-collision systems with durable, low voltage, and efficient pulsed optic warning systems which are not dependent upon radio frequency communications signals. Some aircraft include transponders for use in anti-collision systems and/or TCAS systems within transponders zones proximate to an airport. Other aircraft may pass through regulated transponder zones where the aircraft does not include anti-collision transponders. The risk of air collision within restricted transponder zones is increased by the existence of non-transponder aircraft. A supplemental air anti-collision warning system is therefore needed especially where the supplemental air anti-collision warning system may be incorporated into the existing aircraft lighting systems at an insignificantly increased incremental expense.

In the past, there has generally been two different versions of TCAS where the first version indicates the bearing and relative altitude of an aircraft within a selected range of approximately 10 to 20 miles of another transponder equipped aircraft. Within this first TCAS system a traffic advisory may be issued to identify the intruding aircraft which may permit the increase or decrease of a planes altitude by up to approximately 300 feet. The initial TCAS system does not provide solutions for air anti-collision avoidance, however, the TCAS initial system provides pilots with important information to initiate a course of action to avoid collision. In a second version of TCAS, a pilot is provided with resolution advisories. This TCAS system determines the course of each aircraft and whether the aircraft is climbing, descending, or flying straight and level. The enhanced TCAS system issues resolution advisories to pilots to execute types of evasive maneuvering necessary to avoid collision. If both aircraft are equipped with the enhanced TCAS system, then the two computers on the respective aircraft offer the conflicting resolution advisories. The non-conflicting resolution advisories prevent course alternations which would effectively cancel anti-collision corrections between the two aircraft which would result in a continued threat.

In the past, aircraft emergency location warning signal systems have been extremely dependent upon the electrical power system of the aircraft. In the event of a power interruption, an emergency locator beacon frequently became inoperable or was required to operate from a limited power source as provided from the aircraft battery. The emergency locator visual beacons of the past frequently required relatively large amounts of current which depleted available battery resources in a short duration of time. A need therefore exists for an emergency locator beacon which is durable and which draws a significantly reduced amount of current to provide extended periods of illumination when the main power source for an aircraft is not available. In addition, an emergency locator beacon for an aircraft is needed where the power source may be rechargeable through the use of solar energy.

The pulsated SIT-TEL LED signaling light system may be incorporated into an aircraft 876. Generally, the pulsated SIT-TEL LED signaling light system will originate from a rotating or flashing beacon 878, which is secured to the exterior of the fuselage of the aircraft 876. The beacon 878, may be fixedly positioned relative to the fuselage and/or adjustably repositionable thereon. Certain aircraft 876, may utilize one or more beacons 878, within the pulsed SIT-TEL LED signaling system. Each beacon 878, is formed of a light support 801, and first LED illumination sources 803, as earlier described. In addition, the first LED illumination sources 803, may be positioned within a stationary panel or may be incorporated within a rotational device 805, as earlier described. Each first LED illumination source 803, is placed within a culminator assembly 807, as earlier described. In the event that a stationary LED light support 801 is utilized within the beacon 878, then a rotatable reflector assembly 809, may be positioned over and/or adjacent to the LED light support 801, to facilitate the appearance of rotation. Alternatively, the LED illumination sources 803, may be selectively illuminated by the first controller 815, to provide and impart the appearance of rotation for the beacon 878. The LED light support 801, may be organized into sectors 811, of individual LED illumination sources 803, having different wavelengths of emitted light as earlier described.

The beacon 878, used in conjunction with an aircraft 876, is a replacement illumination source which provides the additional feature of a pulsed SIT-TEL LED optical signaling system which may be generated at the same time as the emission of a visible light signal from the beacon 878. The beacon 878, may therefore, incorporate dual functionality of a visible illumination source and a nonvisible pulsed signaling system for transmission of information between the first LED illumination sources 803, and a second removed receiver 823.

The LED light support 801, as used as a component of the beacon 878, may preferably be cylindrical, octagonal, hexagonal, square, rectangular, and/or oval. In addition, the LED light support 801, may be formed of flexible circuit boards as earlier described herein. The first LED illumination sources 803, may be formed of an infinite variety of colors and/or wavelength patterns to facilitate transmission of pulsed SIT-TEL LED light signals. The beacon 878, may also incorporate a strobe illumination source 880, which functions as an anti-collision warning light signal for an aircraft 876. The beacon 878, strobe warning light 880, first LED illumination sources 803, and any rotational device 805, are in communication with the first controller 815, which is constructed and arranged to provide modulated light intensity to the first LED illumination sources 803. The modulated light intensity is provided to the first LED illumination sources 803, may increase or decrease the voltage or duty cycle applied to brighten or dim illumination from the beacon 878, at a predetermined rate. Additionally, the first controller 815, regulates the rate of pulsation of the first LED illumination sources 803, during the generation of a pulsed SIT-TEL LED light signal.

The beacon 878, and/or strobe light signal 880, is designed to supplement and/or replace existing aircraft lighting systems by substituting LED technology for conventional lighting sources. The first controller 815 is constructed and arranged to continue to offer enhanced light signals and/or any other desired type of lighting signal for use in association with an aircraft 876.

Enhanced flexibility is provided to an aircraft 876, lighting system through the adjustment of the duration of the duty cycle for the first LED illumination sources 803 for a pulsation rate which was previously unavailable and unknown for use in association with aircraft 876, and conventional light sources.

Traditionally, the beacon 878, emits a light source having a red wavelength. The port wing of an aircraft 876, also traditionally emits a red light source. The starboard wing of an aircraft 876, traditionally emits a green light source. The fuselage of an aircraft 876, traditionally emits a white light source. A white light source is generally utilized for landing, ground, and/or taxi lights for an aircraft 876. The port and starboard wing, fuselage, and landing, ground, and/or taxi lights may be LED illumination sources 803, which in turn may be utilized as a portion of the pulsated SIT-TEL LED signaling system for an aircraft 876. In addition, the beacon 878, strobe, port and starboard wings, fuselage, landing, taxi, and/or ground lights may be incorporated within filters and/or other devices to emit a polarized directional optical light signal.

The pulsated light signals as emitted from the first LED illumination sources 803, and regulated by the first controller 815, may be either encoded and/or encrypted for receipt by the second receiver 823, located at a remote position relative to the aircraft 876. The pulsed SIT-TEL LED illumination signals as generated by the first LED illumination sources 803, communicate information as to the identity of the aircraft 876, and/or the position of an aircraft 876, relative to an obstacle and/or tower.

Generally, an observable light signal may be generated from the first LED illumination sources 803, as an anti-collision light source, at a rate of 20 to 60 cycles per minute. A non-observable pulsated light source may be generated by the first LED illumination signals 803, at a rate of 80 hertz and preferably 100 hertz or greater. The pulsed SIT-TEL LED light signal as transmitted by the first LED illumination sources 803, may be prerecorded, processed, and/or converted in real time where a combination of pulsed sequences represents characters, words, and/or numerals for communication of information via a pulsed light signal.

An operator may select from a number of pre-stored pulsed light combinations representative of information to be communicated via the first controller 815. Alternatively, real time communications may be transmitted by pulsed light signal via the use of a keyboard or voice activated system where the controller 815, translates the information into combinations of pulsed light signals for transmission to a second receiver 823. A second receiver 823, preferably receives the generated pulsed LED signals for initial processing and for transfer to a second controller 827, for communication to an individual or system.

The first controller 815 is also constructed and arranged to continue communication of pulsed light signals containing information such as call sign, type, destination, flight plan, and/or other pre-programmed information following an incident or mishap for an aircraft 876.

The first controller 815, is programmed to include a sufficient level of sophistication to eliminate recognition of false light signals which may occur from a source such as sunlight in analyzing and transmitting pulsed LED light signals. The controller 815 may also include a handshake protocol to assist in recognition of a pulsed SIT-TEL LED light signal. The handshake protocol may include an alternating pre-set pattern of ultra high speed pulsating SIT-TEL LED light signals of the same or different wavelengths as may be transmitted in a pre-determined and recognizable combination prior to the transmission of information between a first controller 815, and a second receiver 823. The second controller 827, is preferably constructed and arranged to search for and focus upon pre-set patterns of pulsed SIT-TEL LED illumination signals to finalize the handshake recognition protocol for elimination of interference light signals. The controller 815, may also include any number of filters which may be manipulated by a pilot for attachment to the first receiver 819, for elimination of undesirable light signals.

The pulsed LED signaling light system for use in association with an aircraft 876, preferably augments any available TCAS system. All aircraft may be conveniently converted for generation of a pulsed SIT-TEL LED light signal. The wavelength emitted in association with the pulsed SIT-TEL LED light signal may be in the visible and/or non-visible spectrum and include wavelengths in the infra-red and ultra-violet regions. Further, the pulsed SIT-TEL LED signaling light system may function as a backup to radio frequency transmissions utilized for anti-collision warnings. The pulsed SIT-TEL LED signaling light system in association with an aircraft 876, fulfills FAA requirements of aircraft identification and collision avoidance and may continuously optically transmit a required light signal while simultaneously communicating information and/or a message within an encoded pulsed SIT-TEL LED light signal.

The pulsed SIT-TEL LED light signal system may also be used in an airport air traffic environment for VFR pattern verification and control. The pulsed SIT-TEL LED signal light system may additionally function as a backup to the transponder of the anti-collision TCAS system.

The pulsed SIT-TEL LED signal light system in association with an aircraft 876, may be utilized to verify position, provide aircraft identification and guidance, act as a proximity warning or anti-collision indicator while simultaneously providing illumination as a rotating beacon, obstruction illumination and clearance light, taxi or ground lights, and/or wing or fuselage illumination sources.

The first controller 815, is positioned onboard proximate to the control panel of an aircraft 876, for regulation and transmission of information and/or data via the first LED illumination sources 803. The controller 815, receives converted pulsed SIT-TEL LED light signals for processing to communicate information to a pilot and/or air traffic controller. The controller 815 preferably regulates the transmission of data via pulsed SIT-TEL LED light signals for transmission to other aircraft and/or tower optical receivers 823. The initiation of the pulsed SIT-TEL LED signaling light system may occur at any time as selected by a pilot. Alternatively, the emission of pulsed SIT-TEL LED light signals may be continuous.

The LED support 801, as used within the stationary beacon 878, may include any number of individual first LED illumination sources 803, each having a different wavelength. Within the LED support 801, individual first LED illumination sources 803, may be collected within a specific region and/or sector 811 and controlled as a group by the controller 815. Any number of collections, groups, and/or sectors 811 of first LED illumination sources 803 may be provided where each collection, group, and/or sector 811 is constructed and arranged to provide either a different and distinct warning light signal and/or a different and distinct pulsed SIT-TEL LED light signal. In addition, the controller 815, is preferably constructed and arranged to selectively illuminate individual first LED illumination sources 803, and/or different sectors 811 for the provision of any desired combination of warning light signals and/or pulsed SIT-TEL LED light signals. The controller 815, may therefore transmit more than a single warning light signal and more than one pulsed SIT-TEL LED light signal simultaneously.

A second aircraft 882, and/or ground location 884, may have one or more second receivers 823, where one of said second receivers 823, is constructed and arranged to receive a SIT-TEL light signal as generated from each group and/or sector 811 of LED☐s 803. A second receiver 823, and second controller 827, maybe constructed and arranged to simultaneously receive any number of transmitted pulsed SIT-TEL LED light signals. The second controller 827, is constructed and arranged to collate, decode, translate, and organize the simultaneously received pulsed SIT-TEL LED light signals into a composite decoded message.

The speed of transmission and receipt of pulsed SIT-TEL LED light signals enables messages to be encrypted to provide for the secure transmission of information for receipt by a ground location 884, and/or second aircraft 882. The speed of pulsed SIT-TEL LED light signals may exceed two kilohertz. The most readily apparent limitation on the transmission of encrypted messages relates to the size of the one or more second receivers 823, for receipt of encrypted pulsed SIT-TEL LED light signals. The second controller 827, may also include any desired passwords or verification messages to insure the validity of receipt of secure transmissions. Communication of pulsed LED light signals may be terminated by a first controller 815, at any time when an initial and/or periodic required responsive pulsed SIT-TEL LED light signal is not received by the first receiver 819, and/or the accuracy of the received SIT-TEL LED light signal is not verifiable.

Any number of first controllers 815, and/or second controllers 827, may be interconnected and/or coupled for transmission and receipt of pulsed SIT-TEL LED light signals. Further, independent controllers 815, and/or 827, may be assigned to transmit and/or translate a portion of a composite pulsed SIT-TEL LED light signal. Security is thereby enhanced due to the partial receipt of a secure transmission by an individual controller 815, 827.

The second receivers 823, may be assembled in any array integral to a support 801, and/or removably positioned therefrom. In one embodiment, a circular and/or octagonal array, may be proximate to, or integral with, the light support 801. Each array includes at least one second receiver 823, on each face of the octagonal array. Alternatively, a plurality of second receivers 823, may be adjacent to each other about the circumference of a circular array.

Each array of second receivers 823 is interfaced within an aircraft 876 TCAS anti-collision system for detection of pulsed SIT-TEL LED light signals. It is desirable to determine whether a transmitted pulsed SIT-TEL LED light signal is occurring in a crossing direction relative to the array, where the transmitted SIT-TEL LED light signal is sequentially detected and/or tracked by adjacent second receivers 823. If sequential detection by the second receivers 823, occurs, then a second aircraft 882, is pursuing a crossing pattern relative to the first aircraft 876, minimizing risk of collision. Alternatively, if a single second receiver 823, or group of receivers 823, continuously receives a pulsed SIT-TEL LED light signal and no sequential tracking is detected, then it is likely that the second aircraft 882, is on a constant bearing decreasing range course necessitating an anti-collision warning. A visual and/or audible alarm may be provided by the second controller 827, in the event that the second receivers 823, and/or group of second receivers 823, continuously receive a transmitted SIT-TEL LED pulsed light signal for a period of time exceeding approximately three to five seconds. The second controller 827, may be programmed to include any desired period of time as a threshold prior to triggering of the visual and/or audio warning within the aircraft TCAS system advising of a constant bearing decelerating range second aircraft 882.

Figure 84:
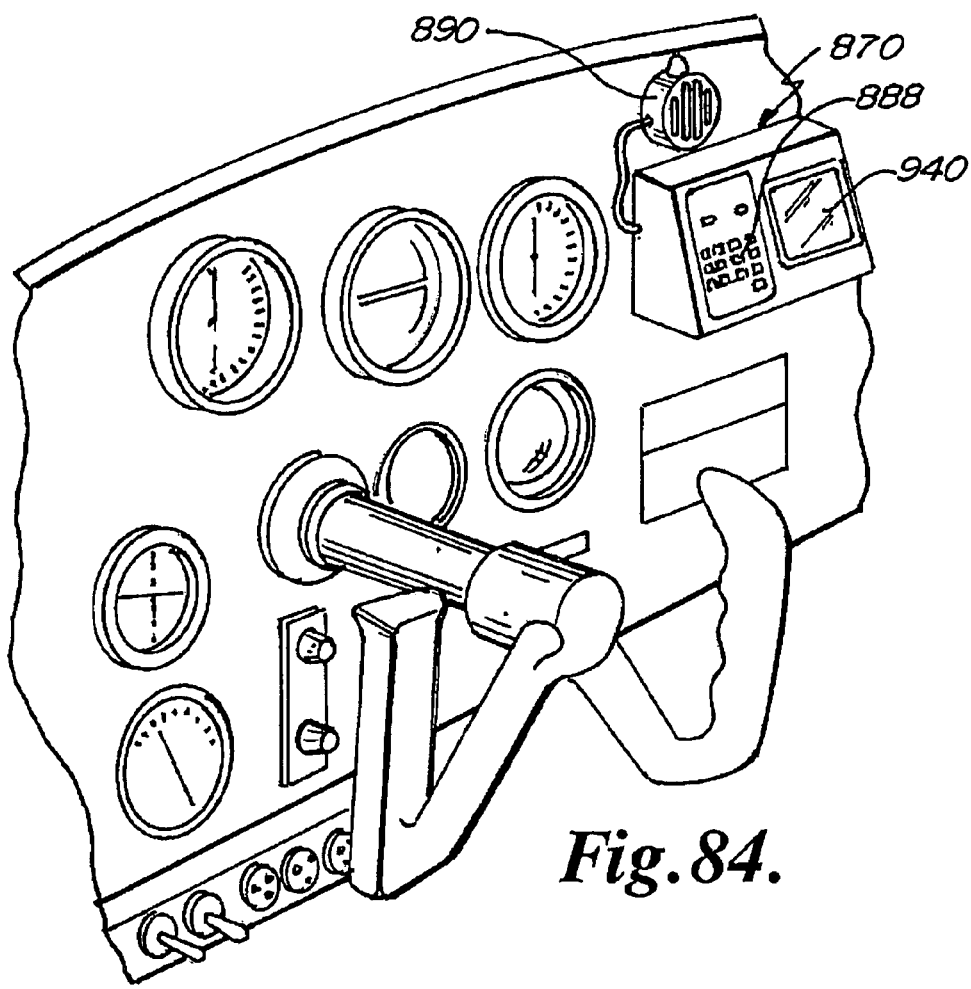
FIG. 84 is an environmental view of the controller of the pulsed light signaling system within the cockpit of an aircraft.

The second controller 827, may include wavelength selection devices such as dials and/or scanners 831 to continuously search for transmitted pulsed SIT-TEL LED light signals. Alternatively, the second controller 827, may be coupled to a key pad 888, which may be used by a pilot to select an individual wavelength for a pulsed SIT-TEL LED light signal. (FIG. 84.) Alternatively, each of the second receivers 823, may be sensitive for receipt of pulsed SIT-TEL LED light signals having different wavelengths. The second receivers 823, preferably are flexible to receive a pulsed SIT-TEL LED light signal whether wavelength specific and/or source sensitive.

The alarm 890, triggered by the second controller 827, may advise a pilot by reciting terms such as ☐warning☐ and may further provide a direction of the received signal to initiate investigation to avoid collision. In this embodiment, the individual second receivers 823, are each associated with a pre-stored site within the second controller 827. The receipt of a pulsed SIT-TEL LED light signal may therefore be traced by the second controller 827, to a second receiver site 823, to indicate the general direction of the source of the pulsed SIT-TEL LED light signal to enhance investigation by a pilot. Each second receiver 823, may be assigned a different site especially when two or more arrays, are utilized on an aircraft 876.

In general, the beacon 878, strobe light source 880, and/or aircraft lighting system receive power from the main power source for an aircraft. In addition, the beacon 878, strobe light source 880, and/or aircraft lighting system may be coupled to a backup battery or power source, transported within the interior of the aircraft 876. The backup battery source, may additionally include a rechargeable feature through the use of a solar power cell.

In the event of an emergency survival situation frequently the main power supply for an aircraft 876, is unavailable to provide power to a beacon 878, position lights, strobe 880, and/or aircraft lighting system. In this instance the battery for the aircraft may be utilized to provide power to the LED beacon 878, strobe 880, and/or aircraft lighting system to continue to provide illumination to identify the coordinates and/or location of the aircraft 876. The reduced power and/or current requirements for the LED beacon 878, position lights, strobe 880, and/or aircraft lighting system prolong the useful life of the aircraft battery to approximately two to three days. A backup battery transported within the interior of the aircraft 876, may then be coupled to the beacon 878, strobe 880, and/or aircraft lighting system to provide power once the main aircraft battery has been depleted. The backup battery is then anticipated to provide power to the beacon 878, strobe 880, and/or aircraft lighting system for an additional period of time of approximately two to three days prior to recharge. The inclusion of a solar cell may enable continuous recharge of the second battery for provision of power to the beacon 878, strobe 880, and/or aircraft lighting system.

The rotating beacon 878, strobe 880, and/or aircraft lighting system may be encased within waterproof enclosures to facilitate continuous operation in adverse conditions. In addition, the beacon 878, strobe 880, and/or aircraft lighting system may further be coupled to an accelerometer which senses aircraft 876, deceleration rates beyond expected parameters. An accelerometer activates the emergency beacon and may initiate a pulsed SIT-TEL LED light signal of preprogrammed information related to aircraft call sign, type of craft, and destination once an unacceptable deceleration rate is detected. The transmission of pulsed SIT-TEL LED light signals thereby augments the current emergency locator transmitter signals for identification of the location of a downed aircraft 876.

The systematic information transfer through encrypted/pulsed light (SIT-TEL) system may also be incorporated into an airport tower 894, and/or obstacle 896, such as a power line support tower and/or radio tower. In the past radio and/or power line towers have used rotating red light beacons having traditional illumination elements such as halogen lamps and/or gaseous discharge xenon lamps to warn air traffic. Power is generally provided to the rotating beacons through a hardwired electrical source. In the past, the traditional illumination sources have not included a long life span, have required large amounts of power to operate, and have been difficult to maintain. In addition, the rotating warning beacons as known frequently did not have a backup power supply in the event of power interruption such as may occur during or immediately following a storm.

The systematic information transfer through encrypted/pulsed light (SIT-TEL) system as engaged to an airport tower 894, and/or obstacle 896, is formed of a light support 801, having first LED illumination elements 803, as earlier described. The light support 801, may be attached to a rotational device 805 for rotation where the light support may include rotational reflectors 809, as earlier described. Alternatively, a controller 815, may provide modulated light intensity in association with selective illumination of first LED light sources 803, to generate the appearance of rotation.

The SIT-TEL system as engaged to either an obstacle 896, and/or a tower 894, may therefore provide a warning light signal, a plurality of singular and/or combination of warning light signals, and/or a plurality of independent and/or simultaneously pulsed light signals at different wavelengths for transmission and communication of information to an aircraft 876.

The SIT-TEL system as engaged to an airport tower 894, and/or to an obstacle 896, such as a radio tower may be hardwired to a suitable power source. In addition, the SIT-TEL system may include a backup power supply such as a battery.

The SIT-TEL signal as generated from a tower 896 and/or obstacle 896 may carry signals representative of characters, numerals, and/or words in a free space transmission. The generated pulsed SIT-TEL signals may be utilized for aircraft identification, anti-collision warnings, relay atmospheric conditions, aircraft guidance, and illumination. Generally, the SIT-TEL light sources utilized in association with a tower 894, and/or obstacle 896, are red in color relating to a preselected wavelength in accordance with FAA regulations.

The controller 827, as included within an aircraft 876, may include voice recognition/activation software which may interpret received digital impulses for conversion to audible voice messages to be emitted from a speaker integral to the cockpit. The controller 827, preferably interprets pulsed LED light signals received from the second receiver 823, for transmission of alarms such as noises, lights, and/or voices to a pilot related to air obstacles 896.

An aircraft 876, may further include the second LED illumination sources 829, for transmission of the SIT-TEL light signals to the first receiver 819, integral to the obstacle 896, and/or tower 894. The first controller 815, may receive and process a reply message from the second controller 827, to record data such as the aircraft identification, time, and date. In addition, the plurality of first receivers 819, set at different wavelengths may be used. The modulated reduced duty cycle at certain LED wavelengths may function as a distance indicator relative to the obstacle 896. For example, a first wavelength may be selected where a successful handshake protocol between the first LED illumination sources 803, and the second receivers 823, and the return signal from the second LED illumination sources 829, for receipt at the first receivers 819, indicate an approximate first distance of three miles between the aircraft 876, and the obstacle 896. A selected different wavelength emitted from the first LED illumination sources 803 at a reduced modulated duty cycle as regulated by controller 815, may be recognized by the second receivers 823, only when the distance between the obstacle 896, and the aircraft 876, has been reduced to a distance of two miles or less. The successful handshake protocol related to the second wavelength emitted by the first LED illumination sources 803, indicates that the aircraft 876, has closed distance with respect to the obstacle 896, by approximately one mile.

Additionally, many features may be included within successive wavelengths to warn the second controller 827, and aircraft 876, as to the proximity to a hazard and/or obstacle 896. The warnings may be audible alarms, visual LED lights, and/or voice signals. A number of wavelengths may be selected for emission from the first LED illumination sources 803, and modulated and successively reduced duty cycle to function as distance indicators relative to an obstacle 896. In addition, for each successive pulsed LED light signal at a specific wavelength having reduced duty cycle, the warning message included within the pulsed LED light signal may incrementally escalate. For example, the three mile warning may be relatively passive. The two mile warning may be more severe in flashing lights and buzzing audible signals. The two mile warning may also transmit to a pilot harassing warning signals and the one mile warning may be quite obnoxious. In addition, each successive wavelength having reduced modulated duty cycle intensity for the first LED illumination sources 803, may be set at a different repetitive cycle. For example, the three mile warning signal may repeat every 15 seconds. The two mile warning signal may repeat every seven seconds, and the one mile warning signal may continuously repeat.

The first controller 815, may be programmed to receive a first handshake protocol related to the three mile pulsed LED signal. The first controller 815, may then trigger the initiation of the second reduced modulated duty cycle wavelength LED light signal from an alternative sector 811 as compared to the first LED warning light sources 803, within the support 801, corresponding to the two mile warning. The controller 815, upon recognition of a second handshake protocol related to the second wavelength may then initiate transmission of the third reduced modulated duty cycle wavelength LED light signal from another alternative sector 811 of the first LED light sources 803 within the support 801, corresponding to the one mile warning.

The method for warning an aircraft 876 as to the existence of an obstacle 896, may initiate by the continuous emission of a first warning pulsed LED light signal at a first wavelength from a sector 811 or portion of an LED light support 801, by the first LED illumination sources 803 integral to the obstacle 896.

The first warning pulsed LED light signal is received by the second receivers 823, integral to an aircraft 876, where the second controller 827, upon receipt of the first warning pulsed LED light signal at the first wavelength initiates transmission of a first responsive pulsed LED light signal at the first wavelength to be received by the first receivers 819, of the obstacle 896.

The first controller 815, connected to the first receivers 819, upon receipt of the first responsive pulsed LED light signal continues to transmit at a regular interval the first warning pulsed LED light signal at the first wavelength. In addition, the first controller 815, generates continued recognition signals by issuance of a first acknowledgment pulsed LED light signal for receipt by the second receivers 823, integral to the aircraft 876. In addition, the first controller 815, may initiate the transmission of a second warning pulsed LED light signal at a second modulated reduced duty cycle and second wavelength, from a different sector 811, or portion of LED support 801.

At such time as aircraft 876, has closed to a distance sufficient to detect the second warning pulsed LED signal by a second set of second receivers 823, the second controller 827, initiates transmission of a second responsive pulsed LED light signal at the second wavelength to be received by another set of first receivers 819.

The alternate set of first receivers 819, may then detect the second responsive pulsed LED light signal from the second controller 827. The first controller 815, continues to transmit at a regular reduced time interval the second warning pulsed LED light signal at a second wavelength. In addition, the first controller 815, generates continued second acknowledgment pulsed LED light signal. The first controller 815, may also emit a third warning pulsed LED light signal at a third modulated reduced duty cycle and third wavelength, as compared to the first and second sectors 811 and wavelengths of the light support 801.

At such time as the aircraft 876 has closed to a distance sufficient to detect the third warning pulsed LED light signal by another set of second receivers 823, the second controller 827, initiates the transmission of a third responsive pulsed LED light signal at the third wavelength.

The issuance of successive warnings and responsive pulsed LED light signals may occur until such time as a compliance signal is generated by the second controller 827, indicating alteration of course of the aircraft 876. The first controller 815, may simultaneously emit three or more warning pulsed LED light signals for detection by the aircraft 876. Further, the first controller 815, may alter the visual warning light signal as integral to the rotating beacon 878, and/or strobe 880, for generation of a faster and/or more versatile observable warning light signal at such time as the controller initiates transmission of the second or third warning pulsed LED light signals.

The controller 815, may also transmit by pulsed LED light signal continuous information such as the coordinates identifying the location of the obstacle 896. Further, the controller 815, may transmit by pulsed LED light signal atmospheric information and/or aircraft navigation guidance information which may be useful to a pilot of an aircraft 876.

Real-time transmission of information may occur between a second controller 827, and a first controller 815, by the exchange of pulsed LED light signals. The interrogation pulsed LED light signal generated by a second controller 827, of the aircraft 876 may trigger a transmission of a pulsed LED light signals from the first controller 815, as to current air traffic proximate to a tower 894, wind direction, wind speed, visibility, ceiling, and/or weather conditions or other information which may be useful to a pilot. Real-time information received from the second controller 827, may be processed for visual display on a screen integral to a cockpit. (FIG. 84.) Alternatively, real-time information received by the second controller 827, may be processed for generation of voice information and instructions by transmission through a speaker integral to a cockpit or through headphones.

An aircraft 876, obstacle 896, and/or tower 894, may include more than one LED light support 801, for simultaneous generation of one or more warning light signals or SIT-TEL signals. Each light support 800 801, may be connected to an independent first controller 815, for generation of independent pulsed LED light signals. A pilot may select a particular wavelength of pulsed LED light signals for receipt of a particular type of information. For example, a first wavelength may include warning information as to the coordinates or location of an obstacle 896. A second wavelength may provide air traffic control information. A third wavelength may provide information as to weather and a fourth wavelength may provide navigation guides. A pilot may therefore receive different types of information from more than one light source 801, and first controller 815, as integral to a tower 894, and/or obstacle 896.

The systematic information transfer through encrypted/pulsed light (SIT-TEL) systems may also be used to transmit approach and/or position information to an aircraft 876. An acknowledgment protocol as earlier described may be used between an aircraft 876 and/or tower 894 to facilitate landing. The SIT-TEL system may communicate a visual reference descent point identifying a position at which the aircraft 876, may or may not leave the constraints of the published approach vector for an airport. The SIT-TEL system may also communicate a wave-off or abort point based upon tracking of approach vectors for aircraft 876 which are beyond acceptable parameters. In both these situations, a SIT-TEL signal may be instantaneously generated by a first support 801, and first LED light sources 803, integral to a tower 894, for receipt by second receivers 823, and second controller 827, integral to the aircraft 876. The generated SIT-TEL signal will cause the second controller 827, to issue an audible, visual, and/or oral alarm or warning to a pilot during landing approach activities. An acknowledgment protocol may then be transmitted by the second LED illumination sources 829, for receipt by the first receivers 819, integral to the tower 894. The SIT-TEL system used in association with approach landing activities for an aircraft 876, are supplemental to the communication systems of VHF, UHF, and TCAS proximity warning. Real-time flight information may also be exchanged between the aircraft 876, and the tower 894, related to the aircraft identity, flight plan, altitude, direction, rate of descent, and wind direction, wind speed, ceiling, instrument approaches, visibility, traffic conditions, landing clearance, as well as other types of aircraft landing information.

The systematic information transfer encrypted/pulsed light signal (SIT-TEL) system may additionally be utilized in conjunction with airport taxi lights 898, runway lights 900, runway approach lights 902, and airport support vehicle lights 904.

A plurality of taxi lights 898, may be positioned adjacent to an airport and runway 906. The taxi lights 898 are generally blue in color and are normally attached to a post support. Proximate to each taxi light 898, is located a marker 910 which identifies the location of a particular taxi light 898 for reference by a pilot during taxiing and/or radio communications with a control tower 894. The taxi lights 898, as known assist in identification of the position of an aircraft 876, on the ground and function as a reference for aircraft 876, taxiing to a gate for docking or from a gate in anticipation of departure and/or takeoff.

The SIT-TEL system used in conjunction with taxi lights 898, involves the transmission of a pulsed light signal from a beacon 878, attached to the top and/or bottom of the fuselage of an aircraft 876. Alternatively, the wing lights 908, for an aircraft 876, may be adapted to include a support 801, having a plurality of first LED light sources 803, for the SIT-TEL signaling system. The wing lights 908, and/or beacon 878, continuously operate to provide constant and/or flashing or rotational illumination 30 relative to an aircraft 876.

The SIT-TEL system as utilized in association with a plurality of taxi lights 898, generally places a second LED light support 801, having the second LED light sources 829, and second receivers 823, integral to a marker 910, where each marker 910 is positioned proximate to and is regularly spaced along an airport taxi way. Each taxi light 898, may be powered by a hardwired electrical source and/or connected to a battery which may be rechargeable. Each taxi light 898, second illumination source 829, and/or second receiver 823, is also electrically connected to a second controller 827, which may be separated from the taxi lights 898, at a central location. A second converter 825, may be coupled to the second controller 827, for conversion of electrical signals from the second receiver 823, to digital signals, for processing within the second controller 827. The second controller 827, is constructed to pass information to a control center and/or control tower 894, by optical pulsed light within the SIT-TEL system or via wire connections. More than one controller 827, may be in communication with a single and/or group of taxi lights 898.

The taxi lights 898, as a portion of the SIT-TEL system may be organized into patterns and/or groups. Each collection, pattern, and/or group of taxi lights 898, may be in electrical communication with one or more second controllers 827. Further, a second controller 827, may be in communication directly with a control tower 894, or an additional main controller to facilitate transfer of information through transmission of free space pulsed LED light signals. The SIT-TEL signaling system utilized in association with a plurality of taxi lights 898, is designed to facilitate the tracking of aircraft 876, on the ground as on or adjacent to a runway 906, and/or airport. Tracking is accomplished through the transmission of a pulsed light signal from the beacon 878, and/or aircraft lighting system. Alternatively, the SIT-TEL signaling system may be transmitted through the wing lights 908, taxi or recognition lights of the aircraft. The beacons 878, and/or wing lights 908, continuously emit a visual signal to identify the aircraft 876 where relative positioning of the aircraft may be determined.

A first controller 815, may generate through SIT-TEL signals identification information and/or call signs for an aircraft 876. This pulsed LED light signal may be detected by a second receiver 823 integral to one or more of the taxi lights 898. Each taxi light 898 forwards the received pulsed LED light signal to a second controller 827 for relay of information related to the existence of an aircraft 876, and the aircraft 876 call sign or identification to a main controller or tower 894. Each taxi light 898, also transmits to the control tower 894, a pulsed LED light signal which identifies, the location of the individual taxi light. The location of the aircraft 876, relative to the taxi way may therefore be established. Alternatively, the taxi lights 898, may be electrically connected to a second controller 827, and the second controller 827, may be electrically connected to the tower 894, through the use of cable and/or wires for transmission of information therebetween.

Traffic controllers within the control tower 894, may therefore be provided with real-time positioning of an aircraft 876, taxiing adjacent to a runway 906, without reliance upon radio frequency communications.

A recognition protocol may be utilized for the transmission of encrypted pulsed LED light signal messages to insure the security and verification as to the accuracy of communications between an aircraft 876, and a tower 894. Further, the existence of a recognition protocol assists to filter out background or other light noise signals.

A tower 894, may contact a second controller 827, for activation of a selected taxi light 898, to transfer a desired pre-stored and/or real-time SIT-TEL pulsed light signal from second illumination sources 829, for transmission to the first receivers 819, integral to the aircraft 876. Traffic regulation signals such as delay gate departure, remain in a stationary position relative to the taxi way, or proceed to the end of the runway may occur without the need for radio frequency transmissions. The SIT-TEL system as incorporated into taxi lights 898, and/or interfaced to an aircraft 876, improves the safety of ground travel of aircraft 876, aircraft personnel, and travelers by identifying in real-time the exact location of an aircraft 876, relative to a taxi way and/or runway 906.

The taxi lights 898, may include one or a plurality of second illumination sources 829, having different wavelengths of emitted light. A taxi light 898, may therefore simultaneously generate one or more of a plurality of SIT-TEL signals for receipt by a tower 894, and/or an aircraft 876. In addition, the taxi lights 898, may include one or a plurality of second receivers 823, to recognize, detect, and/or receive different wavelengths of transmitted SIT-TEL signals.

The systematic information transfer through encrypted/pulsed light (SIT-TEL) system may also be included as an integral component of a runway 906, lighting system. The runway lighting system includes the same LED transmission and receptor components as earlier described in association with the taxi lights 898, and/or aircraft 876. The runway lights 900, and lighting system also includes one or more second controllers 827, which are in communication with individual runway lights 900, a tower 894, and/or an aircraft 876.

The runway lights 900, are regularly spaced along and are positioned adjacent to a runway 906. The runway lights 900 simultaneously provide illumination of a runway 906, and transmit SIT-TEL signals either through free space transmissions and/or through the use of traditional wire or cables to a control tower 894. The runway lights 900, may additionally transmit SIT-TEL signals through free space transmissions to an aircraft 876.

The runway lights 900, through the use of SIT-TEL transmissions indicate the presence and location of an aircraft 876, relative to a runway 906. The runway lights 900, may transmit SIT-TEL signals to an aircraft 876, to advise of departure clearance and/or holding status in real-time. The aircraft 876, includes first receivers 819, and first controller 815, for receipt of transmitted real-time SIT-TEL signals and for acknowledgment of receipt of SIT-TEL instructions. The controller 815, is in communication with a screen display, audio alarm, visual lights, and/or voice generation software and equipment within a cockpit as earlier described.

The runway lights 900, may emit a desired color or type of light signal. For example, in an aircraft hold situation, the second controller 827, may flash a portion of the runway lights 900, in a different color such as red to communicate that takeoff clearance has been delayed. The runway lights 900, and particularly the second receiver 823, and second controller 827, may receive this instructions through the use of a SIT-TEL signal generated by the LED illumination sources of a tower 894.

The second controller 827, coupled to the runway lights 900, may initiate the transmission of preprogrammed SIT-TEL messages to either the tower 894, or to a an aircraft 876, according to a preprogrammed cycle. For example, a runway light 900, may alternatively transmit through an SIT-TEL communication the position of an aircraft 876, and aircraft identification, where the next SIT-TEL signal transmitted is a repeat of the instructions received from the tower 894, to delay departure along a runway 906. Any number and/or combinations of real-time and/or preprogrammed communication messages may be transferred between an aircraft 876, runway light 900, and control tower 894. A pilot may also transmit preprogrammed information to either the runway lights receiver, and/or the tower 894, through the first LED illumination sources 803, and first controller 815.

The SIT-TEL communication system may be incorporated into runway approach lights 902. Initially, the illumination sources for the runway approach lights 902, will be required to upgrade and replace traditional illumination elements with LED technology. The upgraded approach lights 902, will include a light support 801, second LED illumination sources 829, second receivers 823, and second controller 827. The first controller 815, first LED illumination sources 803, and first receivers 819, are integral to an aircraft 876. The features and functions as earlier described related to the taxi lights 898, and/or runway lights 900, are equally applicable to the runway approach lights 902.

The runway approach lights 902, provide illumination as visual strobe lights indicating a correct approach for a runway 906. A second controller 827, may therefore regulate a portion of the LED light support 801, to emit a visual strobe signal while another part of the LED support 801, may be utilized for SIT-TEL communications with either a descending aircraft 876, and/or a tower 894. The runway approach lights 902, may function as a transmission source for the intermediate relay of real-time information and/or instructions to a descending aircraft 876, proceeding on an approach vector for landing on a runway 906.

The tower 894, may track an approach vector for an aircraft 876, through radar/VFR air traffic control systems. As a backup to the radio frequency communications, duplicate instructions may be transmitted by the approach lights 902, for receipt by the first receivers 819, integral to the aircraft 876. Simultaneously, an airplane 876, may transmit SIT-TEL pulsed signals identifying the call sign or identification for the airplane 876, and information related to vector, rate of descent, speed, and altitude in real-time for transfer by the approach lights 902, to the control tower 894. A computer/processor may receive data communicated by the SIT-TEL LED pulsed light system for verification of acceptable approach parameters. Analysis of the aircraft approach may result in the transmission through radio frequency and SIT-TEL signals of an abort approach message due to the existence of unacceptable approach parameters. Alternatively, a tower 894, may transmit through the approach lights 902, by issuance of radio frequency and/or SIT-TEL communications, a warning that approach parameters for an aircraft 876 are required to be modified for a successful landing. The approach lights 902, may alternatively continuously transmit through emission of SIT-TEL communications information such as wind direction, wind velocity conditions, weather information, runway status, ceiling information, and/or other information as appropriate to facilitate landing of the aircraft 876. Alternatively, the approach lights 902, may transmit through emission of SIT-TEL signals a backup transmission to an aircraft 876, advising of an emergency situation to break-off an approach for a runway 906.

The approach lights 902 have the flexibility to transmit SIT-TEL communication signals at different wavelengths either individually or simultaneously in conjunction with a plurality of visually different, distinct, or combination types of visual warning or illumination light effects.

The approach lights 902, as regulated by the second controller 827, may also alter a pattern of strobe or other illumination for an approach to a runway 906. The alteration of a pattern of illumination for the approach lights 902, and/or the color of the transmitted light, may function as an additional visual warning to an aircraft 876, positioned upon or approaching a runway 906. The alteration of a standard white strobe approach signal to a light signal of a different color or wavelength, and the change of the stroboscopic or interval may immediately advise a pilot of a warning prior to receipt of a radio frequency transmission. The transfer of a distinct visual warning in conjunction with transmission of a SIT-TEL pulsed light warning signal may communicate warning information to a pilot at an improved rate of communication transfer as compared to radio frequency transmissions.

It should be noted that free space transmissions for aircraft 876 may occur within the earth□s atmosphere and may be equally applicable for SIT-TEL communications outside the earth's atmosphere as related to space craft communications.

The SIT-TEL communication system may be incorporated into airport support vehicle lights 904. The traditional illumination sources of a rotating beacon 878, are required to be replaced and upgraded with LED technology upon a support vehicle 912. The airport support vehicle lights 904, include a light support 801, a plurality of second LED illumination sources 829, at least one second receiver 823, and at least one second controller 827. The features and functions as earlier described related to the taxi lights 898, runway lights 900, and approach lights 902, are equally applicable to the airport support vehicle lights 904.

The airport support vehicle lights 904, provide illumination as a mechanically or simulated rotating beacon 878, indicating the location of the airport support vehicle 912 relative to an aircraft 876, and gate of an airport. The second controller 827, functions to illuminate second LED illumination sources 829, to emit a visual light signal observable by an aircraft 876. The second controller 827, also functions to illuminate second LED illumination sources 829, to emit a SIT-TEL communication to either a first receiver 819, integral to an aircraft 876, or to a tower 894, to indicate and track the position of the airport service vehicle 912, relative to an aircraft 876, and airport. The airport service vehicle light 904, may function as a real-time position indicator and to communicate through SIT-TEL signals information as to the status of the performance of specific duties. For example, the SIT-TEL communication system through the second LED light sources 829, as integral to a fuel truck may advise the first receivers 819, integral to an aircraft 876 of the location of the airport service vehicle 912, and refueling status.

The tower 894, and/or aircraft 876, may therefore track the position and status of activities of the airport service vehicle 912, relative to an aircraft 876. In this regard, the SIT-TEL communication systems may function as a backup for, or as a replacement of, radio frequency transmissions between an aircraft 876, an airport service vehicle 912, and/or a tower 894.

The SIT-TEL communications related to the airport service vehicle light 904, may be continuously emitted or intermittently activated. The second controller 827, includes preprogrammed signals such as continuous vehicle identification, and various status identifiers which may be selected or changed by an aircraft service personnel during the performance of duties.

The SIT-TEL communications from the second LED illumination sources 829, integral to an airport service vehicle light 904, may transmit messages simultaneously or individually on one or more wavelengths for detection by first receivers 819, integral to an aircraft 876, and/or second receivers 823, integral to a tower 894. The second LED illumination sources 829, are comprised of LED lights of more than one wavelength which may be grouped into one or more collections and/or sectors 811 as earlier described.

The second controller 827, may also regulate the provision of different wavelengths of visual and/or SIT-TEL light signals simultaneously and/or independently. For example, an airport service vehicle light 904, may simultaneously emit a desired type of visual signal, a first wavelength SIT-TEL signal to a first receiver 819, integral to an aircraft 876, and a second wavelength SIT-TEL signal to a second receiver 823, integral to a tower 894. The second controller 827, may also regulate the generation of an emergency visual signal and simultaneously emit an emergency SIT-TEL warning communication to an aircraft 876, and/or tower 894.

The airport service vehicle light 904, and LED light support 801, may be attached to the top of a post. Alternatively, the airport service vehicle light 904, may be attached at location relative to an airport service vehicle 912. Generally, the most common wavelengths of color for the airport service vehicle lights 904, is either amber, green, and/or red.

The second controller 827, positioned integral with an airport service vehicle 912, may include preprogrammed locations relative to an airport. An individual may therefore select an appropriate location via an entry pad or keyboard to alter the pulsed SIT-TEL signal to reflect a change in position of the airport service vehicle 912. Alternatively, a plurality of positional receivers may be disposed at various locations about an airport. Each of the positional receivers may be constructed for transmission of a preprogrammed location identification signal to a tower 894, through SIT-TEL signals and/or connected to the tower 894, by wire or cable connections. In this embodiment, the airport service vehicle light 904, continuously emits an identification signal which is detected by at least one adjacent positional receiver. Upon receipt of the SIT-TEL signal from the airport service vehicle light 904, a pulsated light position indicator signal is generated to either an aircraft 876, and/or tower 894, by the positional receiver. The second LED illumination sources 829, as coupled to the positional receivers may simultaneously communicate a pulsed SIT-TEL signal representative of the location of the positional receivers as well as the identification of the type of signal received from the airport service vehicle light 904.

Each second controller 827, as integral to an airport service vehicle light 904, may include a pre-programmed coded pulsed signal identifying the particular type and/or function for an airport service vehicle 912. For example, a baggage transport may have a different pre-programmed pulse signal as compared to a fuel truck, a food service vehicle, and/or an aircraft maintenance vehicle. Alternatively, the type of aircraft service vehicle 912, may be indicated through the SIT-TEL signals of different and independent wavelengths.

The use of a SIT-TEL communication system in association with a second controller 827, of an airport service vehicle light 904, permits communication to a first receiver 819, and first controller 815, within a cockpit for an aircraft 876, to indicate the real-time status of food replacement, fuel delivery, baggage loading or unloading, and/or maintenance completion. A pilot may therefore advise the crew and/or passengers as to the status of a craft to assist in departure. In addition, a SIT-TEL system in association with the first controller 815, and first LED illumination sources 803, integral to a beacon 878, and/or wing lights 908, may expedite communication that an aircraft 876, is ready and available to receive food, fuel, and/or baggage loading and unloading which in turn enables faster preparation for continued aircraft service. The use of the SIT-TEL system with respect to an aircraft 876, and/or airport support vehicle 912, reduces the necessity for use of radio frequency transmissions proximate to an airport by substitution with free space pulsed LED transmission and detection signals.

The components, features, and applications as earlier described related to the SIT-TEL LED pulsed light communication system are equally applicable for use in a marine application.

Figure 73:
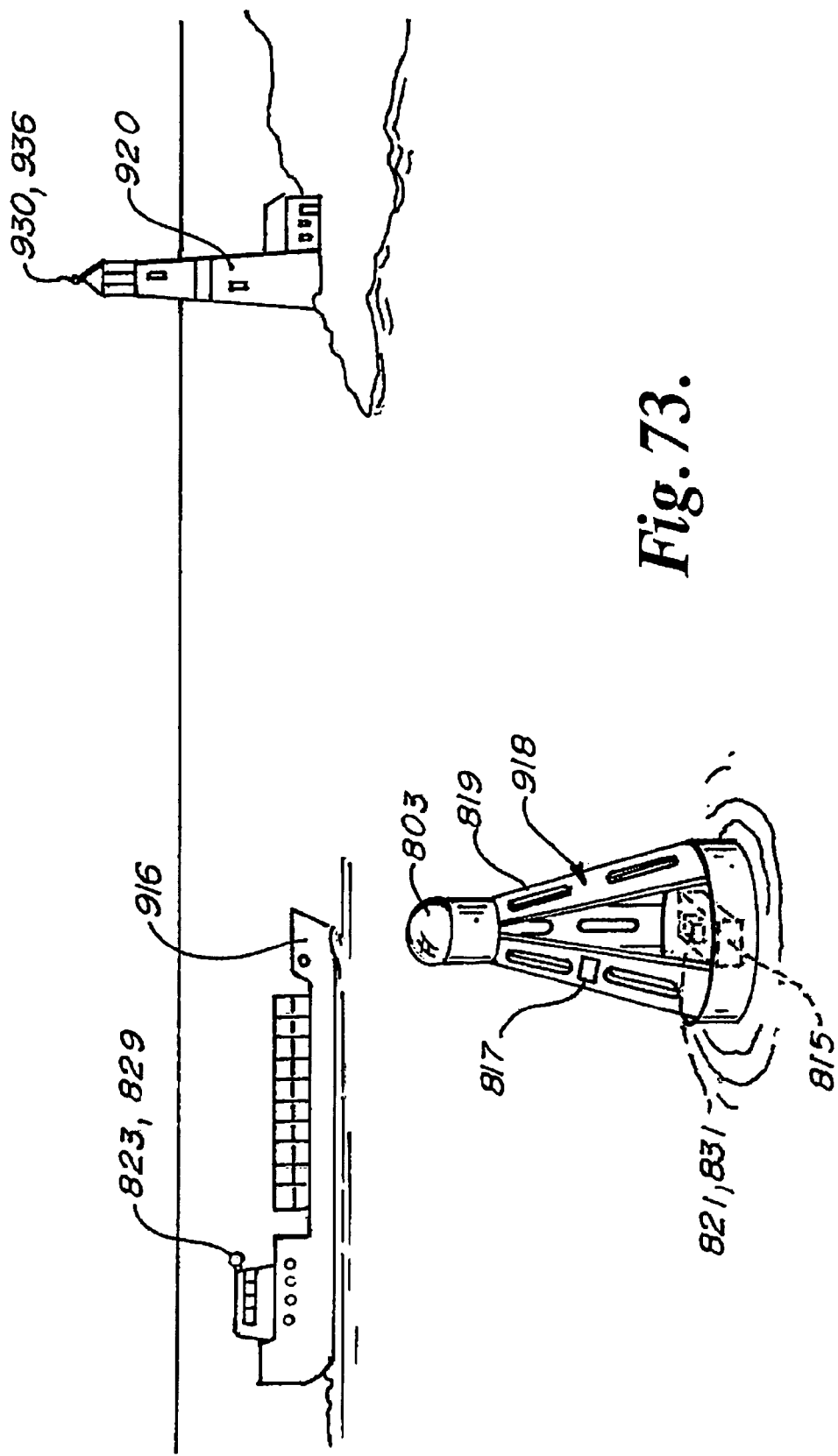
FIG. 73 is an environmental view of an LED SIT-TEL pulsating light signal and marine environment.

In general, an LED light support 801, having first LED illumination sources 803, will be placed at a suitable location aboard a first vessel 916. (FIG. 73.) The LED light support 801, may include a rotational device 805, culminator assembly 807, stationary and/or rotatable reflectors 809, and/or sectors 811, and/or different wavelengths of LED light sources as earlier described. The LED light support 801, is coupled to a vessel power supply and/or may be battery operated having rechargeable solar cells as earlier described or wave-action generators.

A second LED light support 801, having second LED illumination sources 829, second receiver 823, second converter 825, and second controller 827, may be integral to a marine buoy 918, lighthouse 920, and/or other vessel. The second receivers 823, second controller 827, and/or second LED illumination sources 829, are constructed and arranged for receipt of SIT-TEL LED pulsed light communication signals as transmitted from the first vessel 916, for communication recognition, verification, and responsive communication as earlier described with respect to the motor vehicles, aircraft, taxi lights, approach lights, and/or runway lights.

The use of the SIT-TEL system in association with a buoy 918, preferably enables enhanced visualization of the location of the buoy 918, while simultaneously transmitting an SIT-TEL LED pulsed light signal which may indicate pre-programmed and/or real-time information for transmission to the vessel 916. The second controller 827, as integral to the marine buoy 918, may transmit pre-stored information such as the identification number of the buoy, the fact that the buoy may be an east channel marker and the depth of the water at the location of buoy 918. In addition, the second receivers 823, may be disposed about the buoy 918, at various locations where an individual second receiver 823, will only detect a transmitted SIT-TEL signal at such times as a first vessel 916, is outside of a marked channel. In this instance the selected second receiver 823, will generate a signal to the second controller 827, which will in turn generate a responsive warning signal to the first vessel 916, for receipt by the first receivers 819, that the first vessel 916, is outside of the marked main channel and may be on a course for running aground and/or striking underwater obstacles.

The second receivers 823, as integral to the buoys 918, may also be adapted to receive SIT-TEL signals transmitted from the first vessel 916, via the first LED illumination sources 803, and first controller 815, for communication of information such as the registered name and port for the first vessel 916. The buoy 918, may then forward the identity of the first vessel 916, to a second buoy 918, and/or a harbor control center through the use of additional SIT-TEL LED pulsed illumination signals. Any number of buoys 918, may be utilized to sequentially transmit SIT-TEL pulsed LED illumination signals to a harbor master related to communications from a first vessel 916.

The first controller 815, as integral to the first vessel 916, and the second controller 827, as integral to the buoy 918, may also include a pre-stored and/or pre-programmed recognition protocol related to pulsed LED SIT-TEL light signals for initiation of communication therebetween.

The second LED illumination sources 829, as integral to the buoy 918, are constructed and arranged to provide a visual LED signal within the red and/or green spectrums which may be used for navigation purposes. The visual LED signals as transmitted by the second illumination sources 829, may be flashing, pulsed, modulated, and/or may simulate the appearance of rotation as earlier described. Alternatively, the LED light support 801, as integral to the buoy 918, may be physically rotated via a rotational device 805, as earlier described.

A harbor master may utilize a series of buoys 918, to sequentially transmit a communication to a first vessel 916, for regulation of marine traffic through a channel by the use of SIT-TEL communication signals. The use of SIT-TEL communication signals may be supplemental to the transmission of radio frequency transmissions. Alternatively, the buoy 918, is not required to be utilized exclusively within a channel or harbor application. The buoy 918, may be a position identification source and/or obstacle marker.

The buoy 918, may be positioned at any location within a body of water to continuously transmit a pulsed LED SIT-TEL signal for communication of information such as longitude and latitude coordinates. Alternatively, the buoy 918, may become activated and transmit SIT-TEL signals at such time as the second receiver 823, receives a triggering signal from a first set of LED illumination sources 803, integral to a first vessel 916. Each buoy 918, may also transmit real-time information such as water temperature, barometric pressure, changes in barometric pressure, temperature, and/or wind speed and direction. The buoy 918, may include a long life lithium battery and/or a backup rechargeable solar cell as earlier described.

Buoy☐s 918, may also be utilized to record marine traffic for tracking purposes. For example, a first vessel 916, may transmit the vessel identity to a buoy 918, through the use of SIT-TEL communication signals. The buoy 918 may then record the date, time of transmission, and/or destination information related to the vessel 916. The SIT-TEL signal as received by the second receiver 823, is preferably recorded on the second controller 827. In the event that a first vessel 916, becomes overdue then a retrieval craft such as an airplane or helicopter may be dispatched by a Coast Guard unit having interrogation SIT-TEL capabilities. A Coast Guard vessel or aircraft may then fly within range of a buoy 918, and transmit an SIT-TEL interrogation signal which will trigger the second controller 827, to dump all pre-stored marine traffic data for transmission to the Coast Guard aircraft or vessel via a responsive SIT-TEL signal. A Coast Guard and/or searching vessel may thereby identify time and direction of travel for a lost vessel to narrow a search area thereby improving the probability of survivor retrieval. In addition, a vehicle such as an aircraft 876, may fly within the proximity of a buoy 918, for transmission of a first SIT-TEL signal to be received by the second receiver 823, and/or second controller 827, to modify future SIT-TEL communications to be generated by the second LED illumination sources 829. In this regard, warning signals may be activated and/or altered on the marine buoy 918. A marine vessel 916 which has previously been outside of radio frequency transmission range may therefore receive updated SIT-TEL communication signals from a buoy 918, related to warnings such as adverse weather and/or wave conditions.

SIT-TEL communication signals as transmitted between a first vessel 916, and a second vessel 922, may be provided in the manner as indicated as related to SIT-TEL transmissions between aircraft and/or a control tower 894, as earlier described.

SIT-TEL communication signals may also be transmitted between a first vessel 916, and a lighthouse 920, in a manner similar to the SIT-TEL communications identified between an aircraft 876, and tower 894, as earlier described. SIT-TEL communications being generated by a lighthouse 920, are anticipated to be prominently pre-recorded and/or pre-stored communication signals as integral to the second controller 827. It is anticipated that the SIT-TEL communication signals as generated by a lighthouse 920, will transmit information such as longitude and/or latitude or other coordinates, and navigation information which will assist a first vessel 916, from approaching a marine hazard.

Figure 77:
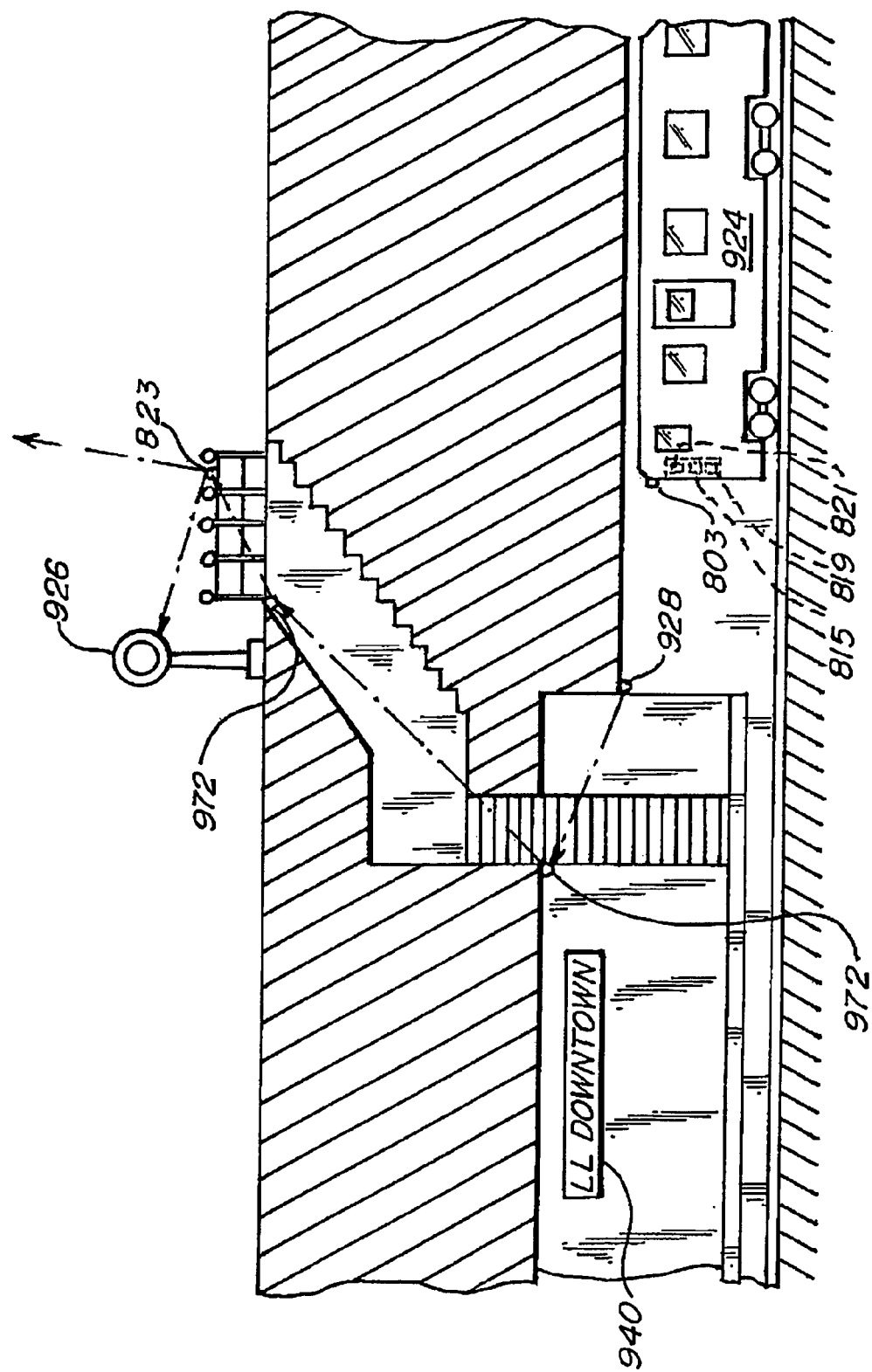
FIG. 77 is an environmental partial cross-sectional side view of an LED OPTICOM SIT-TEL pulsating light signal and subway environment.

The components, features, and applications as earlier described related to the SIT-TEL LED pulsed light communication system are equally applicable for use in a subway, bus, and/or mass transit application. (FIGS. 74 and 77.) For convenience, the subway, bus, and/or mass transit vehicle will be identified by the numeral 924. The subway/bus 924, preferably includes the elements as earlier identified and described related to the LED light support 801, first LED illumination sources 803, culminator assembly 807, sectors 811, power source 813, first controller 815, first receiver 819, and converter 821.

A second receiver 823, second converter 825, second controller 827, and second LED illumination sources 829, are preferably constructed and arranged for attachment to a street sign and/or traffic light 926.

In the mass transit application, the first controller 815, as integral to the bus and/or subway 924, includes pre-stored information as to the vehicle identification number, schedule, and vehicle route. The second controller 827, as integral to the street sign and/or traffic light 926, includes pre-stored identification information such as a position location relative to a map. Within the subway mass transit application position identifiers 928, may be regularly spaced along a route in substitution for the street sign/traffic lights 926.

Initially, the first controller 815, will signal initiation of a first SIT-TEL pulsed light communication signal to be transmitted for detection by the second receivers 823, as integral to a street sign 926, and/or position identifier 928. The second controller 827, as coupled to the street sign 926, or position identifier 928, will process the received signal for generation of a second SIT-TEL LED pulsed light signal for transfer to a centrally located third receiver 930, as connected to a third converter 932, third controller 934, and third LED illumination device 936. The third receiver 930, third controller 934, and/or third LED illumination device 936, are preferably elevated with respect to the street signs 926, and/or position identifiers 928, in order to receive pulsed LED SIT-TEL light signals from a plurality of street signs 926, and/or position identifiers 928. The third controller 934, may be electrically coupled to a traffic processor 938, which functions as a central processing and tracking location related to SIT-TEL signals received from the third controller 934. The second controller 827, as integral to the street sign 926, and/or position identifier 928, may record the first SIT-TEL signal received from the first controller 815. The second controller 827, may then relay the first SIT-TEL signal including vehicle identification along with additional information such as an identification signal corresponding to a street sign 926, and/or position identifier 928, address and a signal corresponding to the time of transmission of the SIT-TEL signal. The third controller 934, as receiving the first and second SIT-TEL signals may transfer information to the traffic processor 938, which may compare the information to a preset map and/or schedule for transmission of SIT-TEL signals back to the street signs 926, and/or position identifiers 928. The street signs 926, and position identifiers 928, as receiving a SIT-TEL signal from the traffic processor 938, may initiate the transmission of an additional SIT-TEL signal for receipt by a plurality of displays 940, as representative of the tracking and/or location of a bus/subway 924 proceeding along a preselected route. Potential passengers waiting for a bus/subway 924, may therefore track in real-time the location of the bus/subway 924. The tracking of a subway/bus 924, is thereby facilitated. Additionally, bus stop and/or subway connection information may also be transmitted by SIT-TEL pulsed LED light signals for receipt upon the displays 940, to assist passengers during travel activities.

Each subway/bus 924, may also include a display 940, which is adapted to receive a second SIT-TEL pulsed light signal as generated by a street sign 926, and/or position identifier 928, for processing by a first controller 815. The position location identifiers from the street signs/traffic light 926, and/or position identifier 928, may assist passengers to identify the real-time location of the vehicle with respect to a pre-selected route to facilitate departure locations.

The wavelengths selected for the first LED illumination sources 803, second LED illumination sources 829, and/or third LED illumination devices 936, may be identical and/or different to facilitate communication of SIT-TEL systems. The first receiver 819, second receiver 823, and/or third receivers 930, may be adapted to receive a particular wavelength of generated LED pulsed light signal. Alternatively, each of the first controllers 815, second controllers 827, and/or third controllers 934, may be coupled to a scanner 831, which searches to identify transmitted SIT-TEL signals used to communicate tracking and/or other information within a mass transit application. The use of SIT-TEL communication signals in association with mass transit tracking applications avoids the necessity for utilization of radio frequency transmissions which may frequently encounter interference from buildings or other sources within an urban environment and facilitates real-time planning for the customers, generating confidence in the system.

A plurality of third controllers 934, may be disposed in any desired pattern as elevated with respect to an urban environment for communication relay to assist in the tracking, regulation, and control of a mass transit SIT-TEL application. The third receivers 930, third converters 932, third controllers 934, and third LED illumination devices 936, are coupled to a power source which may be a battery integral to the street sign/traffic light 926, and/or position identifiers 928. The power source may be hardwired into a power source for a city. The first LED support 801, as integral to the bus/subway 924, may be positioned at any location including but not necessarily limited to the front dashboard proximate to a window, to the exterior proximate to the top of the vehicle, and/or front of the bus/subway. In addition, the second receiver 823, may be positioned at any location relative to a street sign/traffic light 926, and may be located toward the top with respect thereto.

The components, features, and applications as earlier described related to the SIT-TEL LED pulsed light communication system are equally applicable for use in an OPTICOM intersection clearing application.

Figure 67B:
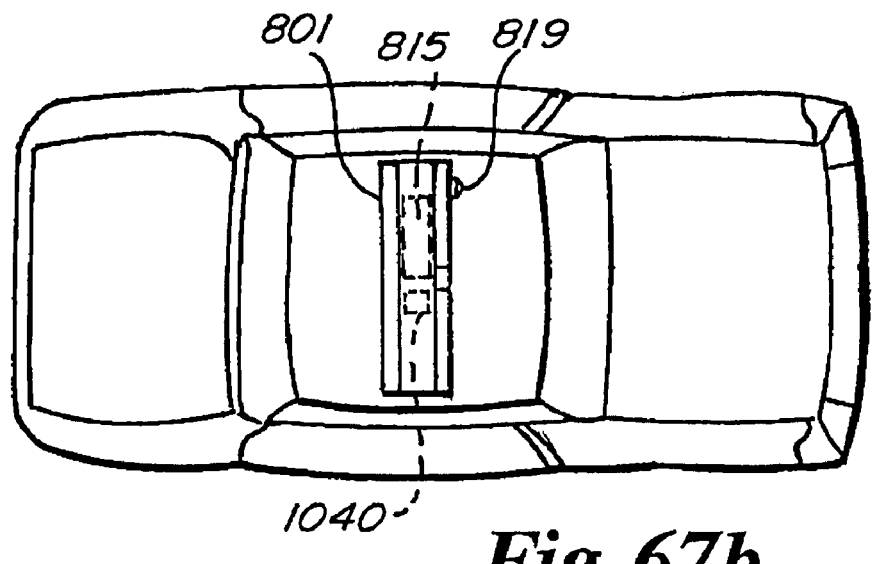
FIG. 67B is an alternative top environmental view of an emergency vehicle and pulsed light system.

The OPTICOM intersection clearing device is generally referred herein as the OPTICOM device identified by the numeral 942. (FIG. 67.) The OPTICOM device 942, includes a second receiver 823, second converter 825, second controller 827, and second LED illumination sources 829. In addition, the OPTICOM device 942, includes an LED support 801, having sectors 811. The OPTICOM device 942, is electrically coupled to a main power supply for a traffic signal 926, and may be constructed to have a backup power supply such as a battery which may be rechargeable through the use of a solar cell.

In general, the OPTICOM device 942, and second controller 827, is connected to an override switch which is integral to the traffic light 926. A police, ambulance, fire, or other emergency vehicle during an emergency situation frequently requires the immediate transposition of a semaphore to a green traffic condition signal, to facilitate speed of arrival at an emergency situation. In addition, the first SIT-TEL system as integral to an emergency vehicle may also include a first receiver 819. During use of the OPTICOM device 942, an officer or emergency personnel will activate a switch to initiate the first controller 815, to generate a first SIT-TEL communication signal for transmission from the first LED illumination sources 803. The first SIT-TEL pulsed light signal will be received by the second receiver 823, integral to the OPTICOM device 942. The second controller 827, of the OPTICOM device 942, will then trigger the override switch to instantaneously transition the semaphore from either a red or amber signal to a green light signal to permit passage of an emergency vehicle through an intersection.

The first LED illumination sources 803, as integral to the emergency vehicle are pointed upwardly towards the top of the traffic light and/or semaphore 926. The second receiver 823, is proximate to the top of the traffic light 926/semaphore. The second receiver 823, second converter 825, second controller 827, and second LED illumination sources 829, may be hardwired to an electrical power source and/or powered through a battery as earlier described.

The second receiver 823, as integral to the OPTICOM device 942, continuously receives the first SIT-TEL signal as generated from the first LED illumination sources 803. At such time as the second receiver 823, terminates detection of the SIT-TEL signal as generated by the first LED illumination sources 803, a pre-programmed timing delay may be initiated for deactivation of the override switch to return the traffic light 926, and/or semaphore to a normal operational condition. Alternatively, the emergency vehicle may include an additional LED support 801, of first LED illumination sources 803, to transmit from the back of a vehicle once passage through an intersection has been completed. A second SIT-TEL pulsed LED light signal may thereby be generated by the first controller 815, for detection by the second receiver 823, as integral to the OPTICOM device 942, for deactivation of the override switch to return the semaphore/traffic light 926, to a standard operational condition. Alternatively, the second controller 827, as integral to the OPTICOM device 942, may include internal pre-programmed software which continues to activate the override switch, for a pre-set period of time. In addition, the first controller 815, and second controller 827 as integral to the OPTICOM device 942, may be programmed to proceed with a recognition protocol as earlier described. The use of the SIT-TEL communication signaling system may be utilized as a backup or supplemental communication device to radar transmitters, transponders, and/or radio frequency equipment. The OPTICOM device 942, provides a visual activation light signal as well as a responsive SIT-TEL communication signal for receipt by the second receivers 823, and/or observation by an emergency personnel or policeman to indicate that, in fact, the override switch has been activated to change the semaphore/traffic light 926, to a green configuration to permit unobstructed passage of the emergency vehicle through an intersection.

The components, features, and applications as earlier described related to the SIT-TEL LED pulsed light communication system are equally applicable for use within a railroad crossing application. (FIGS. 75 and 76.) Generally, black and white railroad crossing signs having no alarm and/or gate are utilized in most all rural environments due to the reduced level of traffic and prohibitive cost for inclusion of more safety conscious railroad warning indicators. The absence of alarms and gates at rural railroad crossings increases the likelihood of motor vehicle accidents and fatalities. Counties generally desire to have safer railroad crossings and railroads also desire safer railroad crossings to reduce risk of motor vehicle accidents. A need therefore exists for an inexpensive, long life and dependable visual and audio signal at rural railroad crossings which is easily adaptable for inclusion within existing railroad crossing signs.

A railroad crossing warning signal 946, is generally formed of an LED support 801, having first LED illumination sources 803, formed into sectors 811. In addition, the railroad crossing warning signal 946, includes a culminator assembly 807, a power source 813, a first controller 815, a solar energy cell 817, a first receiver 819, and a converter 821. The elements of the railroad crossing signal are directly attached to a railroad crossing sign pole as placed adjacent to rural railroad crossings.

The LED light support 801, having the first LED illumination sources 803, is adapted for receipt of power from the first controller 815, to simulate the existence of a revolving light. The power as regulated by the first controller 815, may permit the illumination of individual and/or groups of LED☐S. The railroad crossing warning signal may also include an audible alarm 948, which may be used to generate a buzzing, bell, and/or siren warning signal for detection by motor vehicles.

A train 950, preferably includes a front 952, and a back 954. A second LED light support 801, having second LED illumination devices 829, is positioned proximate to the front 952 of the train 950. In addition, a third LED light support 801, including a third receiver, third converter, third controller, and third LED illumination sources, may be positioned proximate to the back 954 of the train 950. The second controller 827, and second LED illumination sources 829, are constructed to continuously flash a visible warning light signal which may include a modulated duty cycle as earlier described. The second controller 827, and second LED illumination sources 829, are also constructed and arranged to continuously emit SIT-TEL communication signals as earlier described. The SIT-TEL communication signals as generated by the second controller 827 transmit a recognition protocol as earlier described and are adapted for detection by the first receivers 819, as integral to the railroad crossing sign 956. The first receiver 819, is constructed to receive the first SIT-TEL signal as generated by the second controller 827 integral to the front 952, of the train 950. The first controller 815, interprets the first SIT-TEL communication signal for activation of the first LED illumination sources 803, for the provision of a warning light signal and simultaneously the activation of the audible alarm 948. Power is applied to the audible alarm 948, railroad crossing warning signal 946, first controller 815, first receivers 819, and first LED illumination sources 803, through the use of a long life lithium battery and/or a rechargeable battery which may receive power from a solar power cell.

The first controller 815, upon receipt of the initial SIT-TEL communication signal from the train 950, may initiate the transmission of a responsive SIT-TEL signal from the first LED illumination sources 803, for completion of the recognition protocol. The railroad crossing warning signal 946, includes first receivers 819, positioned on opposite sides of the railroad crossing sign 956, along an axis parallel to the direction of the train 950. The first receivers 819, are thereby constructed to receive SIT-TEL communication signals from only one direction which are on opposite sides of the railroad crossing sign 956.

The rear, back, and/or caboose, of the train 950, includes a the third set of LED illumination devices for generation of a second SIT-TEL communication signal. Once a train 950, has passed a railroad crossing, the transmission of the second SIT-TEL communication signal may be detected by the opposite first receiver 819, which deactivates the audible alarm 948, and/or the warning signal light as generated by the first controller 815. Alternatively, the first controller 815 may include a timer for deactivation of the visible warning light signal and audible alarm 948 following passage of a preselected period of time. The first SIT-TEL light signal and the second SIT-TEL light signal are formed of different patterns of pulsated light signals as generated by the second controller 827, and/or third controller. Any wavelength of SIT-TEL signal may be selected for transmission from the first LED illumination sources 803, second LED illumination sources 829, and third LED illumination sources.

A motor vehicle may include a fourth receiver, fourth converter, a fourth controller, a fourth LED illumination device, and an override switch. The fourth receiver is adapted to additionally receive the first SIT-TEL train warning signal in a manner similar to the railroad crossing warning signal. The receipt of the initial SIT-TEL warning signal from the train 950, may be processed by the fourth controller for activation of an override switch, which may be electrically coupled to the radio of the motor vehicle. In addition, the fourth controller may be coupled to the fourth LED illumination device, positioned to the interior proximate to the dashboard of the motor vehicle. The receipt by the fourth receiver, of the first SIT-TEL warning signal as generated by the train 950, causes the controller, to initiate a warning illumination from the fourth LED illumination sources, for observation by an individual as a visual warning signal as to the existence and proximity of a train. An individual may therefore receive a warning indication from a railroad crossing warning signal 946, as well as from the interior of an automobile pursuant to the illumination of the fourth LED illumination device, to heighten awareness as to the existence of a train 950. The fourth controller, following the receipt of the first SIT-TEL warning signal from the train 950, may, via the override switch, terminate power to a motor vehicle radio and/or generate a voice message through a speaker as earlier described.

The components, features, and applications as earlier described related to the SIT-TEL LED pulsed light communication system are equally applicable for use in an urban suburban communication system 966. (FIGS. 74 and 77.)

The urban suburban communication system 966, is generally formed of an LED light support 801, having first LED illumination sources 803, formed into sectors 811. The urban suburban communication system 966, also includes a main power source 813, as earlier described along with a battery backup power source which may be formed of a rechargeable solar cell 817. The urban suburban communication system 966, further includes at least one first controller 815, at least one first receiver 819, and at least one first converter 821. The urban suburban communication system 966, is positioned to the top of a central building 968, or tower 970, as related to a geographic area.

The urban suburban communication system 966, is adapted to generate SIT-TEL pulsed LED light signals in a horizontal and downwardly direction related to the location of the building 968, and/or tower 970. The urban suburban communication system 966, may be formed of a circular, oval, octagonal, hexagonal, square, and/or rectangular shaped LED light support 801. Sectors 811 of culminators 807, and/or first qLED illumination sources 801, may be angularly offset for the emission of light at any desired angle of illumination. The first controller 815, controls the emission of SIT-TEL communication signals from the first LED illumination sources 803, in one or more desired directions sequentially, individually, and/or simultaneously. The first LED illumination sources 803, are constructed and arranged to additionally provide a warning light signal such as a beacon for visual recognition by an aircraft 876.

The urban suburban communication system 966, may also formed of a plurality of relay sites 972, which include at least one second receiver 823, at least one second converter 825, at least one second controller 827, and at least one set of second LED illumination sources 829. The relay sites 972, may be secured to street and/or traffic signals 926, and/or street lamps. Alternatively, the relay sites 972, may be placed at any desired location within an urban/suburban environment. Any number of relay sites 972, may be used for detection of initial SIT-TEL communication signals as emitted from the urban suburban communication system 966.

The relay sites 972, transmit and/or receive SIT-TEL communication signals to or from a user site which may be placed upon a dwelling, building, and/or other structure 976. The user sites include at least one third receiver 930, at least one third converter 932, at least one third controller 934, and at least one set of third LED illumination sources 936. The user site is electrically coupled to a visual display 940, audible alarm, and/or LED light support 801, having LED illumination sources. Any number of relay sites 972, may be sequentially positioned between the urban suburban communication system 966, and the user site. Each SIT-TEL communication signal may therefore be passed from the first LED light sources 803, to a second receiver 823, integral to an initial relay site 972, for successive transmission to additional second receivers 823, of relay sites 972, for final SIT-TEL transmission to a third receptor 930, integral to a user site. The third controller 934, may then process the final SIT-TEL signal at the dwelling, building, and/or structure 976, for issuance of a signal on the display 940, activation of an LED light on a light support 801, and/or activation of an audible alarm. SIT-TEL communication signals may therefore be processed sequentially from the urban suburban communication system 966, through successive relay sites 972, to a user site. Types of SIT-TEL signals may include but are not necessarily limited to mail messages, pictures, photographs, advertisements, communications, news, real-time entertainment, pre-programmed entertainment, civil defense warnings, and/or any other type or form of communication which may be reduce to pulsed and/or encrypted LED light signals. It is anticipated that SIT-TEL communication signals may be used as a supplement or replacement of modes of communication such as mail, e-mail, advertising, billboards, cell phones, telephones, radio, and/or television.

Additionally, the user site includes the third controller 934, and the third LED illumination sources 936, which are constructed and arranged to emit responsive SIT-TEL communications signals upstream through the second receivers 823, of the relay sites 972, for further communication to the first receivers 819, of the urban suburban communication system 966, for processing within the first controller 815. The first controller 815, may identify a designated recipient of the communication for generation of a responsive SIT-TEL signal downstream, back through a series of second receivers 823, for ultimate transition to a particular third receiver 930, at the previously identified and designated user site.

In this regard, each intermediate relay site 972, and user site, is required to have a stored identification combination of pulsed LED light signals to identify an address. The addresses for each and every site 972, and/or user site, are stored within each respective second controller 827, and third controller 934, respectively. The first controller 815, second controller 827, and third controller 934, are computers having microprocessors and stored translation software to recognize and interpret received SIT-TEL communication signals for communication to individuals through the display 940, and/or audible alarms.

The urban suburban communication system 966, relay sites 972, and/or user sites, may each include more than one LED light support 801, and one or a plurality of first receivers 819, second receivers 823, and/or third receivers 930, respectively. The urban suburban communication system 966, relay sites 972, and/or user sites, may each include one or more first controllers 815, second controllers 827, and/or third controllers 934. Each of the first controllers 815, second controllers 827, and/or third controllers 934, may be constructed to process a selected type of SIT-TEL communication signal. For example, one set of first controllers 815, second controllers 827, and third controllers 934, may exclusively communicate SIT-TEL signals related to mail and/or e-mail. Another set of first controllers 815, second controllers 827, and/or third controllers 934, may exclusively communicate SIT-TEL signals related to cellular and/or telephone signals. Any number of sets of controllers may be utilized as a portion of the urban suburban communication system 966 to communicate a specific desired type of information.

A specific type of communication signal may be assigned exclusively to a particular wavelength of SIT-TEL pulsed LED light communication signals. For example, cellular telephones and/or telephone communications may be assigned to a specific wavelength associated with an amber color. Radio communications may be assigned to a wavelength associated with a blue color. Any desired type of communication may be assigned a specific common wavelength for transmission and receipt of SIT-TEL communication signals. The SIT-TEL communication signals are not required to be exclusively in the visible spectrum but may also be generated in the non-visible spectrum.

Recognition protocols as earlier described are equally applicable as related to the SIT-TEL communications between the urban suburban communication system 966, relay sites 972, and/or user sites.

A hardwired connection may be provided between the third receiver 930, or the user sites, and an internally located display 940, audible alarm, and/or LED light signal. The third controller 934, may permit a user to select a type of display 940, for communication of received SIT-TEL pulsed light signals. For example, an individual may manipulate the third controller 934, for generation of a processed and interpreted SIT-TEL communication signal for display upon a screen, television, stereo, speaker, alarm, and/or flashing or other warning light. Additionally, the SIT-TEL communications as processed by the third controller 934, may not be accessible to a end user without entry of security measures to facilitate retrieval such as the use of passwords and/or other encryption means.

The urban suburban communication system 966, relay sites 972, and/or user sites 974, may each additionally include scanners 831 and/or dials as earlier described for detection of transmitted SIT-TEL communication signals.

The third controller 934, is constructed and arranged to interpret digital pulses for translation into visual images for showing on the display 940. Additionally, the third controller 934, is constructed to issue an audible alarm, and/or a flashing LED light signal as a portion of a civil defense warning to advise occupants of the existence of severe weather conditions.

The third controller 934, and third LED illumination sources 936, as integral to a user site, may also be utilized to transmit encrypted SIT-TEL light signals and/or messages on an emergency basis as coupled to third receivers 930, integral to a police or fire station. An individual user within a building, dwelling, or structure 976, may therefore activate a switch causing the initiation of a LED pulsed SIT-TEL emergency signal for transmission to a police or fire station without the necessity of use of a telephone.

A significant advantage of utilizing SIT-TEL communication signals in association with an urban suburban communication system 966, is the flexibility for the provision of alternate communication mechanisms within free space which minimize the necessity for large expenditures for construction of an infrastructure for a community.

The components, features, and applications as earlier described related to the SIT-TEL LED pulsed light communication system are equally applicable for use in a vehicle to vehicle application.

A vehicle to vehicle SIT-TEL communication application is similar to the earlier described applications related to motor vehicle license plates and aircraft/aviation SIT-TEL communications. In addition, to the SIT-TEL communications as previously identified, an emergency vehicle 978, may include an LED light support 801, having first LED illumination sources 803, formed into sectors 811, as earlier described. In addition, the emergency vehicle 978, may include at least one first controller 815, at least one first receiver 819, and at least one converter 821, as coupled to the emergency vehicle electrical system and backup power source such as a battery. Emergency vehicle personnel such a police officer may manipulate the first controller 815, to either select a pre-programmed SIT-TEL signal or may generate a SIT-TEL signal for transmission from the first LED illumination sources 803. At least one second receiver 823, at least one second controller 827, and at least one set of second LED illumination sources 829, may be included within a street and/or a roadway sign. The transmitted SIT-TEL signal as received by the second receivers 823, integral to the road sign, is preferably processed by the second controller 827, for issuance of a message such as "congestion", "accident", "reduced speed", and/or any other message as appropriate for communication of traffic conditions. SIT-TEL communications may therefore be passed through free-space from an emergency vehicle 978, to alter roadway signs, without use of radio frequency transmissions.

The first controllers 815, of the emergency vehicle 978, and the second controller 827, of the roadway signs, may perform recognition protocols to verify authenticity of transmitted instructions and/or messages. In addition, each of the first controllers 815, of the emergency vehicle 978, and the second controllers 827, of the roadway signs, include identification and recording software to assist in recording of transmitted SIT-TEL instructions.

An emergency vehicle 978, may also transmit a SIT-TEL communication signal to a street sign/lamp 926, a building, structure, and/or dwelling 976, a user site, or to a relay site 972, of a urban suburban communication system 966, to track the location of the emergency vehicle 978, and/or to communicate messages and instructions through the use of SIT-TEL pulsed LED communication signals. An emergency vehicle 978, may emit pre-stored and/or real-time free-space communication signals to another motor vehicle, aircraft 876, road sign, OPTICOM 942, urban suburban communication system 966, railroad crossing warning sign 946, and/or any other application as identified herein. Real-time communications may be issued through a keyboard, key pad, and/or voice recognition software integral to the emergency vehicle 978.

Figure 72:
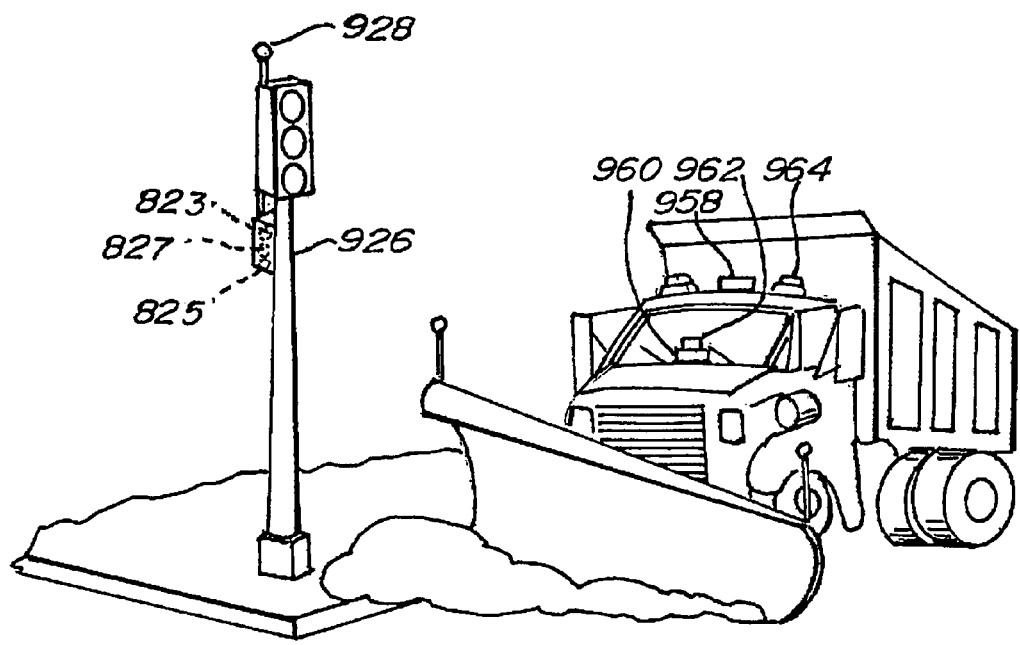
FIG. 72 is an environmental view of an LED SIT-TEL pulsating light signal and snowplow.

The SIT-TEL communication system may additionally be incorporated into other types of vehicles including, but not necessarily limited to, snowplows, roadway construction vehicles, ambulances, and/or fire trucks which utilize visual warning lights. (FIG. 72.) In these vehicles a visual warning signal light may be generated simultaneously with the emission of a SIT-TEL pulsed LED light signal.

SIT-TEL communications may be accomplished between a standard motor vehicle and an emergency vehicle 978, through the emission of a pulsed LED SIT-TEL signal from an emergency vehicle 978, light bar as earlier described. An audible alarm, may be generated requiring an acknowledgment signal by a driver or passenger for actively manipulating a switch to terminate the emission of the audible alarm thereby acknowledging receipt of the SIT-TEL signal from an emergency vehicle. In addition, the manipulation of a switch to terminate the audible alarm, may simultaneously instruct the controller to illuminate LED light sources for transmission of a confirmation SIT-TEL signal to the originating emergency vehicle 978.

The SIT-TEL pulsed LED communication system may also be incorporated into a flare 1000 which may include all of the features as previously identified related to motor vehicles, license plates, aircraft, airport facilities and vehicles, urban communication systems, marine vessels and buoys, OPTICOM traffic signal devices, railroads, and/or subways.

Figures 78, 79:
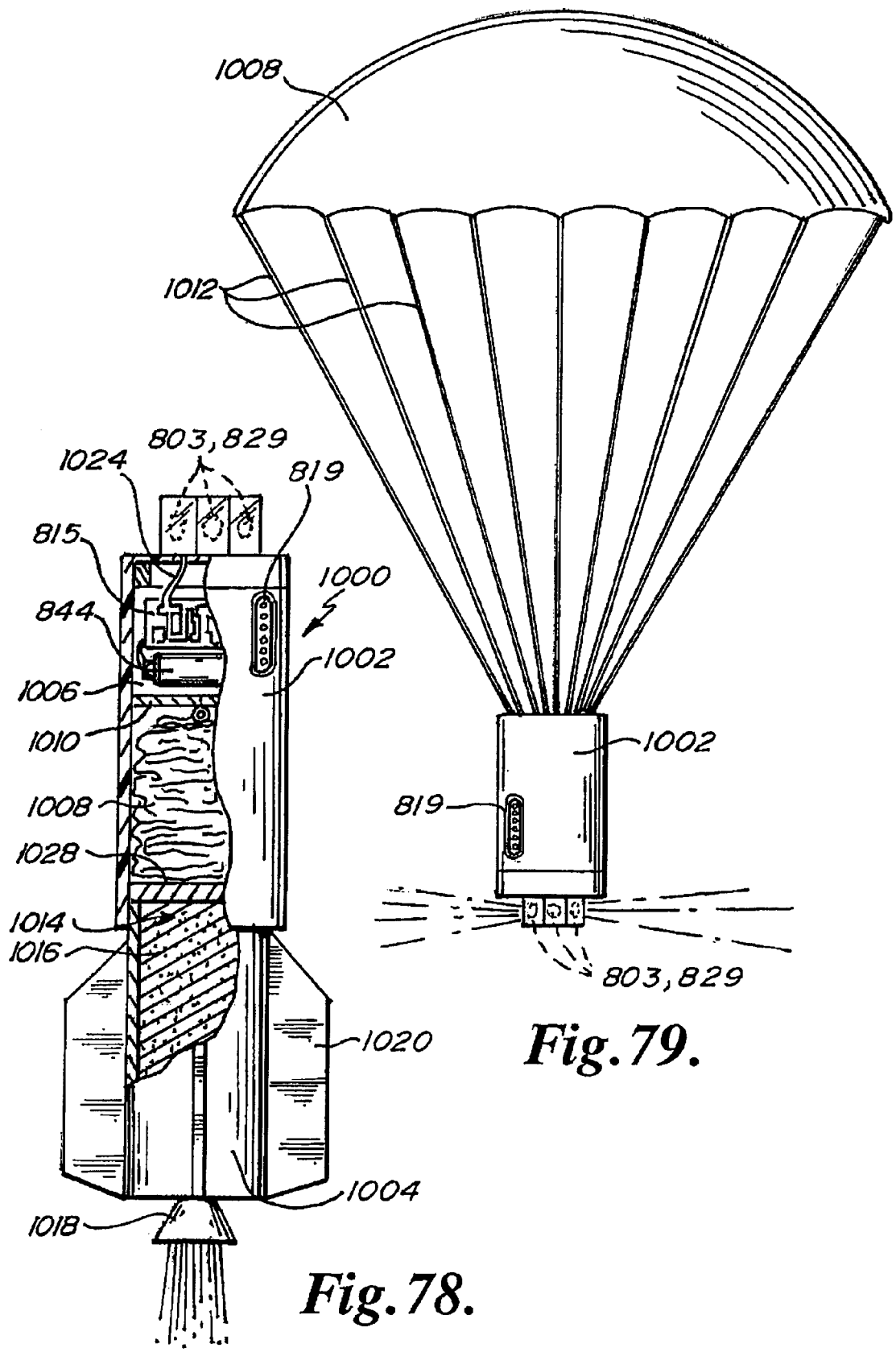
FIG. 78 is a partial cut away view of a flare having an LED SIT-TEL communication system.
FIG. 79 is a perspective view of a flare having an LED SIT-TEL communication system.
Figure 80:
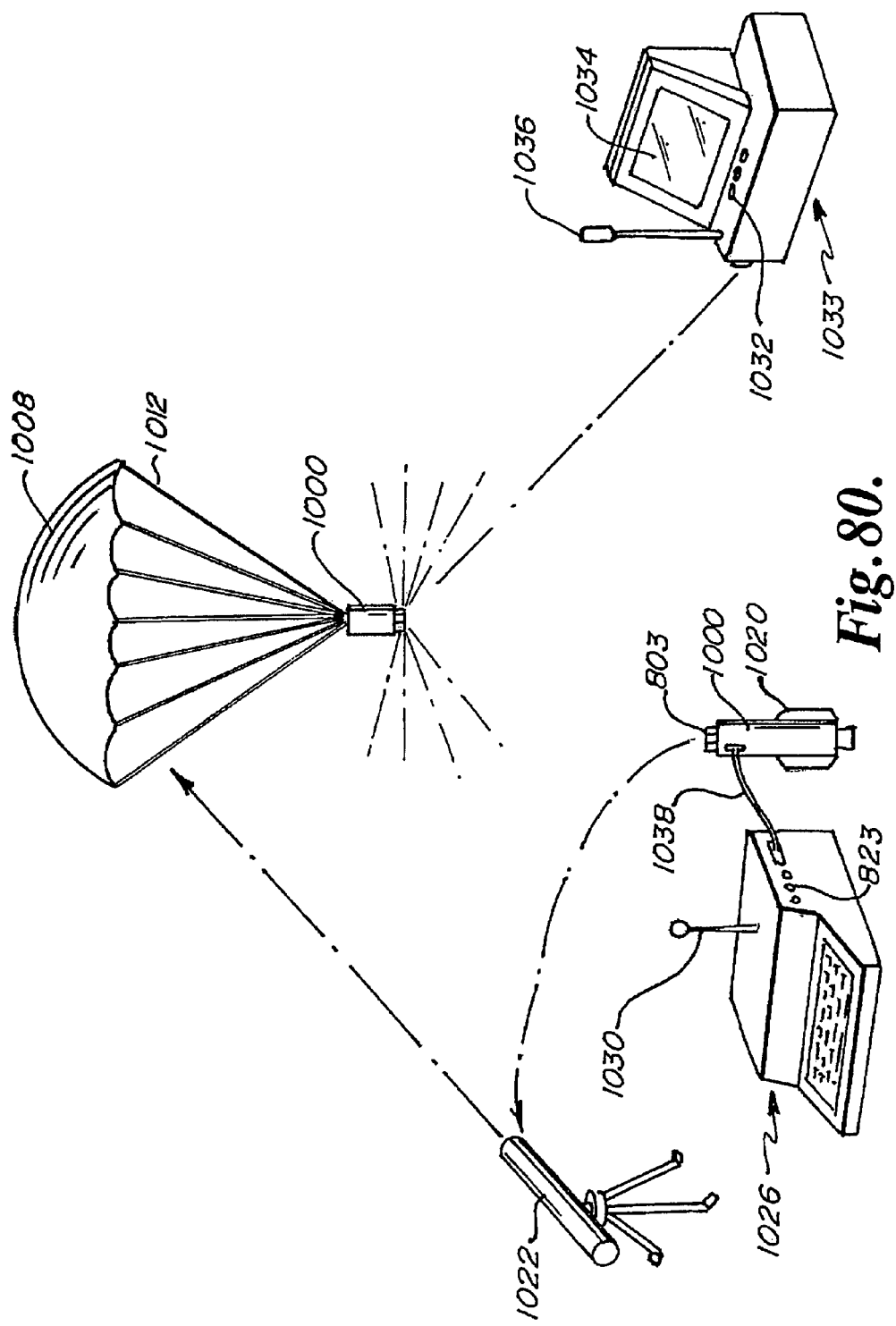
FIG. 80 is an environmental view of a flare having an LED SIT-TEL communication system.

Referring to FIGS. 78 through 80, the SIT-TEL pulsed LED light communication system and flare 1000 are described herein. The flare 1000 includes a casing 1002 and a main body 1004. The casing 1002 includes a chamber 1006. Positioned within the chamber 1006 is the SIT-TEL pulsed LED light control system including a first controller 815 and a parachute 1008. Within the chamber 1006 is located an affixation bracket 1010. The affixation bracket 1010 is constructed and arranged for attachment to the support cords 1012 of the parachute 1008.

The main body 1004 has a cavity 1014. The cavity 1014 holds solid fuel propellant and/or other fuel 1016 which is used to power the assent of the flare 1000 through engine 1018. The exterior of the main body 1004 may include one or more stabilizers 1020 to assist in the assent of the flare 1000 following discharge from an expulsion device which may be a mortar 1022. Within the chamber 1006 is located the first controller 815 and battery. A first receiver 819 which may include photo diodes traverses the casing 1002 proximate to the first controller 815 and LED illumination sources 829. The LED illumination sources 803 are positioned to the exterior and top of the casing 1002 and are in electrical communication with the controller 815 through wire or other connectors 1024. The functions of the first controller 815, battery, first receiver/photo diodes 819 and LED illumination sources 829 are identical to the functions as earlier described.

During launch, the flare 1000 ascends upwardly where the LED illumination sources 803 are identified as being positioned in a location proximate to the nose of the flare 1000.

The exhaustion of the solid fuel propellant 1016 by the engine 1018 represents the apex of the trajectory of the flare 1000. At this point, the casing 1002 separates from the main body 1004 to open the casing 1002 for deployment of the parachute 1008. The parachute 1008 exits the open end of the casing 1002 to deploy the light emitting diode light sources 803 in a downwardly direction. Following separation of the casing 1002 from the main body 1004 an internal switch may be activated and/or a timer may initiate the transmission of pulsed LED SIT-TEL light signals which are used to communicate information to one or more second receivers 823.

The first receiver 819 is adapted to receive, detect, decode, and process potentially encrypted information as communicated by pulsed LED light signals from a third controller 1026 for programming and/or storage of messages upon the first controller 815.

Separation between the casing 1002 and main body 1004 for deployment of the parachute 1008 may be assisted by a controlled explosion proximate to the affixation bracket 1010. The affixation bracket 1010 may be a separation plate which is sealed with respect to the interior walls of the casing 1002 to protect the first controller 815 from adverse environmental elements. A second separation plate 1028 may be fixed and/or integral to the interior walls of the main body 1004 to enclose the solid fuel propellant 1016 preventing damage to the parachute 1008. The secondary explosion to separate the casing 1002 from the main body 1004 exposes an opening in the end of the casing 1002 to open the chamber 1006 holding the parachute 1008 for deployment of the parachute 1008 for a prolonged descent of the flare 1000.

The flare 1000 may be ejected and/or launched from a mortar 1022. The mortar 1022 may be transportable for positioning at any desired location within an operational theater. Alternatively, the flare 1000 may be dropped form an aircraft and/or launched as a missile.

A third controller 1026 may be proximate to the mortar 1022 and flare 1000. The third controller 1026 is used to program the first controller 815 to define the pulsed SIT-TEL LED light messages to be transmitted to troops within an operational theater.

The third controller 1026 may be connected to a third transmitter 1030 which is used to transmit SIT-TEL pulsed light signals to the first receiver 819 for storage upon the first controller 815. The third controller 1026 may further include a third receiver which is used to receive SIT-TEL pulsed LED light signals from an external controller or signal processor, for further transmission to and storage upon the first controller 815 of the flare 1000.

SIT-TEL pulsed light communication signals are generated by the LED illumination sources 803 of the flare 1000 to be received by fourth receivers 1032 as integral to a fourth controller 1033 which is proximate to troops within an operational theater.

The fourth controller 1033 and fourth receiver 1032 may be incorporated into a hand held transportable unit which may be carried in the pocket of an individual and/or hidden from observation during periods of non-use.

The fourth controller 1033 preferably includes a display 1034 which may be similar to the earlier embodiments as described.

A fourth transmitter 1036 as electrically coupled to fourth controller 1033 may be used to communicate pulsed LED light signals from the ground to the first receiver 819 of the flare 1000.

The flare 1000 including the SIT-TEL communication system may be used as a back-up to radio transmissions within an operational theater. In addition, the flare 1000 including the SIT-TEL pulsed LED light communication system may be utilized when radio transmissions are not available in order to maintain secrecy of the location of troops.

The flare 1000 including the SIT-TEL communication system in conjunction with the fourth controller 1033 and fourth receivers 1032 enables troops to receive communications through the use of pulsed LED light signals. The LED illumination sources 803 as coupled to the first controller 815 are sturdy and sufficiently strong to withstand shock exposed to the flare 1000 following discharge of the solid fuel propellant 1016 from the engine 1018.

Alternatively, prior to deployment, the flare 1000 may be coupled to the third controller 1026 which may be a central processing unit via a cable 1038. Information including encryption and/or encoding information may be passed from the central processing unit of third controller 1026 to first controller 815 for future transmission from LED light sources 803 during use of flare 1000. The coupling of the third controller 1026 to the flare 1000 may occur proximate to the location of the first receiver 819.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A light signal comprising:
   a) a light support having a plurality of light emitting diodes attached thereto, said light emitting diodes receiving power from a power source; and
   b) a controller in communication with said light emitting diodes, said controller being constructed and arranged to illuminate said light emitting diodes to simultaneously create at least one first light signal, and at least one second light signal, said first light signal being observable to the unaided eyes of an individual and said second light signal not being observable to the unaided eyes of said individual.

2. The light signal according to claim 1 further comprising a storage device having a plurality of second light signals, said controller being in communication with said storage device for generation of said second light signals.

3. The light signal according to claim 1 wherein said light support is engaged to a building.

4. The light signal according to claim 1 wherein said light support is engaged to a street light.

5. The light signal according to claim 1 wherein said light support is engaged to a traffic control device.

6. The light signal according to claim 5, said traffic control device comprising a semaphore.

7. The light signal according to claim 1 wherein said light support is engaged to a sign.

8. The light signal according to claim 1 wherein said light support is engaged to a vehicle.

9. The light signal according to claim 8, said vehicle comprising a bus.

10. The light signal according to claim 8, said vehicle comprising an automobile.

11. The light signal according to claim 8, said vehicle comprising a train.

12. The light signal according to claim 8, said vehicle comprising a subway car.

13. The light signal according to claim 8, said vehicle comprising a truck.

14. The light signal according to claim 1, said second light signal comprising rapid light pulses.

15. The light signal according to claim 14, wherein said rapid light pulses are grouped into at least one packet.

16. The light signal according to claim 15, wherein said at least one packet is formed into at least one combination of packets.

17. The light signal according to claim 14, said light signal further comprising a photo detector engaged to said support, said photo detector being in communication with said controller.

18. The light signal according to claim 17, wherein said photo detector is constructed and arranged to detect said rapid light pulses.

19. The light signal according to claim 1, wherein said controller illuminates at least two of said first light signals in at least one combination.

20. The light signal according to claim 1, wherein said controller illuminates at least two of said first light signals simultaneously.

21. The light signal according to claim 1, wherein said light signal is engaged to a structure.

22. The light signal according to claim 1, wherein said light signal is engaged to a tower.

23. The light signal according to claim 1, wherein said light signal is engaged to a light post.

* * * * *